INVENTORS
C. H. PROPSTER JR.
JOYCE L. BARBE
BY A. M. Fernandez
ATTORNEY

Dec. 15, 1964 C. H. PROPSTER, JR., ETAL 3,161,856

ELECTRONIC DATA PROCESSOR

Filed Dec. 9, 1960 36 Sheets-Sheet 2

Dec. 15, 1964 C. H. PROPSTER, JR., ETAL 3,161,856

ELECTRONIC DATA PROCESSOR

Filed Dec. 9, 1960 36 Sheets-Sheet 7

Dec. 15, 1964 C. H. PROPSTER, JR., ETAL 3,161,856

ELECTRONIC DATA PROCESSOR

Filed Dec. 9, 1960 36 Sheets-Sheet 8

Dec. 15, 1964 C. H. PROPSTER, JR., ETAL 3,161,856

ELECTRONIC DATA PROCESSOR

Filed Dec. 9, 1960 36 Sheets-Sheet 9

Dec. 15, 1964 C. H. PROPSTER, JR., ETAL 3,161,856

ELECTRONIC DATA PROCESSOR

Filed Dec. 9, 1960 36 Sheets-Sheet 27

Dec. 15, 1964 C. H. PROPSTER, JR., ETAL 3,161,856

ELECTRONIC DATA PROCESSOR

Filed Dec. 9, 1960

36 Sheets-Sheet 28

Dec. 15, 1964 C. H. PROPSTER, JR., ETAL 3,161,856

ELECTRONIC DATA PROCESSOR

Filed Dec. 9, 1960 36 Sheets-Sheet 30

Dec. 15, 1964 C. H. PROPSTER, JR., ETAL 3,161,856

ELECTRONIC DATA PROCESSOR

Filed Dec. 9, 1960 36 Sheets-Sheet 31

| ROW | GROUP GS0 | GS1 | GS2 | GS3 | GS4 | GS5 | GS6 | GS7 | ROW-DISCONNECT SWITCHES |
|---|---|---|---|---|---|---|---|---|---|
| 0 | 000 | 010 | 020 | 030 | 040 | 050 | 060 | 070 | S-0 |
| 1 | 001 | 011 | 021 | 031 | 041 | 051 | 061 | 071 | S-1 |
| 2 | 002 | 012 | 022 | 032 | 042 | 052 | 062 | 072 | S-2 |
| 3 | 003 | 013 | 023 | 033 | 043 | 053 | 063 | 073 | S-3 |
| 4 | 004 | 014 | 024 | 034 | 044 | 054 | 064 | 074 | S-4 |
| 5 | 005 | 015 | 025 | 035 | 045 | 055 | 065 | 075 | S-5 |
| 6 | 006 | 016 | 026 | 036 | 046 | 056 | 066 | 076 | S-6 |
| 7 | 007 | 017 | 027 | 037 | 047 | 057 | 067 | 077 | S-7 |
| 8 | 100 | 110 | 120 | 130 | 140 | 150 | 160 | 170 | S-8 |
| 9 | 101 | 111 | 121 | 131 | 141 | 151 | 161 | 171 | S-9 |
| 10 | 102 | 112 | 122 | 132 | 142 | 152 | 162 | 172 | S-10 |
| 11 | 103 | 113 | 123 | 133 | 143 | 153 | 163 | 173 | S-11 |
| 12 | 104 | 114 | 124 | 134 | 144 | 154 | 164 | 174 | S-12 |
| 13 | 105 | 115 | 125 | 135 | 145 | 155 | 165 | 175 | S-13 |
| 14 | 106 | 116 | 126 | 136 | 146 | 156 | 166 | 176 | S-14 |
| 15 | 107 | 117 | 127 | 137 | 147 | 157 | 167 | 177 | S-15 |

3,161,856

ELECTRONIC DATA PROCESSOR

Charles H. Propster, Jr., Phoenix, and Joyce L. Barbe, Mesa, Ariz., assignors to General Electric Company, a corporation of New York Filed Dec. 9, 1960, Ser. No. 74,976
3 Claims. (Cl. 340—172.5)

This invention pertains to an electronic data processor, and more particularly to a stored-program digital computer that automatically executes instructions in a program which includes alternative sequences of instructions, one or the other being selected by sequence-determining instructions depending upon results obtained in operations performed in response to preceding instructions.

Electronic data processors must be capable of executing alternative sequences of instructions which depend upon results obtained from arithmetic and other operations performed in response to preceding instructions, particularly in business and industrial process control systems, in order to provide alternative courses of action to meet contingent circumstances. Consequently, instructions to compare a result with a specified constant must be provided in order to select an appropriate one of two alternative sequences of instructions.

In a stored-program digital computer, all of the insructions stored in a memory section are usually read and executed in a sequence determined by the order in which they are stored in memory locations either because the memory locations are inherently accessible in sequence or are rendered sequentially accessible by an instruction counter. For instance, in the present embodiment of the invention, after a single-address instruction stored in a location $n$ has been executed, the instruction next in sequence is automatically read from a location $n+2$. In that manner single-address instructions located in alternate memory locations are executed during alternate memory access cycles or word-times until a one-plus-one address instruction is read which specifies the address of the next instruction. Such an instruction is denominated a one-plus-one address instruction because it includes two addresses, the address of an operand, if one is required, and the address of the next instruction whereas a single-address instruction specifies only the address of an operand if one is required.

In a sequence-determining type of instruction, the operation specified by a one-plus-one address instruction is to determine the presence of a specified criterion before branching to an alternative sequence of instructions by reading out the next instruction from a location specified. If the criterion is a relation of a result of previous operations stored in a register to a specified constant, the operation of such a sequence-determining instruction must include some form of comparison by either a complex logical operation or an arithmetic operation followed by some simple logical operation.

One of the most frequently used conditional branch instructions is an instruction to compare the absolute value of a previous result with the absolute value of a specified constant and to either branch if the previous result is equal to or greater than the specified constant or else to branch if the previous result is less than the specified constant. The comparison required by such an instruction can best be made by subtracting the specified constant from the previous result and testing the sign of the remainder to determine the relation of the previous result to a specified constant.

Compare and branch instructions have been executed in the past by subtracting a constant specified by the instruction from a number stored in a register and then effectively determining whether the remainder is positive or negative. However, in the past at least one operating cycle or word-time has been required to subtract a specified constant from a number in a register after the instruction is read in order to test for the specified relation between a constant and a number in a register.

An object of this invention is to provide a computer capable of executing an instruction to compare a number in a register to a specified constant by effectively subtracting the constant from the number while the instruction is being read from a memory location and testing the remainder in order to determine the relation of the specified constant to the number and to branch to an alternative sequence of instructions if a specified relation is present.

This and other objects are achieved in a serial computer having a magnetic drum in its memory section and having an instruction sequencing section for selectively sequencing either single-address or one-plus-one address instructions. Successive instructions of a sequence of single-address instructions which may follow any one-plus-one address instruction are read from alternate memory locations of a track and executed during intervening periods or word-times.

A one-plus-one address instruction comprises two groups of digital signals or words read from two consecutive memory locations of the same track; the first word specifies the operation and the address of an operand, if one is required, and the second word specifies the address of the next instruction which may be anywhere on the magnetic drum. A first distinctive digital signal representing a bit 1 in the first word distinguishes the instruction and causes it to be sequenced as a one-plus-one address instruction so that the second word is read before the first word transferred to a first instruction register is executed. After the instruction has been executed, the next instruction is read from a location specified by the second word stored in a second register.

When the next instruction following a one-plus-one address instruction is transferred into the first instruction register, a new sequencing cycle is initiated for either a single-address instruction or another one-plus-one address instruction. If a sequence of single-address instructions follows, the contents of the second register are not changed and the track portion of the address represented by a group of digital signals stored therein is employed to select the same track as successive single-address instructions are read from alternate memory locations.

A distinctive digital signal representing a bit 1 in the least significant bit position, the position of lowest order as an instruction word is read from memory, is employed to cause the address portion of the word to be automatically modified as *it is* being read and stored in a register. That is accomplished by a means responsive to such a bit 1 for causing the contents of a third register to be added to the address portion of the instruction word being read. Modification of an instruction word while it is being read is made possible by serially transferring all instruction words to appropriate registers directly through a serial binary adder and synchronously transferring the contents of the third register through the adder to cause successive orders of the contents of the third register to be added to corresponding orders of the address portion of the instruction word being read.

If the next instruction is a one-plus-one address instruction which specifies in the first word read from a location $n$ that the next instruction be read from a location $n+q$ specified by the second word, but only if a number represented by the contents of the third register bears a specified relation to a constant represented by the bit configuration of the address portion of the instruction word, a comparison is made between the number in the third register and the specified constant by subtracting the latter from the former and storing the remainder in the instruction register. In order to accomplish that subtraction in response to a distinctive digital signal in the least significant bit position of the instruction word being read, the number in the third register is stored as a positive number and the constant is stored in the instruction word as a negative number in the two's complement form. Neither the positive number nor the negative constant includes a sign bit. If the contents of the third register are greater than or equal to the constant, a bit 1 carry is propagated as a result of adding the most significant bit of the number being compared to the constant.

An instruction to branch if the number stored in the third register is equal to or greater in absolute value than a specified constant includes as part of its operation or command code a bit 0 in the next more significant bit position so that, as the number in the third register is added to the constant in the first instruction word, a bit 1 carry is propagated into that bit position. Just as the instruction sequencing section completes the transfer of the first word to the first instruction register through the adder, the command portion of the instruction word is decoded and executed. The execution of the instruction consists of testing for a bit 1 carry from the addition of the highest order of the number and the highest order of the constant into the next higher bit position of the instruction word. If such a bit 1 carry is detected, the presence of the specified relation is determined and the instruction sequencing section proceeds to transfer the second word which specifies the address of the next instruction into the second register from the memory location $n+1$; but if such a bit 1 carry is not detected, a flip-flop is set which inhibits the instruction sequencing section from transferring the second word to the second register and causes the instruction sequencing section to transfer the next instruction word into the first register from a location $n+2$.

An instruction to branch if the number stored in the third register is less in absolute value than a specified constant is executed in the same manner except that in the first word transferred from a location $n$ to the first register a bit 1 is provided in the bit position transferred immediately following the most significant bit of the specified constant. If the number in the first register is less than the specified constant in absolute value, a bit 1 carry is not propagated, the bit 1 provided in the next more significant bit position is detected in order to determine the presence of the specified relation of the number to the constant, and the second word of the instruction is transferred into the second register to cause the next instruction to be read from the location specified by the second word. If the number in the first register is not less than the specified constant in absolute value, a bit 1 carry is propagated and added to the bit 1 provided in the next more significant bit position to cause a bit 0 to be stored in that bit position of the first register. The absence of a bit 1 in that position is then detected to determine the absence of the specified relation of the number to the constant to cause the instruction sequencing section to be inhibited from transferring the second word of the instruction to the second register, and to cause the next instruction to be transferred to the first register from a location $n+2$.

Certain portions of the electronic data processor disclosed herein are not of our inventions, but are the inventions of A. J. Trangle, E. A. White and R. W. Austad as defined by the claims of a copending application Serial No. 76,220, filed December 16, 1960, and assigned to the assignee of the present application. Those portions pertain to manual operation of the data processor.

Other portions of the electronic data processor disclosed are the sole invention of C. H. Propster, Jr., as defined by the claims of a copending application Serial No. 70,549, filed November 21, 1960.

Other objects and inventions will be more apparent in the following description taken in conjunction with the accompanying drawings wherein.

TABLE OF CONTENTS

| Title of Section: | Column |
|---|---|
| General Description | 6 |
| Circuit Elements | 15 |
| Basic Circuit Elements | 17 |
| Multi-Input Logic Gates | 18 |
| Simple Flip-Flop | 18 |
| Single-Steered Flip-Flop | 19 |
| Double-Steered Flip-Flop | 19 |
| Shift Register | 20 |
| Special Purpose Circuit | 21 |
| Indicator Driver | 21 |
| Indicator Circuit | 22 |
| Magnetic Drum Read Amplifier | 22 |
| Column Drive Circuit | 23 |
| Write Amplifier | 23 |
| Delay Circuit | 24 |
| Gated Decimal-to-Binary Converter | 24 |

TABLE OF CONTENTS—Continued

| Title of Section: | Column |
|---|---|
| Timing | 25 |
| $\phi_1$ and $\phi_2$ Clock Pulses | 26 |
| Write Clock | 26 |
| Probe Pulses | 26 |
| Index Pulse | 27 |
| Bit Timing | 27 |
| Write and Read Timing | 29 |
| Word Format | 31 |
| Parity Check | 33 |
| Parity Generating Section | 33 |
| Parity Checking Section | 34 |
| Instruction Sequencing Section | 35 |
| Single-Address Instruction Sequencing Cycle | 36 |
| One-Plus-One Address Instruction Sequencing Cycle | 39 |
| MPY and DVD Instruction Sequencing | 41 |
| Store Instruction Sequencing | 41 |
| Head Selection Register Sequencing | 42 |
| Manual Instruction Sequencing | 44 |
| Initiating Instruction Sequencing | 45 |
| Instruction Registers | 45 |
| $\alpha$-Register | 46 |
| $\beta$-Register | 50 |
| Save-$\alpha$ Switch | 52 |
| X-Register | 52 |
| Decoding of Program Instructions | 56 |
| Digest of Commands | 58 |
| Load and Store Commands | 59 |
| Arithmetic Commands | 59 |
| Shift Commands | 61 |
| Word Transfer Commands | 62 |
| Test and Branch Commands | 64 |
| External Effect Commands | 66 |
| Input-Output Commands | 66 |
| Basic Command Decoding | 67 |
| Decoding $GEN_1$ and $GEN_2$ Commands | 68 |
| Test and Branch Command Decoding | 70 |
| Basic Branch Commands | 72 |
| Memory Section | 74 |
| Head Selection Decoding | 77 |
| Address Comparator and Word Counter | 79 |
| Arithmetic Section | 80 |
| Adder | 85 |
| Overflow Buffer and Indicator | 85 |
| A-Register | 86 |
| Q-Register | 91 |
| A and Q-Register Control Section | 92 |
| Shift Counter | 95 |
| Multiplication Sequencing Section | 97 |
| Correction for a Negative Multiplicand | 98 |
| Correction for a Negative Multiplier | 100 |
| Correction for Both Negative Multiplier and Negative Multiplicand | 100 |
| Multiplication Sequencing Operation | 100 |
| DivisionSequencing Section | 105 |
| N-Register | 120 |
| I-Register | 123 |
| Stall and Programmed Alarm Circuit | 125 |

GENERAL DESCRIPTION

Figure 1:
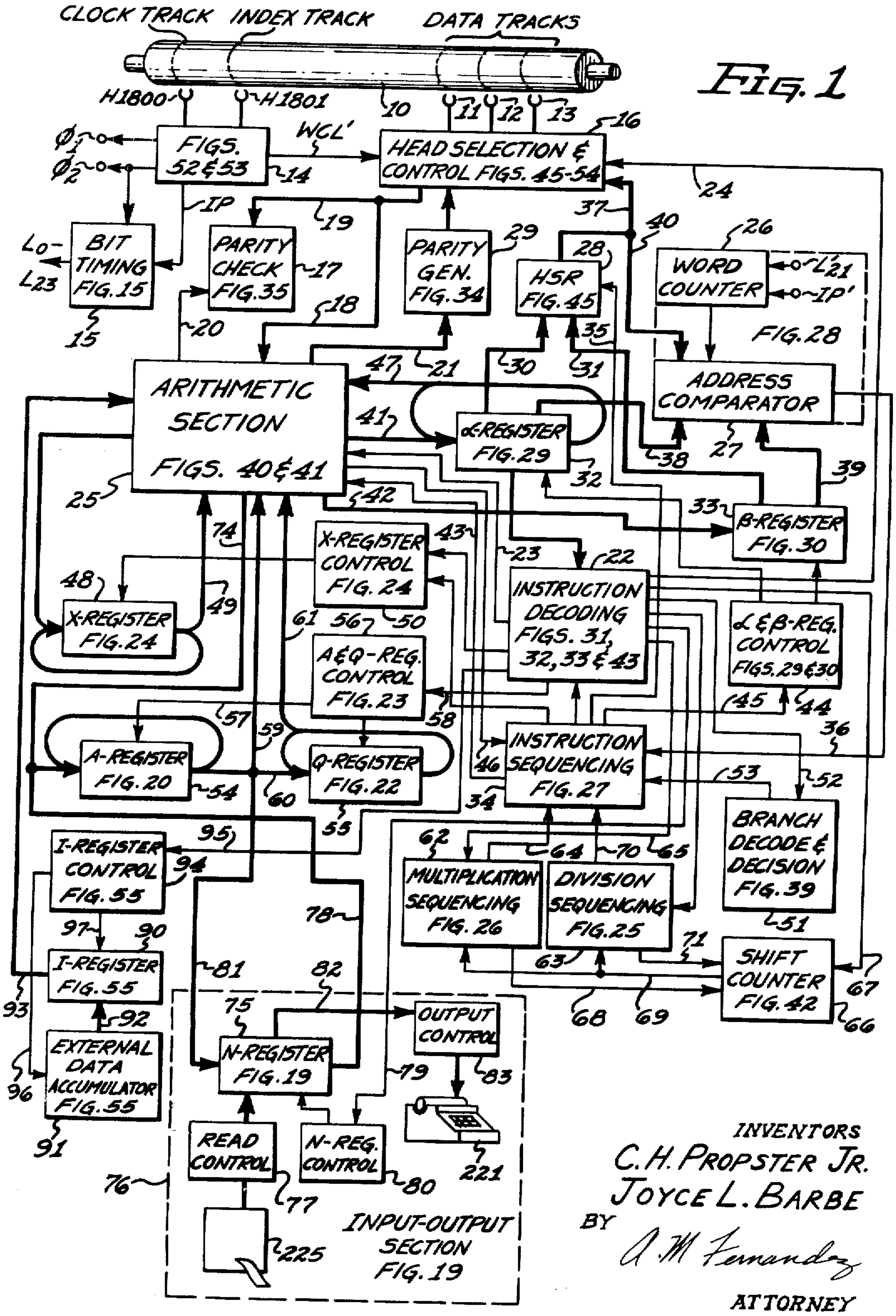
FIG. 1 is a block diagram in which the organization of the basic units of the computer is shown to illustrate the general signal flow for the various functions the computer performs.

The block diagram of FIG. 1 illustrates the general flow of information and the general distribution of control signals in the present computer. The classical organization of a computer includes four units: a memory unit, an arithmetic unit, a control unit and an input-output unit. In a drum computer, the memory unit comprises a magnetic drum, a track or head selector, a read and write control circuit, timing channels, a word counter and an address comparator. The arithmetic unit in previous computers includes an input or storage register, an adder and an accumulating register. In addition to the accumulating register, there may be at least one or two auxiliary registers, one principally provided for storing the multiplier and quotient in multiplication and division operations and the other provided for special operations such as the automatic modification of an instruction address. The control unit is that portion of the computer which causes other units to perform in such a manner that the instructions of a stored program are executed in a predetermined sequence. It includes means for sequencing the steps required to read and execute each instruction and an instruction counter, or equivalent means, for determining the address of the next instruction as each instruction is executed. The control unit also includes an instruction register and means for decoding instructions stored therein. The input-output unit generally includes a buffer register and other appropriate devices, such as a control panel, for effecting a transfer of information to the computer memory unit from such memory devices as a punched paper tape or magnetic tape. Other input devices are generally provided as required. For a more complete description of the foregoing classical computer organization see chapter 11 of Arithmetic Operations in Digital Computers by R. K. Richards, published in 1955 by D. Van Nostrand Company, Inc., Princeton, New Jersey.

The organization of the present computer differs from the foregoing classical organization of a computer in a number of particulars in order to provide a general purpose computer which performs data processing operations more rapidly and with more efficient utilization of memory capacity, logic circuits, and computer operating time. One of the most important differences is that the input or storage register is eliminated so that all information read from memory locations, including instructions, is transferred directly through the adder of the arithmetic unit to a register with the advantage of a saving in components and of the capability of performing an operation on a word as it is being read from a memory location.

Another important difference is that either single or two-address instructions may be employed in the same program. The single-address instructions are automatically read from alternate memory locations so that an instruction counter is not required to determine the location of the next instruction. The memory device employed is a rotating magnetic drum so that the memory locations on a given track are sequentially accessible. Consequently, by storing single-address instructions in alternate memory locations, it is possible to automatically execute a sequence of single-address instructions each of which consists of a word or group of digital signals that represent a command or operation to be performed and the address of an operand if one is required. The operand may be located in any one of a plurality of tracks so long as the sector in which it is located is accessible next in sequence in order that the operand may be read while the instruction is being executed.

A given track on a magnetic drum memory is that circumferential area which passes beneath a given magnetic head as the drum rotates and a given sector is an arc which simultaneously passes beneath all of the heads spaced along the drum axis. The length of the arc, as determined indirectly by timing pulses permanently recorded on the drum, is a word length plus a few extra bit spaces or binary cells provided in order to allow a few bit-times to switch control circuits between operations. All single-address instructions must be capable of being performed in one word-time, the time required for a sector to pass beneath a given head, in order that the next instruction in sequence may be read during the following word-time. If the instruction cannot be performed in one word-time or an operand is required which cannot be optimumly located in the next sector, a two-address instruction must be employed.

A two-address instruction consists of two words in successive memory locations linked by a distinguishing digital signal in the first word. Such an instruction is referred to hereinafter as a one-plus-one address instruction since it consists of two words, the second word specifying the location of the next instruction which may be in any sector. By employing a one-plus-one address instruction to perform a given operation, it is possible to locate the operand any place on the drum and to allow the operation to extend over several word-times, such as for multiplication and division.

A one-plus-one address instruction is also useful to branch from one sequence of instructions on a given track to another on the same track or on any other track. Moreover, the command to branch contained in the first word read may be conditional; after the first word is read from its memory location, it is decoded and a test is made for the specified condition before the second word of the instruction which contains the address of the next instruction is accessible. If the specified condition is not present, the second word is not read out and the next instruction is read from the alternate memory location on the same track.

The general organization of the present computer will now be described with reference to the block diagram of FIG. 1 wherein the heavy lines connecting the blocks represent lines over which information may be transferred in the form of groups of digital signals representing instruction addresses, instructions and data to be processed. The remaining lines represent a complex of lines over which control signals are distributed for the execution of the various instructions. It should be understood that both the information lines and the control lines are in actuality more complex than they are represented to be in FIG. 1 and that only lines of major significance are represented. All of the lines are described hereinafter in full detail with reference to the figures indicated in the various blocks.

As noted hereinbefore, the memory section includes a continuously rotating drum 10 having a magnetizable surface divided into a plurality of circumferential data tracks by a plurality of magnetic heads represented in FIG. 1 by heads 11, 12 and 13 each of which is adapted for both reading and writing information. Although only three magnetic heads are illustrated in FIG. 1, the embodiment described in full detail hereinafter is provided with 128 heads.

Two additional heads H1800 and H1801 are provided for two tracks in order that timing pulses initially recorded thereon may be continuously read when the computer is in operation. Although in the specific embodiment described hereinafter both heads are assumed to be adapted only for reading, in actual practice they may also be adapted for initially recording the timing pulses. The head H1800 reads clock pulses equally spaced on its associated track to provide a basic source of synchronizing pulses and the head H1801 reads a single index pulse on its associated track to provide a point of origin on the drum for locating a specified sector. A circuit 14 having an amplifier for the clock pulses and an amplifier for the index pulse is provided for producing two out-of-phase clock pulses $\phi_1$ and $\phi_2$ in response to each clock pulse and for producing an index pulse IP synchronized by $\phi_1$ and $\phi_2$ pulses.

A bit-timing circuit 15 which includes a twenty-four stage ring counter is provided for producing bit-timing pulses $L_0$ to $L_{23}$ in response to $\phi_2$ pulses in order to effectively divide the surface of the drum 10 into 128 sectors, each sector of a given data track having twenty-four memory cells. The speed of rotation and the drum diameter are selected to provide 3,072 clock pulses for every index pulse at a 250 kc. rate. The index pulses are employed to synchronize the ring counter which generates the $L_0$ to $L_{23}$ bit-timing pulses.

A head selection and control circuit 16 is provided to couple a selected read-write head to the arithmetic section 25. Signals induced in the winding of the selected head by intercepted magnetic flux are applied to the arithmetic section 25 and a parity check circuit 17 over lines 18 and 19. However, input gates are not enabled in the parity check circuit 17 unless input gates in the arithmetic section 25 are enabled to transfer a word through it to a register and a control signal from the arithmetic section 25 is transmitted over a line 20 to enable an odd-parity check to be made.

Every word stored on the drum is written in a given location through a parity generator circuit 29 which counts the bits of the word as it is stored and records an additional bit 1 or 0, whichever is required to make the number of 1-bits in the word an odd number. Consequently, to make an odd parity check it is only necessary to count the number of 1-bits in a word being read and determine that the number is odd.

Words to be recorded are transferred over a line 21 to the parity generator 29 under the control of logic circuits in the arithmetic section 25 in response to a command signal received from an instruction decoding section 22 over a line 23 which represents a group of lines for all command signals involving the operation of the arithmetic section 25. A command signal to store a word in a memory location is also transmitted over a line 24 to the head selection and control section 16 to enable a write-control circuit contained therein to allow pulses of current to be forced through a winding of the selected head to erase an old word and simultaneously write a new word. Synchronizing write-clcok pulses WCL′ produced by the circuit 14 are transmitted to the head selection and control circuit 16 for timing the pulses of current forced through the selected head winding.

A word in the present embodiment consists of a group of twenty digital signals according to a variety of different formats described hereinafter. For a word representing a number, the twenty digital signals consist of nineteen binary coded digital signals plus a sign signal. The parity bit constitutes a twenty-first digital signal which is employed only for an odd-parity check and therefore exists only in the memory section. Since each memory location includes twenty-four binary cells, three extra cells are provided between two consecutive locations to allow a space of three bit-times between words during which instruction decoding functions and other computer control and logic functions may be accomplished.

A given location on a selected track is located by counting the words or sectors in the track starting with the first word in a sector scanned during the word-time following an index pulse and comparing the number of each sector with the sector address of the location desired. A word counter 26 and address comparator 27 are provided for that purpose. The octal code for the first memory location in a given track is 000 and for the last is 177. The heads or tracks are also numbered consecutively and identified by octal codes 000 to 177. Accordingly, every memory location address consists of two three-digit octal numbers, one to specifiy the track or head and the other to specify the sector. Each three digit number is represented by a seven-bit code so that a full memory location address comprises a group of fourteen digital signals.

A Head Selection Register 28 is provided to store the track portion of a memory location address received over a line 30 or 31, each line representing a group of seven lines for a parallel transfer of a track address. The Head Selection Register functions as a buffer between the head selection and control section 16 and two instruction registers 32 and 33, referred to hereafter as the $\alpha$ and $\beta$-registers, respectively. The Head Selection Register is set from the $\beta$-register to read the next instruction and from the $\alpha$-register to read an operand or store a word in a memory location in response to signals from an instruction sequencing section 34 over a line 35 which represents a group of control lines. It should be noted that the sector portions of addresses in both the $\alpha$ and $\beta$-registers are simultaneously compared with the contents of the word counter to provide separate signals ($\alpha$ FND and $\beta$ FND) over a line 36 (which represents a pair of lines) to the instruction sequencing section to initiate whichever action is appropriate, that of reading the next instruction into the $\alpha$-register via the arithmetic section 25 from the location specified by an address in the $\beta$-register if the last instruction was of the one-plus-one address type or that of reading or writing into the location specified by an address in the $\alpha$-register if the last instruction read into the $\alpha$-register requires access to a memory location to read and operand or store a word.

If the present instruction in the $\alpha$-register is a single-address instruction read from a sector $n$, the Head Selection Register is automatically set to the track address of the location address stored in the $\beta$-register when the last one-plus-one address instruction was read in order to automatically read the next instruction from the sector $n+2$ of the same track. In that manner single-address instructions are automatically read from alternate memory locations in a track specified by the contents of the $\beta$-register.

The full address of an instruction stored in the $\beta$-register is employed to locate only the first of a series of single-address instructions or to locate the next one-plus-one address instruction if two one-plus-one address instructions occur in sequence. Only the track portion of the address in the $\beta$-register transferred to the Head Selection Register 28 is transmitted over a line 37 (which represents a group of seven lines) to the head selection and control section 16 to locate the next instruction.

When the address of a memory location specified by an instruction in the $\alpha$-register or by the contents of the $\beta$-register is employed to locate a memory location, the sector portion of the address is transmitted in parallel over lines 38 and 39 to the address comparator 27. In addition to the sector portion, at least some of the digital signals of the track portion transmitted in parallel to the Head Selection Register 28 over the line 30 or 31 are also transmitted to the address comparator 27 over a line 40 to be compared with corresponding digital signals transmitted from the $\alpha$ and $\beta$-registers to the address comparator 27 over lines 38 and 39 in order to assure that the track address in the Head Selection Register has been properly changed to correspond with the track address in one or the other instruction register. Accordingly, all of the lines 38, 39 and 40 represent cables having an appropriate number of lines for parallel transmission of digital signals.

As noted hereinbefore, the arithmetic section 25 includes a serial binary adder and complex control circuits which receive control signals over the line 23 from the instruction decoding section. Control signals are also transmitted to the arithmetic section from the instruction sequencing section 34 over a line 43 which represents a pair of transmission lines, one for transmitting a control signal to load the $\alpha$-register with an instruction from a memory location and the other for transmitting a control signal to load the $\beta$-register with an address from a memory location since the $\alpha$ and $\beta$-registers must be loaded through the arithmetic section over respective lines 41 and 42. While the $\alpha$ and $\beta$-registers are being loaded, shift pulses are applied to them from an $\alpha$ and $\beta$-register control section 44 in response to a control signal from the instruction sequencing section 34 transmitted over a line 45.

It should be noted that the $\beta$-register is not loaded with an address from a memory location except when a distinguishing digital signal is present in an instruction word being loaded into the $\alpha$-register. When such a distinguishing signal is present, a control signal is transmitted over a line 46 to alter the operation of the instruction sequencing section 34 and cause it to transmit control signals over the lines 43 and 45 to the arithmetic section 25 and the $\alpha$ and $\beta$-register control section 44 to cause a word to be transferred into the $\beta$-register. That distinguishing digital signal is a signal representing a bit 1 in the second order or bit position 18 of the instruction word being read into the $\alpha$-register, the bit positions in the present embodiment being numbered 0 to 19 from the most significant order to the least significant order.

The $\beta$-register may also be loaded with a group of digital signals representing the address of a memory location from which the next instruction is to be read in response to an instruction to branch unconditionally which, after being read into the $\alpha$-register and decoded, causes the address portion of the instruction in the $\alpha$-register to be transferred through the arithmetic section over a line 47 and to the $\beta$-register over the line 42. Since the $\alpha$-register contains twenty binary stages in the present embodiment for storing a twenty bit word and the $\beta$-register contains only fourteen stages for storing a fourteen bit address, the $\alpha$ and $\beta$-register control section 44 is employed to synchronize the operation of the $\alpha$ and $\beta$-registers so that digital signals are permitted to be transferred into the $\beta$-register only while the address portion of the instruction in the $\alpha$-register is being transferred through the arithmetic section. Thereafter, the instruction sequencing section 34 sets the Head Selection Register 28 from the β-register 33 and enables the arithmetic section 25 to load the α-register 32 over the line 41 with a new instruction when a signal (β FND) indicating that the address specified by the β-register has been found is received over the line 36 from the address comparator.

Since both of the instruction registers are loaded with words read from memory locations through the arithmetic section, a given word being transferred into either the α or the β-register may be modified automatically by causing the contents of an X-register to be transferred through the arithmetic section over a line 49 synchronously so that the word actually stored in the instruction register represents the binary sum of the word being read from the memory location and the contents of the X-register. Since the X-register is employed principally to modify address portions of instruction words, it includes only fourteen stages for storing a fourteen bit word. An X-register control section 50 synchronizes the operation of the X-register so that bits stored therein are added to corresponding bits of address portions of instruction words transferred into the α-register and to corresponding bits of an address transferred into the β-register.

The X-register is not limited to instruction address modification. For instance, it may also be employed to compare a number stored therein with a number specified by an instruction word being read. Such an instruction to compare and branch if a specified relation is present may be executed by having the number in the instruction written in a two's complement form so that when the number in the X-register is added to its as the instruction is being read into the α-register, only the difference between the two numbers is actually transferred into the α-register. The two's complement of a number Y is that binary number obtained by subtracting it from $2^n-1$ and may be employed to represent the binary number −Y, where $n$ is the number of bits in the number. The two's complement of a specified number is written into the bit positions of the instruction which normally contain the address of an operand.

Compare and branch instructions may contain command codes of two types: one type, identified by the mnemonic code BXH, is employed to branch if the contents of the X-register are equal to or greater than the number specified in the instruction; and the other identified by the mnemonic code BXL, is employed to branch if the number in the X-register is less than the number specified by the instruction. Those compare and branch instructions are one-plus-one address instructions having a distinguishing signal in bit position 18 which causes the instruction sequencing section to load the next word read in sequence from the same track into the β-register. However, all conditional branch instructions are decoded by the instruction decoding section 22 before the next word is read into the β-register and a test for the condition specified by the instruction is made by a branch decoding and decision making section 51 in response to signals transmitted over a line 52 which represents a group of different lines for different branch instructions besides instructions to compare and branch. If the specified relation is not present, an inhibiting signal is transmitted over a line 53 to the instruction sequencing section 34 to alter its mode of operation and inhibit the next word from being loaded into the β-register. A new instruction is then loaded into the α-register from the next succeeding location of the same track.

A number of different instructions to test and branch may be executed in a manner similar to instructions to compare and branch as described in the preceding paragraph, the difference being that the contents of the X-register are not added to the test and branch instructions as they are read into the α-register and the condition for which a test is made is specified by the group of digital signals in the instruction which normally specifies an operand. In all other respects, the test and branch instructions are performed in the same manner as the compare and branch instructions.

Two registers 54 and 55 are provided in addition to the X-register in order to process data in accordance with instructions transferred into the α-register. Those registers are referred to hereafter as the A and Q-registers, respectively. The A-register is the accumulating register employed for the execution of most instructions. Its contents may be shifted or transferred in response to shift pulses transmitted by an A and Q-register control section 56 over a complex of lines represented by a line 57 in response to command signals received from the instruction decoding section 22 over a complex of lines represented by a line 58.

All word transfers from the A-register to any other location, including memory locations, are made over a line 59 through the arithmetic section 25. A word transfer to the memory section in response to an instruction to store the contents of the A-register in a memory location is also made through the arithmetic section but only through the control portion of it. All other word transfers from the A-register are made through the binary adder of the arithmetic section so that if a given instruction causes any other word to be transferred simultaneously from any other location, including a location in the memory section, an arithmetic operation is performed on the word as it is transferred through the arithmetic section. Every number is represented by a group of digital signals in a binary code and a negative number is represented by the two's complement of the absolute binary number. Consequently, if an instruction requires obtaining the algebraic difference between two numbers, a carry flip-flop in the arithmetic section is preset and the one's complement of the subtrahend is serially transferred through the arithmetic section. In that manner, a bit 1 is added to the one's complement of the subtrahend to form the two's complement of it while the minuend is simultaneously transferred through the arithmetic section.

The contents of the A-register may be transferred to the A and X-registers through the arithmetic section over a line 50 and shifted or transferred directly to the Q-register over a line 60. The Q-register may be transferred only to the A-register or some memory location through the arithmetic section over a line 61 or shifted directly into the A-register over a line not shown. Since the contents of the A-register may be shifted or transferred directly to the Q-register and the contents of the Q-register may be shifted or transferred to the A-register, it is possible to either ring-shift the A and Q-registers or to exchange the contents of the A and Q-registers by simultaneous word transfers.

When an instruction to ring-shift the A and Q-registers a specified number of places is executed, the sign bits in the A and Q-registers are not shifted and the sign bit of the Q-register is made equal to the sign bit of the A-register by setting the sign bit position of the Q-register equal to the sign bit position of the A-register directly without changing the sign bit position of the A-register. This feature assures that the numbers being ring-shifted between the two registers are compatible in the sense that both are either positive or negative numbers in order for the instruction to be properly utilized.

The A and Q-registers are employed jointly for multiplication and division under the control of respective multiplication and division sequencing sections 62 and 63. The multiplication instruction sequencing section 62 causes the A and Q-registers, exclusive of their sign bit positions, to be shifted to the right one bit position at a time in order to examine each bit position of the multiplier originally stored in the Q-register in increasing order of significance and cause the multiplicand to be added to the contents of the A-register in response to each bit 1 detected in the multiplier prior to a subsequent shift of the A and Q-registers. Since the execution of a multiplication instruction requires more than one word-time, the multiplication instruction sequencing section 62 disables the instruction sequencing section 34 by an inhibiting signal transmitted over a line 64 in response to a command signal from the instruction decoding section 22 over a line 65. At the same time a shift counter 66 is preset in response to a signal over a line 67, which represents a plurality of lines from the instruction decoding section 22, to enable it to count nineteen successive shift operations and thereby determine when all nineteen bits of the multiplier originally stored in the Q-register have been examined.

Before multiplication by repeated additions is begun, the multiplicand is transferred from a memory location into the α-register. That memory location is specified by the instruction itself so that it is necessary to store the multiplication command signal after the instruction is decoded. That is accomplished by providing a special memory flip-flop in the instruction decoding section 22 for the multiplication command signal. It should be noted that since an instruction to multiply requires more than one word-time, it must be a one-plus-one address instruction so that the address of the next instruction is transferred into the β-register before the instruction to multiply is decoded and executed.

When the shift counter 66 has counted nineteen shift operations under the control of a signal transmitted over a line 68, the sequencing control of the multiplication sequencing section 62 is terminated by a signal transmitted over a line 69. At that time, the product is contained in the A and Q-registers, the least significant part in the Q-register and the most significant part in the A-register. It should be noted that during the execution of the multiplication instruction the successive additions of the multiplicand stored in the α-register are made to successively higher orders of the partial product being developed in the A and Q-registers since the A and Q-registers are shifted to the right as the multiplier is examined one bit at a time.

While the contents of the A-register are being transferred through the arithmetic section in order that the multiplicand may be added to it, the sign bit is transferred as part of the number. However while the A and Q-registers are being shifted as one register, the sign bit position of the Q-register is not shifted and the sign bit position of the A-register is not changed so that the sign bit of the A-register fills the vacated positions as the contents of the A-register are shifted into the Q-register. By that means, a correction factor is automatically added into the product to compensate for an error introduced by expressing a negative multiplicand in the α-register in the two's complement form. Another correction factor must be added to correct for an error introduced by expressing the multiplier stored in the Q-register in the two's complement form, but that is accomplished by simply adding the two's complement of the multiplicand to the final product as the last step.

An instruction to divide is executed in a manner similar to the instruction to multiply in that after the instruction has been decoded, a command signal is stored in a special memory flip-flop provided in the instruction decoding section 22 to enable the division sequencing section 63 and disable the instruction sequencing section 34 but only after the divisor has been located in the memory location specified by the instruction so that the divisor may be transferred into the α-register. The division sequencing section 63 disables the instruction sequencing section by a signal over a line 70. The shift counter 66 is preset by a division command signal over the line 67 so that a predetermined number of word-times required to complete the instruction may be counted.

Division is executed by repeatedly subtracting the divisor in the α-register from appropriate orders of the dividend in the A and Q-registers. The appropriate orders of the dividend are automatically stored in the A-register for each subtraction because following each subtraction, as a bit 1 or a bit 0 is entered into the least significant bit position of the Q-register depending upon whether the previous subtraction produced a positive or negative remainder, the A and Q-registers are shifted one place to the left. The subtractions are repeated until nineteen bits of the quotient have been developed in the Q-register leaving a nineteen bit remainder in the A-register. It should be noted that the shifts to the left are accomplished by effectively ring-shifting the A and Q-registers one place short of a full cycle since in the present embodiment provision is made to shift only to the right.

Each subtraction requires one word-time since the contents of the α-register and the A-register must be transferred through the arithmetic section to obtain a remainder which is stored in the A-register. Accordingly, a minimum of nineteen word-times is required for the execution of a division instruction. Additional word-times are required to prepare the dividend for the operation and to transform the final quotient and remainder into a specified form. When the required number of word-times has been counted under the control of a signal from the division sequencing section 68 transmitted over a line 71, the division sequencing section is disabled by a signal transmitted over the line 69 and the instruction sequencing section 34 is again enabled to cause the next instruction to be located at the address specified by the contents of the β-register and to be transferred into the α-register for execution.

The shift counter 66 is more frequently used to count the number of stages or places the contents of a specified register is shifted to the right under the control of an instruction in the α-register which specifies not only the register or registers to be shifted but also the number of places. When the contents of a register have been shifted the specified number of places, the control section of the register is disabled by a signal over a line not shown. Signals from the instruction decoding section 34 are transmitted over the line 67 to preset the shift counter 66 when a shift command in an instruction is decoded to enable it to count the specified number of places to be shifted.

Since all negative numbers are represented in the two's complement form, it is essential that vacated positions of the A-register be filled with the sign bit when its contents are shifted a specified number of places if the value of the number being shifted is not to be altered. For instance, if a negative number is stored in the A-register and it is necessary to shift it to the right in order to scale it by shifting it relative to a fixed binary point, vacated places must be filled with 1-bits for otherwise 0-bits would be shifted into vacated places which would alter the value of the negative number in the A-register. That unique feature is provided by simply disabling the input circuit of the flip-flop provided for the most significant bit position (the sign bit position) of the number stored in the A-register.

An N-register 75 is provided in an input-output section 76 as an input and output buffer register. Data read in from a tape reader 225 through a read-control section 77 is transferred in parallel into the N-register. Thereafter, under program control, the contents of the N-register are serially shifted into the A-register over a line 78. A signal over a line 79 from the instruction decoding section 22 enables an N-register control section 80 to shift the N-register. To read data out, the operation is reversed in that a group of digital signals is serially shifted into the N-register from the A-register over a line 81 under program control and then transferred in parallel from the N-register to a typewriter 221 over a group of lines in a cable 82 and an output control section 83 which includes a decoding matrix to cause a character which the group of digital signals in the N-register represents to be typed.

Within the input-output section 76 there are two relay contacts (not shown) serially connected to form a logical AND circuit which enables a signal to be transmitted to the branch decision making section 51 over a line (not shown) so that an instruction to branch may be executed if the last electromechanical operation involving either the tape reader 225 or the typewriter 221 has been completed. Separate branch instructions are provided for the tape reader and the typewriter by providing branch decoding and decision making circuits for each but since the logical AND circuit (not shown) in the input-output section 76 provides a common signal indicating that any previous electromechanical action has been completed only one branch instruction and means for decoding it need be employed. In other words, since the condition which should be tested in determining whether to branch is the presence of a predetermined signal produced by the logical AND circuit, it is only necessary to provide one branch decoding and decision making circuit for an instruction to branch if the last electromechanical action has been completed regardless of whether the last action involved the tape reader or the typewriter since the N-register can be used as a buffer for only one input or output device at a time. That unique feature is advantageous if a large number of input-output devices are added in a particular installation of the present computer.

Another input buffer register 90 denominated an I-register is provided so that data from an external accumulator 91 transferred in parallel into it over line 92 may be transferred over a line 93 through the arithmetic section 25. A special instruction is provided to simultaneously transfer a number in a specified memory location through the arithmetic section so that the sum from the output of the arithmetic section is transferred into the A-register via the line 74. The external data accumulator 91 may be an automatic data logging system which accumulates data that is periodically added to a previous total stored in a memory location. An I-register control section 94 responsive to control signals over a group of lines represented by a line 95 controls such an operation via lines 96 and 97.

Data may also be entered into the computer through the A-register by other devices such as a bank of manual switches either directly or under program control. Manual transfer-control switches are also provided to cause the data thus entered into the A-register to be transferred to other registers. In addition to manual switches, data may be entered directly into the A-register by parallel transfer from an external register via a bank of AND-gates which are enabled under program control. These additional input devices not shown in FIG. 1 are described hereinafter.

In summary, the computer comprises: a memory section, including a magnetic drum, read-write head selection and control means, a Head Selection Register, word counter, address comparator, a parity generating and checking means; an arithmetic section consisting of an adder and control circuits; a control section including an instruction sequencing section, decoding section, a branch decoding and decision making section, a shift counter, a multiplication sequencing section, a division sequencing section and a control console; an input-output section including an N-register, typewriter and its control circuits, tape reader and its control circuits, and other input devices; and storage registers including the A, Q and X-registers.

Having described the general organization of the present computer, a preferred embodiment will now be described with reference to FIGS. 2 to 55. It should be understood that many variations and modifications of the preferred embodiment may be made and that its description is intended only to provide a better understanding of the invention, not to limit the scope of the appended claims.

CIRCUIT ELEMENTS

Before proceeding with a description of an illustrative embodiment of the present invention, diagrams of circuits which may be employed to implement its logic diagrams will first be described. Symbols employed to represent the functions which the circuit elements provide in the logic diagrams will be illustrated and described with reference to their associated circuit diagrams. It should be understood that the specific circuits shown are only illustrative; other conventional circuits may be successfully employed if preferred.

Since the present invention is a digital computer, as noted hereinbefore, and it stores and processes data represented by configurations of discrete digital values in the conventional binary system of notation, the logic diagrams employ circuit elements the output signals of which may have only two values denominated binary digits or bits 1 and 0. The signal levels which represent the binary digits 1 and 0 are arbitrarily defined as 0 volts and +6 volts, respectively. The binary complements of the bits 1 and 0 are 0 and 1, respectively, and are represented by the respective signal levels of +6 volts and 0 volts. Accordingly a 0 volt signal may represent a binary digit 1 or the complement of a binary digit 0. Conversely, a +6 volt signal may represent a binary digit 0 or the complement of a binary digit 1. Whether a given signal represents a true binary digit or its complement may depend upon its position or level in the logic diagram. For instance, a +6 volt signal which represents a binary digit 0 at an input terminal of an inverter appears at its output terminal as a 0 volt signal representing the binary complement of the binary digit 0.

Each signal appearing at an input or output terminal of a circuit element may be given a symbol by which it may be conveniently identified. For example, a signal having the binary value of one applied to an input terminal of an inverter may be identified by a symbol W. The output signal from the inverter is the complement of the input signal and may be identified by a symbol $\overline{W}$ or W' since either a bar or a prime may be employed to represent the complement of a specified signal. If the signal $\overline{W}$, which may be read as "not W," is again complemented by an inverter, the signal may be represented by the symbol $\overline{W}'$. Since the recomplemented signal, signal $\overline{W}'$, is equal to W, the symbol by which the recomplemented signal may be identified may be written as simply W.

Each symbol employed in the detailed description of the logic diagrams to refer to a given signal will generally be associated with the output terminal of the circuit element generating it. For instance, the signal at the true output terminal of a flip-flop circuit Z storing a binary digit 1 will be designated Z, the same as the reference character employed to designate the flip-flop. Accordingly, the symbol Z designates not only the signal but also the circuit element generating it and the output terminal from which it is derived. The false or complementary output terminal of such a flip-flop Z and its output signal may logically be designated by the symbol Z' or $\overline{Z}$. If the output signals derived from the true and false output terminals of such a flip-flop Z are translated by inverters, the symbol for a signal derived from the output terminal of the inverter connected to the true output terminal of the flip-flop Z may be designated $\overline{Z}$ or Z' and the signal derived from the output terminal of the inverter connected to the false output terminal may be designated $\overline{Z}'$ or Z.

The circuit elements employed to provide the AND and OR functions inherently provide an inverting or complementing function so that in order to derive a logical AND signal (AB) of two signals A and B at the output terminal of an AND-gate, it is necessary to energize its input terminals with the complementary signals A' and B'. Only a complementary logical OR signal (A'+B') may be derived from an OR-gate. To obtain a true logical OR signal (A+B), it is necessary to connect an inverter in cascade with the OR-gate and derive the logical OR signal (A+B) from the output terminal of the inverter.

Logic circuits having an inherent inverting function have often been referred to in literature as NOR circuits because a given logic circuit is intrinsically neither an AND-gate nor an OR-gate. When NOR logic circuits are pyramided, the inherent inverting function at each level is often canceled out since pyramided logic normally consists of alternate levels of AND and OR functions. For example, to obtain a signal which is represented by the expression (A+B)(C+D) read as "A or B and C or D," two OR-gates each having two input terminals are connected to drive two separate input terminals of an AND-gate. The respective input terminals of the OR-gates are energized by the signals A, B, C and D. The signal output of one OR-gate may be represented by the expression A′+B′ and the output of the other OR-gate may be represented by the expression C′+D′. The two expressions A′+B′ and C′+D′ are combined in the AND-gate to derive the desired expression (A+B)(C+D). Because of the double inversion through the two levels of logic, the inverting functions inherent in the OR-gates and the AND-gate cancel each other out.

*Basic Circuit Element*

The basic circuit element from which many of the various circuits employed in the illustrated embodiment are constructed consists of a common-emitter transistor amplifier which, when employed by itself, may provide an AND function, an OR function or an inverting function. A circuit diagram of the basic circuit element and symbols employed to represent its three distinct functions are illustrated in FIG. 2. The circuit includes a PNP junction transistor $T_1$ of a type suitable for general digital circuit purposes having its emitter connected to a source of +6 volts, its collector connected to a source of −18 volts through a load resistor 100 and its base connected to a bias source of +12 volts through a resistor 101. The collector of the transistor is clamped to ground by a germanium diode $D_1$ so that it does not go below ground potential when the transistor is cut off. When the transistor conducts, its collector potential increases to substantially +6 volts. Two input terminals 102 and 103 are coupled to the base of the transistor by resistors 104 and 105 having respective capacitors 106 and 107 connected in parallel with them. Depending upon the logic signal levels applied to the input terminals, the basic circuit element functions as either an AND-gate or an OR-gate, with signal inversion in each instance, as well as a conventional inverter.

Throughout the present system, each basic circuit element will have applied to its input terminal either a 0 volt signal or a +6 volt signal to produce at its output terminal either a +6 volt signal or a 0 volt signal. The 0 volt signal output is established by conduction of current through the clamping diode $D_1$ when the transistor is cut off and the +6 volt output signal is established through the transistor when it conducts at saturation. Since both the diode and transistor have some internal impedance, the output signal levels will not be at exactly 0 and +6 volts but for convenience they will nevertheless be referred to hereinafter as 0 and +6 volts. As noted hereinbefore, the +6 volt signal level represents a bit 0 and the 0 volt level represents a bit 1.

Figures 2, 3, 4:
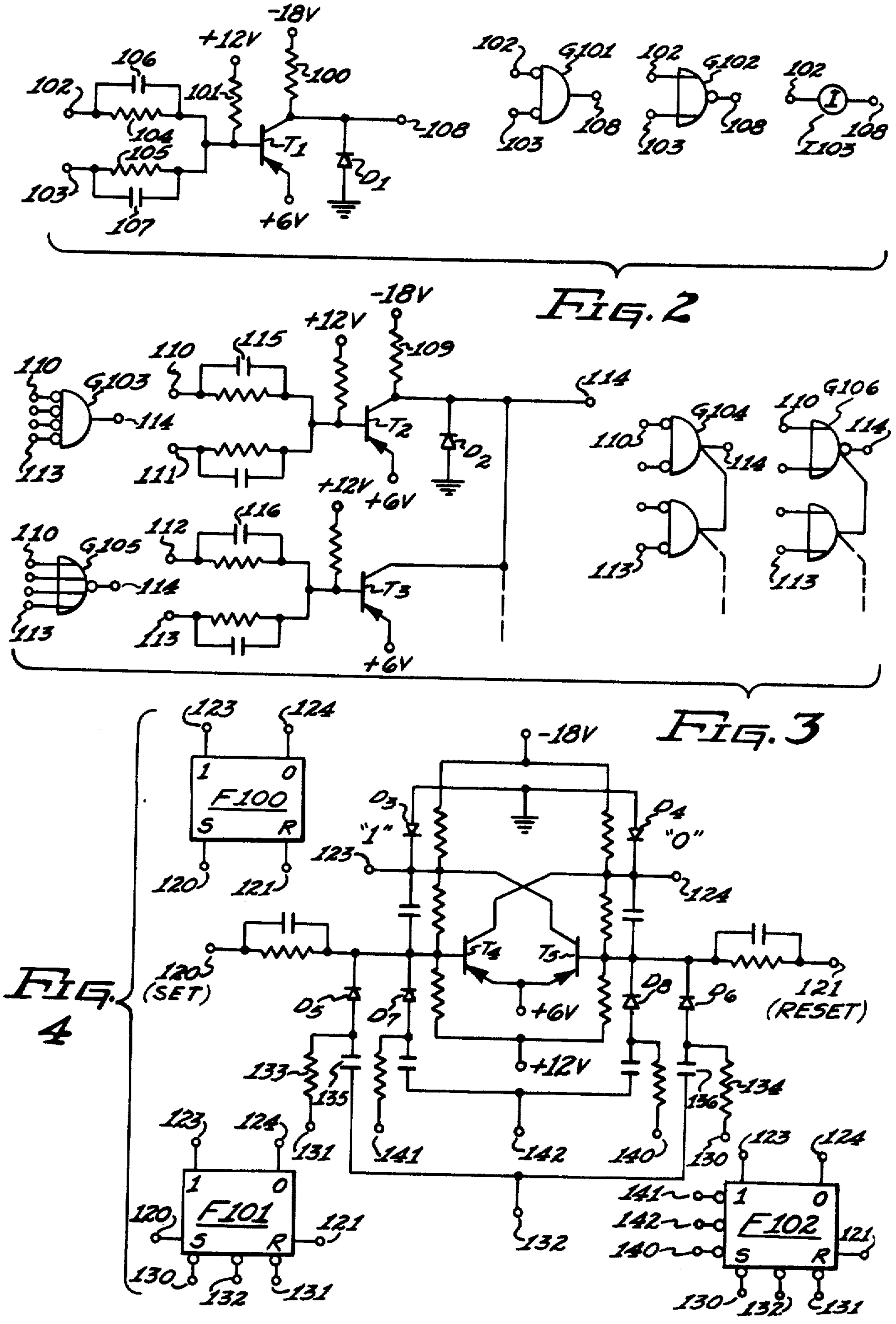
FIG. 2 illustrates a diagram of a basic circuit element and symbols employed to represent it.
FIG. 3 illustrates a circuit diagram of a multi-input logic gate and symbols employed to represent it.
FIG. 4 illustrates a circuit diagram of a flip-flop having two steering input circuits, one or both of which may be eliminated as required, and symbols employed to represent a simple flip-flop circuit and flip-flop circuits having one or two steering input circuits.

Symbols G101 and G102 in FIG. 2 represent elements which perform the respective AND and OR logic functions. The logic AND function is derived from the AND-gate G101 when the input signals at both of the input terminals 102 and 103 are at a +6 volt level for only then may the output terminal 108 be driven to a 0 volt level because if either one of the input terminals 102 or 103 is at a 0 volt level, the base of the transistor $T_1$ will be driven sufficiently negative with respect to the emitter to cause the transistor to conduct at saturation and clamp the output terminal 108 to a +6 volt level. When both of the input terminals 102 and 103 are at a +6 volt level, the base of the transistor $T_1$ will be at substantially the same potential as the emitter so that the transistor is cut off and the diode $D_1$ is forward biased by −18 volts through the load resistor 100 to clamp the output terminal 108 to ground potential. Accordingly, if the signal applied to either the input terminal 102 *or* the input terminal 103 is at a 0 volt level, the output terminal 108 is driven to +6 volts. Since the 0 volt level represents a binary value of one, a bit 1 signal A or a bit 1 signal B will produce an A′ or B′ signal at the output terminal 108. Similarly, since a +6 volt signal represents a binary value of zero or the complement of a signal having a binary value of one, to obtain a signal representing the logical AND of signals A and B, the complements A′ and B′ must be applied to the input terminals 102 and 103.

A symbol I103 in FIG. 2 represents a basic circuit element which performs only an inverting function. For inversion, only one input terminal is required such as the input terminal 102. When a signal is applied to an input terminal, the signal at the output terminal 108 will be the complement of the input signal.

*Multi-Input Logic Gates*

When logic gates are required to combine more than two input signals, a plurality of two-input gates may be connected in parallel to provide the required number of input terminals; however, all of the basic circuit elements connected in parallel must have a common load resistor connecting the collector electrodes of all the parallel circuits to a source of −18 volts. A circuit diagram of a multi-input gate is illustrated in FIG. 3. Four input terminals 110 to 113 are connected to the base electrodes of PNP transistors $T_2$ and $T_3$ each of which is provided with a common load resistor 109. Only one diode $D_2$ is required to clamp the output terminal 114 to ground potential when all of the transistors $T_2$ and $T_3$ are cut off. If more than four input terminals are required, additional basic circuit elements may be connected in parallel, each with the common load resistor 109 and the common clamping diode $D_2$.

Two different symbols G103 and G104 may be employed to represent a multi-input gate which provides an AND function. Similarly, two different symbols G105 and G106 may be employed to represent a multi-input gate which provides an OR function.

To provide a faster logic circuit, such as a faster two-input AND-gate, a circuit identical to that schematically illustrated in FIG. 3 may be employed but with only one input terminal coupled to each transistor so that the capacitance of coupling capacitors, such as the capacitors 115 and 116, may be increased sufficiently to provide faster transistor switching. The logical function and symbolic representation of such a high-speed logic circuit is otherwise the same as for the circuit described with reference to FIG. 2.

*Simple Flip-Flop*

Two of the basic circuit elements schematically illustrated in FIG. 2 may be cross-coupled to provide a simple and conventional flip-flop circuit by connecting a first circuit element directly to the output terminal of a second circuit element and connecting an input terminal of the second circuit element directly to the output terminal of the first circuit element. A symbol F100 which is employed to represent a simple flip-flop is illustrated in FIG. 4. Such a simple flip-flop constitutes the basic circuit of a double-steered flip-flop schematically illustrated in FIG. 4. It consists of two transistors $T_4$ and $T_5$ and includes all of the circuits schematically illustrated except steering circuits which are coupled to the base electrodes of the transistors $T_4$ and $T_5$ by diodes $D_5$ to $D_8$.

An input terminal 120 coupled to the base electrode of the transistor $T_4$ is arbitrarily denominated the set input terminal. When the set input terminal is energized by a 0 volt signal, the transistor $T_4$ is driven into conduction and the transistor $T_5$ is cut off. When the transistor $T_4$ is conducting, the flip-flop is in its "set" state and its true or "one" output terminal 123 is clamped at 0 volts by a diode $D_3$. The false or "zero" output terminal 124 is then clamped to a source of +6 volts by the conducting transistor $T_4$. If a 0 volt signal is applied to a reset input terminal 121, the transistor $T_5$ is driven into conduction and the transistor $T_4$ is cut off thereby driving the flip-flop to its "reset" state and causing the true output terminal 123 to be clamped to a source of +6 volts by the conducting transistor $T_5$. The flip-flop may also be set and reset by driving the false output terminal 124 and the true output terminal 123, respectively, to a +6 volt level. Since the output terminal 121 is the true output terminal, when it is at a +6 volt level, the reset flip-flop is said to be storing a binary value of zero. Conversely, when the true output terminal 121 is clamped at 0 volts by the diode $D_3$, the set flip-flop is said to be storing a binary value of one. The false output terminal 124 is always at a voltage level which represents the complement of the true binary value stored in the flip-flop.

*Single-Steered Flip-Flop*

A single-steered flip-flop is represented by a symbol F101 illustrated in FIG. 4. It has a set steering input terminal 130, a reset steering input terminal 131 and a trigger input terminal 132. A positive-going (0 to +6 volts) pulse is applied to the trigger input terminal to set or reset the flip-flop F101 depending upon the signal level applied to the steering input terminals 130 and 131. If the set steering input terminal 130 is at a +6 volt level, a trigger pulse will set the flip-flop. Similarly, if a +6 volt signal is applied to the reset steering input terminal 131, a trigger pulse will reset the flip-flop. When a +6 volt signal is applied to the input terminal 130, a +6 volt signal is coupled by a resistor 134 to the anode of a diode $D_6$ the cathode of which is at about +6 volts so that a positive-going trigger pulse applied to the trigger input terminal 132 and coupled to the anode of the diode $D_6$ by a capacitor 136 is transmitted to the base of the transistor $T_5$ to cut it off and drive the flip-flop into its set state. If a +6 volt signal is not applied to the input terminal 130, the trigger pulse applied to the anode of the diode $D_6$ is insufficient to drive the flip-flop into its set state.

The reset steering input terminal 131 is coupled to the anode of the diode $D_5$ by a resistor 133 so that when it is at a +6 volt level, a +6 volt trigger pulse applied to the trigger input terminal 132 and coupled to the anode of the diode $D_5$ by a capacitor 135 is transmitted to the base of the transistor $T_4$ to cut it off and drive the flip-flop into its reset state. The complement of a binary signal applied to the set steering input terminal 130 is normally applied to the reset steering input terminal 131.

*Double-Steered Flip-Flop*

A second steering input circuit may be provided to steer a trigger pulse applied to a trigger input terminal 142 to the anode of the diode $D_7$ or the anode of the diode $D_8$ in response to signals applied to steering input terminals 140 and 141. A symbol F102 illustrated in FIG. 4 is employed to represent a double-steered flip-flop. A double-steering flip-flop may have either a direct set or direct reset input terminal, or both, in addition to two steering circuits. If the direct reset input terminal 121 is employed with such a flip-flop, the input terminals for the second steering circuit are shown on the set side as illustrated in the symbol F102. Similarly, if a direct set input terminal is employed, the input terminals of the second steering circuit may be shown on the reset side of the flip-flop symbol. In either case, the steering input terminals proximate to a common corner of the symbol will be associated with the set or reset function as specified by either the letter S or R in the corner. For instance, in the symbol F102 both of the input terminals 130 and 140 proximate to the corner S are associated with the set function. The remaining steering input terminals 131 and 141 which are diagonally opposite each other are associated with the remaining function, the reset function in the instance of the illustrated symbol.

*Shift Register*

Figures 5, 6, 7, 8, 9:
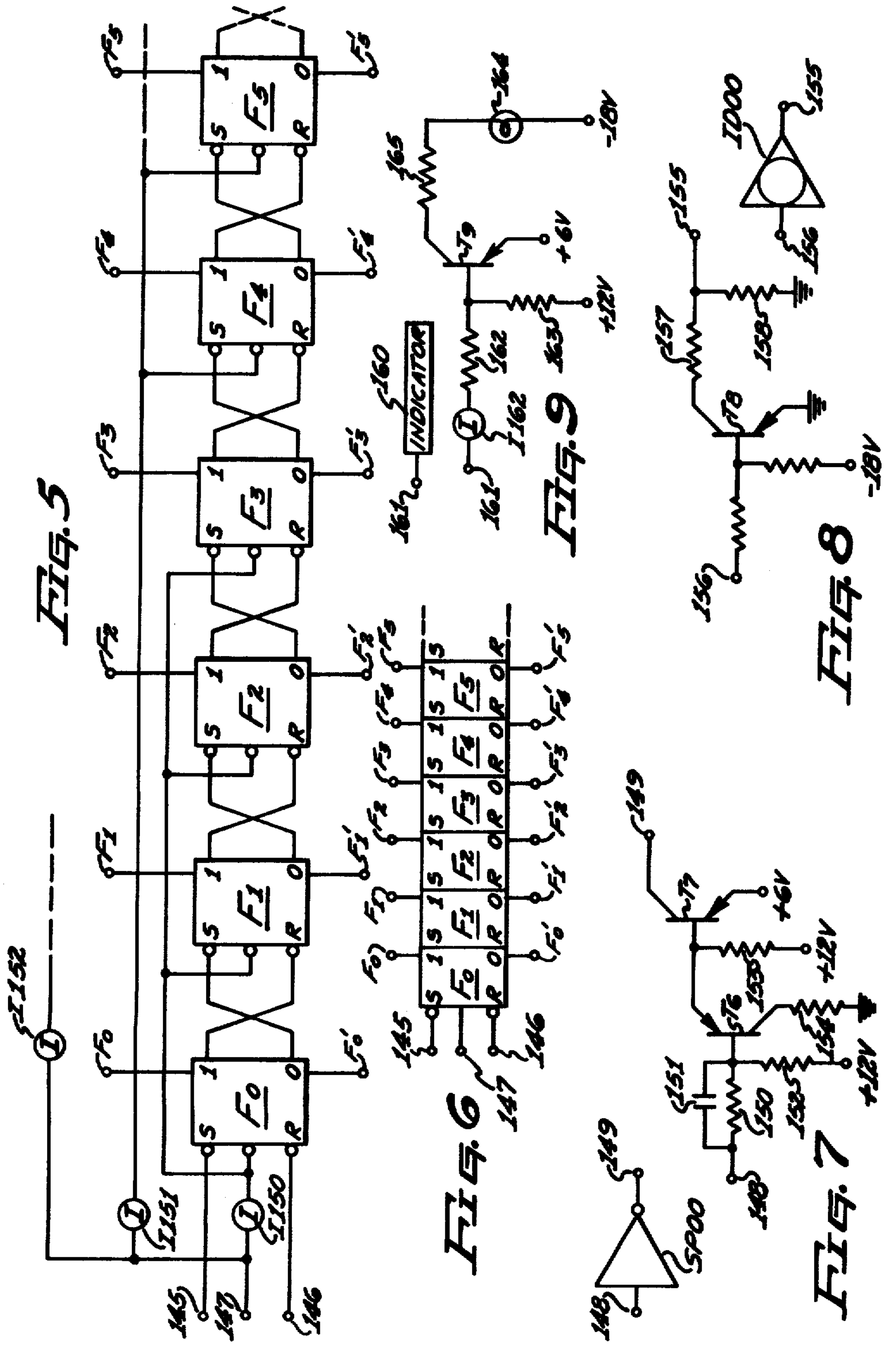
FIG. 5 illustrates diagrammatically a typical shift register.
FIG. 6 illustrates a symbol employed to represent a typical shift register.
FIG. 7 illustrates a diagram of a special purpose circuit and a symbol employed to represent it.
FIG. 8 illustrates a diagram of an indicator-driver circuit and a symbol employed to represent it.
FIG. 9 illustrates a diagram of an indicator circuit and a symbol employed to represent it.

A shift register having as many stages as required may be provided by connecting a plurality of four-stage shift registers in series in a manner illustrated in FIG. 5. The first four-stage shift register includes four steered flip-flops $F_0$ to $F_3$; only two steered flip-flops $F_4$ and $F_5$ of a second four-stage shift register are illustrated. If an odd number of stages is required in a shift register, as in the X-register of the present invention, stages may be removed from the last four-stage shift register.

The steering input terminals of each flip-flop are connected to output terminals of a preceding flip-flop so that a trigger pulse applied to all stages in parallel will drive each stage to the stable state of its preceding stage. A steering input terminal 145 of the first flip-flop $F_0$ is connected to a source of data; a second steering input terminal 146 is connected to a source of the complement of the data signals applied to the input terminal 145. The trigger input terminal of each of the flip-flops $F_0$ to $F_3$ of the first four-stage shift register are connected in parallel to a common trigger input terminal 147 by an inverter I150. An inverter I151 couples the trigger input terminals of the second four-stage shift register to the common trigger input terminal 147. Additional inverters such as an inverter I152 may be provided for additional four-stage shift registers as required. By employing inverters to couple the common trigger input terminal 147 to the trigger input terminals of the steering circuits in the various stages of the shift register, simultaneous triggering of each stage is provided without overloading the trigger pulse source connected to the input terminal 147.

The inverters are to be considered an integral part of a shift register so that negative-going (+6 to 0 volt) shift pulses are required at the trigger input terminal of a shift register, such as the input terminal 147 of the illustrated example in FIG. 5. For convenience, a shift register such as the one illustrated in FIG. 5 is represented as shown in FIG. 6.

Each shift register is identified by the same letter employed to identify its flip-flop stages. In the illustrated example of FIG. 6, the shift register may be identified as the "F-register" each stage of which is identified by the letter F with a subscript such as the stage $F_0$. The subscripts specify the order of the flip-flops in a decreasing order of significance such as the binary order a flip-flop $F_n$ is one greater than of a flip-flop $F_{n+1}$.

A shift register may be employed for serial-to-parallel or parallel-to-serial conversion. For serial-to-parallel conversion, data is serially entered into the first stage $F_0$ one binary digit at a time and shifted to the right as successive binary digits are entered. After the data has been fully registered, the static data may be transferred in parallel from output terminals, such as the output terminal $F_0$ of the first stage, and the one's complement of the static data may be transferred in parallel from false output terminals, such as the output terminal $F_0'$ of the first stage.

Data may also be serially shifted out of the shift register to another shift register or the arithmetic section of the computer. During arithmetic operations, data in a shift register must often be shifted one or more places to the right or one or more places to the left. There is no provision for shifting data in a register to the left but a shift $m$ places to the left may be accomplished by ring-shifting the register to the right $n—m$ places, where $n$ is equal to the number of stages in the shift register and $m$ is equal to the number of places to be shifted to the left. Ring-shifts are accomplished by coupling the serial output from the last or least significant bit stage to the steering input terminals of the first or most significant bit stage. The first stage may be a double-steered flip-flop so that a first steering circuit may be employed for serial data transfers into the register and a second steering input circuit may be employed for ring-shift operations. By gating shift pulses to only one trigger input terminal, either a normal serial shift or a ring-shift operation may be accomplished.

For parallel-to-serial conversion, a configuration of binary coded signals may be transferred in parallel into corresponding stages of a shift register by applying a 0 volt signal to the set input terminal of each stage that is to receive and store a bit 1. Data registered may thereafter be serially transferred to another register or the arithmetic section. Before data may be registered in parallel, it is necessary to reset each stage of the shift register by either applying a 0 volt signal to the reset input terminal of each stage or by serially shifting a bit 0 into all stages. The latter may be done while serially transferring out previously registered data.

*Special Purpose Circuit*

A special purpose circuit illustrated in FIG. 7 is represented by the symbol SP00 having a pulse input terminal 148 and an output terminal 149, and is employed as a switch for selectively applying a +6 volt source to a large number of loads in response to a 0 volt signal.

The pulse input terminal 148 is coupled to the base of a PNP transistor $T_6$ by a resistor 150 and a parallel connected capacitor 151. The input terminal 148 is normally maintained at +6 volts so that the transistor $T_6$ is biased by resistors 152 and 153 to be normally conducting. The base electrode of a second PNP transistor $T_7$ is connected to the emitter of the transistor $T_6$ and has its emitter directly connected to a source of +6 volts. When the input terminal 148 is at +6 volts, the transistor $T_6$ is not rendered sufficiently conductive to cause a voltage dividing network consisting of its emitter-collector impedance, the impedance of a resistor 154 and the resistor 153 to drive the base electrode of the transistor $T_7$ sufficiently negative with respect to its emitter to cause it to conduct. Under those conditions the transistor $T_7$ is cut off. When a 0 volt signal is applied to the input terminal 148, the transistor $T_6$ is driven further into conduction and the base of the transistor $T_7$ is driven negative with respect to its emitter to cause it to conduct and thereby supply a +6 volt output signal.

*Indicator Driver*

FIG. 8 illustrates a circuit which may be employed to drive an indicator lamp from the true side of a flip-flop, such as a shift register flip-flop. The indicator lamp not shown may be connected in series between an output terminal 155 and a source of negative potential so that when a bit 1 is stored in the flip-flop the lamp will be fully energized. Indicator lamps should be provided for each flip-flop of the A-register (the only register into which data may be entered manually from the console) and the $\alpha$ and $\beta$ registers (the registers which store an instruction and the address of the next instruction, respectively). For convenience, indicator drivers and associated lamps have not been shown in the logic diagrams of those registers.

The indicator driver circuit consists of a PNP transistor $T_8$ connected in a common-emitter amplifier configuration and is employed as a switch which is responsive to 0 volt signals at an input terminal 156 to cause its output terminal 155 to be connected through a 100 ohm resistor 157 in the collector circuit of the transistor $T_8$ and through the transistor to a source of reference potential or ground. The input terminal 156 is normally maintained at a +6 volt level to hold the transistor $T_8$ cut off to provide an effective open circuit between the output terminal 155 and ground. A very large resistor 158 is connected in parallel between the output terminal 155 and the source of reference potential so that when the transistor $T_8$ is cut off, a small amount of current may flow from the source of reference potential through the resistor 158 to the indicator lamp in order that its filament may be kept warm.

The indicator driver circuit may also be employed in the present invention to selectively connect the center tap of a transformer in the read circuits of the drum memory section to a source of reference potential through a low impedance path in response to a 0 volt signal applied to the input terminal 156. While the input terminal 156 is at +6 volts, the transistor $T_8$ is cut off and the center tap of the transformer not shown in FIG. 8 is connected to ground through the resistor 158. The symbol employed to represent an indicator driver in the drum read circuits is the symbol ID00 illustrated in FIG. 8.

*Indicator Circuit*

An indicator circuit, represented by a symbol 160 having only an input terminal 161, is illustrated in FIG. 9. It may be connected to the false output terminal of a flip-flop to provide a visual indication of the set condition of the flip-flop in response to a +6 volt signal therefrom. It consists of an inverter I162 which controls a transistor $T_9$ employed as a switch. When a 0 volt signal is applied to the input terminal 161, the base of the transistor $T_9$ is biased more positive than +6 volts by resistors 162 and 163, thereby holding the transistor $T_9$ cut off. A lamp 164 in the collector circuit of the transistor $T_9$ is not energized until the transistor $T_9$ is rendered conductive by a +6 volt signal applied to the input terminal 161 of the circuit. When the transistor $T_9$ is conducting, the lamp 164 is connected to a source of +6 volts through a 100 ohm resistor 165 to provide substantially 24 volts of energizing potential to the lamp.

*Magnetic Drum Read Amplifier*

Figures 10, 11:
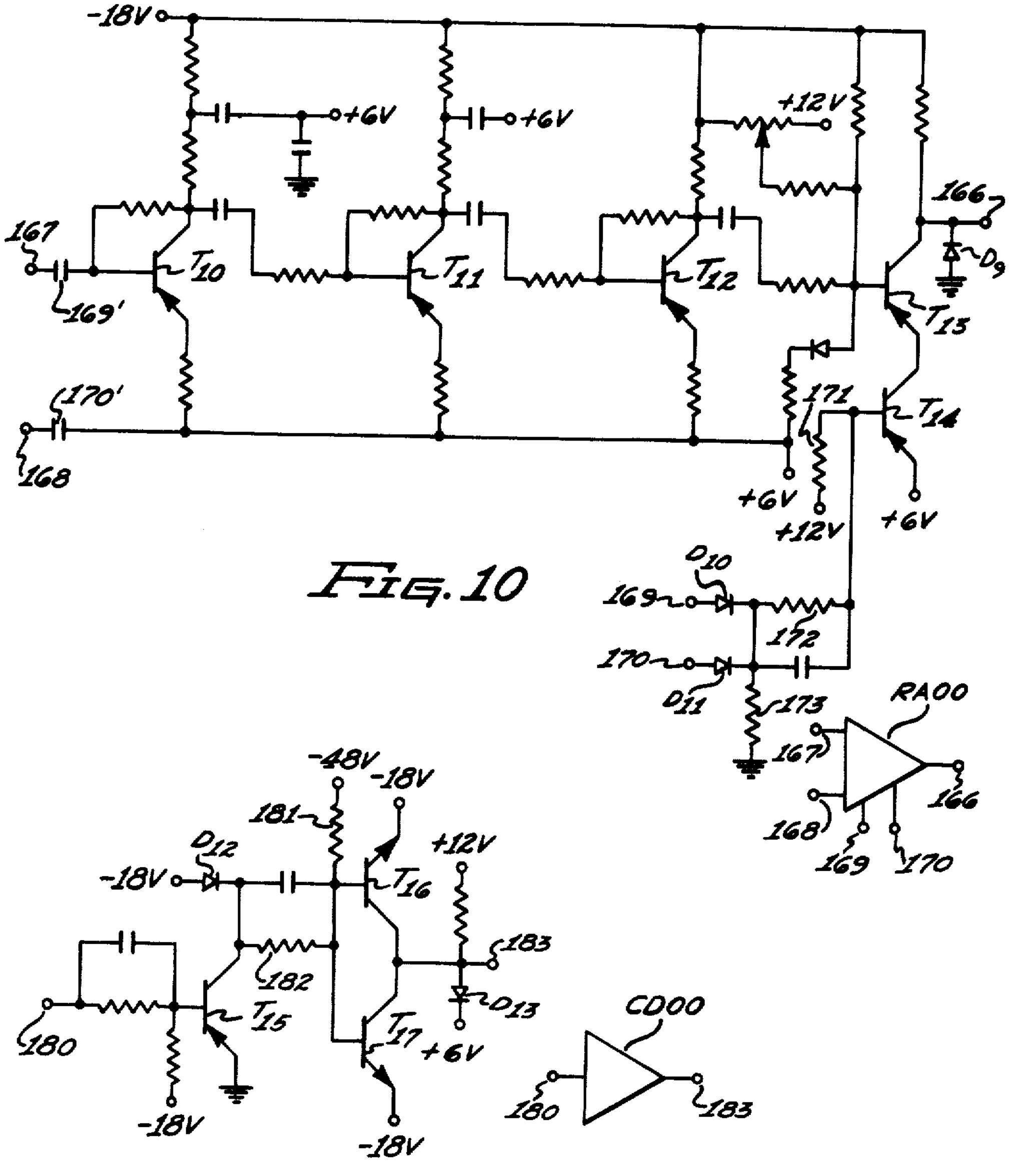
FIG. 10 illustrates a circuit diagram of a magnetic drum read amplifier and a symbol employed to represent it.
FIG. 11 illustrates a diagram of a column drive circuit and a symbol employed to represent it.

A symbol RA00 which represents a read amplifier in the drum memory section of the computer and its circuit diagram are illustrated in FIG. 10. It is provided with one output terminal 166 and two capacitively coupled input terminals 167 and 168 which are coupled by a transformer not shown to a center-tapped winding of a read head. A recorded bit 1 is detected on the drum by the read head to produce a signal which is transformer coupled to the input terminals 167 and 168 and coupled by capacitors 169′ and 170′ to the read amplifier consisting of three stages of amplification to produce a complementary positive-going (0 to +6 volts) signal at the output terminal 166. The three stages of amplification include transistors $T_{10}$, $T_{11}$ and $T_{12}$. The output signal from the third transistor $T_{12}$ is capacitively coupled to the base electrode of a fourth transistor $T_{13}$ which functions as an inverter when emitter supply voltage is provided by a gating transistor $T_{14}$ under control of two input signals applied to input terminals 169 and 170. If either control input signal is at a +6 volt level, the transistor $T_{14}$ is cut off and the read amplifier is inhibited because the output transistor $T_{13}$ cannot conduct and the signal at the output terminal 166 is clamped at 0 volts by a diode $D_9$.

When signals at both inhibiting input terminals 169 and 170 are at 0 volts, diodes $D_{10}$ and $D_{11}$ are reverse biased and the transistor $T_{14}$ is rendered conductive by a bias potential from a voltage dividing network consisting of resistors 171, 172 and 173. If the inhibiting input signal to either input terminal 169 or 170 is at a +6 volt level, the associated diode $D_{10}$ or $D_{11}$ will be forward biased and a bias potential insufficiently negative with respect to the +6 volt power supply connected to the emitter of the transistor $T_{14}$ is provided to its base electrode through the resistor 172 to cause the transistor $T_{14}$ to be held cut off. When the transistor $T_{14}$ is held cut off, its emitter-collector impedance is high causing the output transistor $T_{13}$ to have a virtual open circuit between its emitter electrode and the source of +6 volts.

As noted hereinbefore, a bit 1 is represented in the computer by a 0 volt signal level and, as just described, a bit 1 recorded on the drum produces a complementary +6 volts signal at the output terminal 166 of the read amplifier when it is detected and amplified. Accordingly, the read amplifier always produces the complement of a recorded bit being detected which may readily be converted into a true signal by an inverter.

*Column Drive Circuit*

A column drive circuit illustrated in FIG. 11 may be employed to selectively provide 150 milliamperes of current at −18 volts to the center tap of a winding on a read-write head. An input terminal 180 is normally maintained at a +6 volt level to hold a PNP transistor $T_{15}$ cut off. When the transistor $T_{15}$ is cut off, current is conducted from a source of −48 volts through resistors 181 and 182 and a diode $D_{12}$ to a source of −18 volts to bias the base electrode of a pair of NPN transistors $T_{16}$ and $T_{17}$ to a potential more negative than a −18 volt potential applied to their emitter electrode. Under those conditions both of the transistors $T_{16}$ and $T_{17}$ are cut off and their collector electrodes connected to an output terminal 183 are clamped to a substantially +6 volt level by a conducting diode $D_{13}$. When a 0 volt signal is applied to the input terminal 180, the transistor $T_{15}$ is rendered conductive to bias the base electrodes of both transistors $T_{16}$ and $T_{17}$ to a potential more positive than the −18 volt potential applied to their emitter electrodes so that both transistors $T_{16}$ and $T_{17}$ conduct. Under those conditions the output terminal 183 is clamped to a substantially −18 volt potential by the conducting transistors $T_{15}$ and $T_{16}$ which are connected in parallel in order to provide the required 150 milliamperes of current at −18 volts through the center tap of a winding on a read-write head and thereby select it for reading or writing data on the drum. A symbol CD00 illustrated in FIG. 11 is employed to represent a column driver circuit.

*Write Amplifier*

Figures 17, 18:
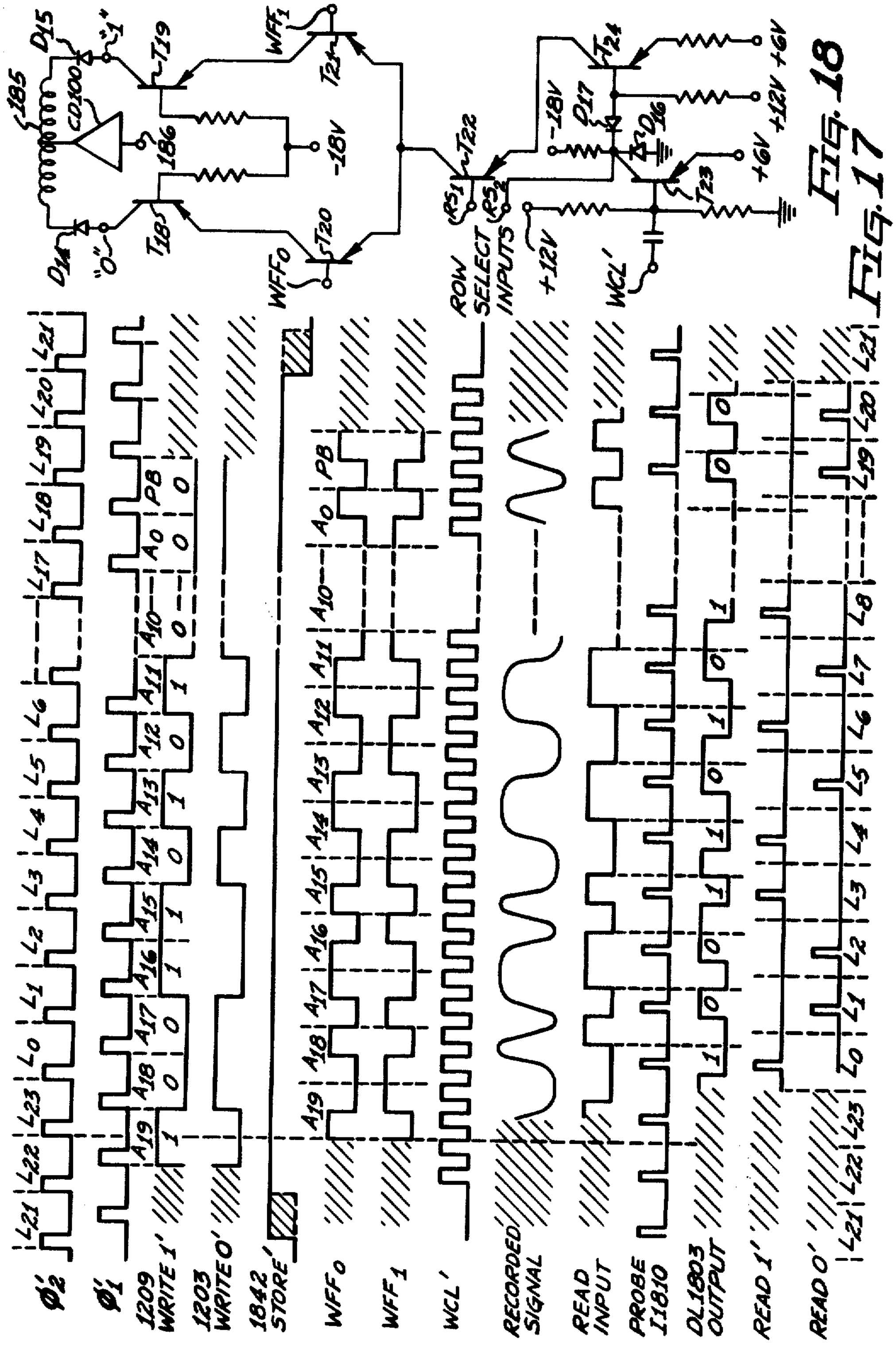
FIG. 17 is a timing diagram for the operation of reading and writing in the memory section.
FIG. 18 illustrates a circuit diagram of a write amplifier employed to record binary digits on a magnetic drum.

A circuit diagram of an amplifier which may be employed to write or record binary digits is illustrated in FIG. 18. It consists of a pair of transistor amplifiers $T_{18}$ and $T_{19}$ and a pair of control transistors $T_{20}$ and $T_{21}$ which steer write-clock pulses applied at a WCL′ input terminal to one side or the other of a center-tapped winding 185 on a read-write head selected by a −18 volt potential applied to the center tap by a column driver CD100 in response to a 0 volt signal applied to an input terminal 186 as described hereinbefore. When a −18 volt potential is provided to the center tap of the winding 185, a pair of diodes $D_{14}$ and $D_{15}$, which are part of a head selecting matrix and not a part of the write amplifier, are forward biased to enable WCL′ pulses steered by the control transistors $T_{20}$ and $T_{21}$ to be transmitted to the center-tapped winding. If a bit 1 is to be recorded, a $WFF_1$ input terminal of the transistor $T_{21}$ is driven to a 0 volt level while a $WFF_0$ input terminal of the transistor $T_{20}$ is driven to a +6 volt level to cut the latter off and render the former conductive so that a WCL′ pulse is transmitted through the transistor amplifier $T_{19}$, the forward biased diode $D_{15}$ and one-half of the center-tapped winding 195. About two microseconds later the transistor $T_{21}$ is cut off and the transistor $T_{20}$ is rendered conductive to steer the next WCL′ pulse to the other side of the winding 185 through the transistor $T_{18}$ and the diode $D_{14}$. If a bit 0 is to be recorded, the sequence is reversed and the transistor $T_{20}$ is rendered conductive before the transistor $T_{21}$. By this method of phase-modulation recording, every bit cell is magnetized to saturation in two directions by two WCL′ pulses. For a bit 1 the direction of first magnetization is in one direction and for a bit 0 in the other direction. A terminal between the diode $D_{15}$ and the collector of the transistor $T_{19}$ may be denominated a "1" output terminal because when recording a bit 1 in a cell it receives a WCL′ pulse first. The corresponding terminal between the diode $D_{14}$ and transistor $T_{18}$ may then be denominated a "0" output terminal.

Two signals, both of which must be at 0 volts, are required to select a given one of a plurality of write amplifiers for a recording operation. A 0 volt signal applied to an input terminal $RS_2$ is required to select a group of write amplifiers out of a plurality available and a 0 volt signal applied to an input terminal $RS_1$ is required to select one out of the selected group of amplifiers. When a 0 volt signal is applied to both input terminals $RS_1$ and $RS_2$, the WCL′ pulses applied to the base of a transistor $T_{23}$ are transmitted by an enabled transistor $T_{24}$ through the enabled gating transistor $T_{22}$. The specific manner in which the write amplifier is employed to record binary digits on the drum will be described in detail with reference to FIG. 17 following an explanation of the computer timing with reference to FIGS. 14 to 16.

*Delay Circuit*

Figure 12:
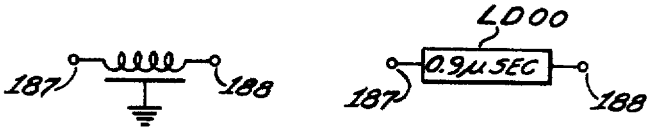
FIG. 12 illustrates schematically a delay circuit and a symbol employed to represent it.

A lumped parameter delay circuit employed in the present invention is schematically illustrated in FIG. 12 as a distributed parameter delay line since a distributed parameter delay line could be employed instead if desired. Its only function is to delay signals applied to an input terminal 187 so that they will appear without appreciable distortion at an output terminal 188 a specified fraction of a microsecond or a specified few microseconds later. A symbol LD00 illustrated in FIG. 12 is employed to represent a delay circuit. A legend within the block symbol specifies the time delay provided.

*Gated Decimal-to-Binary Converter*

Figure 13:
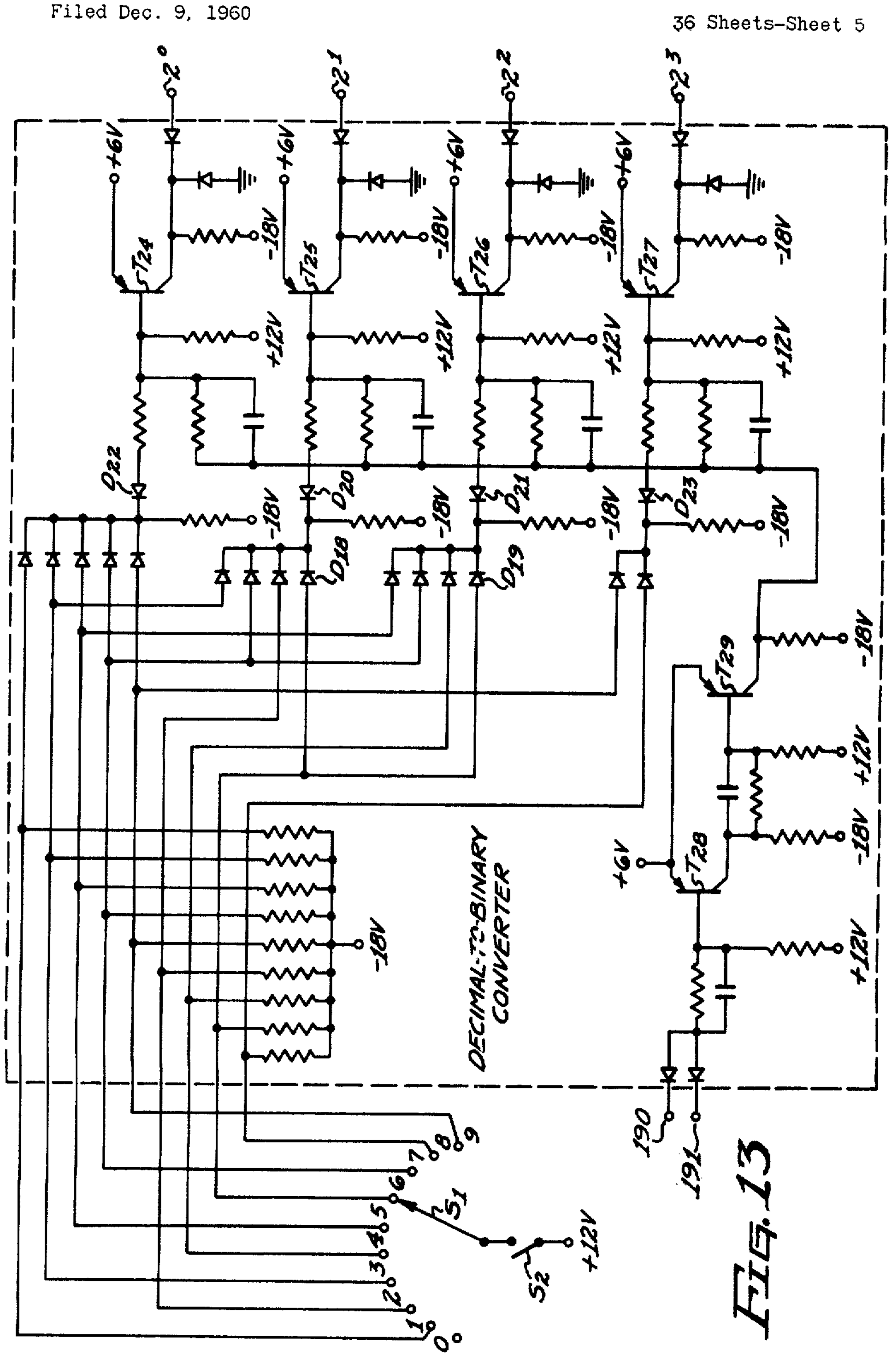
FIG. 13 illustrates a circuit diagram of a gated decimal-to-binary converter.

A gated decimal-to-binary converter illustrated in FIG. 13 may be employed to convert into binary form numbers 1 to 9 represented by a +12 volt signal at one of nine input terminals of a decimal input switch $S_1$ or the number 0 represented by the absence of a +12 volt signal at any input terminal. A +12 volt signal from a decimal input terminal is applied to a diode matrix the output of which enables signals to be transmitted through combinations of four transistors $T_{24}$ to $T_{27}$ to provide a group of four signals at output terminals $2^0$, $2^1$, $2^2$ and $2^3$ the configuration of which represents in binary form the decimal input selected by the switch $S_1$ when a second switch $S_2$ is closed.

Signals at both of two gating input terminals 190 and 191 must be at a +6 volt level in order for a binary code configuration of output signals to be provided at the output terminals $2^0$ to $2^3$ of the transistors $T_{24}$ to $T_{27}$. When both gating terminals 190 and 191 are at a +6 volt level, a transistor $T_{28}$ is cut off and a transistor $T_{29}$ is rendered conductive. While the transistor $T_{29}$ is conducting, its collector electrode is at a substantially +6 volt level. When either input terminal 190 or 191 is at 0 volts, the transistor $T_{28}$ is rendered conductive and the transistor $T_{29}$ is cut off; accordingly, the transistor $T_{28}$ functions as an AND-gate and the transistor $T_{29}$ functions as an inverter. The collector of the transistor $T_{29}$ is coupled to the base of each of the transistors $T_{24}$ to $T_{27}$ which function as AND-gates since each one may be cut off only if the collector of the transistor $T_{29}$ is at +6 volts and a second input terminal from the diode matrix is also at +6 volts. For example, assuming that the input switch $S_1$ is at its decimal six position as shown and that the switch $S_2$ is closed, a +12 volt signal is applied to the anodes of diodes $D_{18}$ and $D_{19}$ to translate a substantially +12 volt signal through diodes $D_{20}$ and $D_{21}$ and permit the +6 volt signal from the collector of the transistor $T_{29}$ to cut off the associated transistors $T_{25}$ and $T_{26}$. Diodes $D_{22}$ and $D_{23}$ associated with the transistors $T_{24}$ and $T_{27}$ do not transmit a +12 volt signal so that their associated transistors $T_{24}$ and $T_{27}$ cannot be cut off by the +6 volt signal from the collector of the transistor $T_{29}$. Under those conditions the signal at output terminals $2^1$ and $2^2$ are at 0 volts and the signal at ouput terminals $2^0$ and $2^3$ are at +6 volts so that the binary configuration of the output signals represents the binary number 0110 which is equal to six.

The switch $S_2$ is provided in order to selectively apply a +12 volt signal to the decimal input switch $S_1$ when a plurality of decimal input switches similar to the switch $S_1$ is connected to the diode matrix. In that manner one of a plurality of decimal input switches may be selectively employed to enter data into the computer. The time at which the data is entered into the computer by parallel transfer into the N-register from the output terminals $2^0$ to $2^3$ is controlled by the logic signals applied to input terminals 190 and 191 when an instruction to read the decimal input into the computer is given in the program of the computer. If two decimal input switches are provided, the decimal input which will be read into the computer at the time that the instruction is received and executed will depend upon which of the two decimal input switches is provided with a +12 volt power supply through its associated second switch $S_2$. The number of decimal input switches which may be connected to a decimal-to-binary converter without the necessity of providing additional components is unlimited. Moreover, although mechanical switches are illustrated, electronic switches may be employed if desired.

A gated decimal-to-binary converter circuit is symbolically represented by a rectangle bearing a legend "Decimal-to-Binary Converter" and having nine decimal input terminals 1 to 9, four binary output terminals $2^0$ to $2^3$ and two gating input terminals 190 and 191.

TIMING

As noted hereinbefore, the internal memory section provided for storing instructions and data words in the computer comprises a magnetic drum revolving at about 4800 r.p.m. The drum consists of a cylindrical surface coated with a metallic oxide surface which can be locally magnetized to store 0 and 1 bits. Magnetic transducers called heads, each having a single center-tapped winding for either reading or writing, are placed close to the drum surface at regular intervals in the axial direction in order to provide a plurality of memory tracks, a track being that drum surface area which passes beneath a given head.

Each track is divided into 128 sectors called memory locations each of which can store a single word consisting of twenty bits plus an odd-parity checking bit. Each bit is stored in a segment called a memory cell. Three extra cells are provided in each memory location in order to allow a relaxation period between stored words.

Since the drum revolves at about 4800 r.p.m., approximately ninety-six microseconds are required to scan one memory location as it passes beneath an associated head. Accordingly, a word-time is approximately ninety-six microseconds and a bit-time, the time required to scan one memory cell, is approximately four microseconds.

The parity bit of each word stored in the memory section is employed only to check the word with which it is associated as that word is serially transferred to the arithmetic section from its memory location. Accordingly, each word passing through the arithmetic section has a maximum of twenty bits. The remaining four bit-times of each word-time provide sixteen microseconds of relaxation time between words as they are processed.

An example will demonstrate the advantage of providing some relaxation time between words being processed. As noted hereinbefore, both instructions and data words pass directly from their memory location to the arithmetic section since a buffer register which is normally provided in drum computers is not included. The manner in which words are processed as they are serially transmitted to the arithmetic section is determined by the instruction sequencing section in cooperation with other control sections. For the example, assume that a given instruction in a memory location requires that a data word in one of the memory locations accessible during the next word-time be added to the contents of the A-register. In order to be able to read an instruction in one word-time and execute it in the following word-time, some finite time is required between the word-times for proper decoding of the instruction and appropriate enabling of logic circuits which will allow a serial transfer of the contents of the A-register through the arithmetic section during the second word-time when the operand is serially transferred through the arithmetic section. The relaxation period of sixteen microseconds is sufficient for the most complex instruction required to be executed in the computer.

So that sections of the computer may allow events to take place in proper sequence with respect to word-times and at the correct bit-times within a given word-time, synchronizing signals are provided. The basic synchronizing signals which are recorded on the drum itself consist of a 250 kc. sine wave on one track and an index pulse on another. They are read continuously and employed to derive all of the specific synchronizing signals required in a manner described in the following paragraphs.

*$\phi_1$ and $\phi_2$ Clock Pulses*

Figure 14:
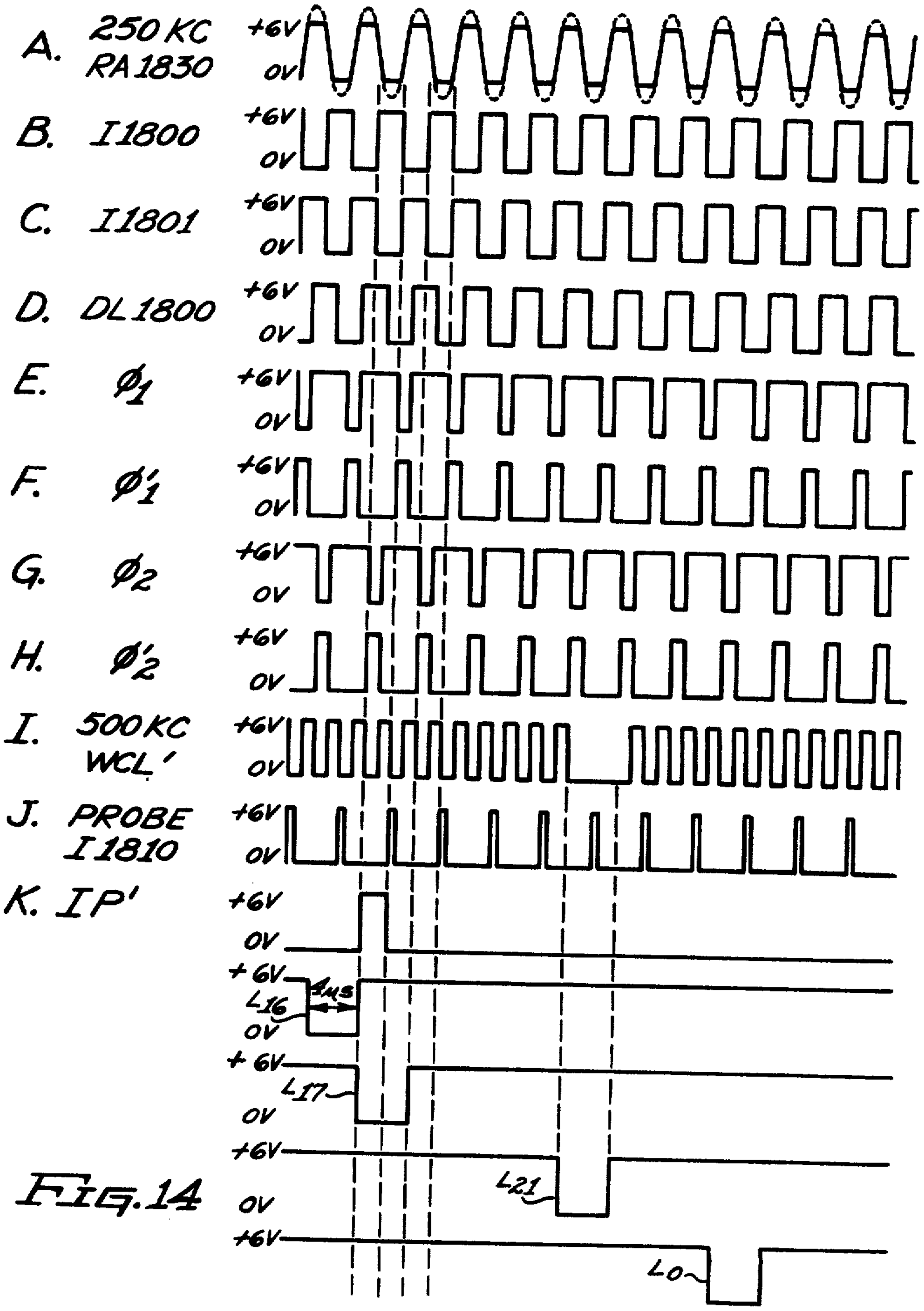
FIG. 14 is a timing diagram.
Figures 52, 53, 54:
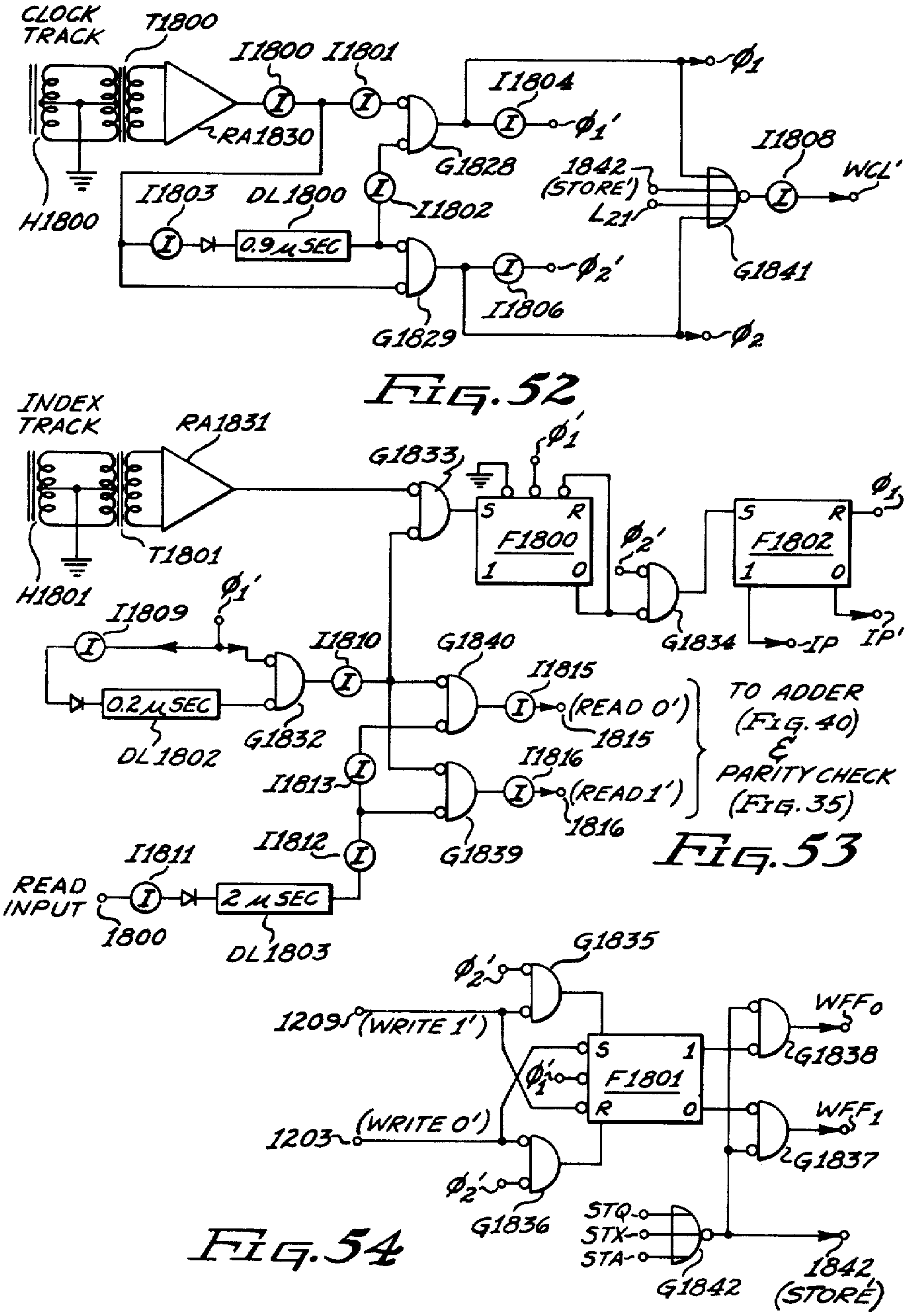
FIG. 52 illustrates a logic diagram of a circuit for deriving $\phi_1$ and $\phi_2$ clock pulses from a track of recorded clock pulses.
FIG. 53 illustrates a logic diagram of a circuit for deriving index pulses from a recorded pulse on an index track and for synchronizing data signals from a memory track.
FIG. 54 is a logic diagram of a circuit for synchronizing the recording of data signals in a memory track.

The basic timing signal of the computer recorded on a single clock track as a 250 kc. sine wave is read by a head H1800 illustrated in FIG. 52 and coupled by a transformer T1800 to a read amplifier RA1830 which provides at its output terminal a continuous series of substantially square pulses each about four microseconds long as illustrated in graph A of FIG. 14.

Two inverters I1800 and I1801 are employed to obtain oppositely phased square wave signals which are illustrated in graphs B and C of FIG. 14 to alternately enable AND-gates G1828 and G1829. The signal from the inverter I1800 is also transmitted through an inverter I1803 and a 0.9 microsecond delay line DL1800 to the AND-gate G1829 to disable it 0.9 microsecond after it has been enabled. In that manner 0.9 microsecond $\phi_2$ pulses illustrated in graph G are generated. The $\phi_2$ pulses are inverted by an inverter I1806 to provide $\phi_2'$ pulses which are illustrated in the graph H of FIG. 14. An inverter I1802 couples the output of the delay line DL1800 to the AND-gate G1828 to disable it 0.9 microsecond after it has become enabled in order to produce $\phi_1$ pulses as illustrated in graph E and to produce $\phi_1'$ pulses illustrated in graph F through an inverter I1804. The $\phi_1$ and $\phi_2$ pulses and their complements $\phi_1'$ and $\phi_2'$ are distributed throughout the computer by a network of inverters not shown in order that the logic circuit of FIG. 52 will not be overloaded.

*Write Clock*

Synchronizing $\phi_1$ and $\phi_2$ pulses are combined by an OR-gate G1841 in FIG. 52 in order to provide a source of 500 kc. clock pulses which are inverted by an inverter I1808 to provide WCL' (write clock) pulses illustrated in graph I of FIG. 14.

The OR-gate G1841 has two additional input terminals both of which are employed to inhibit transmission of WCL' pulses. One input terminal 1842 is normally maintained at a zero volt level to inhibit the transmission of write clock pulses except when an instruction to store data on the drum is being executed at which time a +6 volt STORE' signal is applied to it. Data may then be recorded with generated WCL' pulses in a manner to be described with reference to FIGS. 17 and 18 until a 0 volt signal, a four microsecond $L_{21}$ pulse, is applied to the second inhibiting input terminal.

*Probe Pulses*

Probe pulses illustrated in graph J of FIG. 14 are produced by an AND-gate G1832 and an inverter I1810 in response to $\phi_1'$ pulses which enable the AND-gate G1832 directly and disable it through an inverter I1809 and a 0.2 microsecond delay line DL1802. The output of the inverter I1810 applied to a pair of read-synchronizing AND-gates G1839 and G1840 is a train of 0.2 microsecond pulses which correspond in time to the leading edge of $\phi_1'$ pulses.

The probe pulses synchronize the reading of bits from the drum with the leading edge of a $\phi_1'$ pulse. For instance, an instruction read from a selected location is applied to an input terminal I1800 and transmitted through inverters I1811 and I1812. A delay line DL1803 is placed between those inverters to provide a delay of approximately two microseconds to the instruction word bits transmitted to an input terminal of the AND-gate G1839 and through an inverter I1813 to an input terminal of the AND-gate G1840. If a bit 1 is being read, the input terminal 1800 is at a +6 volt level and a probe pulse enables the AND-gate G1839 to transmit a READ 1' signal to an output terminal 1816 through an inverter I1816. If the bit being read is a 0, the inverter I1813 transmits a +6 volt signal to the AND-gate G1840 so that a probe pulse enables it to transmit a READ 0' signal to an output terminal 1815 through an inverter I1815.

*Index Pulse*

As noted hereinbefore, one track of the drum is employed for the storage of an index pulse the primary purpose of which is to effectively provide a reference mark in order that a given one of the 128 memory locations on a track may be located by counting down from the first location scanned after the index pulse is read. Accordingly, only one pulse is recorded on the index track. It is detected by a read head H1801 illustrated in FIG. 53 and coupled by a transformer T1801 to a read amplifier RA1831. A probe pulse enables an AND-gate G1833 when an index pulse is present to set a flip-flop F1800 in substantial time coincidence with a $\phi_1'$ pulse. A flip-flop F1802 is then set in substantial time coincidence with the leading edge of a $\phi_2'$ pulse through an AND-gate G1834 which is enabled by the set flip-flop F1800. The next $\phi_1'$ pulse to occur resets both of the flip-flops F1800 and F1802. The output terminals of the flip-flop F1802 provide the index pulses IP and IP'.

*Bit Timing*

Figure 15:
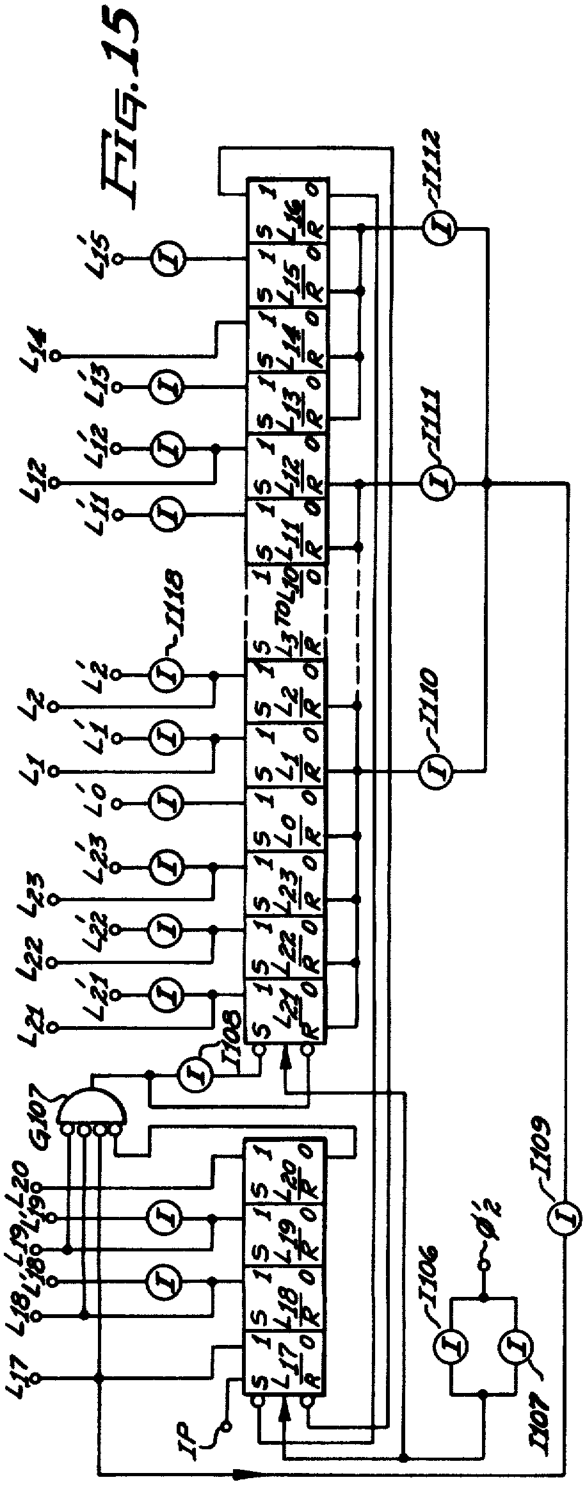
FIG. 15 illustrates schematically a circuit employed to derive bit-timing pulses.
Figure 16:
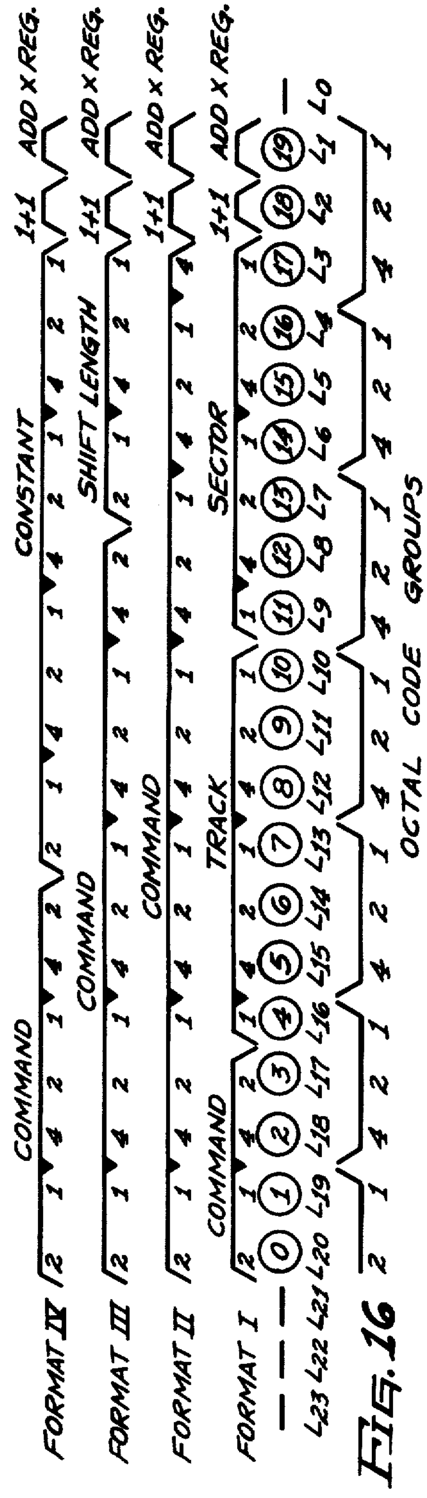
FIG. 16 is a chart which illustrates the relationship between bit-timing pulses and binary digits of data and instruction words.

The correct timing of each operation within a given word-time throughout the computer is assured by bit-timing pulses $L_0$ to $L_{23}$ generated by a bit-time counter illustrated in FIG. 15. Each unique bit-timing pulse generated within a given word-time constitutes a basic timing period of four microseconds which corresponds to a memory cell on the drum. As noted hereinbefore, a data word consists of twenty bits, nineteen bits plus a sign bit, and instruction words consist of twenty bits. FIG. 16 illustrates the manner in which twenty bits of a word may be associated with bit-timing pulses $L_1$ to $L_{20}$. It should be noted that the association of a given bit with bit-timing pulse is a time coincidence relationship only after the particular bit has been read and is available for the execution of an operation. The least significant bit is illustrated in FIG. 16 as bit 19. The reason for this is that when a word is read from memory into a register such as the A-register, the least significant bit 19 is present in the nineteenth stage of the shift register. For instance, if the word read from memory is an instruction, it will be read into the α-register. The nineteenth or least significant bit is then stored in the nineteenth stage of the α-register.

The nineteenth bit of an instruction word always specifies whether or not the contents of the X-register are to be added to the instruction as it is read from the drum memory. The eighteenth bit always specifies whether the current instruction is a single-address instruction or a one-plus-one address instruction. The remaining bits 0 to 17 are employed to specify the operation to be executed including the track and sector of an operand, if one is required, a constant (K) or the length of a specified shift.

The bit counter which generates the bit-timing pulses $L_0$ to $L_{23}$ is a shift register having twenty-four stages $L_0$ to $L_{23}$ connected in a ring and operated as a ring counter in that an IP pulse which sets the stage $L_{17}$ is transferred from stage to stage in a ring fashion 128 times during a drum revolution in response to $\phi_2'$ pulses applied to trigger input terminals through inverters I106 and I107. Transfer of a bit 1 from stage $L_{20}$ to stage $L_{21}$ is not made directly but through a lock-out circuit consisting of AND-gate G107 and inverter I108. The AND-gate G107 is enabled only when stages $L_{17}$ to $L_{19}$ are reset and stage $L_{20}$ is set. When the AND-gate G107 is enabled, a bit 1 is transferred to stage $L_{21}$ in response to the next $\phi_2'$ pulse.

Once during each drum revolution, an IP pulse sets stage $L_{17}$. If a bit-time had not been lost during the preceding drum revolution, the IP pulse will set stage $L_{17}$ at substantially the same time that a $\phi_2'$ pulse shifts a bit 1 into that stage. If a bit-time had been lost during a preceding drum revolution by failing to properly advance the counter in response to a $\phi_2'$ pulse, the bit 1 being circulated would not be shifted into $L_{17}$ during an IP pulse but would instead be shifted from one to some other preceding stage such as from stage $L_{15}$ to stage $L_{16}$. Under those circumstances two stages of the ring counter would be set at the same time if it were not that when the stage $L_{17}$ is set by an IP pulse, a reset signal is transmitted to stages $L_0$ to $L_{16}$ and stages $L_{21}$ to $L_{23}$ through inverters I109 to I112 in order to reset the stage erroneously set. If a spurious advance of the bit-time counter had been made during a preceding drum revolution, it is possible for a bit 1 to be transferred into stage $L_{18}$ at the time that an IP pulse sets stage $L_{17}$. In that event the lock-out circuit prevents a bit 1 from being transferred into stage $L_{21}$ until the bit 1 inserted into stage $L_{17}$ by the last IP pulse has been shifted into stage $L_{20}$ at which time a bit 1 is properly shifted into stage $L_{21}$.

Each bit-timing pulse, such as pulse $L_{16}$, is a four microsecond 0 volt signal persisting from the leading edge of one $\phi_2$ pulse to the leading edge of the next $\phi_2$ pulse as illustrated in FIG. 14 and is distributed by a network of inverters. Not all of the bit-timing pulses $L_0$ to $L_{23}$ are required for timing the computer. Output terminals for only those pulses required are shown in FIG. 15. Inverters are shown connected to some output terminals, such as an inverter I118 connected to the output terminal $L_2$, to provide a complementary output pulse wherever necessary.

Input terminals of circuits in control sections of the computer which are to be driven by different ones of the bit-timing pulses generated by the bit counter of FIG. 15 are indicated by the requisite bit-timing pulse. For instance in FIG. 52, the AND-gate G1841 is disabled by an $L_{21}$ pulse applied to an input terminal $L_{21}$ as described hereinbefore. This convention is employed throughout but it should be understood that input terminals of control sections are not necessarily connected directly to output terminals of the bit counter in FIG. 15. For instance, an inverter could be employed if required by load considerations to couple the output terminal $L_{21}'$ of the bit counter in FIG. 15 to the input terminal $L_{21}$ in FIG. 52 as well as to other input terminals up to a maximum of about five depending upon the specific type of transistor employed in the inverter circuit. Similarly, if the complement of a bit-timing pulse is to be applied to a control input terminal, such as an $L_{21}'$ pulse, it may be connected directly to the inverter which provides the complement or to the true signal source by an inverter.

*Write and Read Timing*

When it is desired to write on a drum location, a magnetic head is selected and at the appropriate time a flux pattern is recorded which represents a group of signals having binary values of one and zero according to the phase modulation of a controlled magnetizing current employed for recording. Every cell is magnetized to saturation; the first half of each cell, beginning with the leading edge of a $\phi_2$ pulse, is magnetized in one direction and the second half, beginning with a $\phi_1$ pulse, is magnetized in another direction. One direction of magnetization is arbitrarily designated as positive and the other as negative. Accordingly, a recorded bit 1 is represented by magnetization in a positive direction followed by magnetization in a negative direction and a bit 0 is represented by magnetization in a negative direction followed by magnetization in a positive direction. Therefore to record a bit 1 positive magnetizing current is driven through the recording head followed by negative magnetizing current. If a sequence of 1-bits is recorded, a sequence of sinusoidal waves is generated when the recorded 1-bits are read. If a sequence of 0-bits is recorded, the sequence of sinusoidal waves generated when it is read out is the same as for a recorded sequence of 1-bits except that the sinusoidal waves for the 0-bits are 180 degrees out of phase with the waves for the 1-bits. However, if a bit 0 follows a bit 1 the out of phase sign waves are combined to produce a phase modulated signal.

An example of writing and reading a word from a memory location will be described with reference to a timing chart in FIG. 17. The chart consists of fourteen graphs of signals plotted with reference to bit-timing periods $L_0$ to $L_{23}$. Assuming that 101011001, the binary value of 345, is to be recorded in a given location, a STORE′ signal is generated commencing with an $L_{21}$ pulse to enable the OR-gate G1841 in FIG. 52 to transmit WCL′ pulses to the write-control circuits of a selected head. However, transmission of WCL′ pulses is inhibited until the termination of the $L_{21}$ pulse applied to the OR-gate G1841; thereafter WCL′ pulses are transmitted until the next $L_{21}$ pulse at which time the OR-gate G1841 is again inhibited and the enabling STORE′ signal is removed from the input terminal 1842.

Figure 34:
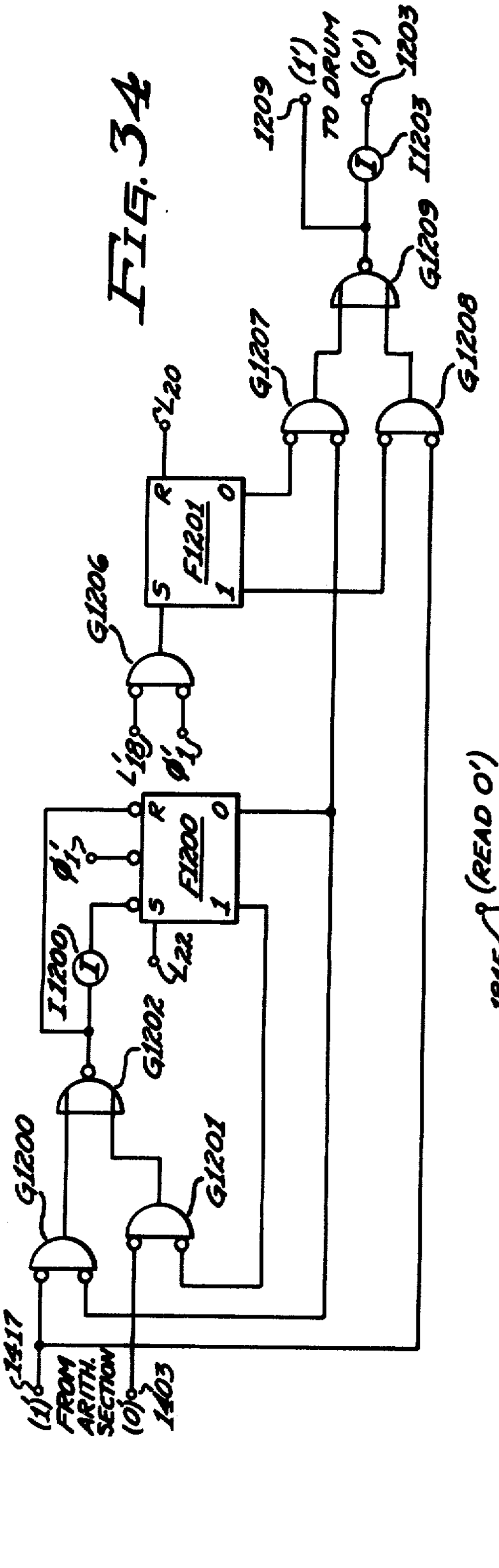
FIG. 34 illustrates a logic diagram of a parity generator.

At time $\phi_1$ of the $L_{22}$ pulse period a WRITE 1′ signal from the parity pulse generating section illustrated in FIG. 34 is presented at an input terminal 1209 of FIG. 54 and the next $\phi_2$ pulse enables an AND-gate G1835 to set a flip-flop F1801. It is then reset by a succeeding $\phi_1'$ pulse. Since a bit 0 follows the least significant bit 1 in the present example, the write flip-flop remains reset while a WRITE 0′ signal from the parity pulse generating section is present at an input terminal 1203 to enable an AND-gate G1836. Upon the occurrence of the next $\phi_1$ pulse, the flip-flop F1801 is set again but since the next write control signal is also WRITE 0′, the following $\phi_2'$ pulse enables the AND-gate G1836 and resets the flip-flop F1801 again. The remaining binary digits control the triggering of the write flip-flop F1801 in a similar manner. For each bit 1 to be recorded, the flip-flop F1801 is set by a $\phi_2$ pulse and reset by a following $\phi_1$ pulse and for each bit 0 to be recorded, the write flip-flop F1801 is reset by a $\phi_2'$ pulse and set by a following $\phi_1$ pulse.

Figure 43:
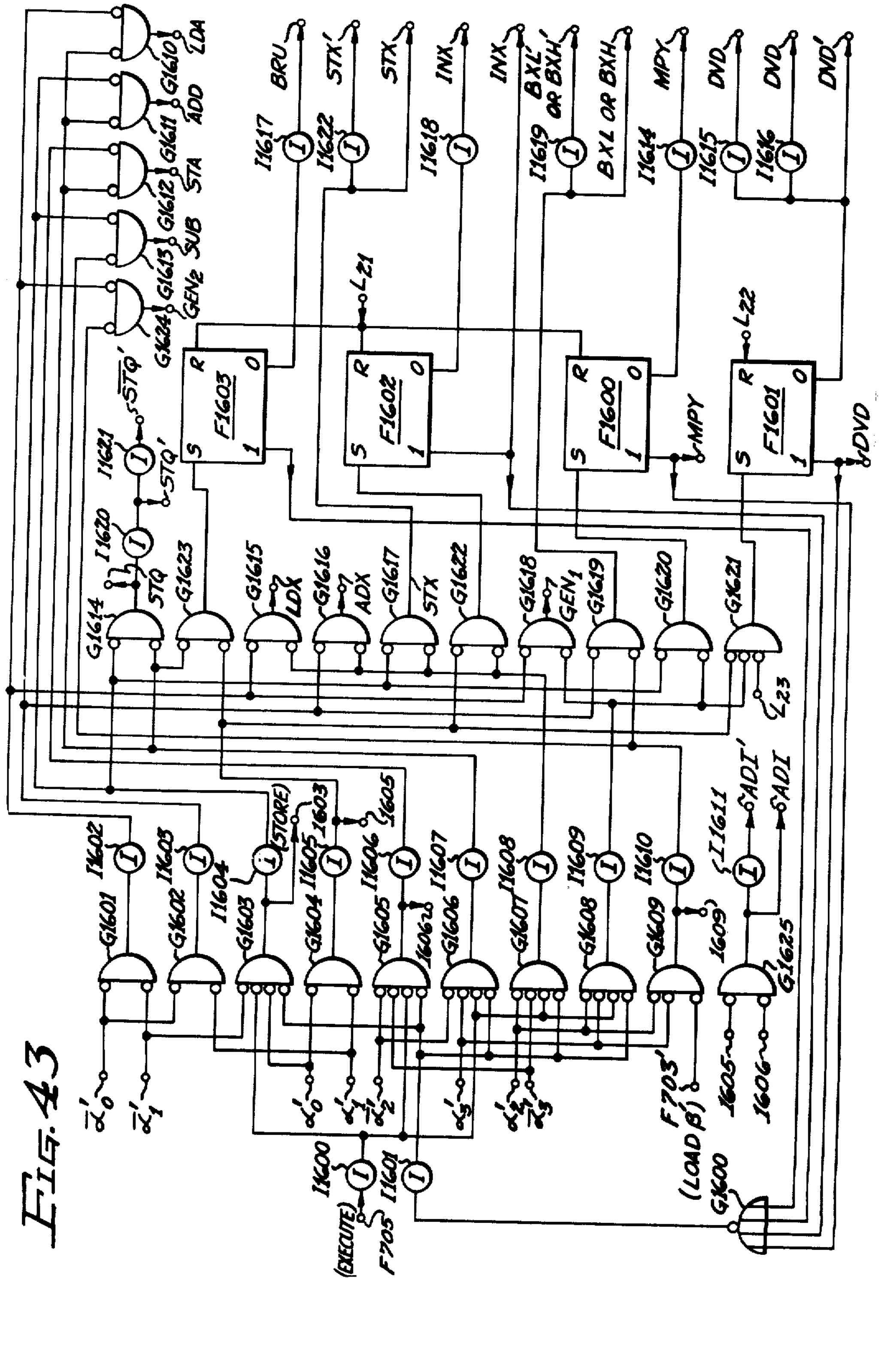
FIG. 43 illustrates a logic diagram of a circuit for decoding basic commands.

Store command signals STQ, STX and STA from the instruction decoding section illustrated in FIG. 43 are applied to input terminals of an OR-gate G1842 (FIG. 54) so that a STORE′ signal is transmitted to the input terminal 1842 of the OR-gate G1841 (FIG. 52) and to input terminals of AND-gates G1837 and G1838 (FIG. 54). During the presence of a STORE′ signal, the true and false output terminals of the write flip-flop F1801 enable the AND-gates G1837 and G1838 to provide complementary output signals $WFF_0$ and $WFF_1$.

The timing of all of the signals described in the preceding paragraph is illustrated by the first eight graphs of FIG. 17. Each graph bears a legend which corresponds with a terminal illustrated in either FIG. 52 or FIG. 54 at which it is present during the successive bit timing periods. The shaded area at the leading and trailing edges of the STORE′ signal indicates that the exact timing of the leading and trailing edges of the STORE′ signal is not critical as long as the leading and trailing edges occur during $L_{21}$ periods. The shaded areas of the graphs for the WRITE 1′ and WRITE 0′ signals indicate that any voltage signals present during those periods may be disregarded. A full word-time cycle is shown in condensed form by omitting the time between bit periods $L_6$ and $L_{17}$ since only a sequence of zeros would be recorded during that period of the example. It should be noted that the graph $WFF_0$ indicates a bit 0 is being recorded after the most significant bit, the sign bit, is recorded because in the example an odd number of 1 bits is already present in the word and an odd parity check bit 1 is not generated by the parity generating section illustrated in FIG. 34.

The complementary output signals $WFF_1$ and $WFF_0$ from the AND-gates G1837 and G1838 are employed in a manner illustrated in FIG. 18 to gate WCL′ pulses to opposite ends of a center-tapped winding 185 of a write head selected by a 0 volt signal at an input terminal 186 of a column driver CD100. The WCL′ pulses are capacitively coupled to a first inverter $T_{23}$ the output of which is coupled by a diode $D_{17}$ to a second inverter $T_{24}$ which is employed to inhibit WCL′ pulses except when an associated head is selected for recording by a 0 volt signal at a read-select input terminal $RS_2$. The WCL′ pulses at the collector of the second inverter are transmitted through a transistor switch $T_{22}$, which is selectively rendered conductive by a 0 volt signal at a read-select input terminal $RS_1$, and through one of two steering transistors $T_{20}$ and $T_{21}$, depending upon whether a 0 volt $WFF_1$ or a 0 volt $WFF_0$ signal is present. The collectors of the steering transistors $T_{20}$ and $T_{21}$ are coupled to respective ends of the head winding 185 by transistor amplifiers $T_{18}$ and $T_{19}$ and diodes $D_{14}$ and $D_{15}$. The result is a recording of binary digit signals on the surface of the drum passing beneath the selected head.

When the recorded 1 and 0-bit signals illustrated in the ninth graph of FIG. 17 are read, a read-input signal illustrated in the tenth graph is applied to the input terminal 1800 (FIG. 53). The read-input signal is delayed by approximately two microseconds in the delay line DL1803 to properly align the read-input signal with probe pulses from the inverter I1810 shown in the eleventh graph of FIG. 17. The read-input signal which appears as a variable-phase square wave as illustrated in the twelfth graph of FIG. 17 is applied to input terminals of the AND-gates G1839 and G1840 in order that it may be probed by the 250 kc. probe pulses. For instance, the first bit read is a bit 1 so that a 0 volt signal at the output terminal of the delay line DL1803 is inverted by the inverter I1812 to enable the AND-gate G1839 when a probe pulse is present. The bit 1 output signal of the AND-gate G1839 is inverted by an inverter I1816 in order to present at an output terminal 1816 a complementary (READ 1′) signal as shown in the thirteenth graph of FIG. 17. The next two 0-bits read are represented by a +6 volt signal coupled by the inverters I1812 and I1813 to the AND-gate G1840 to enable it when probe pulses are present in order to transmit a complementary (READ 0′) signal to an output terminal 1815 via an inverter I1815 as shown in the fourteenth graph of FIG. 17. The remaining 1 and 0-bits are read in a similar manner.

From the foregoing description of the timing for writing and reading operations, it may be seen that the least significant bit is available for recording during the last half of an $L_{22}$ timing period, and the first half of an $L_{23}$ timing period. The $\phi_2'$ and $\phi_1'$ pulses which occur during the WRITE 1′ signal for the least significant bit are employed to generate complementary write-control signals $WFF_0$ and $WFF_1$ which in turn gate WCL′ pulses to record a bit 1 during the $L_{23}$ timing period.

When the bit 1 recorded in the least significant bit position is read, the read input signal is inherently delayed approximately one microsecond by the reading process and further delayed about two microseconds by the delay line DL1803 to enable the bit 1 signal read to be properly probed during the $L_0$ timing period with the result that a READ 1′ pulse is presented to the input of the arithmetic section (FIG. 40) and to the parity checking section (FIG. 35) during an $L_0$ timing period.

In the arithmetic section, an input flip-flop F1400 stores the bit 1 read from the least significant bit position until the middle of the following $L_2$ timing period. While it is stored in the input flip-flop F1400 of the arithmetic section, it may be transferred into the control circuit of the X-register (FIG. 24) by a $\phi_1'$ pulse during the $L_1$ timing period. The remaining bits 0 to 18 are similarly read from the drum and made available during the bit-timing periods $L_1$ to $L_{19}$ as indicated in FIG. 17. The parity bit which follows the most significant bit, the sign bit for data words, is read from the drum and made available for a parity check (FIG. 35) during the $L_{20}$ timing period as illustrated in FIG. 17.

WORD FORMAT

Having described the bit-timing of a word with reference to FIGS. 14 to 18, the format of words stored in the computer will now be described in more detail with reference to FIG. 16. The computer will accept alphabetical and numerical data in any form through the N-register illustrated in FIG. 19, an external register through a bank of AND-gates G316 in FIG. 20 or a bank of manual input switches $S_0$ to $S_{19}$ illustrated in FIG. 36. Information entered through any of those input devices may be stored in locations of the memory section and may be transferred from a memory location to a register and from one register to another. However, unless the information is numerical data in binary form, arithmetic operations cannot be performed. Therefore if numerical data is entered on which arithmetic operations must be performed and which is not in binary form, a program subroutine must be employed to convert such information into binary form.

Words which represent numerical data in binary form consist of a sign bit and a nineteen bit number. The twenty bits of a word in positions 0 to 19 are schematically illustrated in FIG. 16 by encircled position numbers. It should be noted that the bit in position 0 is the sign bit which precedes the most significant bit of the number in position 1, and that the least significant bit is in position 19.

A bit 1 in position 19 of any instruction word specifies that the contents of the X-register are to be added to bit positions 4 through 17 of the instruction word. A bit 0 in position 18 specifies that the instruction is written in the format of a single-address instruction. The remaining eighteen bits of a single-address instruction or the first word of a one-plus-one address instruction is employed to specify the command or operation to be performed, the address of an operand if one is required and other information necessary for the execution of the instruction.

Four formats may be employed to write single-address instructions as illustrated in FIG. 16. Format I includes a command portion in positions 0 to 3 and the address of an operand in positions 4 to 17 if an operand is required. That address consists of a track designation in positions 4 through 17 and the designation of a sector on the specified track in positions 11 through 17. It should be noted that the operand for a single-address instruction must be located in a sector accessible during the next word-time in sequence for reasons which will become apparent as the detailed description of the computer progresses. Consequently, if a single-address instruction read from a sector $n$ of a given track requires an operand, the operand must be located in a sector $n+1$ of the same track or of one of a limited number of tracks in a group of tracks so that the operation which requires the operand may be accomplished within one word-time after the instruction is read. As an example, if the instruction is to add the operand, a serial transfer of the operand from its sector $n+1$ to the arithmetic section for addition is accomplished during the one word-time that the sector $n+1$ is read.

Single-address instructions which do not require the address of an operand or other additional information may be written in Format II but if the command specifies a shift operation, the length of the shift must be specified by writing the instruction in Format III. If a constant is required, such as for branch on high (BXH) or branch on low (BXL) commands in which the constant provides the criteria on which the branch decision is to be made, the instruction is written in Format IV.

Figure 27:
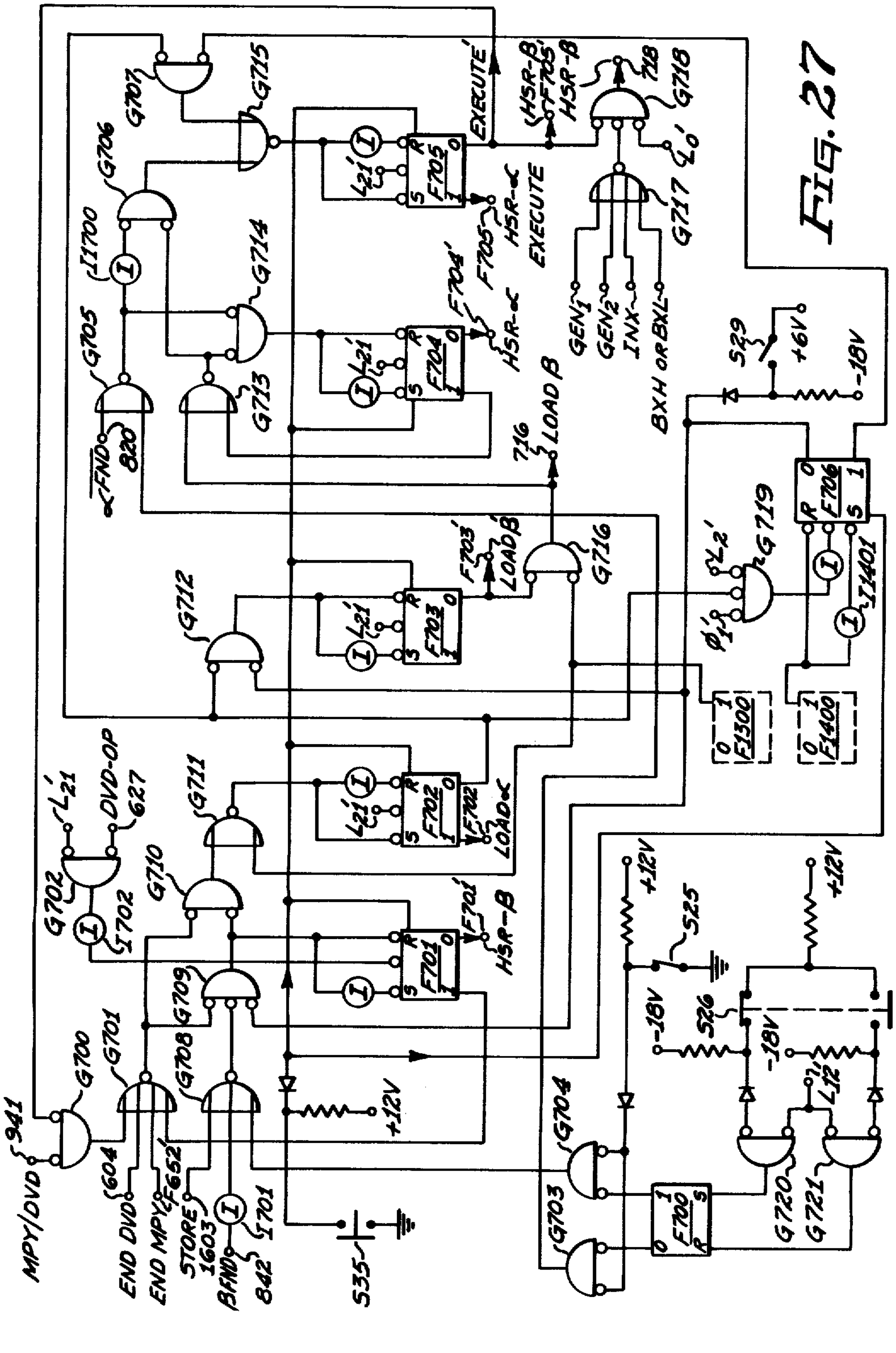
FIG. 27 illustrates a logic diagram of a circuit for instruction sequencing.

The address of the next instruction need not be specified if the instruction is written as a single-address instruction because the instruction sequencing section in FIG. 27 automatically causes the next instruction to be read from a sector scanned during the next word-time immediately after the operand is read and from the same track as the previous single-address instruction. If an operand is not required by the single-address instruction a sector is nevertheless passed during the word time required for the execution of the single-address instruction. Sectors passed in that manner may be employed to store operands required by one-plus-one address instructions. If the operand cannot be optimumly located for single-address instructions in a sector between single-address instructions, or if the instruction requires more than one word-time for its execution, the instruction must include the address of the next instruction and must therefore be written as a one-plus-one address instruction written in the same format as a single-address instruction except that a bit 1 is placed in bit position 18 to effectively link the next sequentially available word in the same memory track to the instruction in order to specify the address of the next instruction in positions 4 through 17; positions 0 to 3, 18 and 19 of the second word are not used.

Numbers and instructions within the computer are in binary form but for convenience they may be expressed in octal form by the user of the computer while preparing a program by dividing the twenty bits of a word into octal groups as illustrated in FIG. 16. One octal digit from zero to seven may be employed to express each group of binary digits. For instance, numerical data words are divided into six octal groups of three bits each beginning from the right and a seventh group of two bits on the left. Only one of those two positions, position 1, may be employed for the numerical value of the word since the other, position 0, must be employed to specify the sign. A bit 1 in the sign position specifies that the number is negative and that the bit configuration to be entered into the computer must be the two's complement of the bit configuration specified by the octal numbers.

Instruction words may also be more conveniently expressed in octal form. However in doing so each portion of the instruction word must be considered by itself. For instance, the instruction to subtract the contents of a memory location from the contents of the A-register must have the sector and track address of the memory location specified in octal form for the positions 4 through 17 while the command is specified in octal form and for the positions 0 through 3. The manner in which the portions of an instruction word are grouped is illustrated in FIG. 16. The octal grouping for the bits in each portion begins with the least significant bit of each portion such that the binary values of bit positions 15, 16 and 17, for instance, determine the value of the least significant octal digit for the sector address.

However the octal grouping of the bit positions in the command portion of each instruction is made from left to right with only two bit positions for the most significant octal group. Since there is an insufficient number of bit positions to specify a complete octal number for the least significant order of the command portions, it is assumed in specifying the octal number for that order that the additional lower order positions required to complete an octal group of three each contain a bit 0. Accordingly, for commands of instructions written in Formats I, III and IV the least significant octal digit must be an even number 2, 4, 6 or 0 and for commands of instructions written in Format II, the least significant octal digit must be either 0 or 4 in order that a bit 0 may be assumed in positions of lower order even though positions of lower order may actually contain a bit 1 for some other purpose. Having composed an instruction word by simply specifying octal code numbers for the various portions, the word may be translated into twenty binary digits and then into a seven digit, octal code, number just as though it were a number without regard to the commingling of binary digits from different portions to form certain octal numbers.

PARITY CHECK

An odd-parity check is employed to determine whether information being transferred from a drum location to the arithmetic section contains a single bit error or an odd number of bit errors. An even number of bit errors will present an incorrect but acceptable information group of binary signals. While information is being recorded on the drum, an odd-parity generating circuit illustrated in FIG. 34 produces an odd-parity bit for each word recorded to make the total number of bits having a binary value of one in the twenty-one bit word an odd number. When the recorded information is read, each successive word passes sequentially through a parity checking circuit illustrated in FIG. 35 which counts the number of bits having a binary value of one. If an even number of such bits is counted, an error is present and a parity error signal is generated. The parity bit in the twenty-first position of each word read is transmitted only to the parity checking circuit.

*Parity Generating Section*

In order to generate a parity bit, a word being stored in a location on the drum is applied to AND-gates G1200 and G1201 from respective output terminals 1417 and 1403 of the arithmetic section. A flip-flop F1200 is set by an $L_{22}$ pulse which, as noted hereinbefore with reference to FIG. 17, occurs immediately before the recording of the least significant bit of the word. The first bit 1 of that word applied to the AND-gate G1200 enables it to transmit a signal through an OR-gate G1202 to the steering circuit of the flip-flop F1200 so that a $\phi_1'$ pulse will reset it. After the flip-flop F1200 is reset by a bit 1 through the AND-gate G1200, each bit 0 which may follow enables the AND-gate G1201 to hold the flip-flop F1200 in the reset state. When the second bit 1 in the word is presented, the AND-gate G1201 is disabled by a 0 volt signal at its input terminal 1403 and the AND-gate G1200 is held disabled by a 0 volt signal from the false output terminal of the flip-flop F1200. Consequently, a 0 volt signal is transmitted by the OR-gate G1202 to enable the flip-flop F1200 to be set by a $\phi_1'$ pulse. The third bit 1 and each alternate bit 1 thereafter resets the flip-flop F1200 while the fourth bit 1 and each alternate bit 1 thereafter sets it. Since the flip-flop F1200 is continually set and reset by successive 1 bits, its false output terminal is at 0 volts after each odd bit 1 has been recorded and at +6 volts after each even bit 1 has been recorded.

Each bit 1 counted by the flip-flop F1200 is transmitted through an enabled AND-gate G1208 and an OR-gate G1209 to produce a +6 volt signal at an output terminal 1209 and a 0 volt signal through an inverter I1203 at an output terminal 1203, both of which are connected to the write-timing section of FIG. 54. Each bit 0 of the word to be recorded produces complementary 0 and +6 volt signals at the output terminals 1209 and 1203, respectively.

After all twenty bits of a word have been recorded through the enabled AND-gate G1208, a $\phi_1'$ pulse is transmitted through an AND-gate G1206 during an $L_{18}'$ pulse period to set a flip-flop F1201 to disable the AND-gate G1208 and enable an AND-gate G1207. Only if the flip-flop F1200 is set at that time will its false output terminal be at +6 volts to enable the AND-gate G1207 to transmit a bit 1 to the write-timing section of FIG. 54 during an $L_{19}$ pulse period so that the recorded word consisting of twenty-one bits will conclude an odd-parity bit. The flip-flop F1201 is reset by an $L_{20}$ pulse to prepare the parity generating section for the next operation of recording.

*Parity Checking Section*

Figure 35:
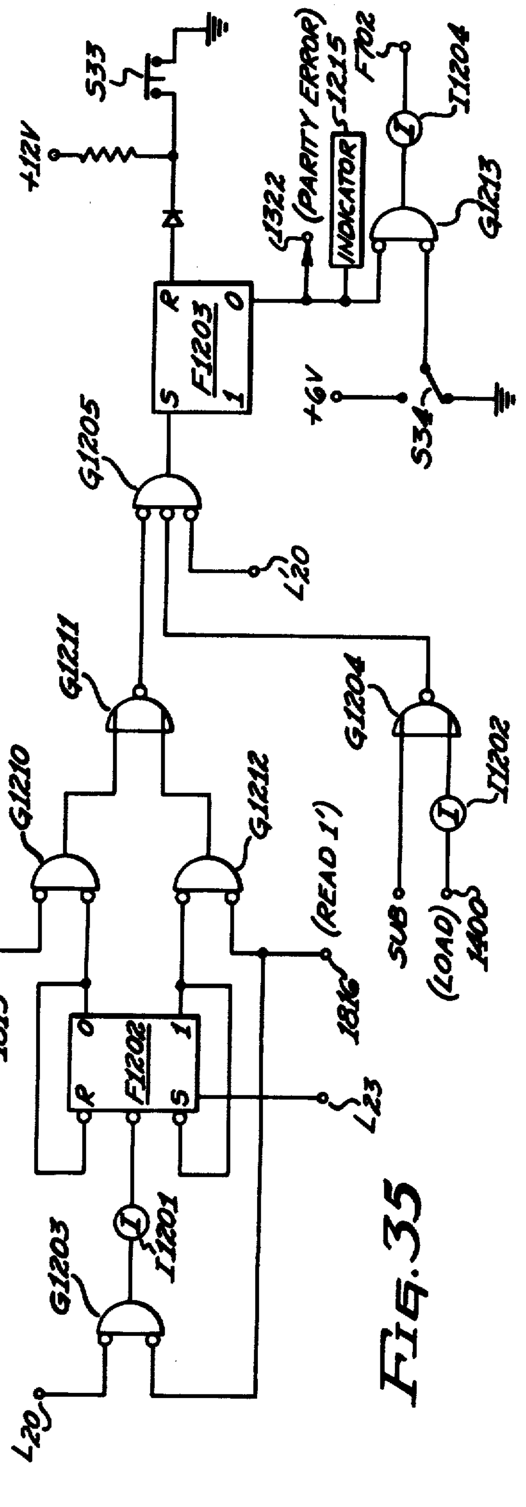
FIG. 35 illustrates a logic diagram of a parity checking circuit.

When a word stored in a memory location is read, an AND-gate G1205 in the parity checking section illustrated in FIG. 35 is enabled by either a subtract command signal SUB coupled to an OR-gate G1204 or a load control signal from an output terminal 1400 of an OR-gate G1400 in the arithmetic section (FIG. 40) coupled to the OR-gate G1204 by an inverter I1202. The execution of a subtract command or any operation which requires loading a register from a memory location through the arithmetic section is initiated by the instruction sequencing section during an $L_{21}$ pulse. The next $L_{23}$ pulse sets a flip-flop F1202 to initiate a parity checking operation. Signals of bits read are applied to input terminals 1815 and 1816, the latter of which is connected to AND-gates G1203 and G1212 to enable them when a bit 1 is read.

Figure 39:
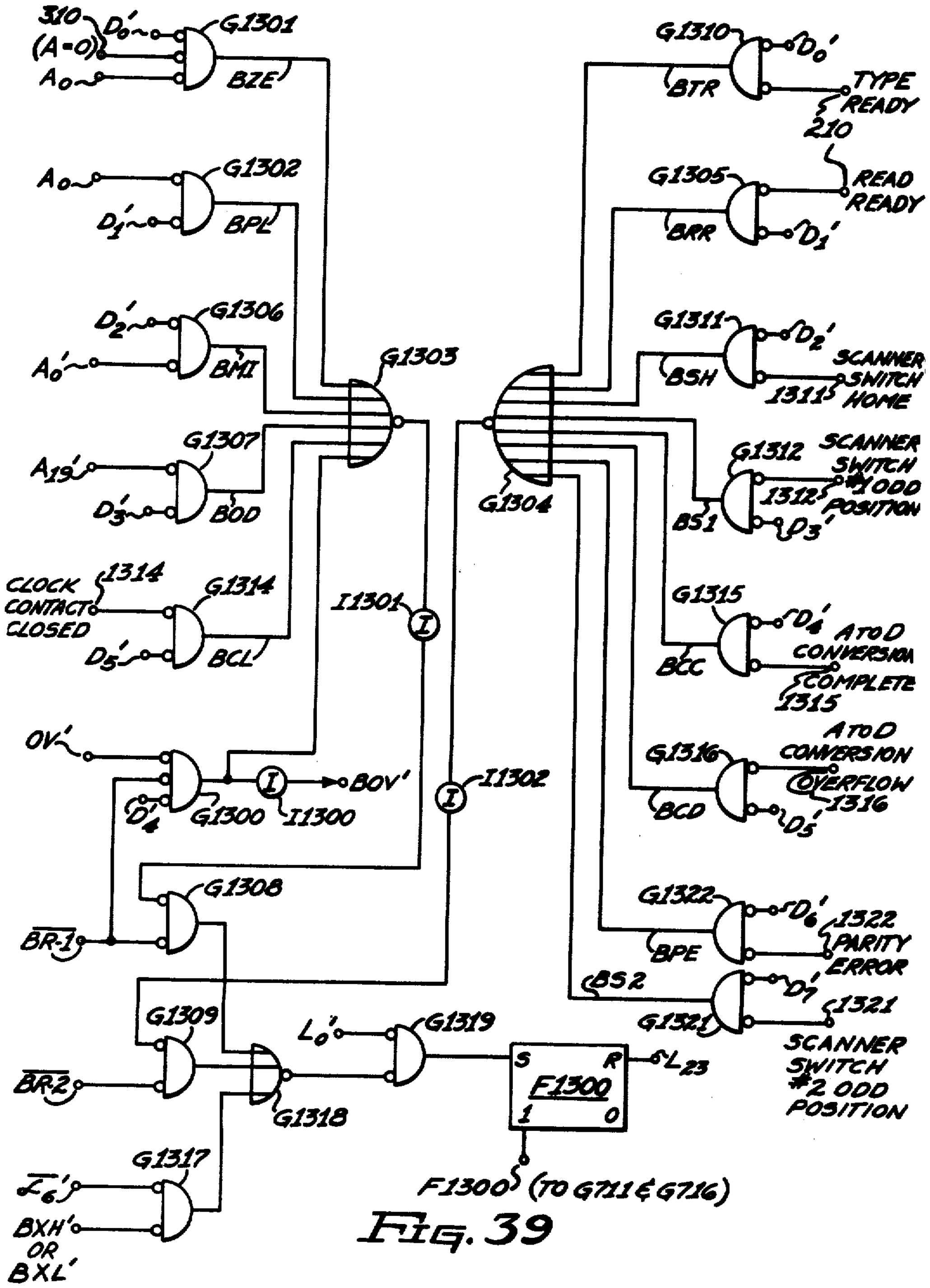
FIG. 39 illustrates a logic diagram of a circuit for decoding conditional branch instructions and for rendering a decision whether to branch.

The AND-gate G1203 allows each bit 1 read to alter the state of the flip-flop F1202. After the last or twentieth data bit of the word being read from memory has been presented to the input terminals 1815 and 1816 during an $L_{19}$ timing pulse, an $L_{20}$ pulse disables the AND-gate G1203 while an $L_{20}'$ pulse enables an AND-gate G1205 to allow the next bit, the parity bit, applied to the input terminals 1815 and 1816 to be transmitted through the AND-gate G1210 or the AND-gate G1212 depending upon whether the parity bit is a one or a zero and further depending upon whether the flip-flop F1202 has been triggered an even or odd number of times. Assuming that the flip-flop F1202 has been triggered an even number of times, the parity bit for a correct word should be a one for an odd-parity check and both of the AND-gates G1210 and G1212 should be disabled so that the flip-flop F1203 is not set during the $L_{20}'$ pulse period. If the flip-flop F1203 is set, a parity error signal is generated indicating that an error does exist in the word read from memory. For instance, if the flip-flop F1202 had been triggered an odd number of times, it would be in a reset state during the $L_{20}'$ pulse period and a parity bit 1 would be transmitted through the AND-gate G1212, the OR-gate G1211 and the enabled AND-gate G1205 to set the flip-flop F1203 and generate a parity error signal at an output terminal 1322 which is connected to a branch-on-parity-error AND-gate G1322 of the branch decoding section (FIG. 39). Otherwise the parity error flip-flop F1203 is not set.

When the flip-flop F1203 is set to indicate a parity error, an indicator 1215 is energized to alarm the operator. Appropriate action may then be taken and the flip-flop F1203 reset by momentarily closing a push button switch $S_{33}$.

The parity error signal is also connected to an AND-gate G1213 which may be held disabled by a switch $S_{34}$ in order that a parity error will not stop the computer from executing the remaining instructions of the program. The normal procedure is to insert in the program timely branch-on-parity-error instructions followed by an appropriate subroutine which may automatically provide corrective action. However, it is possible to have the computer stop when a parity error occurs by applying a +6 volt signal to the AND-gate G1213 through the switch $S_{34}$ so that when a parity error does occur, the parity error signal is transmitted through the enabled AND-gate G1213 and an inverter I1204 to the true output terminal of a flip-flop F702 in the instruction sequencing section (FIG. 27) to hold it in a reset state until the flip-flop F1203 is manually reset by the push button $S_{33}$. The flip-flop F702 controls the loading of the next instruction into the α-register; consequently when a parity error occurs, the operation of the computer will continue until it is necessary to load the next instruction in sequence into the α-register after which the machine will idle until the parity error flip-flop F1203 is reset.

INSTRUCTION SEQUENCING SECTION

The instruction sequencing section provides control signals to cause sections of the computer to cooperate in such a manner as to cause instructions to be obtained automatically from memory in proper sequence and to be executed. For the purpose of better understanding instruction sequencing, a word-time should be considered as twenty-three bit-times from the leading edge of an $L_{21}'$ pulse to the trailing edge of an $L_{20}'$ pulse.

Two types of instructions are employed in the GE–312 computer: single-address instructions and one-plus-one or double-address instructions. Since the first type requires only one word and the second type requires two, the instruction sequencing section is provided with two modes of operation. In one mode of operation a single-address instruction is transferred from a memory location to the α-register during one word-time and executed in the next word-time. Thus a complete cycle for a single-address instruction consists of two operations, loading the next instruction in sequence into the α-register and executing it. A one-plus-one address instruction requires five or more word-times to complete its instruction sequencing cycle as follows: one word-time to load into the α-register the first word which contains the operation code or command and the address of an operand if one is required; one word-time to load the second word which contains the address of the next instruction into the β-register; one or more word-times to search for the location of the operand if one is specified by the first word; one or more word-times to execute the instruction depending upon what operation is specified by the command portion; and one or more word-times to search for the location of the next instruction specified by the second word stored in the β-register. The instruction sequencing section is switched automatically from the first mode to the second for a one-plus-one address instruction by the presence of a bit 1 in position eighteen of the first instruction word read into the α-register.

When an instruction cannot be executed in one word-time or when the next instruction cannot be optimumly located in a memory location accessible during the next word-time following the execution word-time, the next instruction must be written as a one-plus-one address instruction. There are some special instructions written as one-plus-one address instructions which require the instruction sequencing section to deviate from the normal cycle for a one-plus-one address instruction as follows:

(1) Branch instructions are written as one-plus-one address instructions but require a specified condition to be present before the address of the next instruction is permitted to be loaded into the β-register. If the condition is not present, it is executed as if it were a single-address instruction and the normal next instruction in sequence is loaded into the α-register from the same track after a full word-time is allowed to elapse while the sector containing the address to which the branch would have been made is scanned but not read into the β-register.

(2) Shift and word-transfer instructions when written as one-plus-one address instructions skip the search-for-operand mode of operation since one is not specified. That is accomplished by forcing a signal ($\overline{\alpha\ \text{FND}}$) in the address comparator section which simulates having located an operand when none is specified.

(3) Multiply and divide instructions are one-plus-one address instructions which require many word-times for execution whereas other instructions require only one word-time for execution after any operand required has been located. To provide additional word-times, a search for the next instruction is inhibited after the usual one word-time for execution by a multiply or divide operation control signal (MPY or DVD) until a signal (END MPY or END DVD) is received from the multiply or divide instruction sequencing section indicating that the operation has been completed.

In addition to the foregoing special instruction sequencing cycles, a manual operation is provided which causes the instruction sequencing section to cycle in a normal manner for single-address instructions but to stop in a search-for-operand mode of operation during each one-plus-one address instruction cycle, even if an operand is not required and an $\overline{\alpha\ \text{FND}}$ signal is produced as noted hereinbefore. This mode of manually sequencing instructions permits the computer to stop between sequences of single-address instructions while program or operation checks are made.

If program or operation checks on single-address instructions are to be made a "force one-plus-one" switch must be closed to simulate the presence of a bit 1 in position eighteen of each single-address instruction so that the instruction sequencing section will proceed as if all the instructions were one-plus-one address instructions and stop during each cycle in a search for an operand. Before each instruction is executed, care must be taken to manually restore the track portion of the address in the β-register for each single-address instruction because, by forcing a one-plus-one address instruction cycle, an extraneous group of digital signals is loaded into the β-register as the address of the next instruction whereas the address of the next instruction must be in the same track as the address of the current instruction specified by the contents of the β-register (placed there in response to the last one-plus-one address instruction encountered in the stored program) but in a memory location scanned two word-times later. Accordingly, care must be taken to also insert the sector designation for the next instruction. For instance, if the current instruction is read from track T, sector *n*, before it is executed the address of the next instruction in track T, sector *n*+2, must be manually inserted in the β-register. That address becomes the new reference for the remaining single-address instructions located in alternate sectors *n*+4, *n*+6, etc., of the track T until it is also destroyed by forcing a one-plus-one address instruction cycle for the single-address instruction read from the sector *n*+4.

*Single-Address Instruction Sequencing Cycle*

The instruction sequencing section illustrated in FIG. 27 includes seven flip-flops F700 to F706. The flip-flop F700 is employed only for manual sequencing while a switch S25 is open to allow AND-gates G703 and G704 to be enabled. For normal sequencing, that switch is maintained closed, thereby inhibiting AND-gates G703 and G704 and effectively blocking out the flip-flop F700 from the operation of the instruction sequencing section and permitting sequencing operations to proceed automatically from one instruction to the next.

Only two of the flip-flops, F702 and F705, are employed during a single-address sequencing cycle. Assuming that an instruction has just been executed, the flip-flop F702 is set and the flip-flop F705 is reset by an $L_{21}'$ clock pulse. When the flip-flop F702 is set, a LOAD α signal is generated for the duration of the next word-time to control the loading of a word into the α-register from a sector in a track specified by the contents of the β-register. If the last instruction executed was of the single-address type, the instruction read and loaded into the α-register is located in the next memory sector scanned on the same track that the previous instruction was located but following the completion of the execution of the last instruction. In other words, when a single-address instruction following a one-plus-one address instruction is reached in the program, it is read from an address "TN" specified by the β-register and loaded into the α-register during a given word-time where T is that part of the address which specifies the track and N is that part of the address which specifies a sector. During a second word-time, while the sector N+1 is being scanned, the instruction in the α-register is executed and at the beginning of the third word-time during which the sector N+2 is scanned, the instruction sequencing section again generates a LOAD α signal to cause the next instruction at the address T(N+2) to be loaded into the α-register.

While each single-address instruction is being loaded into the α-register, the track selection is made from the digital signal group configuration in positions 4 to 10 of the β-register through a Head Selection Register illustrated in FIG. 45 in a manner to be described with reference to FIGS. 46 to 51. If the instruction requires an operand, the track of the operand is selected from the digital signal group configuration in positions 4, 8, 9 and 10 of the α-register and positions 5 to 7 of the β-register. Position 4 of the α-register specifies one of two matrices from which a specified group of heads is to be selected. Positions 5 to 7 of the β-register specify the group of eight heads and positions 8, 9 and 10 specify a selected head of that group associated with the track on which the operand is located. After the instruction has been executed, the next instruction is read from the next sector N+2 to be scanned in the track T specified by the contents of the β-register.

The contents of the β-register are not altered except by a one-plus-one address instruction; therefore a series of single-address instructions following a one-plus-one address instruction must be located in the track specified by the address in the β-register. A sector address is not required to locate subsequent single-address instructions in sequence since they are automatically read from alternate sectors beginning with the first which is fully specified in the β-register by the one-plus-one address instruction.

After a single-address instruction has been transferred into the α-register for execution, an $L_{21}'$ clock pulse resets the flip-flop F702 and sets the flip-flop F705. In order to set the flip-flop F705, the flip-flop F702 must be set and the flip-flop F706 reset. The flip-flop F702 is already set since the α-register has just been loaded and the flip-flop F706 is reset at that time because the instruction which has just been loaded into the α-register is a single-address instruction as specified by a bit 0 in its bit position eighteen and the flip-flop F706 is reset by a $\phi_1'$ pulse during an $L_2'$ clock pulse when the bit in position eighteen of the instruction stored in the flip-flop F1400 is a zero. The flip-flop F1400 is a buffer flip-flop in the arithmetic section illustrated in FIG. 40 and contains the bit to be added *from* position eighteen of the memory location due to the memory timing described with reference to FIG. 17 since the bit from position seventeen does not set or reset the flip-flop F1400 until after the $\phi_2'$ pulse which occurs during the $L_2'$ pulse period.

When the flip-flop F706 is reset, its true output terminal connected to the AND-gate G707 is at +6 volts. Since the other input terminal of the AND-gate G707 connected to the false output terminal of the set flip-flop F702 is also at +6 volts, the AND-gate G707 is enabled to transmit a 0 volt signal to an input terminal of an OR-gate G715, the output of which transmits a +6 volt signal to the set steering input terminal of the flip-flop F705 whereupon the next $L_{21}'$ pulse sets it after the current instruction has been completely loaded into the α-register to enable it to transmit an EXECUTE signal. At the same time the $L_{21}'$ pulse resets the flip-flop F702 because its reset steering input terminal is at a +6 volt signal due to the fact that as the $L_{21}'$ pulse occurs the false output terminal of the flip-flop F705 is at 0 volts. That 0 volt signal is transmitted through a series of gates G700, G701, G710 and G711 and an inverter coupling the output terminal of the OR-gate G711 to the reset steering input terminal of the flip-flop F702.

While the flip-flop F705 is set it transmits an EXECUTE signal to the instruction decoding section in FIG. 43 to permit the current instruction to be decoded and executed within the following word-time. It is emphasized that if the instruction is of such a nature that it cannot be executed in one word-time, the instruction should not be written as a one-plus-one instruction. While the current instruction is being executed, the flip-flop F702 disables the AND-gate G707 and the flip-flop F705 enables the AND-gate G700 to transmit a +6 volt signal via the gates G701, G710 and G711 to the set steering input terminal of the flip-flop F702. The disabled AND-gate G707 transmits a +6 volt signal through an OR-gate G715 and an inverter to the reset steering input terminal of the flip-flop F705. Accordingly, upon the occurrence of the next $L_{21}'$ pulse at the end of the execute word-time, the flip-flop F702 is set and the flip-flop F705 is reset thereby initiating a sequencing cycle for the next instruction. As long as successive instructions of the program are single-address instructions, the instruction sequencing section repeats the same two-operation cycle of loading the next instruction into the α-register and executing it.

In the foregoing explanation of the single-address instruction sequencing cycle, it has been assumed that an input terminal 941 of the AND-gate G700 is maintained at +6 volts, a condition which is always present unless the current instruction is a multiply or divide instruction, each of which is a one-plus-one address instruction. It is also assumed that input terminals 604 and F652 of the AND-gate G701 are also at +6 volts, a condition which is also always present except when a division or multiplication operation has just been completed. It is further assumed that all input terminals to the OR-gate G708 are at +6 volts. An input terminal 1603 is maintained at +6 volts except when the decoded current instruction includes a STORE command signal in which case a 0 volt signal enables the OR-gate G708. It should be noted that all instructions which include a STORE command must be written as one-plus-one address instructions. Accordingly, the input terminal 1603 remains at +6 volts throughout the sequential execution of single-address instructions. An input terminal 842 maintains a second input terminal of the OR-gate G708 at +6 volts through an inverter I701. The input terminal 709 is normally at 0 volts except when the address specified by the β-register has been located during a one-plus-one address instruction sequencing cycle. The third input terminal of the OR-gate G708 is maintained at +6 volts by a disabled AND-gate G704 which is maintained disabled throughout the automatic sequencing of all instructions, as noted hereinbefore.

A flip-flop F1300 located in the branch instruction decoding section (FIG. 39) maintains a +6 volt signal at a second input terminal of the OR-gate G711 and a +6 volt potential at an input terminal of an AND-gate G716. During sequencing of single-address instructions, the AND-gate G716 is maintained disabled by a flip-flop F703 which is maintained in a reset state by the flip-flop F706. The flip-flop F1300 also remains in a reset state because all branch instructions are written as one-plus-one address instructions. The function of the flip-flop F1300 is to allow the normal execution of a branch instruction whereby a sequence of single-address instructions is terminated and a branch is initiated by entering the address of the next instruction, the first of a new sequence, in the β-register but only if a test made just after loading the α-register is successful. If the test is not successful in the sense that the condition specified is not present, the branch is not to be made, the flip-flop F1300 is set and the AND-gate G716 remains disabled thereby preventing the contents of the β-register from being altered. In addition, the set flip-flop F1300 provides a 0 volt signal to an input terminal of the OR-gate G711 so that upon completion of the word-time allotted to execution of a branch instruction which consists of loading the β-register with a new address, an $L_{21}'$ pulse sets the flip-flop F702 and the normal next instruction is loaded into the α-register as though the previous branch instruction were written as a single-address instruction.

Figure 40:
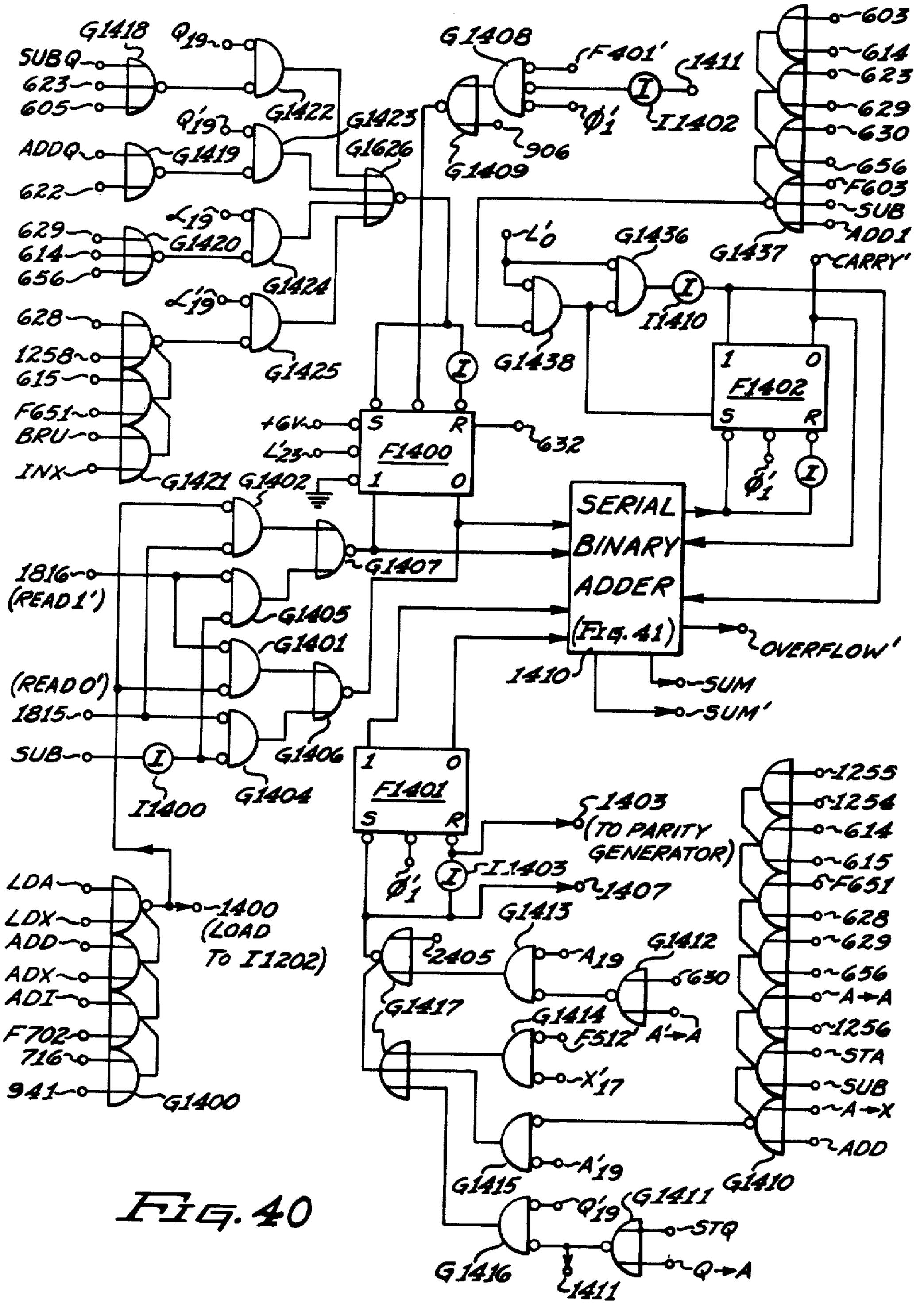
FIG. 40 illustrates a logic diagram of an arithmetic section.

In summary, during the execution of a series of single-address instructions, the instruction sequencing section alternates between LOAD α and EXECUTE operations each of which requires one word-time by setting F702 to LOAD α at the end of the EXECUTE operation and setting the flip-flop F705 to begin the EXECUTE operation after the next instruction is loaded into the α-register. Each time that the flip-flop F705 is set for an EXECUTE operation, a 0 volt signal is transmitted from its false output terminal to the Head Selection Register (FIG. 45) to select the head associated with a track specified by the operand address, if any, in the α-register in order to transmit the operand to the arithmetic section (FIG. 40). When the flip-flop F705 is reset and the flip-flop F702 is set to load the next instruction, a 0 volt signal is transmitted to the Head Selection Register from the false output terminal of the flip-flop F705 to select the head associated with the track specified by the address stored in the β-register to transmit the next instruction to the α-register through the arithmetic section. That track address as stored in the β-register remains unchanged throughout the execution of a sequence of single-address instructions. Upon the occurrence of the next one-plus-one address instruction, a new track address is stored in the β-register and a new sequence of instructions is initiated. A successful branch instruction will also initiate a new sequence of instructions.

*One-Plus-One Address Instruction Sequencing Cycle*

The sequence of operations for a one-plus-one address instruction, as noted hereinbefore, consists of loading a new instruction into the α-register during one word-time, loading the address of the next instruction into the β-register during a second word-time, searching for the operand if one is specified by the address in the α-register during a following one or more word-times and executing the current instruction in the α-register when the operand has been found in one word-time except for multiply and divide instructions. After the instruction has been executed, a search for the next instruction at the address specified by the β-register is initiated. When the address specified by the β-register has been found, a new sequencing cycle is initiated by setting the flip-flop F702 to load the α-register with the next instruction which may be another one-plus-one address instruction or a single-address instruction.

Assuming that the next instruction is a one-plus-one address instruction, and that the flip-flop F702 has just been set by an $L_{21}'$ clock pulse, an input terminal of three AND-gates G719, G712 and G707 receives a +6 volt signal but none is enabled to transmit a 0 volt signal, except G707 which has no effect, because the remaining input terminals are at 0 volts. The AND-gate G707 which does transmit a 0 volt signal because the flip-flop F706 is initially reset is disabled when the flip-flop F706 is set during an $L_2'$ period well before an $L_{21}'$ can set the flip-flop F705.

Following the $L_{21}'$ pulse which sets the flip-flop F702, a $\phi_1'$ pulse which occurs during the next $L_2'$ pulse period sets the flip-flop F706 because the buffer flip-flop F1400 of the arithmetic section is set by a bit 1 stored therein from the current instruction being read into the α-register which designates that the current instruction is a one-plus-one address instruction. Upon being set, the flip-flop F706 disables the AND-gate G707, thereby removing a +6 volt signal from the set steering input terminal of the flip-flop F705 so that the second $L_{21}'$ pulse will not set the flip-flop F705 to cause the current instruction in the α-register to be executed.

When the flip-flop F706 is set, its false output terminal goes to +6 volts, thereby transmitting a +6 volt signal through the AND-gate G712 to the set steering input terminal of the flip-flop F703 to allow the second $L_{21}'$ pulse to set it. Assuming that the current instruction is either not a branch instruction or is a branch instruction for which the test is not successful, when the flip-flop F703 is set, both input terminals of the AND-gate G716 are at +6 volts so that a 0 volt signal is transmitted by it to load into the β-register the second word of the one-plus-one address instruction, the address of the next instruction, from the next sector scanned. A 0 volt signal is also transmitted through the OR-gate G713 and the AND-gate G714 to the steering input terminals of the flip-flop F704. An inverter coupling the AND-gate G714 to the set steering input terminal transmits a +6 volt signal to allow the flip-flop F704 to be set upon the occurrence of the third $L_{21}'$ pulse.

When the flip-flop F704 is set, a +6 volt signal from its false output terminal is transmitted to the Head Selection Register to cause the head associated with the track specified by the track address portion of the instruction in the α-register to be connected to the arithmetic section. After the address specified by the α-register has been found, a +6 volt signal is received at an input terminal 820 of an OR-gate G705 to disable the AND-gate G714 and to enable an AND-gate G706 through an inverter I1700. At the time the flip-flop F704 was set by an $L_{21}'$ pulse, the flip-flop F703 was reset so that the AND-gate G716 was disabled. Accordingly, with the flip-flop F703 reset and the flip-flop F704 set, a 0 volt signal from the AND-gate G716 is removed from one input terminal of the OR-gate G713 but a 0 volt signal from the true output terminal of the set flip-flop F704 continues to enable the OR-gate G713 and provide a +6 volt signal at its output terminal, thereby continuing to provide an enabling signal to the AND-gate G714 and the AND-gate G706.

As soon as an "α found" (α FND) signal is presented at the input terminal 820 of the OR-gate G705 an enabling +6 volt signal is transmitted to the AND-gate G706 through the inverter I1700 as noted hereinbefore and a disabling 0 volt signal is transmitted directly to the AND-gate G714. The enabled AND-gate G706 transmits a 0 volt signal to an OR-gate G715 to cause it to transmit a +6 volt signal to a set steering input terminal of the flip-flop F705. Consequently, upon the occurrence of the next $L_{21}'$ pulse, the flip-flop F704 is reset and the flip-flop F705 is set.

While the flip-flop F705 is set, an EXECUTE′ signal is transmitted to the AND-gate G700 and to the Head Selection Register to select the head associated with a track specified by the contents of the β-register. The enabled AND-gate G700 applies a +6 volt signal through an OR-gate G701 to an input terminal of AND-gates G709 and G710. The AND-gate G709 is then enabled to transmit a 0 volt signal because both of its other two input terminals are also at +6 volts at that time. The enabled AND-gate G709 disables the AND-gate G710 so that a +6 volt signal is applied to the reset steering input terminal of flip-flop F702 while a +6 volt signal is applied to the set steering input terminal of the flip-flop F701. Consequently, upon the completion of the word-time allowed for execution, assuming that the instruction is not a multiply or divide instruction and that it does not include a STORE command, the flip-flop F701 is set by the next $L_{21}'$ pulse.

While the flip-flop F701 is set, a +6 volt signal from its false output terminal is transmitted to the Head Selection Register to select the head associated with a track specified by the address in the $\beta$-register if that has not already been accomplished. A 0 volt signal from the true output terminal of the flip-flop F701 is transmitted to the OR-gate G701 to maintain the AND-gates G709 and G710 enabled, because the $L_{21}'$ pulse which sets the flip-flop F701 also resets the flip-flop F705 removing the +6 volt enabling signal applied to the AND-gate G700 and the AND-gates G709 and G710 must be maintained enabled after the flip-flop F701 is set until the address specified by the $\beta$-register is located.

Figure 28:
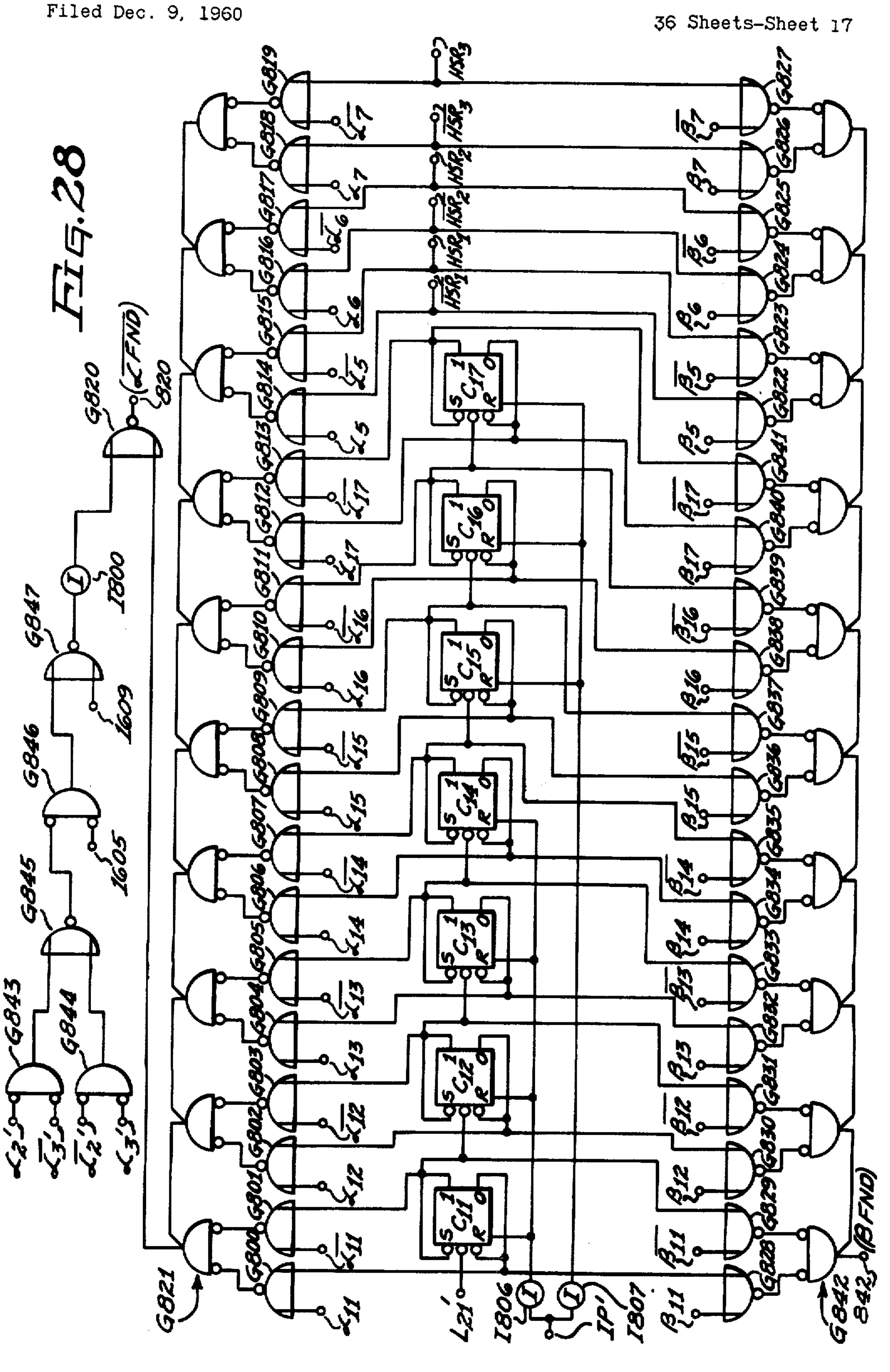
FIG. 28 illustrates a logic diagram of a word counter and address comparator.

When the address specified by the $\beta$-register is located, a 0 volt signal ($\beta$ FND) is received at an input terminal 842 from the address comparator (FIG. 28). An inverter I701 translates the $\beta$ FND signal to +6 volts thereby disabling the OR-gate G708 and the AND-gate G709 so that a +6 volt signal is transmitted to the AND-gate G710 and to the reset steering input terminal of the flip-flop F701 to cause it to be reset upon the occurrence of the next $L_{21}'$ pulse. At the same time the flip-flop F702 is set whereupon the next instruction at the address specified by the contents of the $\beta$-register is loaded into the $\alpha$-register to begin a new sequencing cycle.

*MPY and DVD Instruction Sequencing*

Assuming that the instruction being executed is a multiply or divide instruction, an input terminal 941 of the AND-gate G700 is driven to 0 volts and held there until the multiplication or division has been completed in order to transmit a +6 volt signal to the OR-gate G701. With a +6 volt signal at all input terminals of the OR-gate G701, the AND-gates G 709 and G710 are held disabled thereby preventing the flip-flops F 701 and F702 from being set in sequence. Accordingly, instruction sequencing stops with all flip-flops F701 to F705 rest after one word-time allowed for execution until a 0 volt signal (END DVD) indicating the end of division is received at an input terminal 604 or a 0 volt signal indicating the end of multiplication is received at an input terminal F652' to enable the OR-gate G701 to transmit an enabling +6 volt signal to the AND-gates G709 and G710. Thereafter, upon the occurrence of the next $L_{21}'$ pulse, the flip-flop F701 is set and instruction sequencing proceeds as described hereinbefore by locating and loading into the $\alpha$-register the next instruction from the address specified by the $\beta$-register.

It should be noted that the $L_{21}'$ pulse employed to set and reset the flip-flop F701 is applied to its trigger input terminal through an AND-gate G702 and an inverter I702. The AND-gate G702 is normally enabled by a +6 volt signal applied to an input terminal 627 except while a division operation is in process during which a 0 volt DVD–OP signal is applied to the input terminal 627 in order to inhibit $L_{21}'$ pulses from being transmitted to the flip-flop F701 until the division operation is completed.

*Store Instruction Sequencing*

If a store instruction is being executed, at least one word-time of delay must be provided before the next instruction to be executed may be read because disturbances may be induced in the read circuits by the high recording current employed to write on the drum and more than three or four bit-times may be required for the disturbances to settle. Therefore all store instructions must be written as one-plus-one address instructions so that after the operation has been completed at least one word-time is allowed to lapse before the next instruction is read into the $\alpha$-register.

The next instruction may be located in any sector on the drum, including the sector scanned immediately after the sector of the location into which a word has just been stored. Placing the next instruction in such a sector normally would be considered optimum utilization of memory access time but in this instance it would not be because, after allowing one word-time of delay, a drum revolution is required before that sector is again accessible.

From the foregoing it may be seen that a minimum of four word-times is required for reading and executing a store instruction. Two word-times are required to read the instruction into the $\alpha$ and $\beta$-registers. Assuming that the location into which the information is to be stored has been optimumly selected so that time is not lost in searching for the memory location specified by the address portion of the instruction stored in the $\alpha$-register, one word-time is required to transfer the information to the specified location. After the transfer of information has been completed, a minimum of one word-time delay must be provided before the next instruction may be read. A search for the next instruction in the location specified by the address portion of the store instruction in the $\beta$-register may be initiated during the delay. It should be noted that through proper design of read and write circuits and proper placements of leads between components, the possibility of disturbances being induced in the read circuits during a store operation may be reduced and the necessity of having to provide a word-time delay eliminated. However since store instructions are so seldom required in a normal program the effort required to eliminate the word-time delay may not be justifiable depending upon the application of the computer.

To assure a one word-time delay after a store instruction has been executed, a STORE signal is applied to an input terminal 1603 from the instruction decoding section while the store instruction is being executed so that at the end of the word-time allowed for executing the operation, when the flip-flop F705 is reset by an $L_{21}'$ pulse, the STORE signal enables the OR-gate G708 to provide an enabling +6 volt signal to the AND-gate G709 the output of which provides a +6 volt signal to the set steering input terminal of the flip-flop F701 through an inverter. Consequently, when the flip-flop F705 is reset, the flip-flop F701 is set regardless of whether a +6 volt signal is present at an input terminal 842. A +6 volt signal from the false output terminal of the set flip-flop F701 allows the Head Selection Register to be set to the track address of the next instruction by the contents of the $\beta$-register. Setting the flip-flop F701 initiates a search for the location of the next instruction.

When the location of the next instruction is found, the address comparator (FIG. 28) transmits a 0 volt $\beta$ FND signal at the input terminal 842. The inverter I701 translates the $\beta$ FND signal into a +6 volt signal applied to an input terminal of the OR-gate G708. At that time all input terminals to the OR-gate G708 are at +6 volts so that its output terminal is driven to a 0 volt level to disable the AND-gate G709. When the AND-gate G709 is disabled, its output terminal is driven to a +6 volt level thereby enabling the AND-gate G710 to transmit a 0 volt signal to an input terminal of the OR-gate G711 the output of which is a +6 volt signal applied to the set steering input terminal of the flip-flop F702. Thereafter, the next $L_{21}'$ pulse sets the flip-flop F702 and resets the flip-flop F701. The next instruction sequencing cycle is initiated as the next instruction is loaded into the $\alpha$-register while the flip-flop F702 is set.

*Head Selection Register Sequencing*

Figure 45:
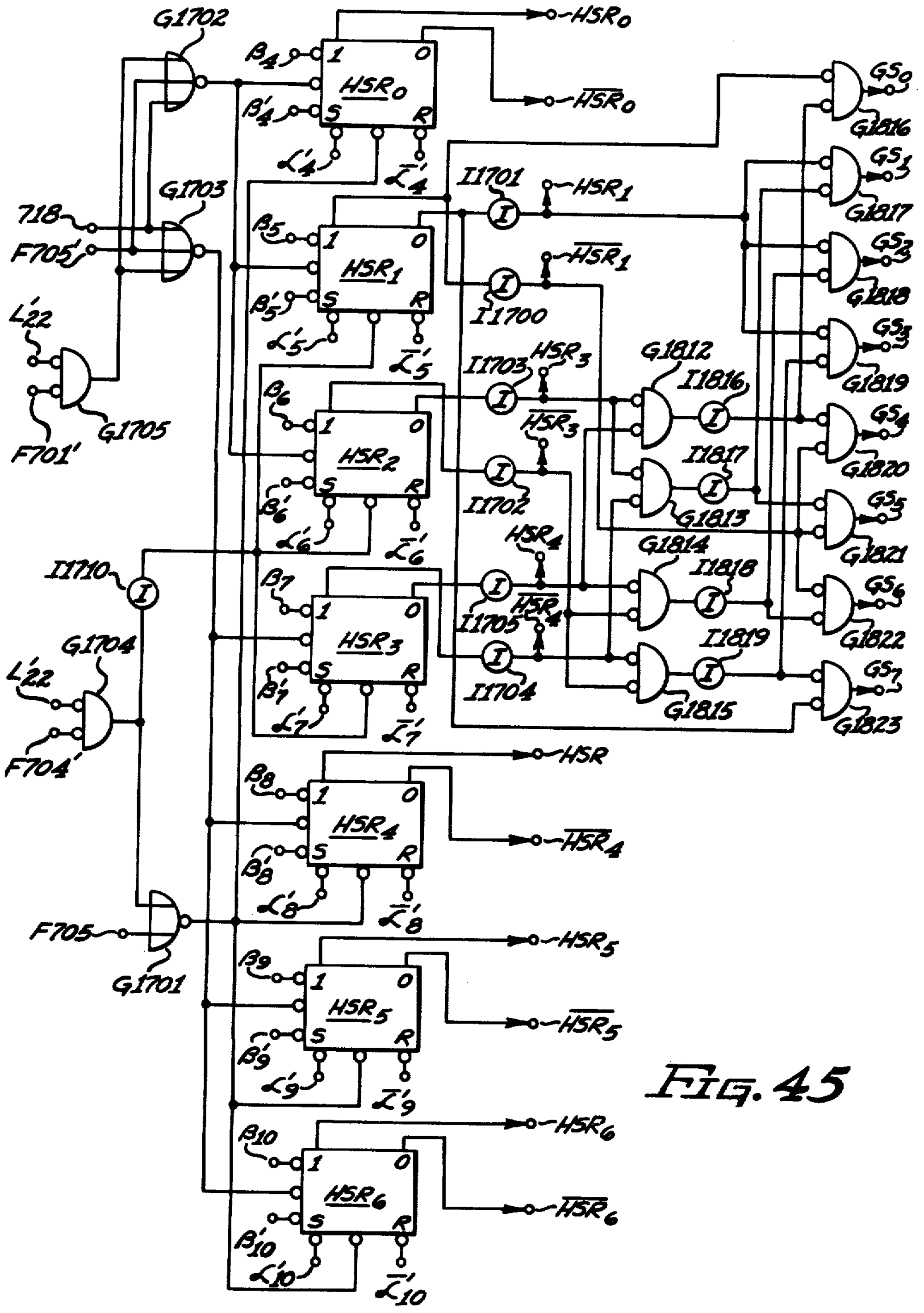
FIG. 45 illustrates a logic diagram of a Head Selection Register and a circuit for generating signals employed to select one of eight groups of magnetic read-write heads.

The Head Selection Register illustrated in FIG. 45 consists of a bank of flip-flops $HSR_0$ to $HSR_6$ used to hold only the track portion of an instruction address during the selection of a specified track of the memory section. It is the interconnecting link between the $\alpha$-register and the $\beta$-register and the head selection matrix illustrated in FIGS. 46 to 51 by which the track portion of an instruction address is decoded to select a head associated with the specified track. Setting of the Head Selection Register from the $\alpha$-register or the $\beta$-register is controlled by the instruction sequencing section. Regardless of whether the Head Selection Register is to be set from the $\alpha$-register or the $\beta$-register, only bit positions 4 through 10 of those registers which represent the track portion of an address are employed. The time at which the Head Selection Register is set from either the α-register or the β-register depends upon whether the current instruction is a one-plus-one address instruction or a single-address instruction.

If the current instruction is a normal one-plus-one address instruction, the Head Selection Register is set from the α-register by an $L_{22}'$ pulse applied to an AND-gate G1704 in FIG. 45 after an $L_{21}'$ pulse sets the flip-flop F704 to initiate a search for the operand if one is specified. When the operand has been found, an α FND signal from the address comparator (FIG. 28) at the input terminal 820 of the OR-gate G705 causes the next $L_{21}'$ pulse to reset flip-flop F704 and set the flip-flop F705 as described hereinbefore. If the instruction does not require an operand, an α FND signal is automatically forced through the address comparator to disable the AND-gate G714 and enable the AND-gate G706 so that the flip-flop F704 is not set by an $L_{21}'$ pulse and the flip-flop F705 is set to immediately initiate execution of the operation specified.

When the flip-flop F705 is set, its true output terminal goes negative from +6 volts to 0 volts. That negative-going (+6 to 0 volts) signal is employed as the trigger signal to set the Head Selection Register from positions 8, 9 and 10 of the α-register. While the flip-flop F705 is set, its false output terminal which is at +6 volts enables an AND-gate G718 so that if the current instruction does not require an operand as determined by a 0 volt signal applied to an input terminal of an OR-gate G718, an $L_0'$ pulse will cause the AND-gate G718 to transmit a negative-going (+6 to 0 volts) signal to an input terminal of the OR-gate G1703 to set the Head Selection Register to the track address specified by the β-register. In that manner the Head Selection Register may be set to the track address of the next instruction a word-time earlier for those instructions which do not require an operand. The signals at input terminals of the OR-gate G717 are derived from the instruction decoding section illustrated in FIG. 43.

The reason for setting the Head Selection Register early from the β-register is that those instructions which do not require an operand will contain other information in bit positions 4 to 10 of the α-register. Consequently, when such an instruction is decoded and executed, the Head Selection Register is automatically set from bit positions 4 and 8 to 10 of the α-register which may contain a digital signal group configuration which inadvertently specifies a track in some group other than the group which includes the track specified by the contents of the β-register so that if the β-register is not set until the flip-flop F701 is set to begin a search for the next instruction operation, switching the head select circuits at that last moment from a track in one group to a track in another group may give rise to disturbances which may not have sufficient time to settle down and permit proper search for the next instruction. With the provision to set the Head Selection Register early from the β-register while the current instruction is being executed allows ample time for disturbances in the head select switching circuits to settle.

Four types of commands which do not require an operand are as follows: (1) BXH for branching on X high or BXL for branching on X low; (2) INX for incrementing X; (3) $GEN_1$ for general instructions of a first class, and (4) $GEN_2$ for general instructions of a second class.

After the current instruction has been executed, the flip-flop F701 is set in a manner described hereinbefore to initiate the operation of searching for the next instruction at an address specified by the β-register. Accordingly, when the flip-flop F701 is set, the Head Selection Register is set from the β-register under the control of a positive-going (0 to +6 volts) signal from the false output terminal of the flip-flop F701 if the Head Selection Register had not been previously set from the β-register in the manner described in the preceding paragraph. When the address specified by the β-register has been found, a β FND signal resets the flip-flop F701 and sets the flip-flop F702 in a manner described hereinbefore after which time the next instruction is loaded into the α-register. If the next instruction is the first of a series of single-address instructions, the instruction sequencing section will alternate between the operations of loading the α-register and executing the operation specified, each time switching the Head Selection Register so that it is alternately set from positions 4, 8, 9 and 10 of the α-register and from the β-register.

*Manual Instruction Sequencing*

For manual instruction sequencing, the switch $S_{25}$ is opened, thereby enabling the AND-gates G703 and G704. The flip-flop F700 is normally in a set state due to the position of the spring-biased switch $S_{26}$ as shown which permits an $L_{12}'$ pulse to be applied to its set input terminal. With the switch $S_{25}$ open and the push button switch $S_{26}$ in the position shown, instruction sequencing continues in a normal manner once it has been initiated by a one-plus-one address instruction until another one-plus-one address instruction is encountered. Then the instruction sequencing is interrupted in the "search for operand" mode with the flip-flop F704 set. Until the flip-flop F700 is reset by momentarily depressing the push button switch $S_{26}$, the AND-gate G703 transmits a 0 volt signal to the OR-gate G705 to prevent the flip-flop F705 from being set even though a +6 volt α $\overline{FND}$ signal is transmitted to the OR-gate G705 from the address comparator. The operator may then manually enter information in the A, α and β-registers in a manner to be described with reference to FIGS. 36 and 37 in the A-register section.

To execute the instruction, the switch $S_{26}$ is momentarily depressed thereby causing the flip-flop F700 to be reset by the next $L_{12}'$ pulse. Thereafter, when an α FND signal is again transmitted to the OR-gate G705, the flip-flop F704 is reset and the flip-flop F705 is set by an $L_{21}'$ pulse. Since the switch $S_{26}$ is only momentarily depressed, instruction sequencing proceeds automatically after the current instruction is executed and the next instruction is loaded into the α-register. However, the switch $S_{26}$ may be held in its depressed position to prevent the flip-flop F700 from being set again and cause instruction sequencing to be interrupted in the search for the next instruction mode by maintaining the AND-gate G704 and the OR-gate G708 enabled. After the switch $S_{26}$ is returned to its normal position and the flip-flop is set, the flip-flop F702 is set by an $L_{21}'$ pulse the next time a β FND signal is transmitted to the input terminal 842 from the address comparator to enable the next instruction to be loaded into the α-register from the address specified by the contents of the β-register. If the next instruction is a single-address instruction, it will be automatically executed and the next instruction will immediately be entered into the α-register.

If it is desired to interrupt instruction sequencing after processing each single-address instruction, a switch $S_{29}$ may be closed to continuously provide a +6 volt signal to the AND-gates G709 and G712 to simulate a one-plus-one address instruction for every instruction processed and thereby cause the computer to stop after the execution of each instruction. However, if the "force one-plus-one" switch $S_{29}$ is closed to cause instruction sequencing to stop during the search for an operand even though the current instruction is a single-address instruction, before the instruction is executed the address of the next instruction must be manually entered into the β-register because by forcing a one-plus-one address instruction sequence the contents of the β-register are destroyed as the sequencing passes through a "load β" operation when the flip-flop F703 is set for one word-time following the word-time allowed for entering the current instruction into the α-register. That may be done while instruction sequencing is interrupted during the search for an operand as noted hereinbefore.

*Initiating Instruction Sequencing*

When power is first applied to the computer, all of the flip-flops F701 to F706 are placed in one stable state or the other. Since it would be impossible to anticipate what the stable conditions for each would be due to the nature of the circuit design of the flip-flops, a push button switch $S_{35}$ is provided to momentarily provide a 0 bolt signal to the reset input terminals of the flips-flops F701, F702, F703 and F705 and to the set input terminals of the flip-flops F704 and F706. In that manner instruction sequencing is initiated in a "search for operand" mode and as long as the switch $S_{25}$ is maintained open, instruction sequencing cannot proceed until the push button switch $S_{26}$ is momentarily depressed, at which time the instruction in the $\alpha$-register is executed. That instruction may be an unconditional branch instruction (BRU) which is described hereinafter in the digest of the programming instructions and in the section on the instruction registers. It is manually entered into the $\alpha$-register and executed when the switch $S_{26}$ is momentarily depressed. Upon being executed, the address portion of the instruction in bit positions $\alpha_4$ to $\alpha_{17}$ is transferred into the $\beta$-register to specify the location of the next instruction. While the switch $S_{26}$ is depressed, the switch $S_{25}$ is closed to disable the AND-gates G703 and G704 so that when the location of the next instruction specified by the contents of the $\beta$-register is found, a $\beta$ FND signal will allow the flop-flop F702 to be set and the next instruction to be loaded into the $\alpha$-register.

INSTRUCTION REGISTERS

As noted in the preceding section, a dual system of instruction addressing is provided by the instruction sequencing section. In one system, single-address instructions may be employed to execute operations which require only one word-time with the advantage that the complete instruction is contained in one word of twenty bits as described with reference to FIG. 16 in the foregoing Word Format section. It contains an operation code as the command and the address of an operand in a memory location if one is required. An address for the next instruction is not required because the next instruction in sequence is automatically read.

The $\alpha$-register having twenty bit positions $\alpha_0$ to $\alpha_{19}$ is provided to store an instruction while it is being executed. It is loaded from a location in the memory section in one word-time directly through the arithmetic section. Consequently, it may be automatically modified by adding to it the contents of the X-register while it is being loaded into the $\alpha$-register. For multiply and divide instructions, the command signals are stored in flip-flops F1600 and F1601, respectively (FIG. 43), in order that during the word-time provided by the instruction sequencing section for execution the multiplicand or divisor may be loaded into the $\alpha$-register after which the actual multiplication and division operations are carried out under the control of special multiplication and division instruction sequencing sections. In that manner the multiplicand or divisor may be stored in a register so that it is not necessary to repeatedly read it from its location in memory without the necessity of providing a special register for only that purpose.

In the second system of instruction addressing, instructions which cannot be executed in one word-time, such as the multiply and divide instructions, are written as one-plus-one address instructions in order that the address of the location from which the next instruction is to be read may be specified in the second word effectively linked to the first by a bit 1 in position 18 of the first word. For instance, the first word for the instruction to multiply contains the operation code for an MPY command and the address of the multiplicand. The second word contains in bit positions 4 to 17 the address of the next instruction.

The $\beta$-register having fourteen bit positions $\beta_4$ to $\beta_{17}$ is provided to store the address of the memory location from which the next instruction is to be read after the execution of a one-plus-one address instruction has been completed. The first seven positions $\beta_4$ to $\beta_{10}$ store a coded group of digital signals which specify the track and the last seven positions $\beta_{11}$ to $\beta_{17}$ store a coded group of digtal signals which specify the sector of the memory location. If that next instruction is a single-address instruction, when it has been executed its track address in position $\beta_4$ to $\beta_{10}$ is employed to select the track from which the next instruction in sequence and subsequent single-address instructions are to be read until a branch instruction or some other instruction written as a one-plus-one address instruction is encountered in the program.

The $\beta$-register is also loaded from a location in the memory section in one word-time directly through the arithmetic section so that it may also be automatically modified by adding to it the contents of the X-register while it is being loaded. Automatic modification of the next instruction address is specified by writing a bit 1 in position 19 of the second word of a one-plus-one address instruction. That bit is detected to effectively cause the contents of the X-register to be added to the next instruction address as it is being stored in the $\beta$-register.

From the foregoing it may be seen that it is necessary to always begin a sequence of single-address instructions with a one-plus-one address instruction or to otherwise load the $\beta$-register with the address of a memory location wherein the first single-address instruction to be executed is stored, as by employing an instruction to branch unconditionally written as a single-address instruction. The branch unconditionally command portion (BRU) of that instruction in the $\alpha$-register causes its address portion to be serially transferred to the $\beta$-register during the word-time provided for execution by the instruction sequencing section. Accordingly, a branch unconditionally instruction may be employed to initiate the execution of a program by manually loading and executing it and to automatically initiate subroutines in the program by writing it into the program as desired.

*α-Register*

The $\alpha$-register and its control will now be described with reference to FIG. 29. As just noted, its principal purpose is to hold the current instruction while it is decoded and executed under control of the instruction sequencing section except that during the arithmetic operations of multiplication and division the $\alpha$-register is employed to store the multiplicand and divisor. The contents of the $\alpha$-register may be exchanged with the contents of the A-register by manual control to enable instructions manually loaded into the A-register to be transferred to the $\alpha$-register for execution and to transfer the contents of the $\alpha$-register to the A-register for inspection and manual modification.

At the beginning of an instruction sequencing cycle, the LOAD $\alpha$ signal from the flip-flop F702 (FIG. 27) allows the $\alpha$-register to be loaded from the drum. After the $\alpha$-register is loaded with a group of twenty digital signals arranged in a unique configuration to specify a particular operation according to a particular word format, an EXECUTE signal from the flip-flop F705 (FIG. 27) allows the contents of the $\alpha$-register to be decoded in order that appropriate control signals required to perform the specified operation may be generated. The various instructions and the manner in which they are decoded will be described in the following Instruction Programming and Decoding section. After the instruction has been decoded and control signals have been transmitted throughout sections of the computer in order to perform the specified operation, the contents of the $\alpha$-register may be changed by loading it with the next instruction.

Some of the important characteristics of the $\alpha$-register are: that it is loaded from a memory location directly through the arithmetic section; that as a new group of digital signals is serially shifted into it, its previous contents are open-shifted and lost; that during the execution of an instruction to branch unconditionally, its output is serially shifted through the arithmetic section to the $\beta$-register; and that its contents may be ring-shifted so that as its contents are being serially shifted through the arithmetic section during the execution of a multiplication or division operation its contents may be automatically restored for repeated use. The contents of the $\alpha$-register are also ring-shifted when a manually operated "save-$\alpha$" switch $S_{30a}$ is closed in order to allow an instruction to be executed repeatedly under the manual control described with reference to FIG. 27.

Figures 29, 30:
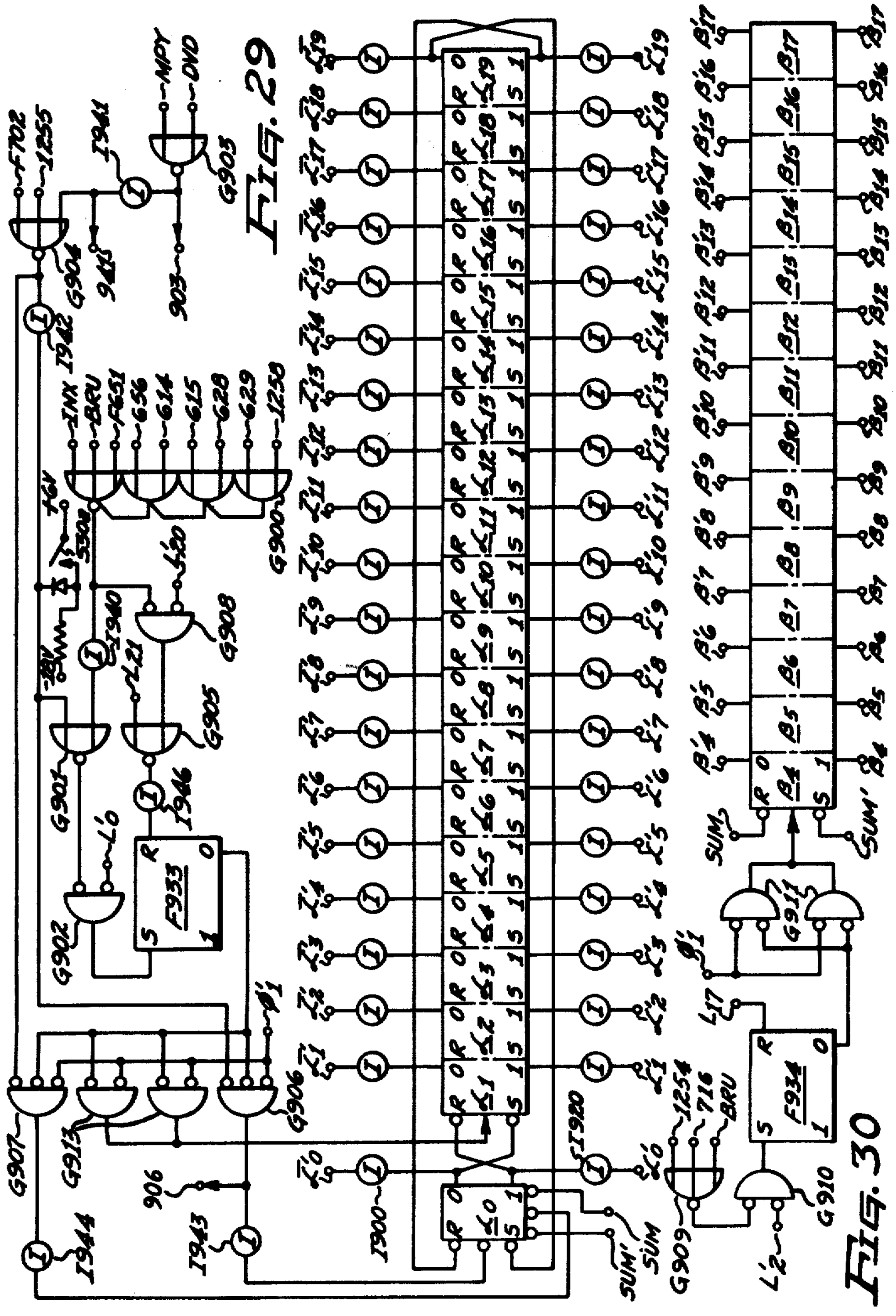
FIG. 29 illustrates a logic diagram of the $\alpha$-register and its control means.
FIG. 30 illustrates a logic diagram of the $\beta$-register and its control means.

The $\alpha$-register illustrated in FIG. 29 consists of a double-steered flip-flop $\alpha_0$ cascade coupled to a shift register having nineteen stages $\alpha_1$ to $\alpha_{19}$. The contents of the resulting twenty bit shift register may be serially shifted out through $\alpha_{19}$ and, when required, ring-shifted back into it through $\alpha_0$. It may be loaded from the arithmetic section through a pair of steering input terminals connected to the SUM and SUM′ output terminals of the adder in the arithmetic section (FIG. 40). When it is being ring-shifted, its contents are serially shifted back into it from the output terminals of the last stage $\alpha_{19}$ through the second set of steering input terminals of the first stage $\alpha_0$.

Parallel output terminals are coupled to true and false output terminals of each stage by inverters. For instance, an output terminal $\overline{\alpha_0}'$ is coupled to a false output terminal of the first stage $\alpha_0$ by an inverter I900. Because of the inverting function of the inverter I900, the $\overline{\alpha_0}'$ signal at the output terminal $\overline{\alpha_0}'$ terminal is the true output signal $\alpha_0$ of the first stage $\alpha_0$ the true output terminal of which is coupled by an inverter I920 to an output terminal $\alpha_0'$ to a false output signal $\alpha_0'$. Output terminals are similarly coupled to the remaining stages $\alpha_1$ to $\alpha_{19}$ to provide output signals transmitted to other sections of the computer as required and indicated in the logic diagrams of the other sections. For instance, output signals from the first four stages $\alpha_0$ to $\alpha_3$ such as the output signal $\overline{\alpha_0}'$, is transmitted to input terminals of AND-gates G1601 and G1602 of the instruction decoding section in FIG. 43 as indicated by the reference character $\overline{\alpha_0}'$ employed to designate the input terminal connected to those AND-gates and the output terminal connected to the inverter I900 in FIG. 30.

The manner in which instruction words are loaded into the $\alpha$-register from a location in the memory section will first be described. As noted hereinbefore, loading the $\alpha$-register is controlled by the true output terminal of the flip-flop F702 in the instruction sequencing section. When that flip-flop is set, its true output terminal, which is connected to an input terminal of an OR-gate G904 in FIG. 30, is driven to 0 volts to produce at the output terminal of the OR-gate a +6 volt enabling potential for an AND-gate G907. That +6 volt potential is also translated through an inverter I942 and an OR-gate G901 to an input terminal of an AND-gate G902 thereby enabling that AND-gate to transmit the next $L_0'$ pulse and set the flip-flop F933. A +6 volt signal from the false output terminal of the flip-flop F933 enables the AND-gate G907 and a pair of parallel connected AND-gates G913 to transmit $\phi_1'$ shift pulses to trigger input terminals of the $\alpha$-register. The AND-gates G913 are connected in parallel in order to provide sufficient power to trigger stages $\alpha_1$ to $\alpha_{19}$ through inverters which are an inherent part of the register as described hereinbefore with reference to FIGS. 5 and 6. An inverter I944 is employed to couple the $\phi_1'$ shift pulses from the AND-gate G907 to the trigger input terminal of the first stage $\alpha_0$ since the first stage is a double-steered flip-flop as described with reference to FIG. 4 which does not include as an integral part an inverter in the trigger input channel. The flip-flop F933 is reset by an $L_{21}$ pulse through an OR-gate G905 and an inverter I946.

The steering input terminals of the steering circuit associated with the trigger input terminal coupled to the AND-gate G907 are connected to the SUM and SUM′ output terminals of the arithmetic section so that as an instruction word is read from a location in memory, it is shifted into the $\alpha$-register by $\phi_1'$ shift pulses. The first bit read from the memory location during an $L_0$ pulse period is present at an input terminal of the arithmetic section (FIG. 40) approximately one microsecond before the leading edge of a $\phi_1'$ pulse is applied to the AND-gates G907 and G913 during the $L_0$ pulse period. Due to circuit delays through the logic levels of the arithmetic section, the first bit read is not available for shifting into the $\alpha$-register by that first $\phi_1'$ pulse so that it is not shifted into the $\alpha$-register until the $\phi_1'$ pulse which occurs during the $L_1$ pulse period. A buffer flip-flop F1400 in the arithmetic section stores each bit for one bit-timing period so that the first bit is available for transfer into the first stage $\alpha_0$ during the $L_1$ pulse period.

Twenty $\phi_1'$ shift pulses are applied to trigger input terminals of the $\alpha$-register to fill it with an instruction word before the $L_{21}$ pulse resets the flip-flop F933. It should be noted that the flip-flop F702 in the instruction sequencing section which enables loading the $\alpha$-register is set by an $L_{21}'$ pulse and reset by the next $L_{21}'$ pulse and that the first four bit-times $L_{21}$ to $L_0$ of the word-time devoted to loading the $\alpha$-register are employed to enable control circuits and to allow for inherent circuit delays of data transmission through logic levels of the arithmetic section.

Figures 36, 37:
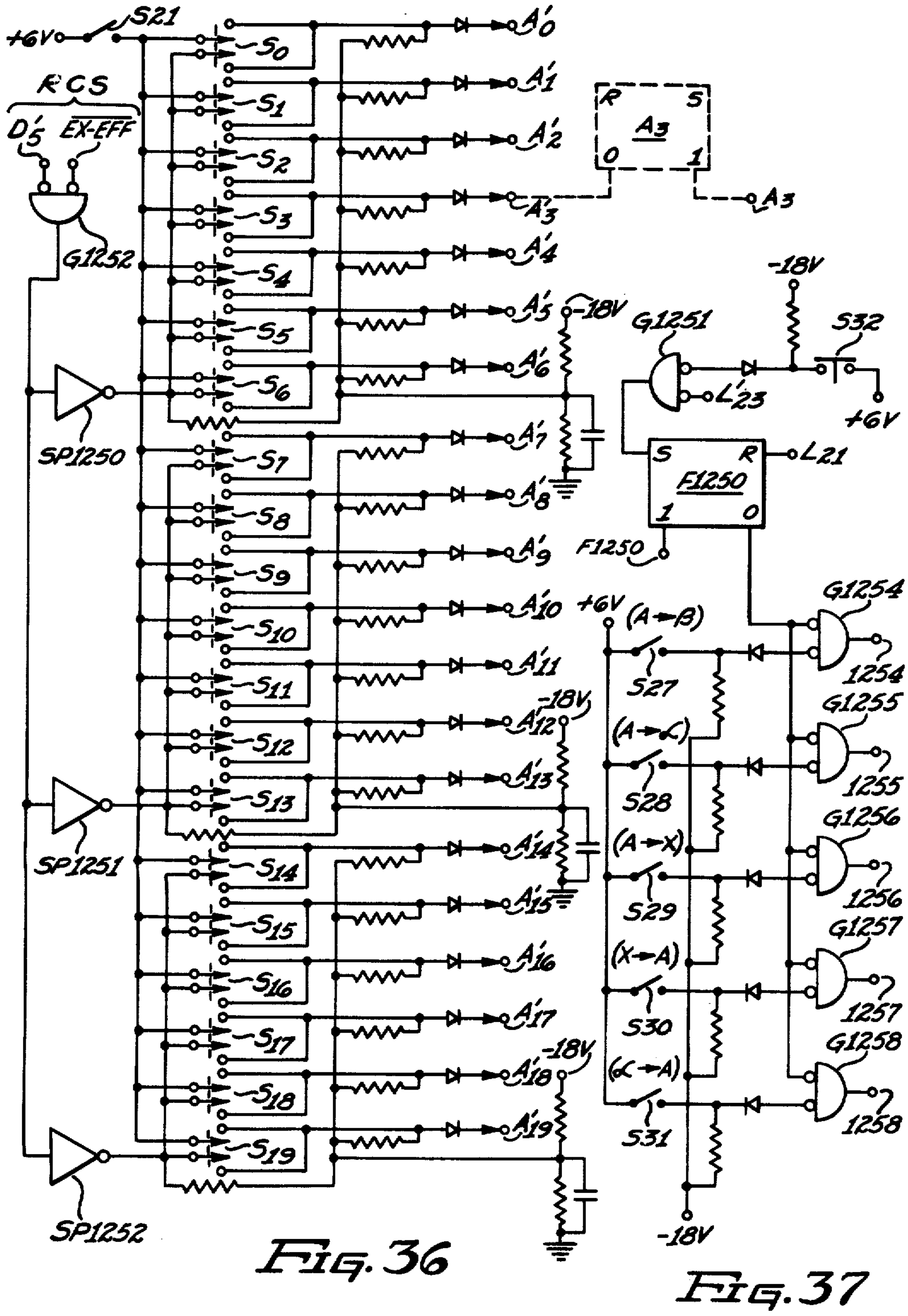
FIG. 36 illustrates schematically a means for entering data into the A-register manually from a console.
FIG. 37 illustrates schematically means for controlling the transfer of data between registers in the computer manually from the console.

The $\alpha$-register may also be loaded under manual control by transferring the contents of the A-register to the $\alpha$-register when a manual A→$\alpha$ transfer switch $S_{28}$ in FIG. 37 is closed and an "execute transfer" push button switch $S_{32}$ is momentarily depressed. Depressing the push button switch enables an $L_{23}'$ pulse to set a flip-flop F1250 through an AND-gate G1251. The false output terminal of the set flip-flop F1250 enables an AND-gate G1255 associated with the A→$\alpha$ transfer switch $S_{28}$ to transmit a 0 volt signal to an input terminal of the OR-gate G904 to cause the flip-flop F933 to be set and to an OR-gate G1410 of the arithmetic section in FIG. 40 to enable the contents of the A-register to be serially shifted through the arithmetic section to its SUM and SUM′ output terminals which are connected to the steering input terminals of the $\alpha$-register. The true output terminal of the flip-flop F1250 transmits a 0 volt signal to an input terminal (identified by the appropriate reference character F1250) of an OR-gate G400 in the control section for the A-register illustrated in FIG. 23 in order to provide $\phi_1$ shift pulses to the A-register.

The flip-flop F1250 in the manual transfer control section serves to synchronize the operation of a manual A→$\alpha$ transfer with the internal word timing of the computer. After twenty-one $\phi_1'$ pulses are transmitted to the trigger input terminals of the $\alpha$-register, the flip-flop F1250 is reset directly by an $L_{21}$ pulse and the flip-flop F933 is reset by the $L_{21}$ pulse through the OR-gate G905.

There is one other manner in which the $\alpha$-register may be loaded. As noted hereinbefore, the multiplication and division operations both require an operand (multiplicand and divisor, respectively) to be stored in the $\alpha$-register. Accordingly, when either a multiply or divide instruction is loaded into the $\alpha$-register while the flip-flop F702 of the instruction sequencing section (FIG. 27) is set, a search for the location of the operand is made after the flip-flop F704 of the instruction sequencing section is set. Thereafter, when the location of the operand is found, an $\alpha$ FND signal enables the flip-flop F705 to be set by an $L_{21}'$ pulse which in turn enables the instruction to be decoded immediately and an MPY or DVD command signal to be transmitted to the AND-gate G903 (FIG. 29) until the next $L_{21}'$ pulse resets the flip-flop F705 in the instruction sequencing section (FIG. 27).

During the word-time that an MPY or DVD command is present at an input terminal of the OR-gate G903, the OR-gate G904 is also enabled through an inverter I941 thereby enabling the flip-flop F933 to be set by an $L_0'$ pulse through the AND-gate G902 in the same manner as described hereinbefore for the operation of loading an instruction in response to a 0 volt signal from the true output terminal of the flip-flop F702. The operand, multiplicand or divisor, is then loaded into the $\alpha$-register from a memory location in the same manner as an instruction.

Before the flip-flop F705 of the instruction sequencing section is reset to terminate the transmission of an MPY or DVD command signal, the multiply instruction sequencing section (FIG. 26) or the divide instruction sequencing section (FIG. 25) assumes the sequencing control function for the computer depending upon which instruction was decoded. Thereafter, as noted hereinbefore, the instruction sequencing section is idle having relinquished control of the computer to the multiply instruction sequencing section or the divide instruction sequencing section.

Figure 26:
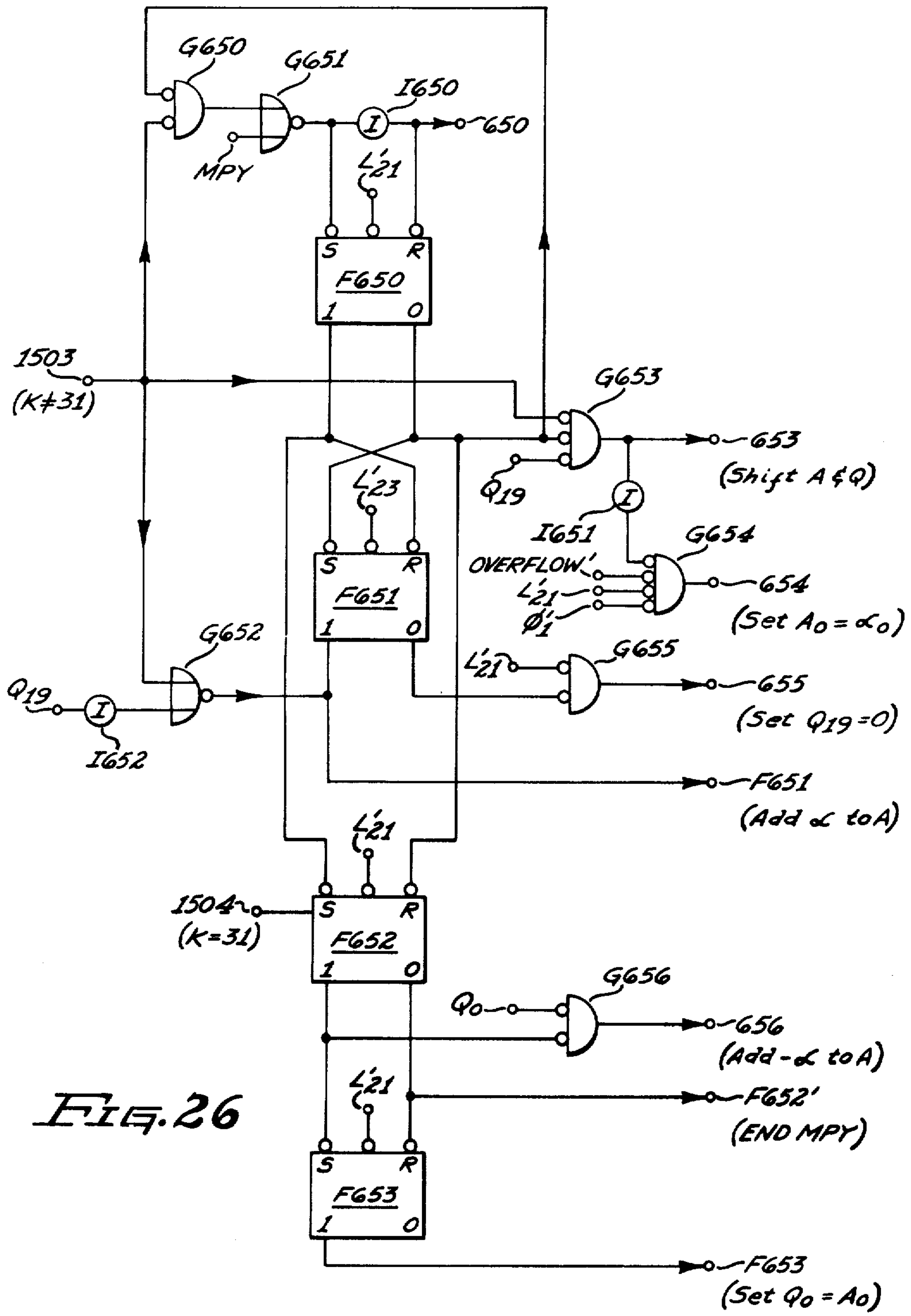
FIG. 26 illustrates a logic diagram of a circuit for multiplication sequencing.

Since multiplication is accomplished by adding the multiplicand stored in the $\alpha$-register to the contents of the A-register as many times as is required by the multiplier in the Q-register, means must be provided to repeatedly shift the contents of the $\alpha$-register through the arithmetic section while simultaneously ring-shifting the $\alpha$-register in order not to lose the multiplicand. That is accomplished by 0 volt signals received from the multiplication sequencing section at input terminals of the OR-gate G900 identified by reference characters F651 and 656. The timing of those 0 volt signals will be described hereinafter with reference to the multiplication instruction sequencing section (FIG. 26). It is sufficient for understanding the $\alpha$-register to appreciate that when a multiplication operation is being executed, the inverter I942 continually transmits a +6 volt signal and thereby enables the AND-gate G906 to transmit $\phi_1'$ pulses whenever the flip-flop F933 is set and to appreciate that a 0 volt signal is continually transmitted to an input terminal of the AND-gate G907 to disable it from transmitting $\phi_1'$ pulses whenever the flip-flop F933 is set. An $L_0'$ pulse sets the flip-flop F933 in the same manner as before but an $L_{20}'$ pulse resets it through an AND-gate G908 which is enabled by a +6 volt signal at the output terminal of the OR-gate G900 whenever a 0 volt signal is present at either input terminal F651 or 656. In that manner twenty $\phi_1'$ pulses are transmitted through the AND-gate G906 to the trigger input terminal of the first stage $\alpha_0$ through an inverter I943 and to the remaining stages $\alpha_1$ to $\alpha_{19}$ through the pair of AND-gates G913 while the output from the last stage $\alpha_{19}$ is transmitted to the arithmetic section and to the first stage $\alpha_0$.

Storing the divisor in the $\alpha$-register and ring-shifting the $\alpha$-register while serially transferring the divisor stored therein to the arithmetic section during a division operation is accomplished in a manner similar to the storing and transfer of the multiplicand during a multiplication operation as described in the preceding paragraphs except that 0 volt signals are transmitted to input terminals 614, 615, 628 and 629 of the OR-gate G900 from the division instruction sequencing section (FIG. 25) the operation of which will be described in detail hereinafter. Only twenty $\phi_1'$ pulses are required to ring-shift the contents of the $\alpha$-register during a division operation, just as for a multiplication operation, since there is virtually no time delay in the transmission of digital signals from the output terminals of the last stage $\alpha_{19}$ to the steering input terminals of the first stage $\alpha_0$ or the input terminals of the arithmetic section.

There are three additional control input terminals to the OR-gate G900 employed for ring-shifting the $\alpha$-register while its contents are serially transferred. The first is an input terminal 1258 which is connected to the AND-gate G1258 in the manual transfer control section illustrated in FIG. 37. When a manual $\alpha \rightarrow A$ transfer switch $S_{31}$ is closed, an AND-gate G1258 is enabled while the flip-flop F1251 is set as described hereinbefore with reference to the manual $A \rightarrow \alpha$ transfer switch $S_{28}$. The flip-flop F933 is then set for a period from an $L_0'$ pulse to an $L_{20}'$ pulse to cause the contents of the $\alpha$-register to be serially shifted through the arithmetic section to the A-register while the $\alpha$-register is being ring-shifted.

The second is an input terminal (identified by the reference character INX) of the OR-gate G900 which receives an INX command signal when the instruction to increment the X-register is received in the $\alpha$-register and decoded. During the word-time that the flip-flop F705 of the instruction sequencing section is set, the instruction decoding section (FIG. 43) transmits an INX command signal to cause the flip-flop F933 to be set for a period from an $L_0'$ pulse to an $L_{20}'$ pulse. The contents of the $\alpha$-register are then serially transferred to the arithmetic section while the $\alpha$-register is being ring-shifted. The contents of the X-register are also transferred to the arithmetic section and the value of bit positions $\alpha_4$ to $\alpha_{17}$ is added to the contents of the X-register. The result is stored in the X-register. The precise manner in which that is accomplished will be described hereinafter with reference to FIG. 24.

The third is an input terminal (identified by the reference character BRU) of the OR-gate G900 which receives a BRU command signal when the instruction to branch unconditionally is received in the $\alpha$-register and decoded. During the word-time that the flip-flop F705 of the instruction sequencing section is set, the instruction decoding section (FIG. 43) transmits a BRU signal to cause the flip-flop F933 to be set for a period from an $L_0'$ pulse to an $L_{20}'$ pulse and thereby cause the contents of the $\alpha$-register to be serially transferred into the $\beta$-register while the $\alpha$-register is being ring-shifted.

The BRU command signal is also transmitted to an OR-gate G909 in FIG. 30 to cause a flip-flop F934 to be set by an $L_2'$ pulse through an AND-gate G910. The flip-flop F934 remains set until an $L_{17}$ pulse occurs. While the flip-flop F934 is set, a pair of AND-gates G911 is enabled to transmit $\phi_1'$ pulses to a shift terminal of the $\beta$-register. In that manner only bit positions 4 to 17 of the branch conditionally instruction stored in the $\alpha$-register are serially transferred into the $\beta$-register through the arithmetic section. As noted hereinbefore, those bit positions of a branch unconditionally instruction specify the address of the next instruction.

A branch unconditionally instruction written as a one-plus-one address instruction may be employed in a program to initiate a new sequence of instructions. It may also be used to initiate the execution of the program in the first instance by manually loading the instruction to branch unconditionally into the A-register in a manner to be described with reference to FIG. 36, manually transferring it to the $\alpha$-register as just described hereinbefore and causing it to be executed in the manner described with reference to switches $S_{25}$ and $S_{26}$ in the instruction sequencing section.

*$\beta$-Register*

The $\beta$-register is a fourteen bit register employed to hold the second word of a one-plus-one instruction which contains the address of the next instruction and employed while executing a sequence of single-address instructions for remembering the track from which the next instruction is to be read. Accordingly, as noted hereinbefore, a one-plus-one address instruction must be employed at the beginning of each new sequence of single-address instructions in order that the first single-address instruction may be located and that the track of the second and subsequent single-address instructions may be located by the configuration of the digital signals in the first seven stages $\beta_4$ to $\beta_{10}$ of the $\beta$-register.

For example, an instruction to load the A-register from a location Y in the memory section may be a single-address instruction if the location Y is in the next sector scanned in sequence during the one word-time provided by the instruction sequencing section for execution of the instruction. However, if the location is not on the same track, the Head Selection Register (FIG. 45) is switched to the track specified by the instruction in the $\alpha$-register. After the one word-time during which the instruction is executed, the next instruction must be loaded into the $\alpha$-register automatically from the location in the next sector of the same track from which the previous instruction was read. Accordingly, the Head Selection Register must be reset to the track containing the sequence of single-address instructions as specified by positions 4 to 10 of the $\beta$-register. If a given sequence of single-address instructions is to be continued on a second track, a one-plus-one address instruction must be employed as the last instruction of that part of the sequence written in the first track in order to load the $\beta$-register with the track and sector address of the next instruction, the first single-address instruction in that part of the sequence of single-address instructions to be read from the second track. The true and false output terminals of each stage of the $\beta$-register, $\beta_4$ to $\beta_{17}$, are connected only to the address comparator illustrated in FIG. 28 and to the Head Selection Register illustrated in FIG. 45 in order to locate the next instruction.

The $\beta$-register may be loaded only through the arithmetic section and cannot be ring-shifted. Accordingly, only one set of steering input terminals is provided for the first stage $\beta_4$ which is connected to the SUM and SUM' output terminals of the arithmetic section. Shift pulses are applied to the $\beta$-register through a pair of parallel connected AND-gates G911 when a flip-flop F934 is set. The flip-flop F934 is set by an $L_2'$ pulse when a control signal is applied to the AND-gate G910 through an OR-gate G909. A 0 volt control signal is present at an input terminal 1254 of the OR-gate G909 when the $\beta$-register is to be loaded from the A-register under manual control by closing the A→B transfer switch $S_{27}$ and momentarily depressing the switch $S_{32}$ in the manual transfer control section of FIG. 37. The operation is similar to the manual A→$\alpha$ transfer described hereinbefore except that a 0 volt signal from the output terminal of the enabled AND-gate G1254 is transmitted to the OR-gate G909 instead of the OR-gate G904.

The $\beta$-register is loaded from a memory location through the arithmetic section in response to a 0 volt (LOAD $\beta$) signal at an input terminal 716 from an AND-gate G716 (FIG. 27) under the control of the instruction sequencing section. That LOAD $\beta$ signal occurs whenever the present instruction to be executed is a one-plus-one instruction because when the first word of a one-plus-one address instruction is loaded into the $\alpha$-register, the eighteenth bit is sampled while it is in the flip-flop F1400 of the arithmetic section and if a bit 1 is present, the flip-flop F706 of the instruction sequencing section is set to cause the $\beta$-register to be loaded from a memory location read during the next word-time as described hereinbefore.

The only other way by which the $\beta$-register may be loaded is by first loading an instruction to branch unconditionally into the $\alpha$-register which produces a BRU command signal during the word-time allowed for execution as the branch unconditionally instruction is decoded and a flip-flop F1603 (FIG. 43) is set. The BRU signal allows the flip-flop F934 to be set by an $L_2'$ pulse in order that $\phi_1'$ shift pulses may be applied to the $\beta$-register to serially shift it. The BRU signal also enables the OR-gate G900 of the $\alpha$-register control section to allow the flip-flop F933 to be set by an $L_0'$ pulse in order that $\phi_1'$ shift pulses may be applied to the $\alpha$-register to ring-shift it. In that manner a BRU signal loads the $\beta$-register with the contents of bit positions 4 to 17 of the $\alpha$-register.

*Save-$\alpha$ Switch*

The save-$\alpha$ switch $S_{30a}$ located on the console may be independently closed at any time it is desirable to assure that the contents of the $\alpha$-register are not changed such as while checking a stored program. When it is closed, the contents of the $\alpha$-register may not be changed and a new group of digital signals cannot be transferred into it because it clamps the output terminal of the inverter I942 at a +6 volt level, thereby inhibiting the AND-gate G902 from being enabled to set the flip-flop F933 in response to an $L_0'$ pulse when a 0 volt signal is applied to any one of the input terminals of the OR-gate G904. Consequently, any +6 volt signal transmitted by the OR-gate G904 to an input terminal of the inverter I942 and to an input terminal of the AND-gate G907 may not cause the flip-flop F933 to be set in order that $\phi_1'$ pulses may be translated by the AND-gate G907 and the inverter I944 to the trigger input terminal of the steering circuit which couples the flip-flop $\alpha_0$ to the SUM and SUM' output terminals of the arithmetic section.

While the save-$\alpha$ switch $S_{30a}$ is closed, any 0 volt signal which enables the OR-gate G900 may enable the AND-gate G902 through the inverter I940 and the OR-gate G901 to cause the flip-flop F933 to be set in response to an $L_0'$ pulse. When the flip-flop F933 is set in that manner, the AND-gates G906 and G913 are enabled to transmit shift pulses to the $\alpha$-register. The AND-gate G906 coupled by the inverter I943 transmits a $\phi_1'$ pulse to the trigger input terminal of the steering circuit which couples the flip-flop $\alpha_0$ to the flip-flop $\alpha_{19}$ so that the $\alpha$-register may be ring-shifted while its contents are serially transferred to the arithmetic section.

One advantage of the save-$\alpha$ switch is that an instruction may be repeatedly executed under manual control, while the switch $S_{25}$ in the instruction sequencing section is open, by repeatedly depressing the execute switch $S_{26}$ as described with reference to FIG. 27. The save-$\alpha$ switch also makes it possible for the contents of the $\alpha$-register to be transferred to the A-register under manual control without changing the contents of the $\alpha$-register. That is accomplished by closing the switch $S_{31}$ (FIG. 37) to provide a 0 volt signal at the input terminal 1258 of the OR-gate G900 while the save-$\alpha$ switch $S_{30a}$ is closed. The purpose for transferring the contents of the $\alpha$-register to the A-register in that manner may be to observe the bit configuration of the word in the $\alpha$-register through the indicator lamps provided for all stages of the A-register. The save-$\alpha$ switch may also be advantageously used to check the proper operation of the computer by repeatedly executing the same instruction until any malfunction has been located and corrected.

X-REGISTER

The X-register is an eleven bit register having stages $X_7$ to $X_{17}$ and is employed to automatically modify instructions as described in the preceding section with reference to FIGS. 29 and 30 or to control a program flow by providing a way to compare a given number of the information being processed with a specified constant in order to determine if a branch to a new sequence of instructions should be performed. To accomplish that an instruction to branch if the contents of the X-register represent a number higher, or lower, than a specified constant is written into the program after an appropriate instruction to load the number into the X-register so that when the branch instruction is read, the number in the X-register is added to the specified constant in positions 7 to 17 of the instruction. The specified constant is written in the two's complement form so that the result of the addition is the algebraic difference between the given number and the specified constant. A carry propagated from position 7 is allowed to be added to position 6 of the instruction.

If a bit 1 carry *is* propagated into bit position 6, when an instruction to branch if the contents of the X-register are equal to or greater than the specified constant is being read, the instruction sequencing section is *not* inhibited from loading the second word of the one-plus-one address instruction to branch into the β-register and a branch to a new sequence is accomplished. If not, the instruction sequencing section is inhibited from loading the second word and the normal next instruction is read from the memory location accessible next in sequence after the location in which the second word is stored. If a bit 1 carry is *not* propagated and added to a bit 1 in position 6, when an instruction to branch if the contents of the X-register are less than the specified constant is being read, the instruction sequencing section is *not* inhibited from loading the second word if the one-plus-one address instruction to branch into the β-register. Otherwise, the instruction sequencing section is inhibited from loading the second word and the normal next instruction is read. Testing for a bit 1 in position 6 of the α-register and making the decision whether to branch is more fully described with reference to FIG. 39 and decoding of the branch on high (BXH), or low (BXL), command portion of the instruction is described with reference to FIG. 43.

The contents of the X-register itself may be modified by loading a new word into it from a memory location in response to a decoded LDX command, or by adding to it the contents of a memory location in response to a decoded ADX command, and its contents may be stored in a memory location in response to a decoded STX command. In addition, the contents of the X-register may be incremented in response to a decoded INX command by adding to it a value stored in bit positions 7 to 17 of the instruction in the α-register during the word-time for execution provided by the instruction sequencing section. Since the α-register is ring-shifted while the instruction is being executed, a flip-flop F1602 is provided in the instruction sequencing section to store the INX command signal throughout the word-time of execution. If the contents of the X-register are caused to be added to the instruction automatically while it is being read from its memory location by placing a bit 1 in position 19 of the instruction, the result of executing an INX command is 2X+K which is stored in the X-register where X is the original value of the contents of the X-register and K is the value of a group of binary coded digital signals in positions 7 to 17 of the instruction.

The X-register may be serially loaded only through the arithmetic section which is connected to the SUM' input terminal of an AND-gate G500 or it may be ring-shifted through an AND-gate G501 connected to the false output terminal of the last stage $X_{17}$. Only one of the AND-gates G500 and G501 may be enabled at one time to transmit digital signals through an OR-gate G502 to the steering input terminals of the first stage $X_7$ because an OR-gate G517 which enables the AND-gate G500 when a 0 volt signal is applied to one of its five input terminals disables the AND-gate G501 through an inverter I504. While a 0 volt signal is not present at an input terminal of the OR-gate G517, the AND-gate G500 is disabled and the AND-gate G501 is enabled to cause the contents of the X-register to be continuously ring-shifted once during each word-time until a 0 volt signal is applied to an input terminal of the OR-gate G517.

The eleven $\phi_1'$ pulses required to ring-shift the X-register are synchronized by a flip-flop F511 which controls an AND-gate G515 through which the $\phi_1'$ pulses are applied to the X-register. The flip-flop F511 is set through an OR-gate G512 by an $L_2$ pulse and reset through an AND-gate G516 by an $L_{13}'$ pulse. If the current instruction to be executed is to store the contents of the X-register in a memory location, an STX' command signal enables an AND-gate G511 to transmit an $L_1'$ pulse through the OR-gate G512 to set the flip-flop F511 one bit-time earlier and enables an AND-gate G513 to transmit an $L_{12}'$ pulse through the OR-gate G514 to reset the flip-flop F511 one bit-time earlier. The reason for ring-shifting the X-register one bit-time earlier is to allow for the inherent time delay in writing into a memory location as described in the timing section with reference to FIG. 17.

Figure 24:
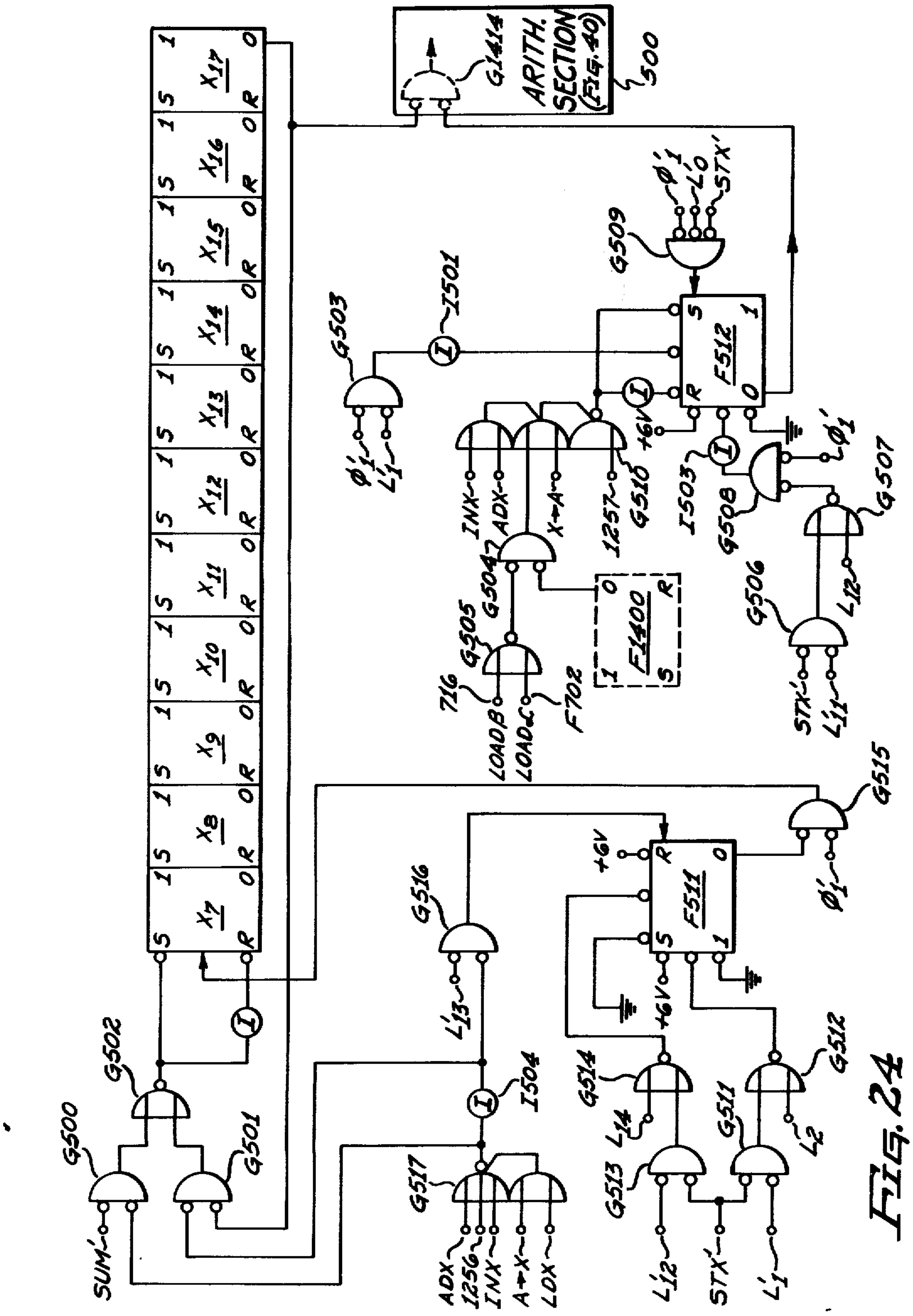
FIG. 24 illustrates a logic diagram of the X-register and its control means.

The contents of the X-register are stored in a memory location through the arithmetic section illustrated in FIG. 24 as a block 500 the complete logic detail of which is illustrated in FIG. 40, including an AND-gate G1414 that is enabled when a flip-flop F512 is set. That flip-flop is set by a $\phi_1'$ pulse during an $L_0'$ pulse period when an STX' command signal is present. It is then reset by a $\phi_1'$ pulse through an AND-gate G508 and an inverter I503 when the AND-gate G508 is enabled by an $L_{11}'$ pulse applied to an AND-gate G506 which is enabled by an STX' command signal. The output pulse of the AND-gate G506 is coupled to an input terminal of the AND-gate G508 by an OR-gate G507. In that manner, the contents of the X-register are stored in a memory location through the arithmetic section while the X-register is being ring-shifted.

When a 0 volt A→X command signal is produced by an AND-gate G1138 in FIG. 31 when the instruction is decoded as described hereinafter, the contents of positions 7 to 17 of the A-register are shifted into the X-register during the next word-time while the AND-gate G500 is enabled and the AND-gate G501 is disabled. During the period that the flip-flop F511 is set, the contents of stages $A_7$ to $A_{17}$ of the A-register are shifted through the arithmetic section into the X-register. Because of cumulative circuit delays through logic levels, there is a one bit-time delay in data transmission through the arithmetic section so that the flip-flop F511 is not reset until the $L_{14}$ pulse is applied at an input terminal of the OR-gate G514. The $L_{13}'$ pulse is prevented from resetting the flip-flop F511 because while the AND-gate G501 is disabled the AND-gate G516 is also disabled.

A manual A→X transfer operation may be similarly accomplished by closing a manual A→X transfer switch $S_{29}$ in the manual transfer control section (FIG. 37) and by momentarily depressing the execute-transfer push button $S_{32}$ to cause the flip-flop F1250 to be set for a period from an $L_{23}'$ pulse to an $L_{21}$ pulse and thereby enable an AND-gate G1256 to transmit a 0 volt signal to the input terminal 1256 of the OR-gate G517 (FIG. 24).

The X-register may be loaded from a memory location through the arithmetic section in response to an LDX command signal applied to an input terminal of the OR-gate G517 so that as the memory location is read the digital signals stored therein may be serially transferred through the arithmetic section into the X-register. Due to the manner in which the synchronizing flip-flop F511 is set and reset by $L_2$ and $L_{14}$ pulses, only the digital signals from positions 7 to 17 of the memory location are shifted into the X-register.

The X-register may be loaded in a similar manner in response to an ADX command signal applied to the OR-gate G517 except that the ADX command signal also causes the contents of the X-register to be serially transferred through the arithmetic section as the contents of a specified memory location are read so that the algebraic sum of the contents of the X-register and the bit positions 7 to 17 of the memory location are serially transferred through the AND-gate G500 into the X-register.

The operation specified by an INX command is accomplished in a manner similar to the operation specified by the ADX command except that as the contents of the X-register are serially transferred through the arithmetic section, the contents of the α-register are serially transferred through the arithmetic section instead so that the algebraic sum of the contents of the X-register and the bit positions 7 to 17 of the α-register are serially transferred through the AND-gate G500 into the X-register.

In order to cause the contents of the X-register to be serially transferred through the arithmetic section in response to INX and ADX command signals, the flip-flop F512 is set by a $\phi_1'$ pulse transmitted through an AND-gate G503 which is enabled by an $L_1'$ pulse. An inverter I501 is employed to couple the AND-gate G503 to the trigger input terminal of the flip-flop F512 in order to obtain a positive-going (0 to +6 volts) trigger signal. When an INX or ADX command signal is applied to the OR-gate G510, a +6 volt signal is transmitted to the set steering input terminal of the steering circuit associated with the trigger input terminal to which the inverter I501 is connected. After eleven bit-time periods, the flip-flop F512 is automatically reset by a $\phi_1'$ pulse transmitted through the AND-gate G508 which is enabled by an $L_{12}$ pulse translated through an OR-gate G507.

The contents of the X-register may be transferred to the A-register by a programmed instruction while the contents of the X-register are being ring-shifted. An X→A transfer command signal is transmitted by an AND-gate G1132 when the appropriate instruction is decoded in a manner described hereinafter with reference to FIG. 31 to cause the flip-flop F512 to be set by transmitting a +6 volt signal via the OR-gate G510 to the set steering input terminal of the flip-flop F512. While the flip-flop F512 is set, the AND-gate G1414 is enabled to transmit the contents of the X-register through the arithmetic section to the A-register.

A manual X→A transfer may be similarly accomplished by closing a manual X→A transfer switch $S_{30}$ in FIG. 37 and depressing the execute-transfer switch $S_{32}$ to cause the flip-flop F1250 to be set by an $L_{23}'$ pulse. While the flip-flop F1250 is set and the switch $S_{30}$ is closed, an AND-gate G1257 is enabled to transmit a 0 volt signal to an input terminal 1257 of the OR-gate G510.

The contents of the X-register are also transmitted to the arithmetic section while the X-register is being ring-shifted when an instruction word being loaded into the α-register, or the β-register, contains a bit 1 in position 19 specifying that positions 7 to 17 of the instruction word be automatically modified by adding to it the contents of the X-register. When a bit 1 is present in position 19 of a word being read, the flip-flop F1400 in the arithmetic section of FIG. 40 indicated by a dotted-line block symbol in FIG. 24 is set during an $L_1$ bit-timing period so that the AND-gate G504 is enabled and a +6 volt signal is translated by the OR-gate G510 to the set steering input terminal of the flip-flop F512. In that manner a $\phi_1'$ pulse translated through the enabled AND-gate G503 and the inverter I501 during an $L_1'$ pulse period sets the flip-flop F512 to enable the AND-gate G1414 in the arithmetic section and thereby cause the contents of the X-register to be added to positions 7 to 17 of the instruction. To assure that the AND-gate G504 is enabled by the presence of a bit 1 in the flip-flop F1400 during an $L_1'$ pulse period only for automatic modification of an instruction word, the second input terminal of that AND-gate is connected to an OR-gate G505 which may be enabled only by either a LOAD α signal from the true output terminal of the set flip-flop F702 in the instruction sequencing section or by a LOAD β signal at an output terminal 716 of an AND-gate G716 which is enabled only while the flip-flop F703 in the instruction sequencing section is set.

Although there is not an appropriate instruction listed in the digest of instructions to transfer the contents of the X-register to the A-register and simultaneously transfer the contents of the A-register to the X-register, it is possible to perform that operation by writing an appropriate instruction having a bit 1 in positions 2, 3, 5, 8 and 10. As illustrated in the instruction decoding chart of FIG. 44, the 1 bits in positions 2, 3 and 5 are decoded to indicate that a transfer operation must take place and the 1-bits in positions 8 and 10 are decoded to simultaneously enable gates which allow A→X and X→A transfers so that an exchange transfer between the A and X-registers is accomplished in one word-time. This is but one example of the many word transfer operations which may be performed without having to devote additional word-times for the additional operations and without having to use a third register in the exchange process. Such an instruction may be denominated an "exchange X and A" instruction and identified by the mnemonic code EXA. The specific manner in which such an A→X and X→A transfer instruction is decoded is described in the following section with reference to FIGS. 31, 43 and 44. A corresponding manual transfer may be accomplished through the manual transfer section (FIG. 37) by closing both of the switches $S_{29}$ and $S_{30}$ before depressing the execute-transfer switch $S_{32}$.

DECODING OF PROGRAM INSTRUCTIONS

As noted hereinbefore, the present invention pertains to a general purpose, stored program, digital computer which may be particularly adapted to real time or on-line industrial calculations for process control and monitoring due to its organization which allows great flexibility in programming and versatility in forming instructions for transfer and shift operations as well as in providing control circuitry for external effect commands, input and output commands, and branch commands.

Figure 44:
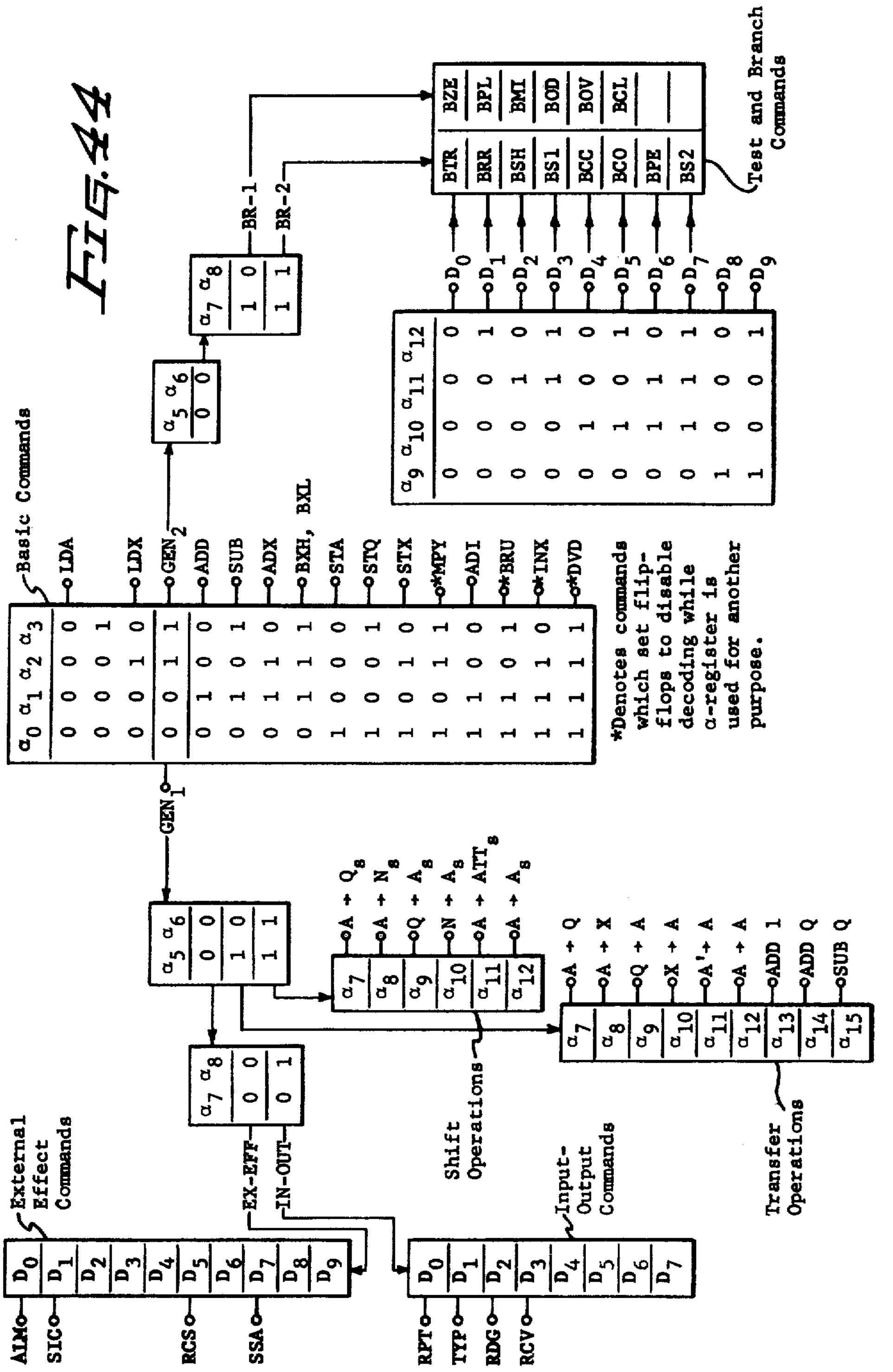
FIG. 44 is a chart illustrating the manner in which digital signal configurations of command portions of instructions in the $\alpha$-register may be decoded to generate command or operation control signals.

Referring to FIG. 44 it may be seen that by using only four positions $\alpha_0$ to $\alpha_3$ of a twenty-bit instruction word, sixteen unique configurations may be provided for different operations only fifteen of which are utilized in the present embodiment. Those fifteen configurations of basic operations are the basic commands of the computer and are identified by their mnemonic codes such as LDA for the code 0000 which specifies that the contents of a memory location be algebraically added to the contents of the A-register. All of these commands and others illustrated by other charts in FIG. 44 are described in a Digest of Commands following this section with the exception of the operation code 0011 which produces $GEN_1$ and $GEN_2$ signals that are not command signals but signals employed to enable further decoding of other positions of the α-register from $\alpha_5$ to $\alpha_{17}$ to obtain a large number of unique operation codes only a few of which are illustrated but all of which may be utilized. All of the basic command code groups involving only positions $\alpha_0$ to $\alpha_3$ are decoded by the decoding section illustrated in FIG. 43.

A $GEN_1$ signal from the basic command decoding section enables decoding positions $\alpha_5$ to $\alpha_{12}$ for shift instructions specified by a code 11 in position $\alpha_5$ and $\alpha_6$ and for transfer operations specified by a code 10 in those two positions. A bit 1 in any one of the positions from $\alpha_7$ to $\alpha_{12}$ specifies the register from which data is to be shifted and the register into which the data is to be shifted. Positions 13 to 17 of the instruction word are employed to specify the shift length, the number of stages through which a given bit is to be shifted. More than one shift operation may be specified by placing a bit 1 in more than one position, but all operations must be for the same number of stages. If more than one register is shifted into the same register, their logical-OR bit configuration is shifted into the register.

Figure 22:
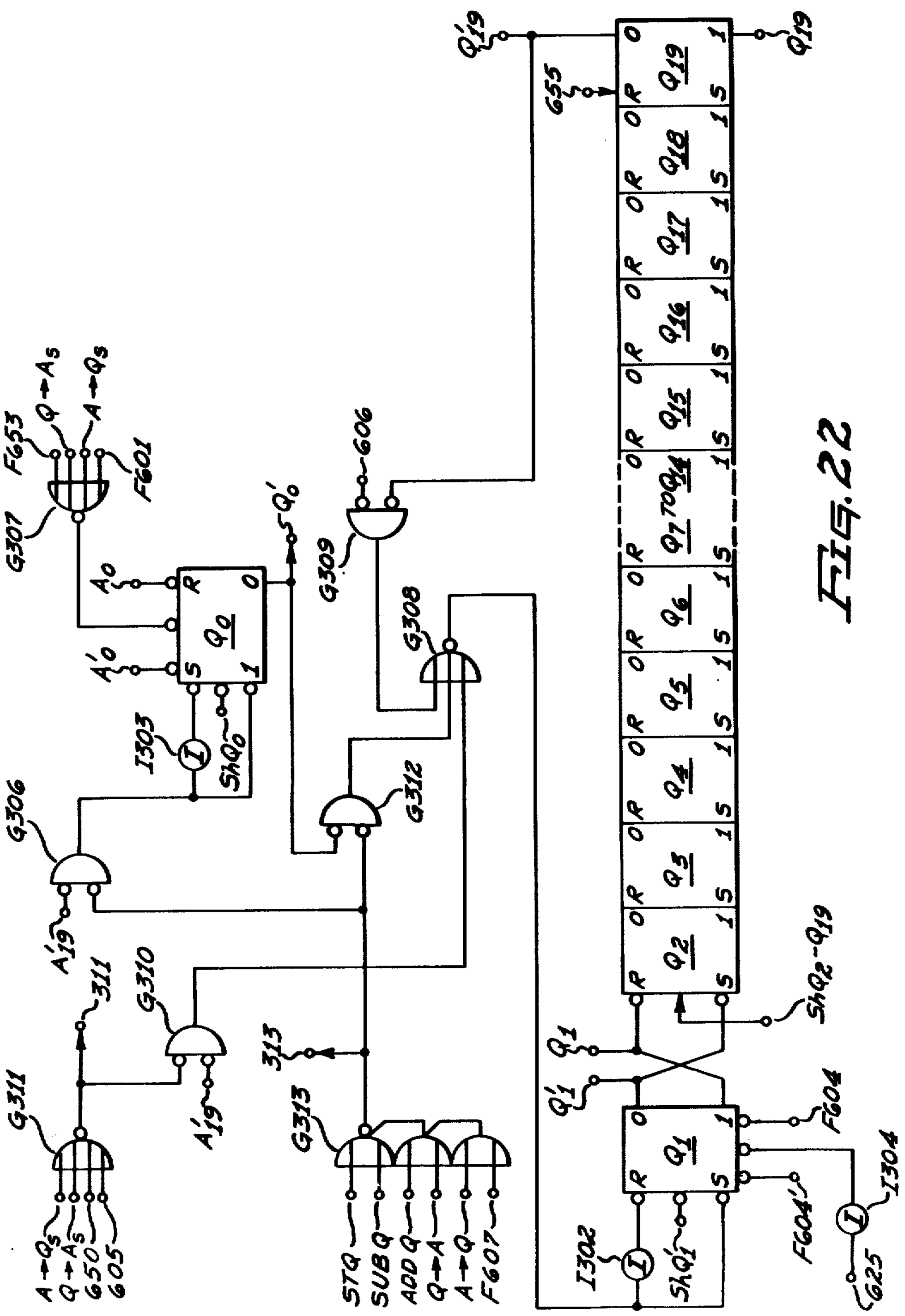
FIG. 22 illustrates a logic diagram of the Q-register and its control means.

A bit 1 in positions $\alpha_7$ to $\alpha_{12}$ is similarly employed to specify a word transfer from one register to another through one input channel of the arithmetic section except an A→Q transfer which is made directly through an AND-gate G310 (FIG. 22). Consequently, if a bit 1 is placed in more than one of the positions $\alpha_8$ to $\alpha_{12}$ the logical-OR bit configuration of the words being transferred will be transferred to the specified register or registers.

Bit positions $\alpha_{13}$ to $\alpha_{15}$ are employed to specify special arithmetic operations in conjunction with a word transfer. When a bit 1 is placed in $\alpha_{13}$, a carry flip-flop F1402 is preset so that as a word is transferred through the arithmetic section as specified by a bit 1 in one of the positions $\alpha_7$ to $\alpha_{12}$, the word is incremented by one. If an A'→A transfer is specified, the one's complement of the A-register is transferred through the arithmetic section where a bit 1 is added in the least significant order thereby forming the two's complement which is stored in the A-register.

Bit positions 14 and 15 are employed to transfer the contents of the Q-register and the one's complement of the Q-register through a second channel of the arithmetic section to the A-register, respectively, so that a word transferred through the first channel may be algebraically added to it in response to a bit 1 in one of the positions $\alpha_9$ to $\alpha_{12}$. A bit 1 in position $\alpha_{15}$ produces an operation signal SUB Q in order to subtract the contents of the Q-register from the contents of the A-register but by itself it only effects a transfer of the one's complement of the Q-register through the arithmetic section. Accordingly, a bit 1 in position $\alpha_{13}$ for an ADD 1 operation must be combined with the SUB Q operation to algebraically subtract the contents of the Q-register from the contents of the A-register.

All word transfer operations involve the A-register so that if a bit 1 is not placed in at least one of the positions $\alpha_7$ to $\alpha_{15}$, the contents of the A-register are shifted out and lost with the result that the A-register is reset to 0000– – – –, a plus zero. To place 1111– – – –, a minus one, in the A-register a bit 1 is placed in both positions $\alpha_{11}$ and $\alpha_{12}$ to cause the contents (binary digits) of the A-register and their one's complement to be transferred through the same channel of the arithmetic section into the A-register. The same result may be accomplished by combining a Q→A with a SUB Q in a word transfer command.

The $GEN_1$ signal from the basic command decoding section also enables decoding positions $\alpha_5$ to $\alpha_{12}$ for input-output commands and for external effect commands. Both types of commands are specified by a code 00 in positions $\alpha_5$ and $\alpha_6$ and are distinguished by the codes 00 and 01 in positions $\alpha_7$ and $\alpha_8$ as illustrated in the chart of FIG. 44. Positions $\alpha_9$ to $\alpha_{12}$ are decoded by a decoding section illustrated in FIG. 33 to obtain ten out of a possible group of sixteen distinct signals $D_0$ to $D_9$ which may be combined with an EX-EFF signal or an IN-OUT signal produced by decoding positions $\alpha_7$ and $\alpha_8$ in the decoding section illustrated in FIG. 31 in order to initiate an external effect or an input-output operation. Only four commands for operations of each type are illustrated; others may obviously be added.

The decoding AND-gates required to obtain specified external effect and input-output commands are provided and shown with the control circuits for the apparatus which is to perform the desired operation. As an example of an external effect operation, consider the ALM command signal which is produced by a logical-AND combination of an EX-EFF' signal with a $D_0'$ signal by an AND-gate G1253 in FIG. 38 to set a flip-flop F1251. When the flip-flop is set, an indicator 1292 and an audio alarm device 1291 are energized. That programmed alarm may be reset by closing a switch $S_{21}$ and momentarily depressing a push button switch $S_{22}$.

Figure 19:
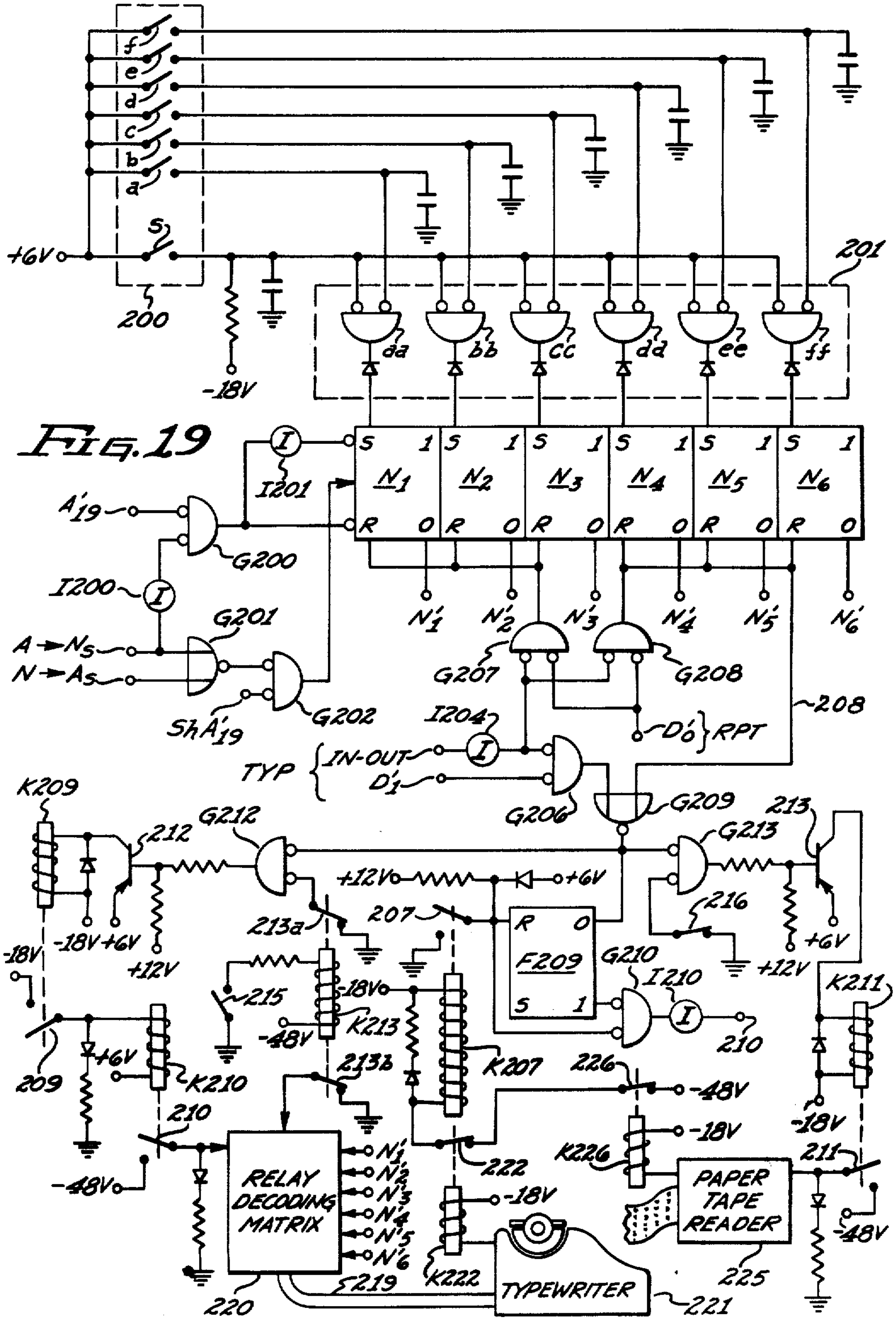
FIG. 19 illustrates a logic diagram of the N-register and its control means for computer input-output operations.

As an example of an input-output operation, consider the TYP command signal which is produced by a logical-AND combination of an IN-OUT' signal with a $D_1'$ signal by an AND-gate G206 in FIG. 19 to set a flip-flop F209. When the flip-flop F209 is set, an operation for typing a character specified by a unique configuration of digital signals in the N-register is initiated. The mechanical action requires so much time for completion, as is described hereinafter in the N-register section, that other instructions may be executed after which another TYP command employed to initiate another typing operation. Before doing that, however, it is advisable to test for completion of the last typing operation with a branch command. If the typewriter is ready for another operation, branch to a sequence of instructions is made for the purpose, the sequence including an instruction to load the N-register with a new configuration of digital signals.

The ten $D_0$ to $D_9$ signals may be combined with the $GEN_2$ signal and digital signals in positions $\alpha_5$ to $\alpha_8$ of an instruction to produce test and branch commands. Only the $D_0$ to $D_7$ signals are actually utilized in the present embodiment to produce two groups of illustrative test and branch commands; others may be added. The two groups are distinguished by decoding positions $\alpha_5$ to $\alpha_7$ in the decoding section of FIG. 32 to produce either a BR–1 or a BR–2 signal. The BR–1 and BR–2 signals are combined with the $D_0$ to $D_7$ signals in the branch decoding and decision making section illustrated in FIG. 39. For instance, an instruction to branch if the typewriter is ready is decoded to produce a BR–2 signal and and a $D_0$ signal. Those two signals are decoded and the test for the readiness of the typewriter is made simultaneously by the AND-gates G1309 and G1310. If the typewriter is *not* ready, the AND-gates are not enabled and the flip-flop F1300 *is* set by an $L_0'$ pulse translated through an enabled AND-gate G1319. While the flip-flop is set, its true output terminal inhibits a LOAD $\beta$ control signal from being transmitted by the AND-gate G716 of the instruction sequencing section (FIG. 27), thereby preventing a branch to a different sequence of instructions, and enables the flip-flop F702 to be set by the next $L_{21}'$ pulse almost one word-time later to cause the instruction normally next in sequence to be read into the $\alpha$-register. All instructions to test and branch are written as one-plus-one address instructions but the address of the first instruction in the branch sequence is not loaded into the $\beta$-register if the test fails, as in the example just described.

The following is a digest of the operation codes or commands which may be written into instructions. As demonstrated by the chart in FIG. 44 and the foregoing description, the computer organization provides great versatility in forming instructions. Therefore, the commands briefly described in the digest are not to be considered as defining all of the capabilities of the computer. Many new instructions may be written without requiring any structural modification of the illustrated embodiment. Instructions for the control of additional input-output equipment and for other external effects which may be written may be implemented with as few as one or two gates in addition to the control circuits required to translate their command signals into action.

DIGEST OF COMMANDS

In the following descriptions of the computer commands, the letter Y refers to a location in the drum memory and K refers to a constant. The format used gives the mnemonic code for the command, an indication of whether a drum location or a constant must be specified, the command, the octal code for the particular command and an octal-to-binary conversion key in parentheses. For example:

LDX Y LOAD X 04 (2)

The mnemonic code is LDX, an operand located in the drum memory must be specified (indicated by Y), the command is to load the X-register, the octal code for the command is 04 and the binary code for the command is a one in bit position two as may be more clearly understood from the chart of FIG. 44. The octal code of the command portion of an instruction is always considered to be divided into seven octal groups and is read from left to right. The octal code 04, for instance, is actually 0400000 but all zeros in orders of less significance than the least significant non-zero digit are omitted.

*Load and Store Commands*

These commands are written in Instruction Format I and are used to transfer information between a memory location and a register. The commands to load a register from drum memory are executed in one word-time after the operand has been located.

The commands to write the contents of a register into a memory location require a minimum of four word-times for reading and execution of the instruction. Two word-times are used to read and decode the instruction, since they must be written as 1+1 address instructions. One word-time is required to transfer the information to the drum after the specified location is located. After the transfer of information, a delay of one word-time is necessary before the read-write amplifiers are ready to read the next instruction.

LDA Y LOAD A 00

The contents of $Y_0$ to $Y_{19}$ replace the contents of $A_0$ to $A_{19}$. The contents of $Y_0$ to $Y_{19}$ are not changed. This instruction can be automatically modified by the contents of the X-register and may be written as a single-address or a 1+1 address instruction.

LDX Y LOAD X 04 (2)

The contents of $Y_7$ to $Y_{17}$ replace the contents of $X_7$ to $X_{17}$. The contents of Y are not changed. This instruction can be automatically modified by the contents of the X-register and may be written as a single-address or a 1+1 address instruction.

STA Y STORE A 20 (0)

The contents of $A_0$ to $A_{19}$ replace the contents of $Y_0$ to $Y_{19}$. The contents of A are not changed. This instruction can be automatically modified by the contents of the X-register and must be written as a 1+1 address instruction.

STQ Y STORE Q AND EXCHANGE 22 (0, 3)

The contents of $Q_0$ to $Q_{19}$ replace the contents of $Y_0$ to $Y_{19}$. In addition, the contents of $Q_0$ to $Q_{19}$ and the contents of $A_0$ to $A_{19}$ are interchanged. This instruction can be automatically modified by the contents of the X-register and must be written as a 1+1 address instruction.

STX Y STORE X 24 (0, 2)

$Y_0$ to $Y_{19}$ are set to zero and the contents of $X_7$ to $X_{17}$ replace the contents of $Y_7$ to $Y_{17}$. The contents of $X_7$ to $X_{17}$ are not changed. This instruction can be automatically modified by the contents of the X-register and must be written as a 1+1 address instruction.

*Arithmetic Commands*

A value stored in a location of the drum memory may be added to or subtracted from the contents of the A-register. The capacity of the A-register may be exceeded while executing add or subtract commands. In that event, the overflow indicator is turned on, the bit in the highest order of the result is lost and the sign of the result is reversed. Add or subtract commands are executed in one word-time after the operand has been located. All arithmetic commands, except INX, are written in Instruction Format I.

ADD Y ADD 10 (1)

The contents of $Y_0$ to $Y_{19}$ are algebraically added to the contents of $A_0$ to $A_{19}$. The result is placed in $A_0$ to $A_{19}$. The contents of Y are not changed. This instruction can be automatically modified by the contents of the X-register and may be written as a single-address or a 1+1 address instruction.

SUB Y SUBTRACT 12 (1, 3)

The contents of $Y_0$ to $Y_{19}$ are algebraically subtracted from the contents of $A_0$ to $A_{19}$. The result is placed in $A_0$ to $A_{19}$. The contents of Y are not changed. This instruction can be automatically modified by the contents of the X-register and may be written as a single-address or a 1+1 address instruction.

ADX Y ADD TO X 14 (1, 2)

The contents of $Y_7$ to $Y_{17}$ are added absolutely to the contents of $X_7$ to $X_{17}$. A carry from position $X_7$ is lost. The contents of Y are not changed. This instruction can be automatically modified by the contents of the X-register and may be written as a single-address or a 1+1 address instruction.

MPY Y MULTIPLY 26 (0, 2, 3)

The contents of $Y_0$ to $Y_{19}$ are stored in the $\alpha$-register and then algebraically multiplied by the multiplier stored in the Q-register. The product is developed in the A and Q-registers, the sign of Q being the same as the sign of A. If the contents of the A-register are not set to zero before the MPY command is given, the contents of the A-register will be added algebraically to the least significant half of the product. Thus, with proper scaling, it is possible to form the value AB+C. The overflow indicator is turned off after this command is executed. After the multiplicand has been located in the drum memory location Y, one word-time is required to store it in the $\alpha$-register. Thereafter, the time required to execute the MPY command is variable, depending on the bit configuration of the multiplier in the Q-register. Trailing zeros will be shifted out in one word-time; one word-time is required for each 1, or 01 combination, in the multiplier. Intervening groups of zeros will be shifted out in one word-time; leading zeros will be shifted in one word-time. After the multiplication by repeated additions of the multiplicand has been completed, one word-time is required to add a correction factor if the multiplier is negative. This instruction must be written as a 1+1 instruction and may be automatically modified by the contents of the X-register.

ADI Y ADD I TO Y 30 (0, 1)

The I-register is loaded from a source specified by the Input Selector Register. The contents of the I-register are added to the contents of the memory sector Y and stored in the A-register. An STA command should follow immediately. The I-register is cleared and the Input Selector Register is advanced one position by the addition. This instruction is executed in one word-time, can be automatically modified by the contents of the X-register and may be written as a single-address or a 1+1 address instruction.

INX K INCREMENT X 34 (0, 1, 2)

This instruction is written in Format IV. The contents of $\alpha_7$ to $\alpha_{17}$ are added absolutely to the contents of $X_7$ to $X_{17}$, and the result replaces the contents of $X_7$ to $X_{17}$. A carry from position $X_7$ is lost. If this instruction is automatically modified by the contents of the X-register, the result in X will be 2X+K. Execution takes place in one word-time immediately after the instruction has been read. This instruction may be written as a single-address or a 1+1 address instruction.

DVD Y DIVIDE 36 (0, 1, 2, 3)

The dividend in the A and Q-registers is algebraically divided by the divisor in the $\alpha$-register. The quotient developed in the Q-register is placed in the A-register and the final remainder which results in the A-register is placed in the Q-register. After the divisor has been located in the drum memory location Y, one word-time is required to store it in the $\alpha$-register. Thereafter, the time required to execute the DVD command is a fixed number of twenty-six word times. When execution of the DVD command is complete, the overflow indicator is turned off and a search for the next instruction is begun. The magnitude of the divisor must be greater than the magnitude of that part of the dividend in the A-register. If not, the overflow indicator is turned on at the end of the fourth word-time and a search for the next instruction begins immediately thereafter. This instruction must be written as a 1+1 instruction and may be automatically modified by the contents of the X-register.

*Shift Commands*

Numerous commands are available to serially shift to the right the contents of the A-register, either alone or with the contents of the N and/or Q-registers as written in Instruction Format III. The maximum number of places that can be shifted is twenty. All shift instructions may be written as either a single-address or a 1+1 address instruction. After the instruction is read, one word-time is required for execution. The length of shift may be automatically modified by the contents of the X-register; however, care must be taken so that the length of shift specified plus the contents of the X-register will not exceed twenty places. As shown in FIG. 44, positions 5 through 12 are decoded as part of the operation code. A bit 1 in both positions 5 and 6 denotes a right shift and a bit 1 in any of the positions 7 through 12 specifies the register to be shifted. If none is specified, the A-register will be open-shifted. When the contents of the A-register are being shifted into the Q or N-register, or into some external register, such as the ATT-register not shown, or when the A-register is being open-shifted, the sign of the A-register is duplicated in the vacated positions of $A_1$ to $A_{19}$ through AND-gate G304. However, if the contents of the Q, N or A-register are being shifted into the A-register, then the sign bit in $A_0$ is not shifted into vacated positions of the A-register.

If the contents of more than one register are shifted into the A-register, the bits are added logically. For example, if the contents of both the A and Q-registers are shifted into the A-register, the logical OR of the bits shifted out of $A_{19}$ and $Q_{19}$ fill the vacated positions in the A-register. When positions 7 or 9 of the instruction contains a bit 1, bits shifted out of $A_{19}$ fill the vacated positions $Q_1$ to $Q_{19}$ of the Q-register, and the sign bit $Q_0$ is set to agree with the sign bit $A_0$. If the contents of a register are shifted into a A-register while the sign bit $A_0$ is being duplicated in the vacated positions $A_1$ to $A_{19}$, the sign bit $A_0$ is added to each bit shifting into $A_1$ to $A_{19}$ in a logical "or" manner.

The length of shift is specified in positions 13 through 17 of the instruction.

The shift commands used most frequently are described in detail.

OSA K OPEN SHIFT A 06600 (2, 3, 5, 6)

The contents of $A_1$ to $A_{19}$ are shifted right K places. If $A_0$ is 0, 0's are inserted in the vacated positions of $A_1$ to $A_{19}$. If $A_0$ is 1, 1's are inserted in the vacated positions of $A_1$ to $A_{19}$. Bits shifted out of $A_{19}$ are lost. The sign bit $A_0$ is not changed.

RSA K RING SHIFT A 06602 (2, 3, 5, 6, 12)

The contents of $A_1$ to $A_{19}$ are shifted right K places in a ring fashion; that is, the bit shifted out of $A_{19}$ is inserted in $A_1$, replacing the bit shifted out of $A_1$ into $A_2$. The sign bit $A_0$ is not affected.

OAQ K OPEN SHIFT A AND Q 06700 (2, 3, 5, 6, 7)

The contents of $A_1$ to $A_{19}$ and the contents of $Q_1$ to $Q_{19}$ together are shifted K places to the right. Bits shifted out of $A_{19}$ are shifted into $Q_1$. Bits shifted out of $Q_{19}$ are lost. If $A_0$ is 0, 0's fill the vacated positions $A_1$ to $A_{19}$; if $A_0$ is 1, 1's fill the vacated positions $A_1$ to $A_{19}$. The sign bit $Q_0$ is made equal to the sign bit $A_0$. The sign bit $A_0$ is unchanged.

RAQ K RING SHIFT A AND Q 06620 (2, 3, 5, 6, 7, 9)

The contents of $A_1$ to $A_{19}$ and $Q_1$ to $Q_{19}$ together are shifted K places to the right in a ring fashion. Bits shifted out of $A_{19}$ shift into $Q_1$. The sign bit $Q_0$ is made equal to the sign bit $A_0$. The sign bit $A_0$ is unchanged.

OAN K OPEN SHIFT A AND N 06640 (2, 3, 5, 6, 8)

The contents of $A_1$ to $A_{19}$ and $N_1$ to $N_6$ together are shifted K places to the right. Bits shifted out of $A_{19}$ shift into $N_1$. Bits shifted out of $N_6$ are lost. If the sign bit $A_0$ is 0, 0's fill the vacated positions $A_1$ to $A_{19}$; if the sign bit $A_0$ is 1, 1's fill the vacated positions $A_1$ to $A_{19}$. The sign bit $A_0$ is unchanged.

ONA K OPEN SHIFT N AND A 06610 (2, 3, 5, 6, 10)

The contents of $N_1$ to $N_6$ and $A_1$ to $A_{19}$ together are shifted K places to the right. Bits shifted out of $N_6$ shift into $A_1$. Vacated positions $N_1$ to $N_6$ are filled with 0's. Bits shifted out of $A_{19}$ are lost. The sign bit $A_0$ is unchanged.

NAQ K OPEN SHIFT N, A AND Q 06710 (2, 3, 5, 6, 7, 10)

The contents of $N_1$ to $N_6$, $A_1$ to $A_{19}$ and $Q_1$ to $Q_{19}$ together are shifted K places to the right. Bits shifted out of $N_6$ shift into $A_1$. Bits shifted out of $A_{19}$ shift into $Q_1$. Bits shifted out of $Q_{19}$ are lost. Vacated positions of $N_1$ to $N_6$ are filled with 0's. The sign bit $Q_0$ is made equal to the sign bit $A_0$. The sign bit $A_0$ is unchanged.

ANQ K OPEN SHIFT A INTO N AND Q 06740 (2, 3, 5, 6, 7, 8)

The contents of $A_1$ to $A_{19}$ are shifted K places to the right into both the N and Q registers. Bits shifted out of $A_{19}$ enter both $Q_1$ and $N_1$. Bits shifted out of $N_6$ and $Q_{19}$ are lost. If the sign bit $A_0$ is 0, the vacated positions $A_1$ to $A_{19}$ are filled with 0's; if the sign bit $A_0$ is 1, 1's fill the vacated positions $A_1$ to $A_{19}$. The sign bit $Q_0$ is made equal to the sign bit $A_0$. The sign bit $A_0$ is unchanged.

*Word Transfer Commands*

This group of commands controls the following operations: exchange of information between registers through the adder; logical operations; loading or addition of constants in the A-register; and arithmetic operations involving the contents of the A-register or the X and Q-registers. All word transfer commands are written in Instruction Format II as either single-address or 1+1 address instructions, and are executed in one word-time. They cannot be automatically modified by adding to them the contents of the X-register.

As shown in FIG. 44, positions 5 through 15 are decoded as part of the operation code. Positions 5 and 6 contain the bit configuration 10 to denote a word transfer operation. Positions 7 through 15 specify the registers which are affected. If none of the positions 7 through 15 contain a 1, the A-register is set to +0. The symbol A' is interpreted as meaning the one's complement of the contents of the A-register.

Some of the more frequently used word transfer commands are described in detail.

MAQ MOVE A TO Q 065000 (2, 3, 5, 7)

The contents of $A_0$ to $A_{19}$ replace the contents of $Q_0$ to $Q_{19}$. Zeros replace the contents of $A_0$ to $A_{19}$.

LQA LOAD Q FROM A 065020 (2, 3, 5, 7, 12)

The contents of $A_0$ to $A_{19}$ replace the contents of $Q_0$ to $Q_{19}$. The contents of $A_0$ to $A_{19}$ are unchanged.

EXC EXCHANGE A AND Q 064200 (2, 3, 5, 7, 9)

The contents of $A_0$ to $A_{19}$ and $Q_0$ to $Q_{19}$ are interchanged.

LAX LOAD A FROM X 064100 (2, 3, 5, 10)

The contents of the A-register are set to +0 and the contents of $X_7$ to $X_{17}$ replace the contents of $A_7$ to $A_{17}$. The contents of the X-register are unchanged.

LXA LOAD X FROM A 064400 (2, 3, 5, 8)

The contents of $A_7$ to $A_{17}$ replace the contents of $X_7$ to $X_{17}$. The contents of the A-register are unchanged.

LDZ LOAD ZERO INTO A 064000 (2, 3, 5)

The contents of $A_0$ to $A_{19}$ are replaced by 0's.

LDO LOAD ONE INTO A 064010 (2, 3, 5, 13)

The contents of $A_0$ to $A_{18}$ are set to 0, and a 1 is placed in $A_{19}$.

LMO LOAD MINUS ONE INTO A 064060 (2, 3, 5, 11, 12)

The contents of $A_0$ to $A_{19}$ are replaced by 1's.

ADO ADD ONE 064030 (2, 3, 5, 12, 13)

Plus one is added algebraically to $A_{19}$. If the capacity of the A-register is exceeded, the overflow indicator will be turned on.

SBO SUBTRACT ONE 064026 (2, 3, 5, 12, 14, 15)

One is subtracted algebraically from $A_{19}$. The original contents of $A_0$ to $A_{19}$ replace the contents of $Q_0$ to $Q_{19}$. If the capacity of the A-register is exceeded, the overflow indicator will be turned on.

A+Q ADD Q TO A 064024 (2, 3, 5, 12, 14)

The contents of $Q_0$ to $Q_{19}$ are added algebraically to the contents of $A_0$ to $A_{19}$. The original contents of $A_0$ to $A_{19}$ replace the contents of $Q_0$ to $Q_{19}$. If the capacity of the A-register is exceeded, the overflow indicator will be turned on.

A−Q SUBTRACT Q FROM A 064032 (2, 3, 5, 12, 13, 15)

The contents of $Q_0$ to $Q_{19}$ are subtracted algebraically from the contents of $A_0$ to $A_{19}$. The original contents of $A_0$ to $A_{19}$ replace the contents of $Q_0$ to $Q_{19}$. If the capacity of the A-register is exceeded, the overflow indicator will be turned on.

Q−A SUBTRACT A FROM Q 064054 (2, 3, 5, 11, 13, 14)

The contents of $A_0$ to $A_{19}$ are subtracted algebraically from the contents of $Q_0$ to $Q_{19}$. The result is placed in the A-register and the original contents of $A_0$ to $A_{19}$ replace the contents of $Q_0$ to $Q_{19}$. If the capacity of the A-register is exceeded, the overflow indicator will be turned on.

X+Q ADD X AND Q 064104 (2, 3, 5, 10, 14)

The contents of $X_7$ to $X_{17}$ are added algebraically to the contents of $Q_0$ to $Q_{17}$. The result together with $Q_{18}$ and $Q_{19}$ are placed in $A_0$ to $A_{19}$. The original contents of $A_0$ to $A_{19}$ replace the contents of $Q_0$ to $Q_{19}$. If the capacity of the A-register is exceeded, the overflow indicator will be turned on. The contents of the X-register are unchanged.

NOP NO OPERATION 064020 (2, 3, 5, 12)

Zero is added to the contents of $A_0$ to $A_{19}$. By writing this as a 1+1 address instruction, it may be used to achieve the effect of an unconditional branch but the single-address instruction BRU (Branch Unconditionally) may be used instead for that purpose.

CPL COMPLEMENT A 064040 (2, 3, 5, 11)

Each bit in $A_0$ to $A_{19}$ is inverted; that is, each 1 in the A-register is replaced by a 0 and each 0 is replaced by 1.

NEG NEGATE A 064050 (2, 3, 5, 11, 13)

The two's complement (negative value) of the contents of $A_0$ to $A_{19}$ replaces the contents of $A_0$ to $A_{19}$.

ORQ OR A AND Q 064220 (2, 3, 5, 9, 12)

The contents of $A_0$ to $A_{19}$ and $Q_0$ to $Q_{19}$ are added in a logical OR manner. The result is placed in $A_0$ to $A_{19}$. Each bit of the A-register and each corresponding bit of the Q-register are examined together. If there is a 1 in a given position of either the A or Q register, a 1 is placed in the A-register in that position. Otherwise a 0 is placed in the A-register in that position. The initial contents of $A_0$ to $A_{19}$ replace the contents of $Q_0$ to $Q_{19}$.

*Test and Branch Commands*

Test and Branch Commands are written in Format II, except as otherwise specified for three special branch commands, and the optimum instruction location from the time point of view is at word-time $n+2$, assuming the branch command is avalaible at a word-time $n$, unless otherwise indicates. Except for BRU all branch instructions must be written as 1+1 address instructions.

BRU Y BRANCH UNCONDITIONALLY 32 (0, 1, 3)

Control is transferred to the instruction in location Y. This instruction is written in Format I and may be a single-address or 1+1 address instruction. If written as a single-address instruction available at word-time $n$, the instruction in location Y must be available at word-time $n+2$. If written as a 1+1 address instruction the optimum location of Y is for word-time $n+3$. This instruction may be automatically modified by the contents of the X-register.

BXH (−K), Y BRANCH IF X IS HIGH 160 (1, 2, 3)

If the contents of $X_7$ to $X_{17}$ are greater than or equal to K, the next instruction is taken from the location Y. If the contents of $X_7$ to $X_{17}$ are less than K, the normal next instruction is executed. The contents of the X-register are not changed. This is a 1+1 address instruction written in Format IV. Position 19 must contain a 1.

BXL (−K), Y BRANCH IF X IS LOW 164 (1, 2, 3, 6)

If the contents of $X_7$ to $X_{17}$ are less than K, the next instruction is taken from the location Y. If the contents of $X_7$ to $X_{17}$ are greater than or equal to K, the normal next instruction is executed. The contents of X are not changed. This is a 1+1 address instruction written in Format IV. Position 19 must contain a 1.

BZE Y BRANCH ON ZERO 061000 (2, 3, 7)

If the contents of $A_0$ to $A_{19}$ are zero, the next instruction is read from a location Y. If the contents are not zero, the normal next instruction is executed.

BPL Y BRANCH ON PLUS 061020 (2, 3, 7, 12)

If the sign of the A-register is plus, the next instruction is read from a location Y. If the sign of the A-register is not plus, the normal next instruction is executed.

BMI Y BRANCH ON MINUS 061040 (2, 3, 7, 11)

If the sign of the A-register is minus, the next instruction is read from a location Y. If the sign of the A-register is not minus, the normal next instruction is executed.

BOD Y BRANCH ON ODD 061060 (2, 3, 7, 11, 12)

The next instruction is read from location Y if the contents of the A-register are odd ($A_{19}$ contains a 1). The contents of the A-register are not changed. The normal next instruction is executed if the contents of the A-register are not odd ($A_{19}$ contains a 0).

BOV Y BRANCH ON OVERFLOW
061100 (2, 3, 7, 10)

If the overflow indicator is on, the next instruction is read from a location Y and the indicator is turned off. If the overflow indicator is not on, the normal next instruction is executed.

BCL Y BRANCH ON CLOCK
061120 (2, 3, 7, 10, 12)

If an external Digital Clock not shown can be read before a time change will occur the normal next instruction will be executed. If the digital clock cannot be read before it will change, the instruction at location Y will be executed. The actual time for the clock to change is a function of the clock design and therefore is a consideration which goes beyond the computer.

BTR Y BRANCH ON TYPEWRITER READY
061400 (2, 3, 7, 8)

The next instruction is taken from a location Y if a previously given TYP command has been completed. The normal next instruction is executed if the TYP command has not been completed.

BRR Y BRANCH ON READER READY
061420 (2, 3, 7, 8, 12)

The next instruction is taken from a location Y if the paper tape reader is ready to read a character and the last RPT command has been executed. The normal next instruction is executed if the reader is not ready.

BSH Y
BRANCH IF STEPPING SWITCHES ARE HOME
061440 (2, 3, 7, 8, 11)

If all external stepping switches not shown are at a home position, the next instruction will be read from a location Y. If all stepping switches are not home, the normal next instruction will be executed.

BS1 Y
BRANCH ON STEPPING SWITCH #1 ODD
061460 (2, 3, 7, 8, 11, 12)

If an external stepping switch #1 not shown is at an odd numbered position of the scanner, the next instruction will be read from a location Y. If the stepping switch #1 is at an even numbered position, the normal next instruction will be executed.

BCC Y
BRANCH IF CONVERSION IS COMPLETED
061500 (2, 3, 7, 8, 10)

If an external analog-to-digital converter not shown has completed its operation, the next instruction will be taken from a location Y. If the operation is not complete, the normal next instruction will be executed.

BCO Y
BRANCH IF CONVERTER OVERFLOWED
061520 (2, 3, 7, 8, 10, 12)

If an external analog-to-digital converter overflow indicator is on, the next instruction is taken from a location Y. If the indicator is off, the normal next instruction will be executed.

BPE Y BRANCH ON PARITY ERROR
061540 (2, 3, 7, 8, 10, 11)

If the parity error indicator is on, the next instruction is taken from a location Y and the indicator is not turned off. If the parity error indicator is not on, the normal next instruction is executed.

BS2 Y
BRANCH ON STEPPING SWITCH #2 ODD
061560 (2, 3, 7, 8, 10, 11, 12)

If an external stepping switch #2 not shown is on an odd numbered position, the next instruction will be read from a location Y. If the stepping switch #2 is on an even numbered position, the normal next instruction will be executed.

*External-Effect Commands*

These commands are executed in one word-time. They are written in Format II as either single-address or 1+1 address instructions.

ALM ALARM 060000 (2, 3)

A signal is generated which turns on an alarm indicator 1292 (FIG. 38) at the console and activates a relay 1294 to energize an audio alarm 1291. The light and contacts are reset by console push button $S_{22}$.

SIC SET INPUT CONTROL
060020 (2, 3, 12)

Figure 55:
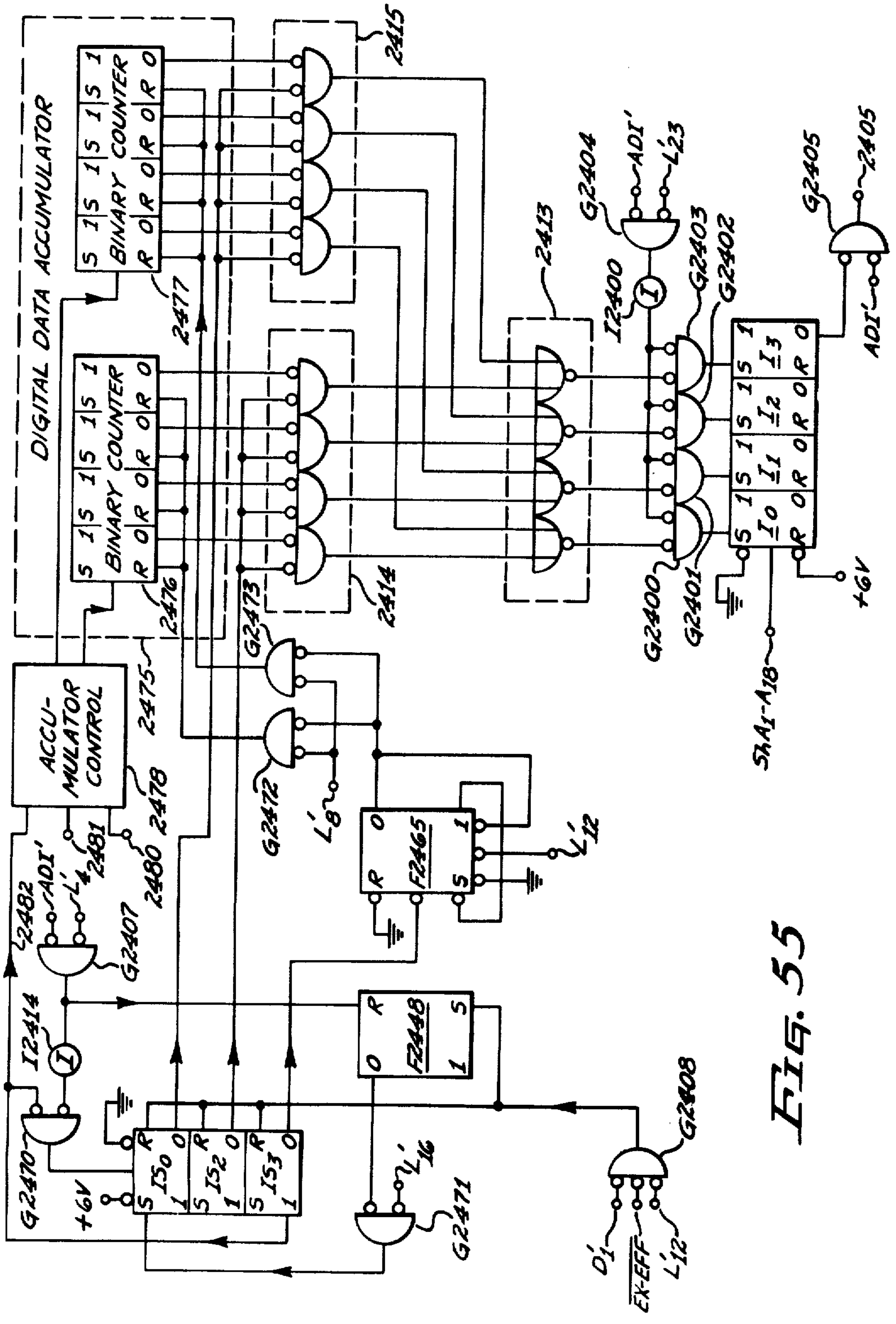
FIG. 55 illustrates a logic diagram of an I-register and a circuit for controlling the transfer of data from an external digital data accumulator into the I-register.

An IS-register shown in FIG. 55 which functions as an input selector for the I-register is reset and a flip-flop F2448 is set to enable accumulated data to be transferred from external binary counters to the I-register, one counter at a time.

RCS READ CONSOLE SWITCHES
060120 (2, 3, 10, 12)

Each of the manually set console switches $S_0$ to $S_{19}$ on the console is examined. If a switch is down (on), a 1 is placed in the corresponding position of the A-register. If a switch is up (off), the corresponding position in the A-register will not be altered. The A-register should be cleared before this command is given.

SSA SET STALL ALARM
060160 (2, 3, 10, 11, 12)

Figure 32:
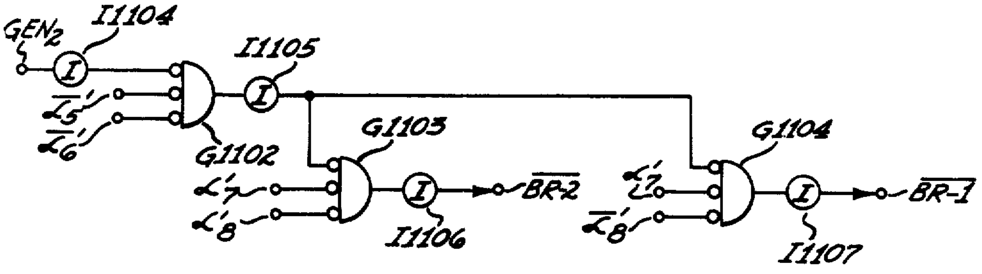
FIG. 32 illustrates a logic diagram of a circuit for partially decoding general instructions of a second type.

This command is used to periodically set a time delay device 1285 shown in FIG. 32 to its initial position. Should the time delay provided by the device ever be permitted to expire, an alarm indicator 1290 will be turned on and an audio alarm 1291 will be energized.

*Input-Output Commands*

All of these commands are written in Format II and may be single-address or 1+1 address instructions.

RPT READ PAPER TAPE 060400 (2, 3, 8)

The N-register is cleared and one six-bit coded character is read into the N-register. Fifty milliseconds are required to read a character into the N-register; other instructions not using the N-register may be executed during this time.

TYP TYPE 060420 (2, 3, 8, 12)

A six-bit coded character in the N-register is typed. The contents of the N-register are not changed. If an associated paper tape punch is also provided, the character in the N-register will also be punched. One hundred milliseconds are required to type, or type and punch, a character; other instructions not using the N-register may be executed during this time.

RDG READ DIGITAL 060440 (2, 3, 8, 11)

Figures 20, 21:
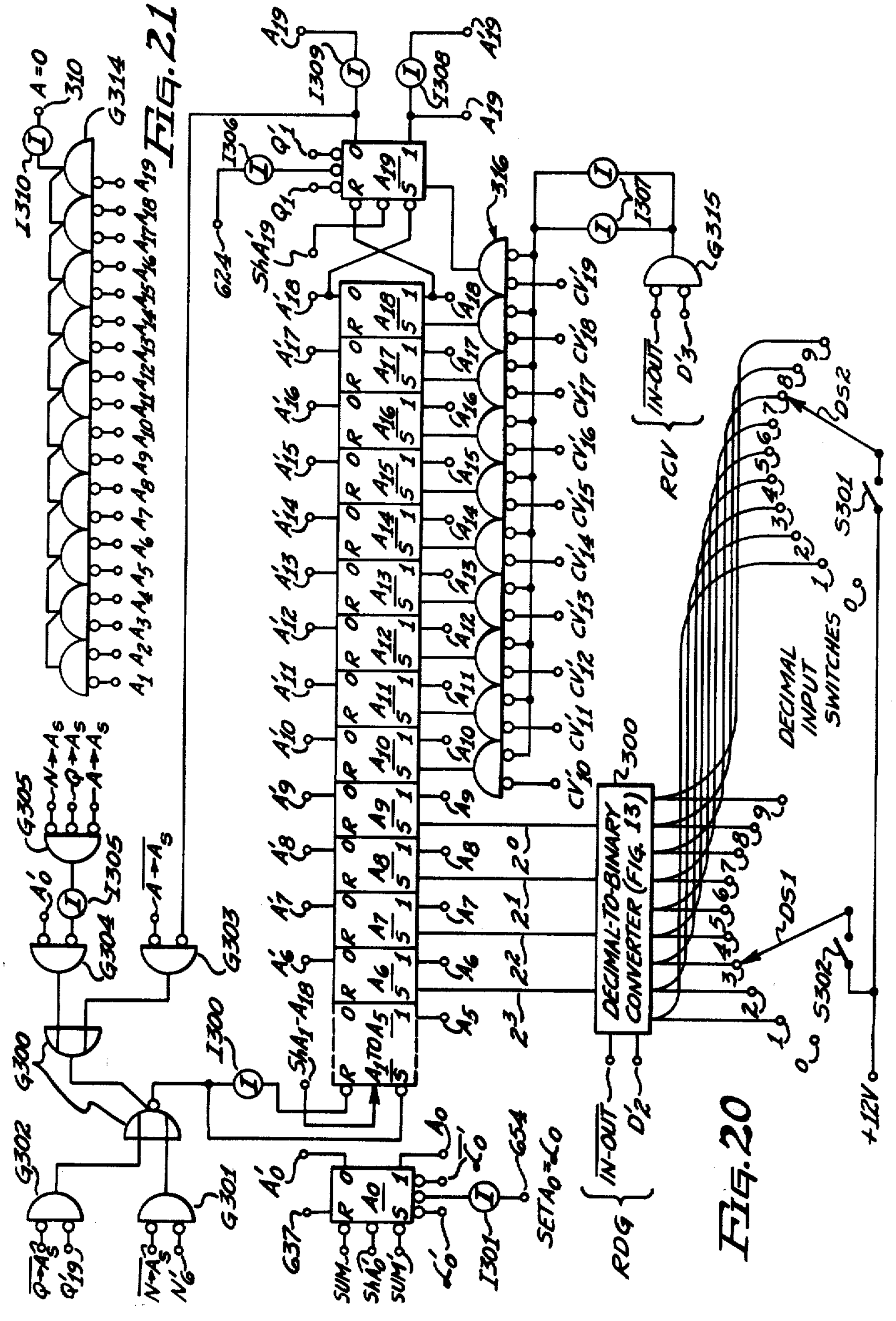
FIG. 20 illustrates a logic diagram of the A-register and its control means.
FIG. 21 illustrates a logic diagram of a circuit for determining when the binary value of the contents of the A-register is equal to zero.

This command is used to read binary-coded decimal information into $A_6$ to $A_9$ from a selected decimal input switch as shown in FIG. 20. The flip-flops $A_6$ to $A_9$ must be cleared before giving this command.

RCV READ CONVERTER
060460 (2, 3, 8, 11, 12)

The contents of an external analog-to-digital register ($CV_{10}$ to $CV_{19}$) are transferred into $A_{10}$ to $A_{19}$ through a bank of AND-gates G316 shown in FIG. 20. The A-register must be cleared before giving this command. The contents of the CV-register remain unchanged.

*Basic Command Decoding*

The section for decoding the basic command portion of an instruction is illustrated in FIG. 43 as noted hereinbefore. That section decodes the four bits of the instruction in stages $\alpha_0$, $\alpha_1$, $\alpha_2$ and $\alpha_3$ of the $\alpha$-register and transmits an appropriate command signal to other sections of the computer or generates $GEN_1$ and $GEN_2$ signals which are employed for further decoding of all other instructions. Thus, the decoding section of FIG. 43 does not decode all commands completely; it completely decodes only the commands which are written in Format I. All other commands described in the foregoing digest are further decoded with $GEN_1$ or $GEN_2$ signals in decoding sections illustrated in FIGS. 31 to 33.

Instruction decoding takes place during the first instant of the word-time allowed for execution of the instruction sequencing; i.e., when the flip-flop F705 (FIG. 27) is set and its true output terminal which is connected to an inverter I1600 in FIG. 43 is driven to 0 volts. The +6 volt signal output of the inverter I1600 enables all AND-gates G1601 to G1625, except G1609, G1619 and G1624, to decode a given instruction and provide a command signal at an appropriate output terminal. For instance, an instruction to load the contents of the A-register into a given memory location is decoded by AND-gates G1601, G1605 and G1610 to provide an LDA signal at the output terminal of the AND-gate G1610. The other command signals ADD, STA, SUB, STQ, LDX, ADX, STX and ADI are similarly provided. If a command requires an operand such as the command LDA, the operand is located before the instruction sequencing section initiates the execute operation. If no operand is required, the search for an operand is omitted and the instruction sequencing section immediately initiates an execution of the command. Accordingly, instruction sequencing governs the time at which a given instruction loaded into the $\alpha$-register is decoded.

As noted hereinbefore in connection with the description of FIG. 27, the flip-flop F706 is set at $\phi_1'L_2'$ time if the current instruction to be executed is a one-plus-one address instruction and the instruction sequencing section will not advance directly from LOAD $\alpha$ to EXECUTE but instead will advance through LOAD $\alpha$, LOAD $\beta$ and search for the operand before the EXECUTE operation unless the instruction does not require a search for an operand but is nevertheless written as a one-plus-one address instruction in order to continue the sequence of instructions from some other location. Those instructions include all of the commands which require a $GEN_1$ signal to complete instruction decoding. The AND-gate (FIG. 43) is enabled by a $GEN_1$ or $GEN_2$ code (0011) and a LOAD $\beta'$ signal in order to produce an $\overline{\alpha\ FND}$ signal through OR-gate G847, inverter 1800 and OR-gate G820 (FIG. 28). The forced $\overline{\alpha\ FND}$ signal is applied to the OR-gate G705 to cause the flip-flop F705 to be set next instead of the flip-flop F704 (FIG. 27). In that manner both the instruction registers are loaded before the instruction is executed.

All of the instructions which require a $GEN_2$ signal are also written as one-plus-one address instructions although none requires an operand, the reason being that all have a branch command in the operation code portion of the first word and must therefore load a second word into the $\beta$-register, but only if the condition specified is present. Accordingly, the execution of a branch command consists of making a test for a specified condition before the instruction sequencing section allows the second word to be loaded into the $\beta$-register. That is accomplished by allowing the operation code to be decoded when the flip-flop F703 is set and a LOAD $\beta$ signal is transmitted to the AND-gate G1609. That occurs immediately after an $L_{21}'$ pulse sets the flip-flop F703 and actual loading of the $\beta$-register does not begin until an $L_2'$ pulse sets the flip-flop F934 (FIG. 29) so that five bit-times or approximately twenty microseconds are provided to decode and execute the command, which consists of making a decision whether to branch. If the decision is to not branch, the AND-gate G716 (FIG. 27) is inhibited from transmitting a 0 volt signal to the OR-gate G909 (FIG. 30) (thereby preventing the contents of the $\beta$-register from being altered) and the $L_{21}'$ pulse at the end of the LOAD $\beta$ word-time sets the flip-flop F702 (FIG. 27) to allow the normal next instruction to be loaded into the $\alpha$-register. If the decision is to branch, the address of the next instruction is loaded into the $\beta$-register and the $L_{21}'$ pulse at the end of the LOAD $\beta$ word-time sets the flip-flop F705. During the word-time that the flip-flop F705 is set, the sector in which the normal next address is located is skipped.

Besides the $GEN_2$ type of commands, two other commands require early decoding and execution. One is the BXH command which is decoded and executed when a LOAD $\beta$ signal enables the AND-gate G1609 (FIG. 43). The second is a BXL command which has the same operation code as the BXH command and is therefore decoded and executed as a BXH command. The execution of the BXH and BXL commands is described hereinafter with reference to FIG. 39. For each, an $\overline{\alpha\ FND}$ signal is forced in the same manner as for $GEN_2$ type of commands.

Two instructions which may be written as one-plus-one address instructions but which do not require an operand are instructions having BRU and INX operation codes. Both are partially decoded by AND-gates which are not enabled until the flip-flop F705 (FIG. 27) is set and partially decoded by an AND-gate G1604 which transmits a +6 volt signal to an output terminal 1605 which is connected to an AND-gate G846 in FIG. 28. The second input terminal of that AND-gate is coupled to a pair of AND-gates G843 and G844. The latter, together with the signal at the input terminal 1605 of the AND-gate G846, decodes the INX command and the former similarly decodes a BRU command. In that manner an $\overline{\alpha\ FND}$ signal is forced and the flip-flop F705 is set instead of the flip-flop F704 of the instruction sequencing section when the BRU or the INX command is part of a one-plus-one address instruction. To execute the BRU command, the contents of $\alpha_4$ to $\alpha_{17}$ are shifted into the $\beta$-register as described hereinbefore with reference to FIG. 30 and to execute the INX command, the contents of $\alpha_7$ to $\alpha_{17}$ are algebraically added to the contents of the X-register as described hereinbefore with reference to FIG. 24. Since both require that the $\alpha$-register be shifted while being executed, flip-flops F1602 and F1603 are provided to store the respective INX and BRU command signals while the commands are being executed.

The MPY and DVD commands also require that the $\alpha$-register be shifted while the flip-flop F705 (FIG. 27) is set. Accordingly, flip-flops F1600 and F1601 are provided to store the MPY and DVD command signals while the $\alpha$-register is loaded with an operand.

The output terminals of the basic command decoding section are identified by reference characters which correspond to the mnemonic codes of the command signals which they produce. Some command signals are produced through inverters when their complement is required and when more power to drive control circuits is required, such as for the DVD command signal.

*Decoding $GEN_1$ and $GEN_2$ Commands*

As noted hereinbefore, decoding $GEN_1$ and $GEN_2$ commands is accomplished by examining positions 5 to 15 of the $\alpha$-register when the $GEN_1$ and $GEN_2$ signals are provided by decoding 0011 in the first four positions of the command. Signals generated in the $GEN_1$ and $GEN_2$ command decoding section are transmitted to other sections of the computer to control the operations required to execute the command. The chart in FIG. 44 illustrates the manner in which the positions 5 to 15 are combined in a command to specify different operations. Shift and transfer control signals are generated directly by the $GEN_1$ and $GEN_2$ command decoding section upon decoding positions 5 to 15 but as noted hereinbefore the external effect, input-output and branch command signals are not generated directly. Instead positions 5 to 8 are decoded to obtain EX-EFF, IN-OUT, BR–1 and BR–2 signals. Bit positions $\alpha_9$ to $\alpha_{12}$ are decoded to produce $D_0$ to $D_9$ signals. The $D_0$ to $D_9$ signals are combined with the EX-EFF, IN-OUT, BR–1 and BR–2 signals to control the specified operation.

Figure 31:
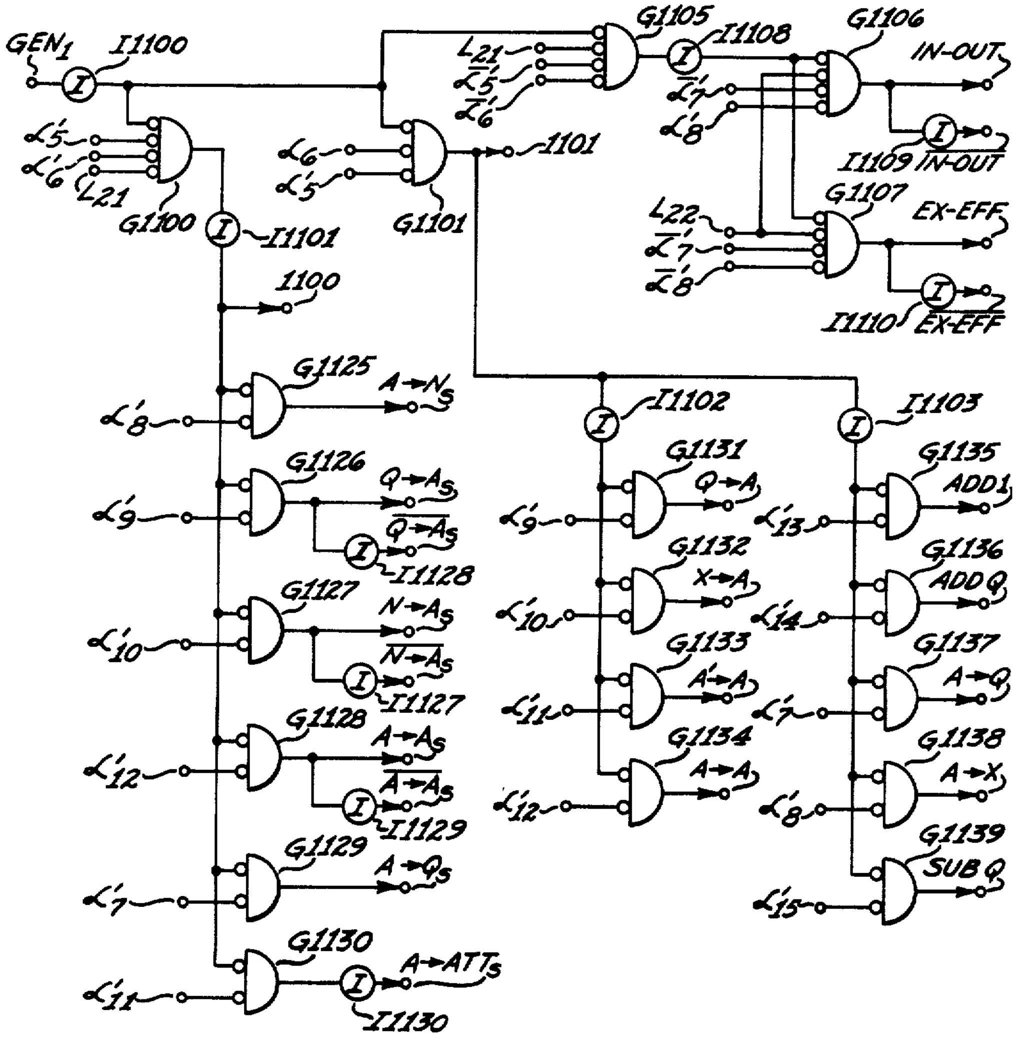
FIG. 31 illustrates a logic diagram of a circuit for partially decoding general instructions of one type.

The $GEN_1$ command decoding section illustrated in FIG. 31 comprises AND-gates G1100, G1101 and G1108 to G1139. A $GEN_1$ signal coupled by an inverter I1100 to an AND-gate G1100 is combined with $\alpha_5'$ and $\alpha_6'$ to obtain a +6 volt shift control signal at an output terminal 1100 through an inverter I1101. An $L_{21}$ pulse is also applied to the AND-gate G1100 so that the shift control signal at the output terminal 1100 is present only from the trailing edge of an $L_{21}$ pulse until the leading edge of the next $L_{21}$ pulse which is from time $L_{21}$ of an execute operating word-time.

The shift control signal is coupled to input terminals of AND-gates G1125 to G1130 to enable a bit 1 signal to be transmitted by those AND-gates coupled to stages of the α-register storing a bit 1 and thereby transmit the shift control signals indicated in the chart of FIG. 44. Each specific shift control signal controls the serial shift of a specified register to a second specified register. Inverters are provided for appropriate ones of the signals to obtain the complementary signal as required by the circuits controlled as is described hereinafter. It should be noted that the A-register is always one of the registers to be shifted for any shift operation. Accordingly, the +6 volt shift signal at the output terminal is applied to the AND-gate G405 (FIG. 23) of the A-register control section to develop shift pulses to be developed for positions 1 to 19. The sign position is not shifted so that vacated positions are filled with the sign bit in position 0 unless data is being shifted into the A-register.

All shift instructions are written in Format III and include the shift command in positions 0 to 12 and the shift length in positions 13 to 17. A shift counter is preset by positions 13 to 17 of the α-register as described hereinafter with reference to FIG. 42 and counts each shift pulse applied to the last stage of the A-register until the data being shifted has been shifted the specified number of places after which transmission of shift pulses to the registers involved is inhibited.

Then $GEN_1$ signal is also coupled by the inverter I1100 to the AND-gate G1101 where it is combined with $\alpha_5$ and $\alpha_6$ to produce a word-transfer control signal at an output terminal 1101. That word-transfer control signal is coupled by inverters I1102 and I1103 to a plurality of AND-gates *G1131* to G1139 to be combined with different ones of the signals $\alpha_7'$ to $\alpha_{15}'$ from the α-register in order that the word-transfer control signals specified may be generated as described with reference to the chart of FIG. 44.

EX-EFF and IN-OUT control signals are obtained by decoding instructions pertaining to some input-output peripheral equipment or some external effect. Decoding of those instructions is accomplished by decoding a 00 code in positions $\alpha_5$ and $\alpha_6$ with the $GEN_1$ signal at an AND-gate G1105 which is inhibited from transmitting a decoded signal during the occurrence of an $L_{21}$ pulse. The decoded signal from the AND-gate G1105 is coupled by an inverter I1108 to two AND-gates G1106 and G1107. The AND-gate G1105 decodes positions 7 and 8 of the α-register to produce an IN-OUT signal only when a 01 code is present in those positions. The complement of the IN-OUT signal is obtained through an inverter I1109. An external effect control signal is obtained by decoding positions 7 and 8 of the α-register at the AND-gate G1107 with the decoded signal from the AND-gate G1105. An $L_{22}$ pulse inhibits both AND-gates G1106 and G1107 from decoding during its occurrence so that an EX-EFF and an IN-OUT signal may not be present for eight microseconds following the initiation of an EXECUTE signal by the leading edge of an $L_{21}$ pulse applied to the flip-flop F705 of the instruction sequencing section in FIG. 27.

Figure 33:
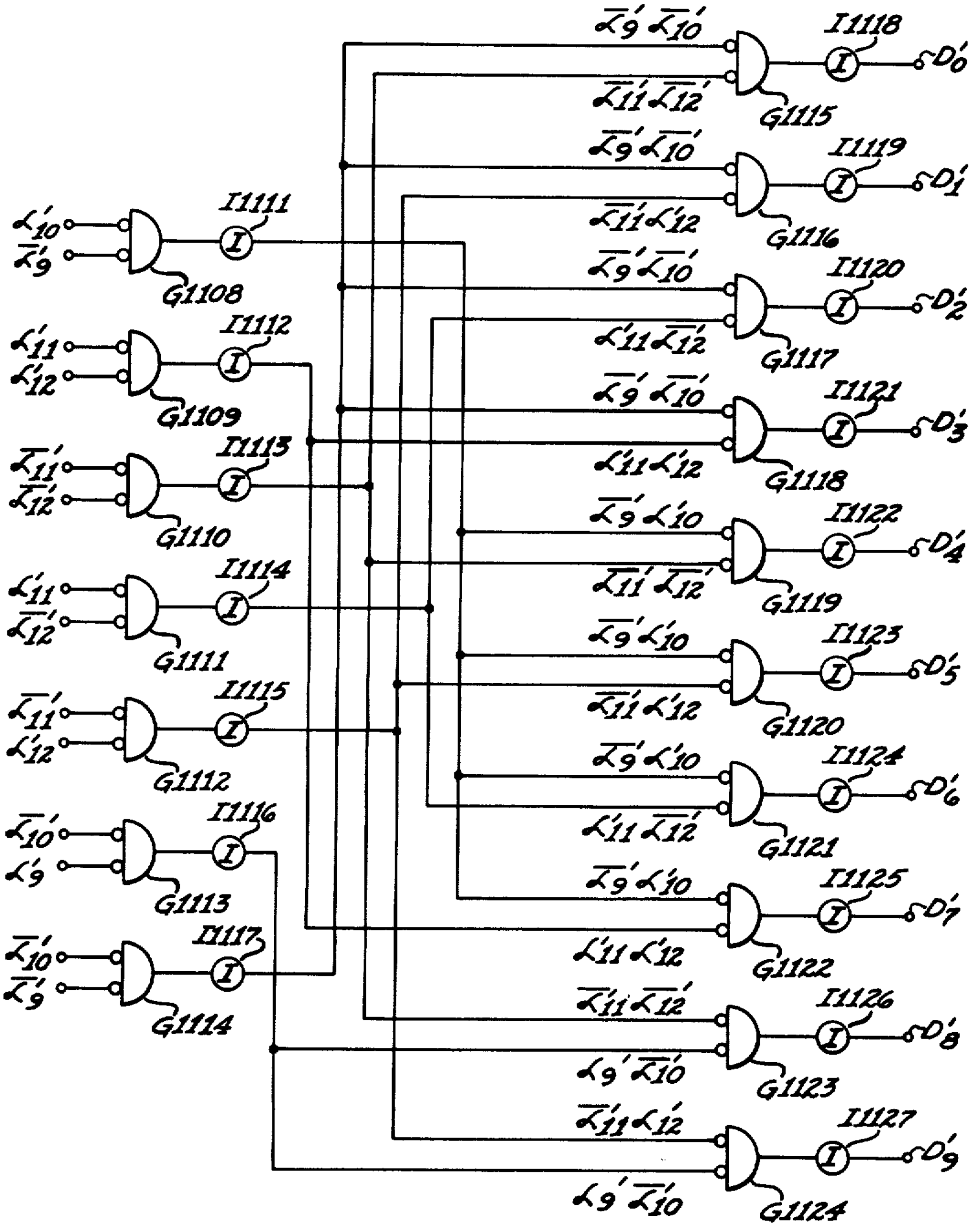
FIG. 33 illustrates a logic diagram of a circuit for partially decoding some of the instructions of the one type and partially decoding all of the instructions of the second type.

The decoding section for positions 9 to 12 of the α-register illustrated in FIG. 33 comprises a plurality of AND-gates G1108 to G1124. Of those gates, the AND-gates G1115 to G1124 produce $D_0$ to $D_9$ signals according to the codes illustrated in the chart of FIG. 44. Inverters I1118 to I1127 are provided to couple the complementary signals $D_0'$ to $D_9'$ to output terminals designated $D_0'$ to $D_9'$ in order that a given one of the complementary signals may be employed for further instruction decoding through AND-gates in a manner described in connection with illustrative EX-EFF and IN-OUT commands.

Decoding of test and branch instructions is accomplished with a $GEN_2$ signal at AND-gates G1102 to G1104 illustrated in FIG. 32. A $GEN_2$ signal is coupled by an inverter I1104 to an input terminal of the AND-gate G1102 to decode a 00 code in positions 5 and 6 of the α-register and to produce an output signal transmitted through an inverter I1105 to the AND-gates G1103 and G1104. The latter gates decode the codes 10 and 11 in positions 7 and 8 of the α-register to produce a BR–2 signal at the output terminal of the AND-gate G1103 and a BR–1 signal at the output terminal of the AND-gate G1104. Inverters I1106 and I1107 are provided to transmit the complement of the respective BR–2 and BR–1 signals to the branch testing and decoding section illustrated in FIG. 39 where they are employed with $D_0'$ to $D_9'$ signals to determine what test should be made for a given branch instruction.

*Test and Branch Command Decoding*

The branch testing and decoding section of FIG. 39 controls the sequence of computer operation when the instruction being executed is a conditional branch command since, as noted hereinbefore, a conditional branch command is employed to cause the computer to make a given test for a specified condition and determine whether to continue with the same sequence of instructions or to branch to some other sequence of instructions. The decoding section of FIG. 39 decodes the command portion of the instruction by combining a BR–1 or BR–2 signal from the general instruction decoding section of FIG. 32 with one of the $D_0'$ to $D_7'$ signals present and simultaneously makes the test for the specified condition. The decoding operation is accomplished by applying the $\overline{BR-1}$ and $\overline{BR-2}$ signals to respective AND-gates G1308 and G1309 the second input terminal of each being coupled by respective OR-gates G1303 and G1304 in series with inverters I1301 to I1302 to two separate groups of AND-gates each of which tests for a condition specified by one of the signals $D_0'$ to $D_9'$ which must be present in order for the branch command to cause the address of an instruction of a new sequence to be loaded into the β-register.

The AND-gate G1301 is employed to decode a BZE command to branch if the contents of the A-register are zero. From the chart of FIG. 44 it is seen that the combination of a $\overline{BR-1}$ signal and a $D_0'$ signal specifies a BZE command. The information for the test is obtained from the A-register by an AND-gate G310 in FIG. 21 which has nineteen input terminals each connected to a different one of the false output terminals of the stages $A_1$ to $A_{19}$ in the A-register. All input terminals of the AND-gate G310 must be at a +6 volt level in order for an "$A=0$" signal to be transmitted through an inverter I310 to an input terminal 310 of the AND-gate G1301 in FIG. 39. In the present embodiment of the invention only a positive zero is permitted. Accordingly, in order for the contents of the A-register to be zero the first stage $A_0$ must contain a bit 0. The true output terminal $A_0$ of that stage is also connected to an input terminal of the AND-gate G1301 to complete a test for a zero in the A-register. If a zero is present in the A-register, a signal presented at the output terminal of the AND-gate G1301 is transmitted through the OR-gate G1303 and the inverter I1301 to inhibit the AND-gate G1308 so that its output terminal remains at +6 volts and the output terminal of an OR-gate G1318 remains at 0 volt levels. Under those conditions the AND-gate G1319 remains disabled and the flip-flop F1300 is not set by an $L_0'$ pulse. Since branch decisions are made at the beginning of a LOAD $\beta$ operation controlled by the flip-flop F703 of the instruction sequencing, the test for the condition specified in a given branch instruction is completed before the $\beta$-register is ready to be loaded.

If the test is not successful, the AND-gate G1319 is enabled and an $L_0'$ pulse applied to it is transmitted to the flip-flop F1300 to place it in its set state so that its true output terminal is driven to a 0 volt level. When the true output terminal of the flip-flop F1300 is at a 0 volt level, the AND-gate G716 in the instruction sequencing section (FIG. 27) is disabled and a LOAD $\beta$ signal being transmitted by it to an output terminal 716 is cut off. Under those circumstances the address of the next instruction, the address of the first instruction in the new sequence of instructions, is not loaded into the $\beta$-register and the normal next instruction is loaded into the $\alpha$-register from the track specified by the address in the $\beta$-register during the following word-time. But if the test is successful the flip-flop F1300 is not set as just described and its true output terminal remains at +6 volts, thereby continuing to enable the AND-gate G716 to transmit a LOAD $\beta$ signal. Thereafter a search for the next instruction to be loaded into the $\alpha$-register is made and, when it is found in the location specified by the address loaded into the $\beta$-register in response to the branch instruction, it is read and executed as the first of a new sequence of instructions.

Other branch instructions are decoded and executed in a similar manner. A branch on plus (BPL) command is decoded by a $D_1'$ signal at an input terminal of the AND-gate G1302 in combination with a $\overline{BR\text{-}1}$ signal at the input terminal of the AND-gate G1508. The test for a BPL command is automatically made by the AND-gate G1302 because its second input terminal is connected to the true output terminal of the sign position in the A-register. A branch on minus (BMI) command is similarly decoded and tested by the AND-gate G1306. A branch on odd (BOD) command is decoded and tested by the AND-gate G1307. To determine if the contents of the A-register are odd, the least significant bit position (stage $A_{19}$) is tested for the presence of a bit 1 which causes its false output terminal $A_{19}'$ to transmit a +6 volt signal that enables the AND-gate G1307 and causes the AND-gate G1319 to be disabled so that the flip-flop F1300 is not set by an $L_0'$ pulse. A command to branch if a digital clock is ready (BCL) is decoded and tested by the AND-gate G1314. If the clock is ready, a contact is closed which produces a +6 volt signal at an input terminal 1314 to enable the AND-gate G1314 and disable the AND-gate G1319. A command to branch on overflow (BOV) is similarly detected and executed by the AND-gate G1300 except that the state of an overflow indicator 1450 (FIG. 41) is tested. If the overflow indicator is on, a +6 volt signal OV' enables the AND-gate G1300 and disables the AND-gate G1319 so that the address of the first of a new sequence of instructions is loaded in the $\beta$-register. A BOV command signal is simultaneously transmitted through an inverter I1300 to an AND-gate G1442 (FIG. 41) to enable the overflow indicator to be turned OFF by an $L_{20}'$ pulse.

The second group of branch instructions is similarly decoded and executed. The command to branch on typewriter ready (BTR) is decoded and a test for the presence of a +6 volt signal at an input terminal 210 is made to determine if a type operation has been executed. A branch on reader ready command (BRR) is similarly decoded and executed to cause the address of the next instruction to be loaded into the $\beta$-register if the paper-tape reader indicates it is ready to read another character by allowing a +6 volt signal to be presented at the input terminal 210. It should be noted that the +6 volt signal which enables both types of branch commands BTR and BRR is produced by the same AND-gate G210 in FIG. 19 when both relay contacts 222 and 226 are closed as is described hereinafter with reference to the N-register and its control for input and output operations. Therefore either a BTR or a BRR operation code may be used for both instructions and the AND-gate G1310 or G1305 associated with the unused operation code employed for some other branch decoding and decision making function, and the same operation code, which may be given the mnemonic code EMA for electromechanical action complete, may be similarly employed with other input or output apparatus as hereinafter described with reference to FIG. 19.

A command to branch if two stepping switches not shown are home or reset (BSH) is decoded and tested by an AND-gate G1311 and a command to branch if a first one of the stepping switches is in an odd position (BS1) and a command to branch if the second stepping switch is in an odd position (BS2) are decoded and tested by AND-gates G1312 and G1321, respectively. A command to branch if a specified analog-to-digital conversion is complete (BCC) is decoded and tested by an AND-gate G1315. The BCC command provides for a branch in the program if a random relay scanner not shown has completed its operation, including an analog-to-digital conversion. A command to branch if the analog-to-digital converter turns an overflow indicator on (BCO) is decoded and tested by an AND-gate G1316. If the overflow indicator is on, a +6 volt signal is present at an input terminal 1316 to enable the AND-gate G1316 and disable the AND-gate G1319, thereby causing the address of the next instruction to be loaded into the $\beta$-register. A command to branch on a parity error (BPE) is decoded and tested by an AND-gate G1322. If a parity error has occurred, a +6 volt signal is present at input terminal 1322 since it is connected to the false output terminal of a set flip-flop F1203 in the parity error detector circuit of FIG. 34. When a parity error is detected, the AND-gate G1322 is enabled thereby disabling the AND-gate G1319 and causing the address of the next instruction to be loaded into the $\beta$-register. Other branch commands, both of the internal test and branch type and of the external test and branch type, may be implemented as the need arises by either reassigning combinations of BR–1 or BR–2 signal codes with $D_0$ to $D_9$ signal codes or by increasing the branch decoding and decision making section of FIG. 39, as by adding additional AND-gates to additional input terminals of the OR-gates G1303 and G1304. A still greater number of branch commands may be accommodated by also adding AND-gates in the circuit of FIG. 33 to decode the six other possible bit configurations which may be placed in positions $\alpha_9$ to $\alpha_{12}$ in order to produce $D_{10}$ to $D_{15}$ signals that may be combined with either a BR–1 or a BR–2 signal to provide twelve additional branch command codes.

*Basic Branch Commands*

Having described the execution of general branch commands, the execution of basic branch commands will be described. The basic branch commands are to branch if X is high (BXH), to branch if X is low (BXL) and to branch unconditionally (BRU). Each is decoded by the basic command decoding section of FIG. 43 as described hereinbefore. The BRU command signal sets the flip-flop F1603 to inhibit instruction decoding while the branch operation is executed by serially shifting a track and sector address of the next instruction from the $\alpha$-register into the $\beta$-register as described hereinbefore with reference to the instruction register, $\alpha$ and $\beta$. The execution of BXH and BXL commands is more complex.

An instruction to branch if the contents of the X-register are equal to or greater than a reference constant K is written in the Format IV illustrated in FIG. 16. The octal code for it is 160 so that the bit configuration of positions $\alpha_0$ to $\alpha_6$ is 0111000. The constant with which the binary value of the contents of the X-register is to be compared is written in a two's complement form in positions 7 to 17 of the instruction. Since the instruction is a branch instruction, it must be written as a one-plus-one address instruction by placing a bit 1 in the eighteenth position of the instruction. The address of the next instruction to which the computer operation is to branch if the contents of the X-register are equal to or greater than the constant K is written as the second word of the instruction in the next memory sector of the same track as the first word so that it may be loaded into the $\beta$-register. In order to execute the command, it is necessary for the contents of the X-register to be added to the constant K written in the two's complement form in the instruction as the first instruction word is read into the $\alpha$-register. In order that the contents of the X-register may be added to the constant K in that manner, a bit 1 is written into the nineteenth position of the first instruction word. Since that bit is read first, it is detected and employed to enable the control section of the X-register to cause its contents to be added to the constant K as the instruction is serially read into the $\alpha$-register.

If the contents of the X- register are equal to or greater than K, the addition of the contents of the X-register to the two's complement of K will produce a carry signal into the next most significant position $\alpha_6$ as the instruction is loaded into the $\alpha$-register. Since the instruction is written so that it contains a bit 0 in position 6, a bit 1 present in that position after the instruction is stored in the $\alpha$-register indicates that the binary value of the contents of the X-register is equal to or greater than the binary value of the constant K. Accordingly, the decision of whether to branch is made by testing for a bit 1 in $\alpha_6$. That is accomplished by an AND-gate G1317 having one input terminal connected to the BXH' output terminal of the basic command decoding section in FIG. 43 and a second input terminal connected to an $\overline{\alpha}'$ output terminal of the $\alpha$-register (FIG. 29). When the content of $\alpha_6$ is a bit 0, both input terminals of the AND-gate G1317 are at a +6 volt level so that the AND-gate G1319 is enabled and the flip-flop F1300 is set by an $L_0'$ pulse to inhibit loading the $\beta$-register with the address of a new instruction. However, when the content of $\alpha_6$ is a bit 1 as a result of a carry propagated into that position, the AND-gates G1317 and G1319 are disabled so that the flip-flop F1300 is not set by an $L_0'$ pulse and the $\beta$-register is loaded with the address of a new instruction, the first instruction of a new sequence of instructions.

An instruction to branch if the contents of the X-register are less than a specified constant is written, decoded and executed in the same manner as an instruction to branch if the contents of the X-register are equal to or greater than a specified constant except that a bit 1 is written in position 6 of the instruction as part of the operation code so that a branch will be executed unless the contents of the X-register are equal to or greater than the specified constant, in which case a bit 1 carry is propagated and added to the bit 1 in position 6 with the result that a bit 0 is stored in $\alpha_6$. Since the operation code for a BXL command is the same as for a BXH command in positions 0 to 3 as indicated in the chart of FIG. 44, the same AND-gate G1619 produces a command signal for both the BXH and the BXL commands and enables the AND-gate G1317 to test for a bit 1 in $\alpha_6$ before it is time to load the $\beta$-register. If a bit 1 is detected in that position for a BXL command, the AND-gates G1317 and G1319 are not enabled, the flip-flop F1300 is not set and the address of the next instruction is loaded into the $\beta$-register.

If the flip-flop F1330 is set when executing a BXL or a BXH command, the AND-gate G716 is disabled and the OR-gate G711 is enabled as described hereinbefore with reference to FIG. 27. Under those circumstances, the Head Selection Register (FIG. 45) is not changed and the normal next instruction is read into the $\alpha$-register during the word-time immediately following the word-time that the flip-flop F703 is set. Thus if the BXL or BXH command is read from sector $n$ of track T, the normal next instruction is read from sector $n+2$ of track T. But if the flip-flop F1300 is not set, the AND-gate G716 remains enabled and the address of the next instruction is read from sector $n+1$ of track T. Thereafter, the instruction sequencing section switches from a LOAD $\beta$ operation to an EXECUTE operation because an operand is not required. Since an operand is not required, the Head Selection Register is set to correspond with the contents of the $\beta$-register in advance through an AND-gate G718 enabled by the set flip-flop F705 and a BXH or BXL command signal just as for the execution of an INX command or either a $GEN_1$ type of instruction or a $GEN_2$ type of instruction, which type includes all other branch instructions except the instruction to branch unconditionally (BRU). There is one difference between the branch instructions and all other instructions which do not require an operand: no action is executed during the word-time that the flip-flop F705 and the time is devoted to skipping over the sector $n+2$ of the normal next instruction as noted hereinbefore.

MEMORY SECTION

As noted hereinbefore, the memory section which holds both program instructions and data in the illustrative embodiment of the present invention includes a magnetic drum. The cylindrical surface of the drum is coated with a material such as a dispersion of iron oxide particles in a suitable binder which can be locally magnetized to store bits of values 0 and 1. The read-write heads employed (only a few of which are illustrated in FIG. 1) are electromagnetic transducers placed at regular intervals in the axial direction of the drum so that as the drum is rotated, a separate data track is scanned by each read-write head. The tracks are divided into groups, each group having eight tracks and every track is divided into 128 sectors. Each sector may store a group of digital signals referred to as a word consisting of twenty bits plus a parity-check bit. A period of ninety-six microseconds is required for a sector to pass under its read-write head although only eighty-four microseconds are required to read a word stored therein so that a twelve microsecond buffer period is provided between words as described hereinbefore with reference to FIGS. 15 to 17. To locate a given word, its location in memory must be specified by track and sector.

As many as 128 read-write heads may be arranged in groups of eight, each read-write head being associated with a separate track, to provide a memory capacity of 16,384 words. A given word on a track may be located once during each drum revolution or once every 12.5 milliseconds with a drum revolution of 4800 r.p.m. Therefore, the average memory access time for a word specified at random is 6.25 milliseconds. If faster access is required for information stored on a specified track, two or more read-write heads displaced circumferentially may be employed to scan the track so that a given word may be located as many times during each drum revolution as there are heads, thereby decreasing the average memory access time for the specified track. If faster access is provided for a certain track and the number of read-write heads is not increased by the number of extra heads provided for that track, the total word capacity of the memory is necessarily decreased since each separate head-track combination has a memory capacity of 128 words and the total number of separate head-track combinations must be reduced by the number of extra heads associated with one track for faster random access.

In the present embodiment, 118 read-write heads are employed to provide 118 tracks of general data memory with a maximum word capacity of 14,592. Six additional read-write heads may be employed in pairs to provide three fast access tracks of memory and four other read-write heads may be employed to provide one track of even faster access. Data may be read out from or written into a general data track from a single read-write head associated with it under program control but data may be read out from or written into a fast access track by an associated one of a plurality of read-write heads. Therefore it will be assumed that there are 128 tracks in the following description of the memory addressing section, one for each read-write head although four of the tracks may be shared by more than one read-write head so that there may be only 122 different data tracks.

In addition to the data tracks, there are provided an index track and a clock track as described hereinbefore in the timing section. In addition to providing synchronizing signals for control throughout the various sections of the computer, the index and clock tracks are employed to locate specified memory locations. When a search is being made for a specific memory location in a given track, the read-write head associated with that track is selected by one of two head selection matrices and the specific memory location in the given track is located by counting sectors from the index pulse which marks the first sector until a word counter in FIG. 28 reaches a count equal to the number which specifies the desired location as determined by an address comparator also illustrated in FIG. 28. At that time the computer recognizes that the specified sector on the given track has been located and a word is read from or written into the sector which passes under the selected read-write head during the following word-time.

Fourteen binary digits are required to address a location in the memory section since it consists of 128 tracks divided into 128 sectors. Those binary digits are stored in positions 4 to 17 of an instruction word. If the instruction is a single-address instruction, those bits are stored in stages $\alpha_4$ to $\alpha_{17}$ of the $\alpha$-register after they are read from a memory location. They specify the address of an operand for the current instruction, an operand being either a word to be read out and processed or a location into which a word is to be stored. If the instruction is a one-plus-one address instruction, bit positions 4 to 17 of the second word are stored in stages $\beta_4$ to $\beta_{17}$ of the $\beta$-register. The fourteen binary digits stored in the $\beta$-register specify the address of an instruction. Each memory location address stored in either the $\alpha$-register or the $\beta$-register consists of a seven bit track address and a seven bit sector address. A sector address in the $\beta$-register is employed to locate only the first of a sequence of single-address instructions or to locate the next one-plus-one address instruction. For the second and subsequent single-address instructions, only the track portion of the address in the $\beta$-register is required.

As noted hereinbefore with reference to FIG. 16, the address portion of an instruction word may be specified by octal digits. Three are required to specify a sector and three are required to specify a track and the most significant octal digit in each case may be only a one or a zero. Thus the 128 sectors may be designated by the octal numbers 000 to 177 instead of the decimal numbers 000 to 127 or the binary numbers 0000000 to 1111111. The tracks may be similarly designated by octal numbers 000 to 177 wherein each track number actually refers to a specific read-write head and not necessarily to a separate and independent track.

Figures 46, 47, 48:
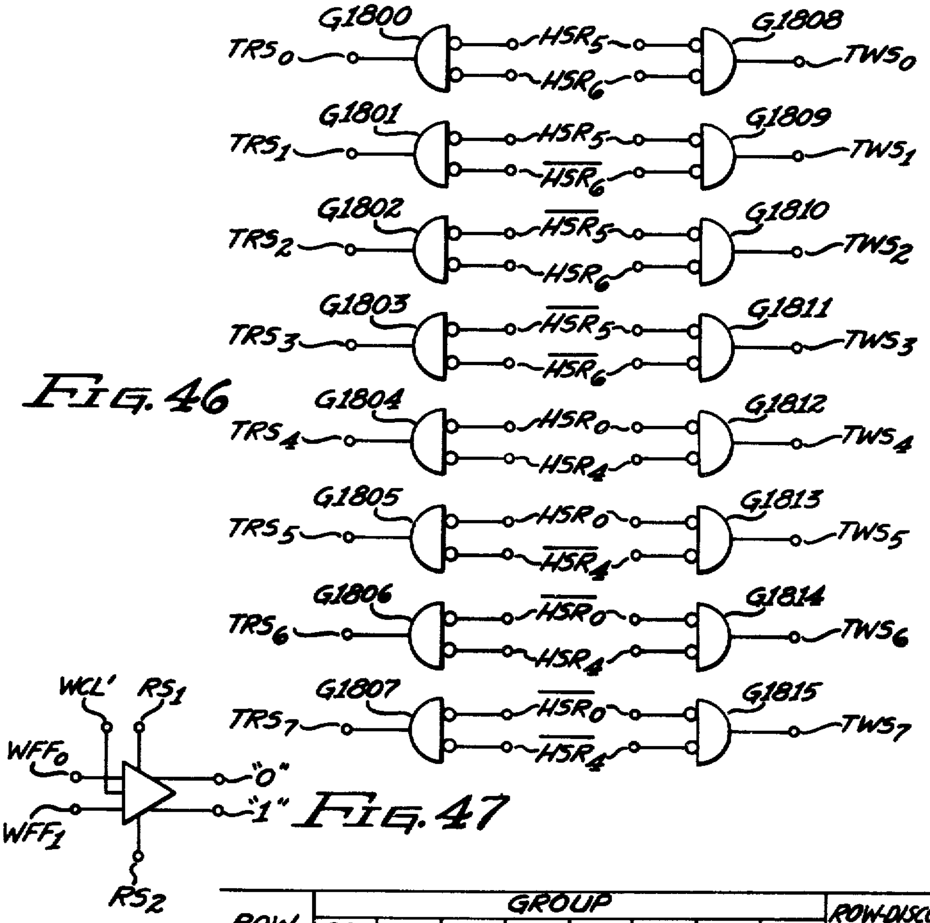
FIG. 46 illustrates a logic diagram of a circuit for decoding an address in the Head Selection Register of FIG. 45 and for generating a signal employed to select one of sixteen rows of magnetic read-write heads.
FIG. 47 illustrates a symbol employed in FIGS. 49 to 51 to represent the write amplifier circuit illustrated in FIG. 18.
FIG. 48 is a chart of the octal-code address for each of a plurality of 128 magnetic read-write heads.

For the purpose of implementing a head selection decoding and switching system, the 128 tracks are separated into eight groups, each group consisting of sixteen tracks. The chart in FIG. 48 illustrates the manner in which the tracks are separated into groups. It should be noted that the groups are arranged in columns $GS_0$ to $GS_7$. The middle digit of each octal code specifies the group in which a given track is placed. It should also be noted that the columns are divided into two sections such that rows 0 to 7 are in one section and rows 8 to 15 are in the other. The most significant octal digit specifies in which of the two sections a given track is placed. The least significant digit specifies in which row from 0 to 7 of a section a given track is placed. In that manner, to select a given track the most significant digit is employed to effectively switch to the appropriate section. Since each section consists of an eight by eight matrix, only two octal digits are required to specify the given track within the appropriate matrix, one digit for the column and one digit for the row. The manner in which the binary digits represented by the octal digits are actually decoded to select a read-write head associated with a specified track is described hereinafter following a description of the Head Selection Register. Following that is a description of the word-counter and address comparator illustrated in FIG. 28 to complete the memory section.

The Head Selection Register in FIG. 45 consists of a bank of seven double-steered buffer flip-flops $HSR_0$ to $HSR_6$ provided to store the track address of a memory location during the selection of a specified read-write head. It functions as a buffer between the instruction registers (the $\alpha$ and $\beta$-registers) and the head selection decoding and switching circuits. One set of steering inputs is provided to load the Head Selection Register from the $\alpha$-register and the other set to load it from the $\beta$-register.

The contents of the Head Selection Register are changed under the control of the instruction sequencing section (FIG. 27). When it is necessary to obtain a new instruction from a memory location after the execution of a one-plus-one address instruction, that is accomplished by one of three different ways. If it is an instruction which does not require an operand, the contents of bit positions $\beta_4$ to $\beta_{10}$ are transferred in parallel into the flip-flops $HSR_0$ to $HSR_6$ by a negative-going (+6 to 0 volts) signal at an input terminal 718 of a pair of OR-gates G1702 and G1703 in response to an $L_0'$ pulse applied to the enable AND-gate G718 of FIG. 27. If the instruction requires an operand, the Head Selection Register should not be loaded from the $\beta$-register so that the AND-gate G718 is not enabled and a negative-going (+6 to 0 volts) signal is not applied to an input terminal of the OR-gate G1703 until the flip-flop F705 is reset by an $L_{21}'$ pulse after the end of the word-time devoted to executing the instruction. To assure that the Head Selection Register is loaded from the $\beta$-register when the flip-flop F701 is set after a one-plus-one address instruction is executed, an AND-gate G1705 is provided. One of its input terminals is coupled to the false output terminal of flip-flop F701 to enable it to translate an $L_{22}'$ pulse through the OR-gates G1702 and G1703 to the trigger input terminals of the flip-flops $HSR_0$ to $HSR_6$. It should be noted that the output signals from the OR-gates when they are enabled by a negative-going signal are positive-going signals as required by the steering input circuits of the flip-flops.

When a one-plus-one address instruction read into the $\alpha$-register requires an operand, the flip-flop F704 (FIG. 27) is set until an $\overline{\alpha\ FND}$ signal is applied to the OR-gate G705 from the address comparator. That flip-flop is set by an $L_{21}'$ pulse. The $L_{22}'$ pulse which immediately follows is translated by an AND-gate G1704 (FIG. 45) through an OR-gate G1701 and an inverter I1710 to load the flip-flops $HSR_0$ to $HSR_1$ in parallel from positions 4 to 10 of the instruction in the $\alpha$-register. That is made possible by the connection of one input terminal of the AND-gate G1704 to the false output terminal of the set flip-flop F704. After the operand is found, the instruction is executed and the Head Selection Register is again loaded from the $\beta$-register.

When a single-address instruction is read into the $\alpha$-register, the flip-flop F705 is set as the flip-flop F702 is reset to cycle the instruction sequencing section directly into the EXECUTE operation. As the flip-flop F705 is set, the flip-flops $HSR_0$, $HSR_4$, $HSR_5$ and $HSR_6$ are loaded in parallel from positions 4, 8, 9 and 10 of the instruction in the $\alpha$-register. That is accomplished by a negative-going (+6 to 0 volts) signal from the true output terminal of the flip-flop F705 translated through the OR-gate G1701 to the trigger input terminals of those four Head Selection Register flip-flops as the flip-flop F705 is set. If the instruction is written in Format I so that it requires an operand, the command signal need only enable the arithmetic section to receive the operand as it is read from the track specified by the Head Selection Register. If the instruction is written in some other format so that it does not require an operand, the Head Selection Register is loaded with some meaningless track address so that some data is read but as the arithmetic register is not enabled by the decoded command to receive the data, no harm is done.

It should be noted that the group code of the track address is not changed when the Head Selection Register is loaded from the $\alpha$-register while executing a single-address instruction. The reason is that switching between groups may require more than two or three bit-times so that the memory section may not be ready to read the first bit of the operand. That imposes a requirement that the operand be located in one of the eight tracks of the group which includes the track from which the instruction is read. Similarly, switching between groups in order to return to the same track from which the instruction is read for the purpose of reading the next instruction may take so long as to cause the first bit of the instruction to be lost. If the Head Selection Register were to be loaded with some meaningless group code when a single-address instruction not requiring an operand is executed, that is what may happen since the meaningless group code could be the code of some other group. Consequently, it is for that reason that the contents of the flip-flops $HSR_1$, $HSR_2$ and $HSR_3$ are not permitted to be changed by the setting of the flip-flop F705. If the application of the computer should require that this limitation on group switching be eliminated, faster group switching circuits may be employed, then an OR-gate could be substituted for the inverter I1710 to couple the true output terminal of the flip-flop F705 to the trigger input terminals of the flip-flops $HSR_1$, $HSR_2$ and $HSR_3$.

*Head Selection Decoding*

Figure 49:
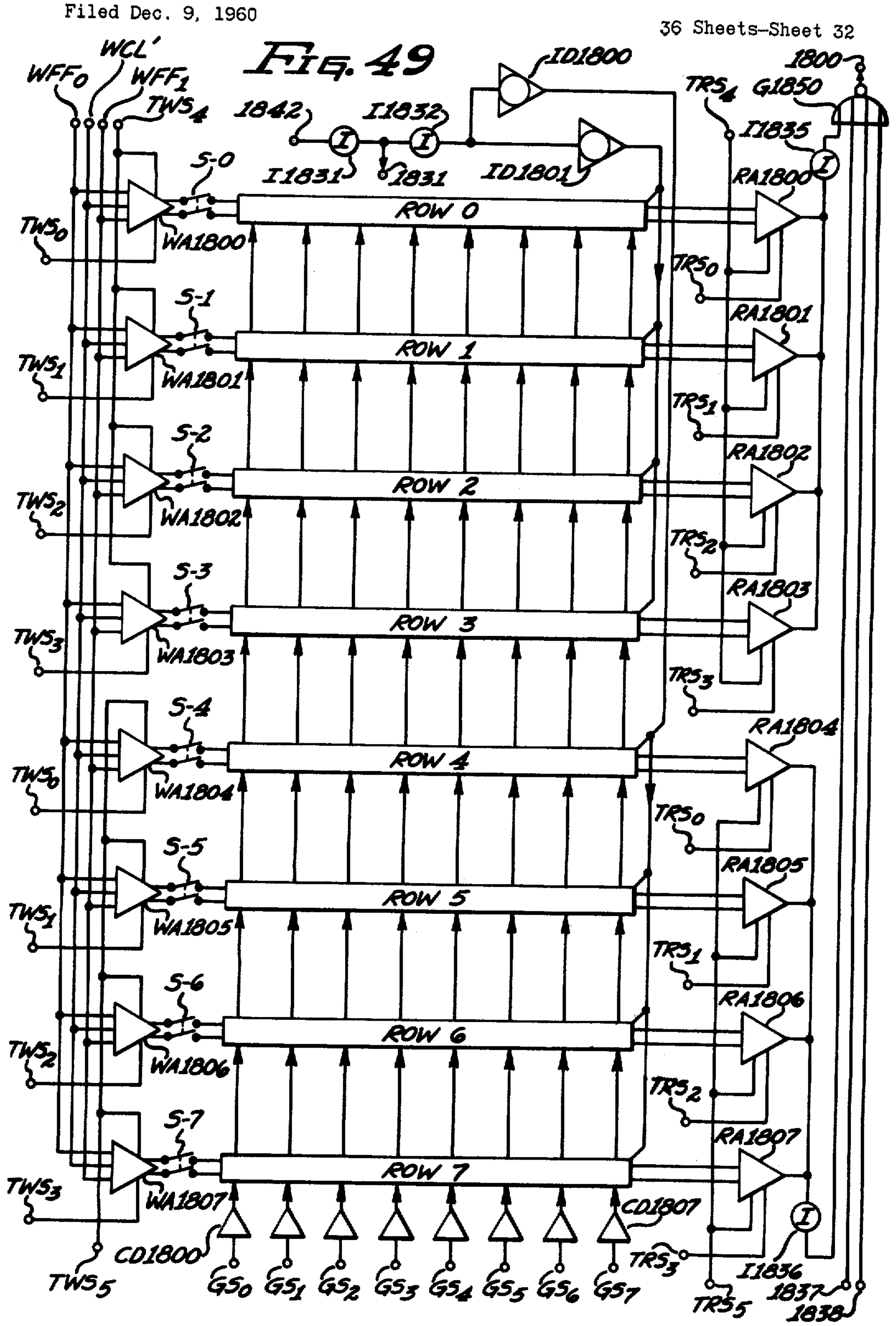
FIG. 49 illustrates the manner in which a magnetic read-write head may be selected from a first matrix of sixty-four heads by row and group selecting signals.
Figure 50:
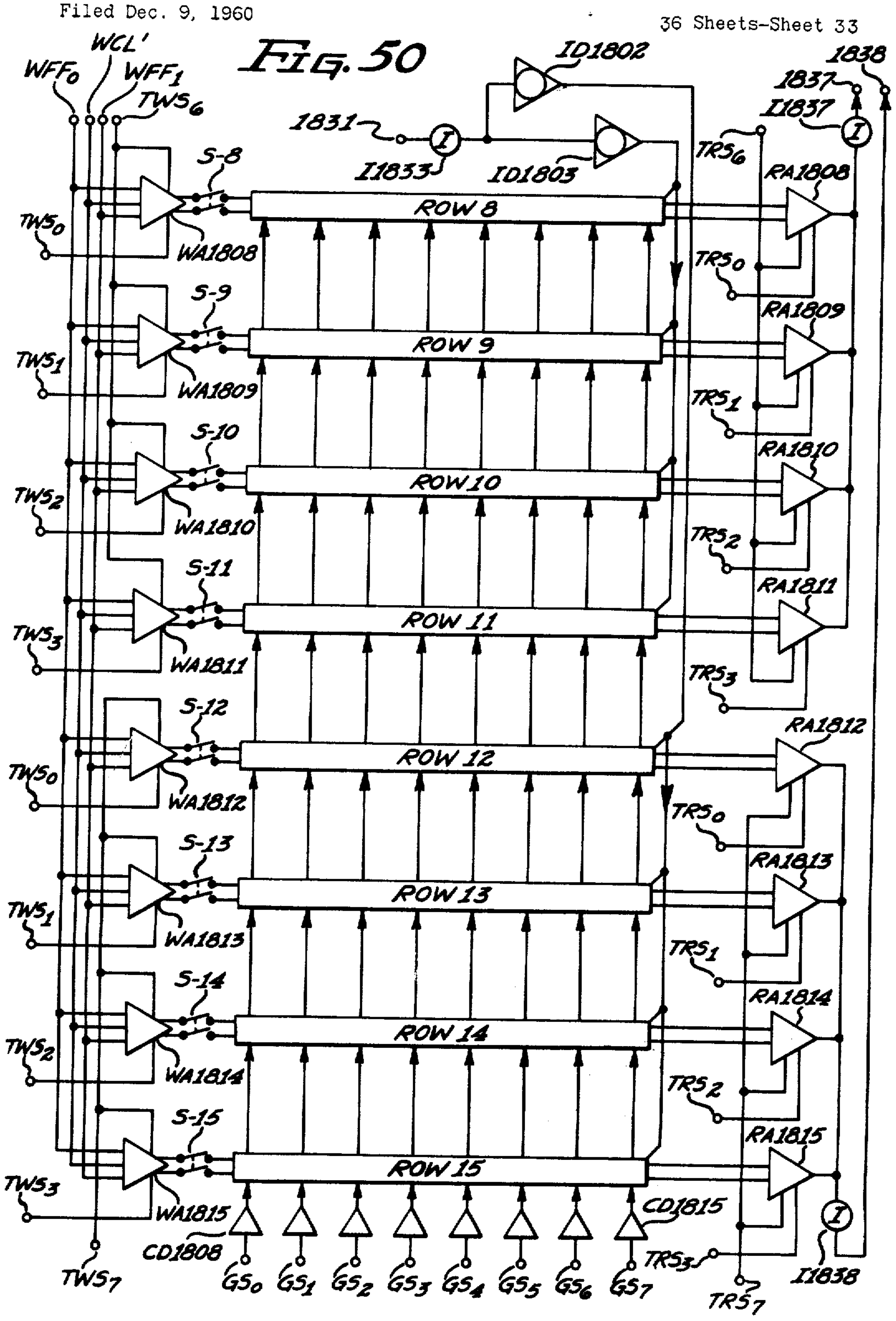
FIG. 50 illustrates the manner in which a magnetic read-write head may be selected from a second matrix of sixty-four heads by row and group selecting signals.

The track address in the Head Selection Register is decoded to generate signals which are employed to energize group-selecting column drivers, such as the column drivers CD1800 in FIG. 49 and CD1808 in FIG. 50 and to enable a read or write amplifier associated with a row of read-write heads, such as a read amplifier RA1800 and a write amplifier WA1800 of row 0 in FIG. 49.

As noted hereinbefore, the 128 read-write heads are arranged in two matrices, each having eight rows and eight groups or columns. The group specified by an address is selected by decoding the configuration of the bits stored in the flip-flops $HSR_1$, $HSR_2$ and $HSR_3$ through AND-gates G1812 to G1823 in FIG. 45. The decoded signals $GS_0$ to $GS_7$ from the AND-gates G1816 to G1823 are applied to the column drivers of the two matrices in order to select one group in each matrix. The circuit of a column driver is disclosed in FIG. 11.

To select a row specified by an address stored in the Head Selection Register, the configuration of bits stored in flip-flops $HSR_0$, $HSR_4$, $HSR_5$ and $HSR_6$ is decoded by two banks of AND-gates G1800 to G1807 and G1808 to G1815 in order to generate signals $TRS_0$ to $TRS_7$ and $TWS_0$ to $TWS_7$ which are employed to enable the read or write amplifier associated with the appropriate row as illustrated in FIGS. 49 and 50.

The symbol employed for a write amplifier is illustrated in FIG. 47. It consists of an amplifier circuit having two complementary output terminals "0" and "1," a pair of complementary steering input terminals $WFF_0$ and $WFF_1$, an input terminal for write clock pulses WCL′ and two row-selecting input terminals $RS_1$ and $RS_2$. The write amplifier circuit and its operation are described hereinbefore with reference to FIGS. 17 and 18. The appropriate ones of the $TWS_0$ to $TWS_7$ signals are applied to the row select input terminals $RS_1$ and $RS_2$ of each write amplifier in FIGS. 49 and 50.

It should be noted that both the read and the write amplifiers of a specified row are enabled simultaneously. If the operation during the next word-time is to read an instruction or data word, the selected read amplifier transmits the group of digital signals detected by the specific head selected through an OR-gate G1850 to an output terminal 1800 which is connected to the synchronizing circuit in FIG. 53. The complementary output signals are transmitted from the synchronizing circuit to the arithmetic section (FIG. 40) and the parity-check section (FIG. 35). A read operation does not affect the write amplifier associated with the row of the selected heads and that write amplifier does not affect the read amplifier because $WFF_0$ and $WFF_1$ steering signals are not transmitted by the write-control circuits illustrated in FIG. 54 and write-clock pulses WCL′ are not transmitted by the write synchronizing circuit in FIG. 52 during a read operation.

If the operation during the next word-time is to write a group of digital signals in a memory location, a STORE′ signal is produced at the output terminal 1842 of the OR-gate G1842 of the write-control circuit (FIG. 54) in response to an STQ, STX or STA command signal. The STORE′ signal enables steering signals $WFF_0$ and $WFF_1$ and write-clock pulses WCL′ to be transmitted to the write amplifiers in FIGS. 49 and 50. A row-disconnect switch is associated with each write amplifier so that writing with any head located in that row may be prevented to assure that data intended to be permanently stored is not destroyed by inadvertently writing through one of those heads. Assuming that the row-disconnect switch $S_0$ is closed so that data may be read or written through any of the heads in row 0 data may be stored in a sector of the track specified by one of the group select signals $GS_0$ to $GS_7$ and the enabled write amplifier WA1800.

Figure 51:
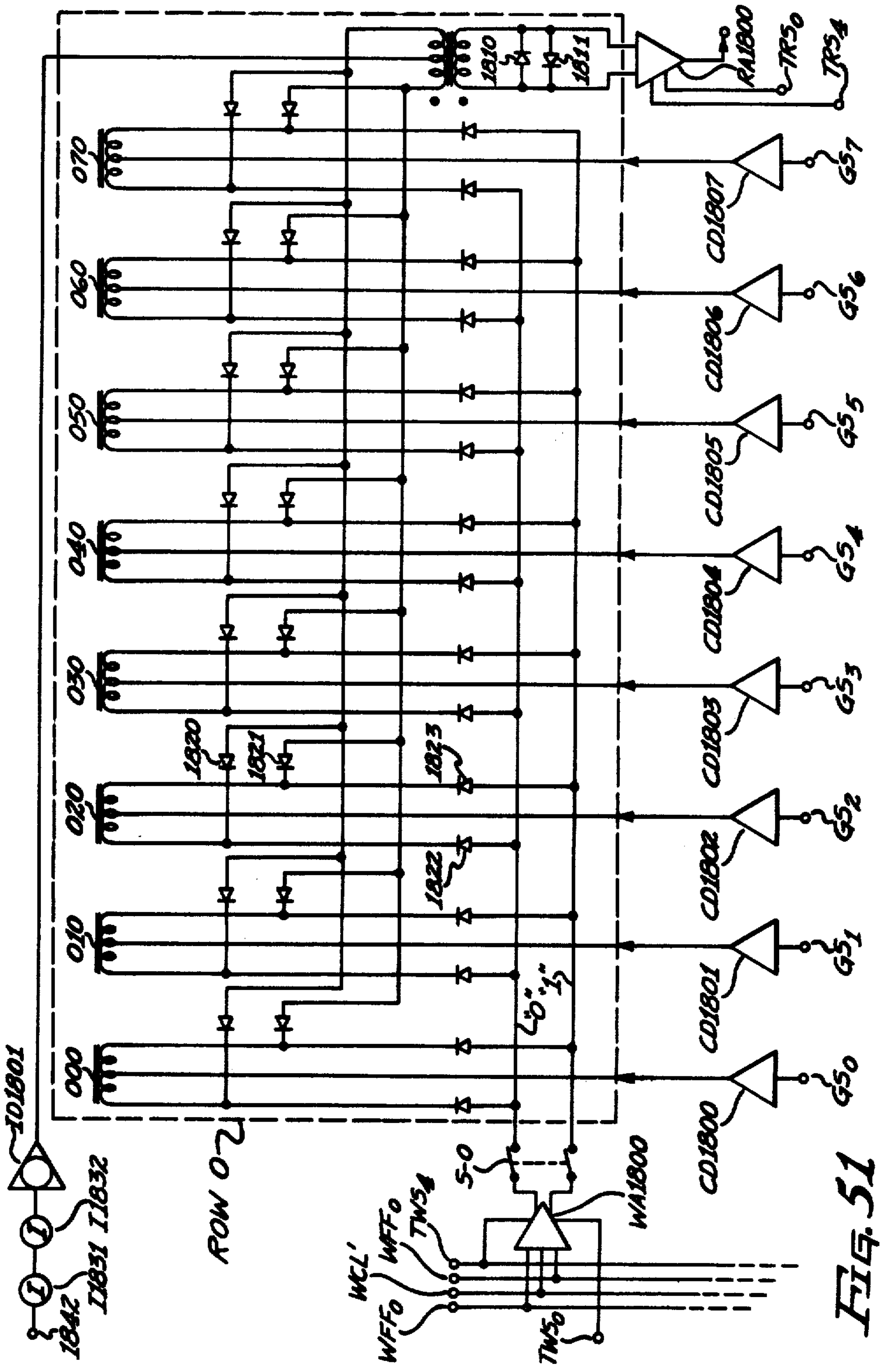
FIG. 51 illustrates schematically the manner in which a selected magnetic head is coupled to read or write amplifier.

In order to protect the read-amplifier RA1800 associated with the selected row 0, while high recording current is transmitted to the selected head, the STORE′ signal from the write-control circuitry in FIG. 54 is transmitted through inverters I1831 and I1832 to indicator drivers ID1800 and ID1801 in order to ground a center tap of the primary winding in a transformer coupling each of the read amplifiers RA1800 to RA1807 to its assocaited heads as shown for row 0 in FIG. 51. A STORE′ signal is similarly transmitted through the inverter I1831 in FIG. 49 and an inverter I1833 in FIG. 50 to indicator drivers ID1802 and ID1803 in order to ground a center tap of the primary winding in a transformer coupling each of the read-amplifiers RA1808 to RA1815 to its associated heads. In that manner recording signals transmitted to read amplifiers during a storing operation are so diminished in amplitude that the read amplifiers are not overdriven. It should be noted that signals transmitted by the read amplifiers during a storing operation have no effect on other sections of the computer since the arithmetic section and the parity-checking section are not enabled at that time.

The manner in which a specific head in a chosen row is selected by a group-select signal is illustrated in FIG. 51. For instance to select the read-write head 020 the write amplifier WA1800 and the read amplifier RA1800 are enabled to choose the row 0 and the specific head 020 is selected by a $GS_2$ signal applied to the column driver CD1802 which provides a −18 volts to the center tap of the winding on the read-write head 020. That −18 volts forward bias a pair of diodes 1820 and 1821 through the two sides of the head winding to couple the head 020 to the read amplifier RA1800. It also forward biases a pair of diodes 1822 and 1823 to couple the head 020 to the write amplifier WA1800.

The read amplifier RA1800 is transformer coupled to the selected head by a transformer having a center tap in its primary winding which is grounded during a storing operation in a manner described hereinbefore. Further protection is provided for the read amplifier while information is being stored in a memory location by a pair of clamping diodes 1810 and 1811 which limit the voltage amplitude of signals across the secondary winding to the voltage drop across them as determined by their internal impedance.

*Address Comparator and Word Counter*

The address comparator illustrated in FIG. 28 is employed to signal when the address of the operand specified by the contents of the α-register is found or when the address of the next instruction specified by the β-register is found. Locating the specified address is accomplished by comparing the address contained in the α-register or the β-register with the drum location indicated by a word counter consisting of seven stages $C_{11}$ to $C_{17}$ which counts each drum sector as it is about to pass under the read-write heads. A word counter having only seven stages is employed because it is only necessary to count 128 sectors in order to determine which of the sectors is about to pass under the read-write heads. Once during each drum revolution, the word counter is reset by an IP′ pulse applied to inverters I806 and I807. Output signals from the word counter and stages $HSR_1$ to $HSR_3$ of the Head Selection Register are compared with positions 5 to 7 and 11 to 17 of the α and β-registers to locate the specific location on the drum specified in either the α or the β-register as required by the instruction sequencing section (FIG. 27). Comparison is accomplished by a network of OR-gates G800 to G819 and an AND-gate G821 for an address specified by the α-register. These gates compare the number of the next sector to pass beneath the read-write heads with the address in the α-register. When there is an identity, one leg of each OR-gate G800 to G819 is at 0 volts thereby driving all twenty input terminals of the AND-gate G821 to a +6 volt level. When all input terminals of the AND-gate G821 are at +6 volts, an $\overline{\alpha\ \text{FND}}$ signal is transmitted from the output terminal 820 of the OR-gate G820. The $\overline{\alpha\ \text{FND}}$ signal is transmitted to the instruction sequencing section to indicate that the operand has been found and to initiate execution of the instruction in the α-register. For commands which do not require an operand, an $\overline{\alpha\ \text{FND}}$ signal is forced through the AND-gate G820 as described hereinbefore.

Comparison is similarly made with the contents of the β-register to generate a $\overline{\beta\ \text{FND}}$ signal at an output terminal 842 when OR-gates G822 to G841 enable an AND-gate G842. The $\overline{\beta\ \text{FND}}$ signal indicates that the next instruction specified by the β-register has been located.

Bit positions 5, 6 and 7 of the track portion in the α-register and the β-register are compared with the contents of $HSR_1$, $HSR_2$ and $HSR_3$ by the address comparator in order to assure that the Head Selection Register is being loaded properly during the execution of one-plus-one address instructions. For greater assurance, the comparator may be expanded to compare all seven positions of the track portion of an address in the α or β-register with the contents of all seven stages of the Head Selection Register.

ARITHMETIC SECTION

The arithmetic section illustrated in FIG. 40 is the information flow center of the computer where arithmetic and other logical operations may be performed on groups of digital signals, often referred to herein as words, while they are being transferred from a memory location to the A, X, α or β-register; from one register to another, except word transfers from the A-register to the Q-register which are made directly; and from the A, X or Q-register to a memory location. A word transfer operation is distinct from a shift operation in that the latter does not require the use of the arithmetic section and may not be a shift of a complete word. For instance, during the execution of an instruction to divide, the divisor stored in the α-register is synchronously transferred through the arithmetic section with the remainder in the A-register in order to obtain a new remainder and develop another bit of the quotient in the Q-register. As part of the process, it is necessary to shift the Q-register one place to the left by ring-shifting it to the right one place short of a complete ring-shift. The control circuit employed for each register during a word transfer or a shift operation is described in another section with reference to the particular register. Ony those circuits required for the control of information transferred through the arithmetic section during a word transfer operation are described with reference to FIG. 40.

In addition to control circuits for word transfer operations, the arithmetic section includes a serial binary adder 1410, a first buffer flip-flop F1400 in one word transfer channel, a second buffer flip-flop F1401 in another word transfer channel and a carry flip-flop F1402 which may be preset through an OR-gate G1437. It should be noted that all word transfers through the two channels are also through the adder so that if two words are synchronously transferred through the adder their sum appears at its output terminal. There are only three exceptions, each one involving storing operations. The first is the execution of an STQ command which requires that the contents of the Q-register be stored while the contents of the A and Q-registers are exchanged. To accomplish that an STQ command signal is translated through an OR-gate G1411 to enable an AND-gate G1416 which allows the contents of the Q-register to be serially transferred through the adder 1410 to the A-register while the contents of the A-register are transferred directly into the Q-register. The input and output terminals 1417 and 1403, respectively, of an inverter I1403 are connected to input terminals of the parity generating section (FIG. 34) for transfer to a memory location. The second exception involves only the operation of storing the contents of the A-register. That is controlled by an STA command signal from the instruction decoding section (FIG. 43) applied to an OR-gate G1410 to enable an AND-gate G1415. The third exception involves only the operation of storing the contents of the X-register in a memory location. That is controlled indirectly by an STX command signal which sets a flip-flop F512 in the X-register control section (FIG. 24). While that flip-flop is set, an AND-gate G1414 is enabled and the contents of the X-register are transferred through the OR-gate G1417 to the memory section in a manner similar to the transfer of the A and Q-register contents to memory locations. Of course for each of the X, A and Q-registers there are other commands or operation control signals which will cause the contents of those registers to be transferred through the respective AND-gates G1414, G1415 and G1416 as described hereinafter and with reference to the respective registers.

The advantage of transferring words through the arithmetic section is that any word being transferred may be modified by some arithmetic or logical operation as it is being transferred through the adder 1410 from one location to another. For instance, the address of an instruction loaded into the α-register or the β-register may be automatically modified by adding to it the contents of the X-register while the instruction is read from a memory location through the adder to the $\alpha$ or $\beta$-register. That is accomplished by sampling the first bit of the instruction word while it is stored in the flip-flop F1400 with a $\phi_1'$ pulse during an $L_1'$ period. If it is a bit 1, a flip-flop F512 in the X-register control section (FIG. 24) is set as described hereinbefore to enable an AND-gate G1414 in the arithmetic section to serially transfer the contents of the X-register through the OR-gate G1417 to the adder via the buffer flip-flop F1401 so that the contents of the X-register are added to the address portion of the instruction word serially transmitted through AND-gates G1401 and G1402 from input terminals 1815 and 1816 coupled to a selected read amplifier. The AND-gates G1401 and G1402 are coupled by the respective OR gates G1406 and G1407 to the adder 1410.

Another example of how a word transferred from a memory location to a register may undergo some arithmetic operation while it is serially read from the memory location is the execution of a subtract command. A SUB command signal from the instruction decoding section (FIG. 43) enables AND-gates G1404 and G1405 through an inverter I1400 and enables an AND-gate G1415 through an OR-gate G1410 when the location of the word in memory has been located. The SUB command signal also enables an AND-gate G1438 through an OR-gate G1437 to preset the carry flip-flop F1402 in response to an $L_0'$ pulse. Thereafter, the contents of the specified memory location are transferred through the enabled AND-gates G1404 and G1405 to the adder while the contents of the A-register are serially transferred through the enabled AND-gate G1415 to the other input channel to the adder via the flip-flop F1401. The AND-gates G1404 and G1405 are so connected to the adder through the OR-gates G1406 and G1407 that the one's complement of the contents of the specified memory location is added to the contents of the A-register. To obtain the algebraic subtraction of the contents of the memory location from the contents of the A-register, it is necessary to add to it the two's complement of the contents of the memory location, not just the one's complement. The two's complement is automatically formed and added by presetting the carry flip-flop F1402 in response to the SUB command signal because in that manner, a bit 1 is effectively added to the least significant bit of the one's complement of the contents of the memory location while it is also being added to the least significant bit of the contents of the A-register. The algebraic sum presented at the SUM and SUM' output terminals of the adder is stored in the A-register. Other combinations of word transfers for arithmetic operations are described hereinafter.

Control signals for the arithmetic section are provided by the instruction decoding and instruction sequencing sections described hereinbefore and by division and multiplication sequencing sections described hereinafter with reference to FIGS. 25 and 26, respectively. Some input control signals are provided manually from the console. As noted hereinbefore, words may be transferred through the arithmetic section from a memory location, the $\alpha$, A, Q and X-registers, and in addition from an external register, the I-register (FIG. 55), through an input terminal 2405 connected to the OR-gate G1417. Word transfers from the adder are provided to the A, X, $\alpha$ and $\beta$-registers.

From the foregoing, it can be seen that the primary function of the arithmetic section is to perform the arithmetic operation of binary addition during the mathematical solution of problems and to control word transfers. By means of addition other arithmetic operations may be performed: namely, multiplication by repeated additions, subtraction by the addition of the two's complement of the number and division by repeated subtractions. In addition, the arithmetic section functions as an information flow center for all word transfers manually controlled from the console in a manner similar to the word transfers initiated under program control. The versatility of the arithmetic section coupled with the versatility with which $GEN_1$ word transfer instructions may be formed as described hereinbefore provides a computer which performs a variety of word transfer operations extremely fast.

Before describing the operation of the arithmetic section with reference to other sections of the computer, its general organization will be more fully described. The input terminals 1815 and 1816 connect the memory location to the adder through the AND-gates G1401 and G1402. The complement of a word read from a memory location is formed through the AND-gates G1404 and G1405. OR-gates G1406 and G1407 are employed to couple the output terminals of the AND-gates G1401 to G1404 directly to input terminals of the adder and to output terminals of the flip-flop F1400 to force it into a set or reset condition depending upon whether a bit 1 or a bit 0 is being transferred to the adder. The flip-flop F1400 is always reset at the end of a word-time by an $L_{23}'$ pulse applied to a trigger input terminal to assure that the arithmetic section is reset prior to the next word-time. The flip-flop F1400 is also reset by a 0 volt signal at an input terminal 632 during the execution of a divide operation.

The contents of the $\alpha$-register may be transferred through the adder via the buffer flip-flop F1400 when an AND-gate G1425 is enabled. It may be enabled by control signals applied to input terminals of an OR-gate G1421. Those signals are: the INX command signal which causes the contents of bit positions 7 to 17 of the instruction in the $\alpha$-register to be added to the contents of the X-register, the sum from the adder being stored in the X-register; the BRU command signal which causes the contents of bit positions 4 to 17 of the instruction to be transferred to the $\beta$-register; a 0 volt signal from the true output terminal of a set flip-flop F651 during the execution of a multiplication instruction to cause the multiplicand stored in the $\alpha$-register to be added to the most significant part of the product being developed and stored in the A-register; 0 volt control signals at input terminals 615 and 628 to cause a divisor to be added to the most significant part of a remainder in the A-register as required to develop a quotient during the execution of a division instruction; and a 0 volt signal at an input terminal 1258 from an AND-gate G1258 in FIG. 37 to cause the contents of the $\alpha$-register to be transferred to the A-register under manual control.

The one's complement of the contents of the $\alpha$-register may be transferred through the adder as the carry flip-flop F1402 is preset to cause the two's complement to be added to the contents of the A-register as required by the algorithm employed for multiplication and division. That is accomplished for multiplication by a 0 volt signal applied to a terminal 656 connected to both the OR-gate G1437 to preset the flip-flop F1402 and to an OR-gate G1420 to enable an AND-gate G1424. The 0 volt signal at the terminal 656 is derived from an AND-gate G656 which is enabled at the end of a multiplication operation if the multiplier was negative. The reason for adding the two's complement of the multiplicand if the multiplier is negative may be found in the algorithm employed as described in the multiplication sequencing section with reference to FIG. 26.

Figure 25:
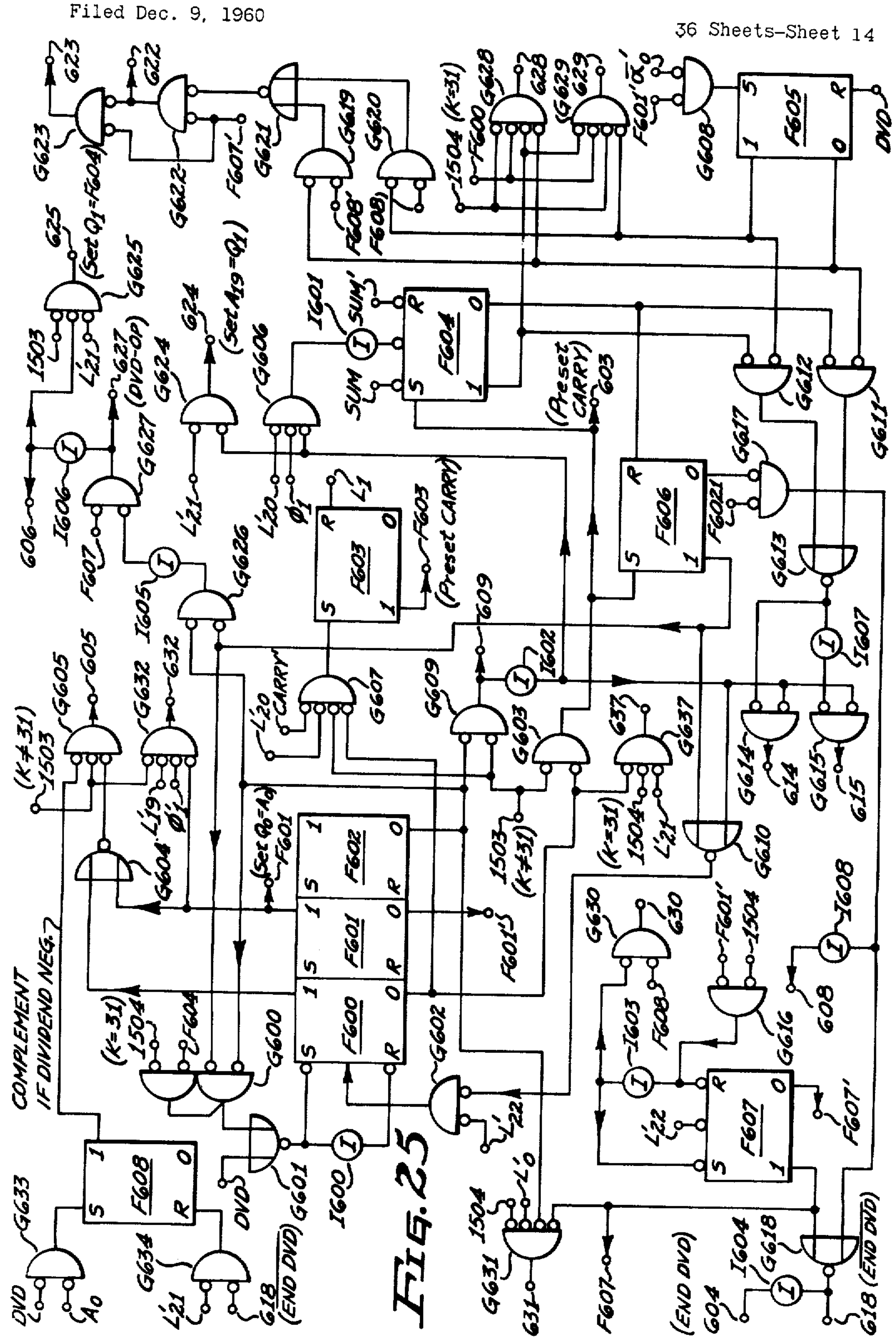
FIG. 25 illustrates a logic diagram of a circuit for division sequencing.

The two's complement of the contents of the divisor stored in the $\alpha$-register is similarly added to the contents of the A-register under the control of the division sequencing section illustrated in FIG. 25. The 0 volt signals at terminals 614 and 629 which are connected to the OR-gates G1420 and G1437 to accomplish that are developed by AND-gates G614 and G629 in FIG. 25 as they are enabled, the former during the normal division process by successive subtractions of the divisor from appropriate orders of the dividend and the latter after the normal division process to correct a negative remainder if necessary.

Synchronous $\Phi_1'$ clock pulses are required at the trigger input terminal of flip-flop F1400 when the contents of the α-register are being transferred through the adder. They are derived from the AND-gate G906 in the α-register control section illustrated in FIG. 29 and translated to the flip-flop F1400 by an OR-gate G1409 in FIG. 40.

The one's complement of the contents of the Q-register and the true contents of the Q-register are transferred through the binary adder by controlled AND-gates G1422 and G1423, respectively. The complement of the Q-register is transferred through the adder under the control of a SUB Q signal applied to an input terminal of an OR-gate G1418 from the AND-gate G1139 in FIG. 31 and under the control of 0 volt signals applied to input terminals 623 and 625 from the division sequencing section. The true contents of the Q-register are transferred through the adder under the control of an ADD Q signal applied to an input terminal of an OR-gate G1419 from an AND-gate G1136 in FIG. 31 and under the control of a 0 volt signal from the division sequencing section applied to an input terminal 622 of the OR-gate G1419. Synchronous $\Phi_1'$ clock pulses are applied to the trigger input terminal of the flip-flop F1400 for the transfer of the contents of the Q-register and for the transfer of the one's complement of the contents of the Q-register by an AND-gate G1408 through the OR-gate G1409 when a flip-flop F401 in the Q-register control section (FIG. 23) is set but only if a 0 volt signal is present at an output terminal 1411 of an OR-gate G1411 when neither an STQ nor a Q→A control signal is present from the instruction sequencing section (FIGS. 43 and 31) at input terminals of the OR-gate G1411.

As noted hereinbefore with reference to FIG. 44 and FIG. 31, the SUB Q transfer operation also requires that an ADD 1 operation be included as part of the operation code in a word transfer operation in order that the two's complement of the contents of the Q-register be transferred through the adder. An ADD 1 control signal from the AND-gate G1135 in FIG. 31 presets the carry flip-flop F1402 by enabling the AND-gate G1438 via the OR-gate G1437. An $L_0'$ pulse times the presetting so that it occurs in time for a bit 1 to be added to the first bit transferred through the adder via the AND-gate G1422. Similarly, when the two's complement of the Q-register is to be transferred through the adder under the control of a 0 volt signal from the division instruction sequencing section at an input terminal 623 of the OR-gate G1418, the carry flip-flop F1402 is preset by the 0 volt signal at the input terminal 623 connected to the OR-gate G1437. A 0 volt signal from an AND-gate G605 is similarly applied to an input terminal 603 of the OR-gate G1437 under the control of the division sequencing section as required by the division algorithm employed, as described in detail hereinafter, when the one's complement of the contents of the Q-register is being transferred through the adder under the control of a 0 volt signal from an AND-gate G605 at an input terminal 605 of the OR-gate G1418.

As noted hereinbefore, the contents of the X, A and Q-registers may be transferred through the respective AND-gates G1414, G1415 and G1416 in order to store their contents in a memory location. The contents of the Q-register may also be transferred through the AND-gate G1416 in response to a Q→A transfer control signal from the AND-gate G1131 when a word transfer instruction is decoded which involves transferring the contents of the Q-register to the A-register such as an EXC instruction to exchange the contents of the A and Q-registers. The contents of the A-register are transferred directly to the Q-register while the contents of the Q-register are transferred to the A-register through the adder.

Since the contents of the X-register are transferred through the AND-gate G1414 whenever the flip-flop F512 in the X-register control section is set, it is necessary to refer to FIG. 24. There it is seen that such a transfer takes place whenever a 0 volt X→A transfer signal is present at an input terminal 1257 in response to the manual transfer control section, when a programmed X→A transfer signal is present from the AND-gate G1132 in FIG. 31, when either an ADX or INX command signal is present from the basic instruction decoding section in FIG. 43 or when a bit 1 is present in position 19 of an instruction word being loaded into either the α or β-register.

The contents of the A-register may be transferred through the adder in response to more control signals than any other register since it is the principal register which, together with the arithmetic section, may be considered as the arithmetic unit in the classical breakdown of a computer into three units consisting of a memory unit, arithmetic unit and control unit. The command signals which occur most frequently in a program are probably ADD and SUB which cause the contents of the A-register to be added to a word as it is being loaded into the A-register from a memory location. The SUB command signal from the basic instruction decoding section enables the AND-gates G1404 and G1405 to cause the one's complement of the word read from a memory location to be transferred through the adder. It also presets the carry flip-flop F1402 through the OR-gate G1437 to effectively form the two's complement of the word from memory. To add the word from memory to the contents of the A-register, the ADD command from the basic instruction decoding section enables the AND-gates G1402 and G1401 through an OR-gate G1400. For both operations, the AND-gate G1415 is enabled by the ADD and SUB command signals through the OR-gate G1410 to transfer the contents of the A-register through the adder.

The contents of the A-register may also be transferred through the adder in response to the following control signals: A→X and A→A from the $GEN_1$ instruction decoding section of FIG. 31; 0 volt signals at input terminals 1254, 1255 and 1256 for transfer to the β, α and X-registers, respectively, under control of manual transfer switches in FIG. 37; 0 volt signals at input terminals 614, 615, 628 and 629 from the division sequencing section; and 0 volt signals at input terminals F651 and 656 from the multiplication sequencing section. The remaining control signal applied to the OR-gate G1410 is the STA command signal which causes the contents of the A-register to be transferred through the AND-gate G1415 but does not cause a transfer into a memory location through the adder since the output from the arithmetic section is taken from the inverter I1403 as described hereinbefore.

A word from a memory location may also be added to the contents of the X-register and the external I-register by respective ADX and ADI command signals applied to the OR-gate G1400. The ADX command signal sets the flip-flop F512 (FIG. 24) to enable the AND-gate G1414 to transfer the contents of the X-register through the adder while the word from memory is transferred through the adder. The ADI command signal controls the I-register in a similar manner by enabling an AND-gate G2405 in FIG. 55, which is connected to the OR-gate G1417 in FIG. 40, while the OR-gate G1400 is enabled to transfer the word from a memory location to the A-register through the adder.

The remaining 0 volt control signals which may be applied to the OR-gate G1400 are for the purpose of loading the A, X, α or β-register with a word from a memory location. For the A and X-registers, the control signals are LDA and LDX command signals from the basic instruction decoding section. For the α and β-registers the control signals are LOAD α and LOAD β signals from the true output terminal of the flip-flop F702 and the output terminal 716 of the AND-gate G716, respectively, of the instruction sequencing section (FIG.

27). The α-register may also be loaded from a memory location specified by a multiplication or division instruction, as described with reference to the α-register control section illustrated in FIG. 29. A 0 volt signal from the output terminal 941 of the α-register control section enables the OR-gate G1400 for that purpose.

Having described the arithmetic section with respect to its organization and control, its utilization in arithmetic and other operations may be understood by reference to the description of the registers three of which are described hereinbefore with reference to obtaining and modifying instructions. Those are the α, β and X-registers. The X-register can of course be used for other purposes as noted and the α-register is used to store the multiplicand or divisor as described with reference to the multiplication and division sequencing sections. The A and Q-registers are described hereinafter in the following section and the I-register is described in a later section. It should be understood that the control of the arithmetic section is always synchronized with the control of one or more registers and, if required, the memory section. That synchronous control is achieved by the simultaneous or coordinated distribution of control signals from the instruction decoding sections and instruction sequencing sections or from the manual control section of FIG. 37.

Before describing the A and Q-registers and their utilization in general, the adder 1410 of the arithmetic section will be described. Then the execution of multiplication and division instructions will be described with reference to the multiplication and division sequencing sections. Those instructions serve to illustrate the manner in which all of the sections described hereinbefore, including the A and Q-registers and their control described hereinafter are utilized in the execution of an arithmetic operation.

*Adder*

Figure 41:
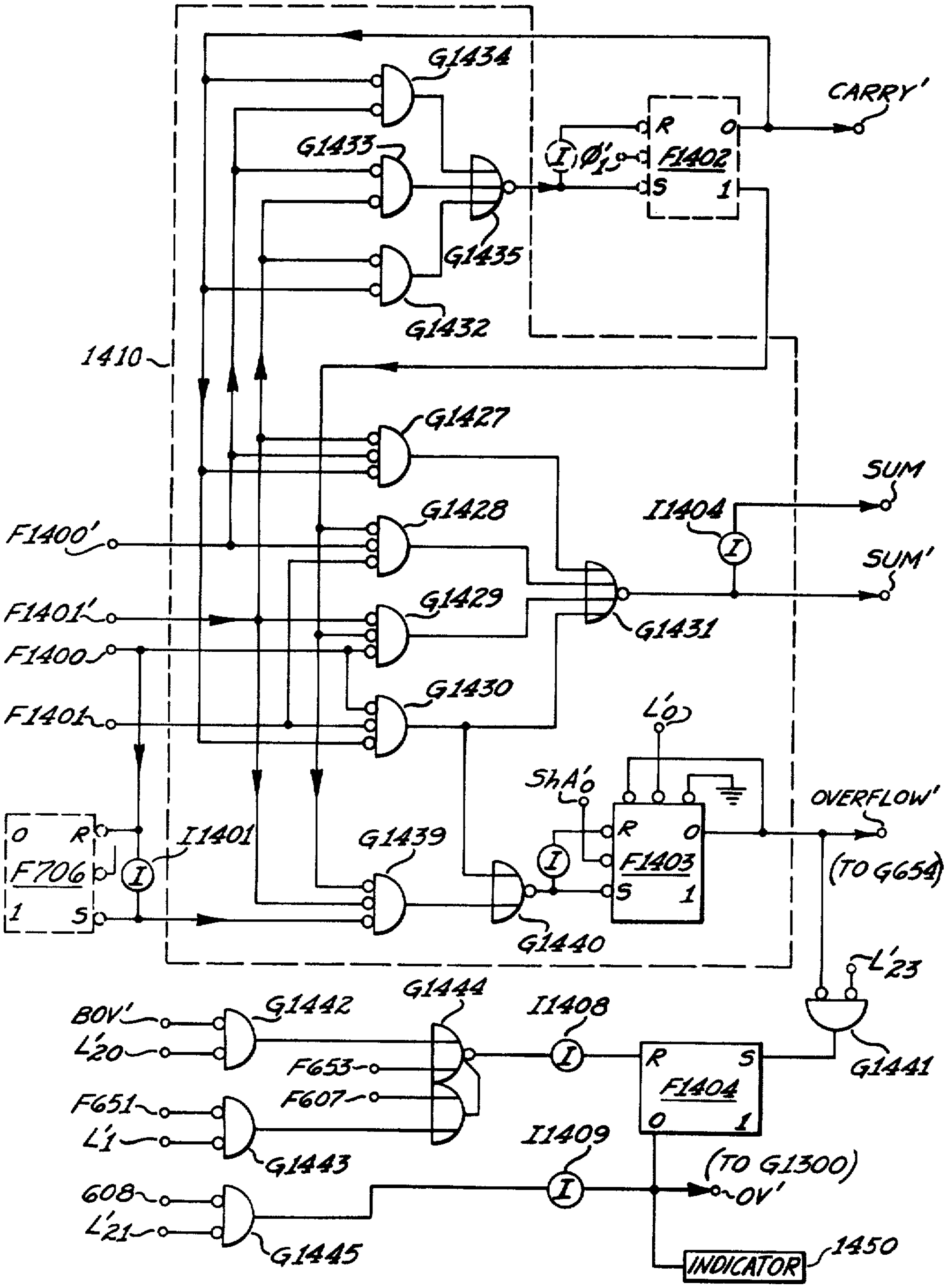
FIG. 41 illustrates a logic diagram of an adder useful in the arithmetic section of FIG. 40 and an overflow indicator.

A logic diagram of the serial binary adder 1410 is illustrated in FIG. 41. Three input AND-gates G1427 to G1430 recognize the four conditions under which the binary sum of 1 is to be produced. The first AND-gate G1427 produces a bit 1 output signal when all three input signals from the flip-flops F1400, F1401 and F1402 represent a bit 1. One of three AND-gates G1428 to G1430 produces a bit 1 output signal when only one of the three flip-flops is storing a bit 1: the AND-gate G1428 produces a bit 1 output signal when only the flip-flop F1400 is storing a bit 1; the AND-gate G1429 produces a bit 1 output signal when only the flip-flop F1401 is storing a bit 1; and the AND-gate G1430 produces a bit 1 output signal when only the carry flip-flop F1402 is storing a bit 1. An OR-gate G1431 translates any bit 1 output signal produced by the AND-gates G1427 to G1430 into a SUM′ output signal. An inverter retranslates the output of the OR-gate G1430 into a SUM output signal so that complementary output signals are available from the adder.

Three AND-gates G1432 to G1434 recognize the conditions under which a bit 1 should be carried from one binary order to the next higher binary order. The flip-flop F1402 functions as a buffer or delay element to carry such a bit 1 into the next order. If any two of the three flip-flops F1400, F1401 and F1402 are storing a bit 1, a bit 1 carry is produced by one of the AND-gates G1432 to G1434 and transmitted through an OR-gate G1435 to the flip-flop F1402 which is set in response to the next $\Phi_1'$ pulse. A complementary output signal (CARRY′) is transmitted to the AND-gates G1434, G1432, G1427 and G1430 for a bit 1 to be added to the next order. The true CARRY output signal is coupled to the AND-gates G1428 and G1429 to complete the logic of the adder.

*Overflow Buffer and Indicator*

The AND-gate G1430 and an AND-gate G1439 are employed to recognize when a bit 1 overflow is produced as a result of the addition of the most significant bits, the sign bits, of two twenty bit words and when a carry from the next lower order changes the sign bit of the sum from 0 to 1. As noted hereinbefore, the 0 bit position is the most significant bit of a data word which is stored in the $A_0$ stage of the A-register as the sign bit of the data word. If the data word is a negative number, the sign bit is 1. An overflow will surely occur if two negative numbers are added since the two sign bits will produce as the sum a bit 0 and a carry. When there is such a bit 1 and a carry produced in response to the addition of two negative numbers, it is necessary to detect the carry as an overflow in order that the sign may be corrected for otherwise a bit 0 will be present in the sign position erroneously indicating that the sign of the sum of two negative numbers is positive. When an overflow is produced in that manner, a signal from the AND-gate G1439 is translated through an OR-gate G1440 and applied to the steering input terminals of an overflow flip-flop F1403 so that when a signal $ShA_0'$ to shift the sign bit into the A-register is produced, the flip-flop F1403 is set and an OVERFLOW′ signal is produced.

Another type of overflow occurs and affects the sign bit position of the sum when the most significant bit in position 1 of a positive number is added to the most significant bit in position 1 of another positive number with no carry from the addition of bits in the next lower order (position 2 of the data word) because a bit 1 carry is then added to two 0 bits to produce a bit 1 in the sign position thereby erroneously indicating that the sum of two positive numbers is negative. To correct the sign bit, the carry of a bit 1 into the sign position under those circumstances must be detected. Such a bit 1 carry into the sign position is detected by the AND-gate G1430 as the sign bits of the two positive numbers are transferred through the adder. If there is a bit 1 carry, a signal is translated through the OR-gate G1440 and, upon the occurrence of the next $ShA_0'$ signal, the flip-flop F1403 is set to produce an OVERFLOW signal.

Upon the occurrence of the next $L_{23}'$ pulse at the end of the word-time devoted to adding the two numbers, any overflow in the flip-flop F1403 is transferred into an overflow-indicator flip-flop F1404 which produces an OV′ pulse that is transmitted to the branch decoding section (FIG. 39) for a decision in executing a branch on overflow instruction (BOV). The flip-flop F1404 energizes an indicator 1450 which remains energized as long as the flip-flop F1404 remains set.

The overflow flip-flop F1404 is reset by an $L_{20}'$ pulse through an AND-gate G1442 and an OR-gate G1444 when a branch on overflow instruction is executed. The overflow flip-flop F1404 is automatically reset during the execution of a multiplication instruction through an AND-gate G1443 when a flip-flop F651 in the multiplication sequencing section is reset and through the OR-gate G1444 when a flip-flop F653 is set. It is similarly reset automatically during the execution of a division instruction when a flip-flop F607 is set to enable the OR-gate G1444. The reason for automatically turning off the overflow indicator while sequencing a multiplication or division instruction is that with the algorithm employed virtual overflow conditions will occur but an actual overflow which will affect the correctness of the product or quotient will not occur. The only exception is while sequencing a division instruction when a test is made initially to determine whether a permissible division is specified, as described hereinafter. If a prohibited division is specified, the overflow indicator is turned on through the AND-gate G1445 and division sequencing is terminated.

A-REGISTER

The A-register illustrated in FIG. 20 is a twenty-bit register which functions as an accumulator in that it may store a quantity to which a second quantity may be added and store the result. For instance, the basic command ADD causes the contents of a memory location to be added to the contents of the A-register by transferring the contents of both through the arithmetic section to the A-register where the sum is stored. Of course the A-register is not the only register employed in that manner. For example, the X-register may also store a quantity to which a second quantity may be added and store the result in response to an ADX command. However, the A-register is the only register employed in that manner which can store a nineteen bit number plus a sign bit and is therefore the only register employed as an accumulator during arithmetic operations. Another reason for using the A-register as the accumulator during arithmetic operations is that it is the only register which may be shifted directly into another twenty bit register, the Q-register, for multiplication and division operations.

The A-register is frequently involved in other operations such as a storage register for information to be printed out through the N-register six bits at a time. While it is involved in other operations, it should be considered as only another working register which is all it really is since all of the arithmetic operations are actually performed in the arithmetic section which does not have a storage register. All of the operations which the A-register may perform or in which it may be involved are pointed out in the following description in conjunction with the description of the A and Q-register control section hereinafter as well as other sections. If the A-register were to be considered by itself, it would appear to be capable of only two operations, word transfer and shift operations. Accordingly, the following description and the description of the A and Q-register control section must be finally considered only when all of the other sections of the computer are understood. That is of course true of all sections but more apparent in the A-register because it is involved in so many different operations, the most complex being multiplication and division. For example, because of the many operations in which it is involved, independent control of the sign bit position $A_0$ and the least significant bit position $A_{19}$ is provided. Until all of the sections involved in the various operations have been described, the use of such independent controls may not be clear. However, after all of the sections described are understood, the manner in which any specific operation or instruction is executed will be apparent when it is considered that the control of all of the sections is synchronized by bit-time pulses $L_0$ to $L_{23}$, clock pulses $\phi_1$ and $\phi_2$ and simultaneous transmission of control signals to all logic elements which must be enabled simultaneously.

Any serial shift in the A-register, as in all other registers, is from left to right in the direction from the most significant bit position $A_0$ to the least significant bit position $A_{19}$. It should be noted that when the data word stored in the A-register represents a number the bit in the stage $A_0$ represents its sign, a bit 0 for plus and a bit 1 for minus. The $A_0$ bit position normally receives its input signals from the SUM and SUM' output terminals of the arithmetic section but, during a multiplication operation, the $A_0$ stage may receive its input signals from the $\alpha_0$ stage of the $\alpha$-register in order to set the sign of the A-register equal to the sign of the $\alpha$-register at an appropriate time as required by the division algorithm employed.

The A-register may be loaded through $A_0$ via the arithmetic section, such as when a word is transferred into the A-register from the X or Q-register, or a memory location by either manual or program control, as described with reference to the arithmetic section. Similarly, other registers or a memory location may be loaded from the A-register through $A_{19}$ via the arithmetic section by either manual or program control. Since all word transfer operations involve the A-register, shift pulses are applied to all twenty stages $A_0$ to $A_{19}$ whenever a word transfer operation is being performed. That is accomplished by a 0 volt signal applied to an OR-gate G400 of the A-register control section (FIG. 23) from either the true output terminal of the flip-flop F1250 (FIG. 37) while set for a manual transfer or from the output terminal 1101 of the AND-gate G1101 while enabled for a programmed transfer.

The A-register may also be loaded in parallel manually from the control console. FIG. 36 illustrates schematically the circuits by which that may be accomplished. Twenty switches $S_0$ to $S_{19}$ are provided, each having a neutral or off position as shown, an upper position and a lower position. To enter a word manually, the desired bit configuration is set up in the bank of switches by placing an associated switch in its upper position for each bit 1 in the word. Thereafter, when a switch $S_{21}$ is closed a +6 volt signal is applied through those switches which are in their upper position to the false output terminal of a corresponding flip-flop such as the flip-flop $A_3$ associated with the switch $S_3$ if it is in its upper position. A +6 volt signal at the false output terminal of a given flip-flop in the A-register will place it in a set condition.

After a word has been manually entered into the A-register, it may be transferred to the $\beta$, $\alpha$ or X-register under the control of respective manual switches $S_{27}$, $S_{28}$ and $S_{29}$ illustrated in FIG. 37. Assuming that the word manually entered into the A-register is an instruction to be shifted into the $\alpha$-register, the switch $S_{28}$ is closed and the push button switch $S_{32}$ is momentarily depressed. Upon the occurrence of the next $L_{23}'$ pulse, the AND-gate G1251 is enabled and a flip-flop F1250 is set. When the flip-flop F1250 is set, the AND-gate G1255 is enabled to transmit a 0 volt signal from its output terminal 1255 to appropriate logic elements of the control sections for the A and $\alpha$-registers. After one word-time during which the word is transferred through the arithmetic section to the $\alpha$-register, an $L_{21}'$ pulse resets the flip-flop F1250. Additional manual transfer switches are provided to transfer the contents of the X-register into the A-register and to transfer the contents of the $\alpha$-register into the A-register by respective switches $S_{30}$ and $S_{31}$ as described hereinbefore.

The switches $S_0$ to $S_{19}$ may also be employed to enter a word from the console into the A-register under program control. The binary bit configuration to be entered is set up by placing an associated switch in its lower position for each bit 1 in the word. For instance, to manually enter a bit 1 into stage $A_3$, the switch $S_3$ is placed in its lower position. Thereafter, when an instruction to read the console input is decoded an RCS command signal is transmitted by an AND-gate G1252 to input terminals of special purpose amplifiers SP1250 to SP1252 thereby causing their respective output terminals to be driven to +6 volts so that a +6 volt signal is transmitted through those switches placed in their lower position to false output terminals of respective flip-flops. For instance, in the foregoing example the switch $S_3$ is placed in its lower position so that an RCS command signal causes a +6 volt signal to be transmitted through it to the false output terminal $A_3'$ of the flip-flop $A_3$ to set it. It should be noted that the RCS command is produced by decoding the complements of EX-EFF and $D_5$ signals derived from the $GEN_1$ instruction decoding section illustrated in FIG. 31 as described hereinbefore.

Bit positions $A_{10}$ to $A_{19}$ may be loaded from an external register (not shown) having ten stages $CV_{10}$ to $CV_{19}$. The false output terminals $CV_{10}'$ to $CV_{19}'$ of that register are connected to input terminals of a bank 316 of ten two-input AND-gates. When an instruction to read the external register into the A-register is decoded by an AND-gate G315, an RCV command signal is transmitted to the bank 316 of AND-gates through a pair of parallel connected inverters I307 to enable them to transfer in parallel the contents of $CV_{10}$ to $CV_{19}$ into the respective flip-flops $A_{10}$ to $A_{19}$.

Bit positions $A_6$ to $A_9$ of the A-register may be loaded in parallel from a decimal-to-binary converter 300 under program control. To accomplish that a selected one of a pair of decimal input switches $DS_1$ and $DS_2$ is set to the decimal value which is to be converted into a binary coded word and entered into the A-register. For example, the decimal input switch $DS_1$ is first set to the decimal value 3 and then selected as the decimal input switch from which binary information is to be entered into the A-register by closing an associated switch S302. While the switch $DS_1$ is being read into $A_6$ to $A_9$, the switch S301 associated with the switch $DS_2$ must remain open. Since the decimal-to-binary converter 300 is a gated converter, binary coded signals are not transmitted over lines $2^0$ to $2^3$ to set input terminals of the flip-flops $A_6$ to $A_9$ until an instruction to read a digital input is decoded by the converter itself, as described hereinbefore with reference to FIG. 13 to enable the decimal value 3 set on the selected decimal input switch $DS_1$ to be converted to a binary coded word and transferred into flip-flops $A_6$ to $A_9$.

Output signals from the true output terminals of the flip-flops $A_1$ to $A_{19}$ are connected to a multiple-input AND-gate G314 in FIG. 21 to decode a bit configuration for the value zero. Its output is coupled to a terminal 310 by an inverter I310. The signal present at the terminal 310 is at a +6 volt level only when all of the flip-flops $A_1$ to $A_{19}$ are reset thereby indicating that the contents of the A-register are equal to zero. That +6 volt level signal is transmitted to the AND-gate G1301 in the branch decoding section (FIG. 39) to make the decision required by an instruction to branch on zero (BZE).

During a word transfer operation, the output of the flip-flop $A_0$ is transferred to the steering input terminals of the flip-flop $A_1$ through a normally enabled AND-gate G304 and an OR-gate G300. The AND-gate G304 is normally enabled through an inverter I305 by an AND-gate G305 which is normally enabled and which is disabled only when a shift operation is being performed. The remaining AND-gates G305, G302 and G303 are normally disabled except when a shift operation is being performed. Shift pulses applied simultaneously to all the stages $A_0$ to $A_{19}$ enable execution of whichever word-transfer operation is specified by control signals applied to the arithmetic section as described hereinbefore or a direct transfer to the Q-register if required. The $ShA_0'$ shift pulses for the flip-flop $A_0$ and the $ShA_{19}$ shift pulses for the flip-flop $A_{19}$ are generated separately in a manner described hereinafter with reference to FIG. 23 but are nevertheless applied simultaneously with the $ShA_1$–$A_{18}$ shift pulses for the flip-flops $A_1$ to $A_{18}$ during word transfer operations.

Shift operations are not accomplished through the arithmetic section so that they are controlled by signals applied directly to the AND-gates G301, G302 and G303. For instance, to serially shift the contents of the N-register into the A-register after reading in a six bit word from the tape reader, an $\overline{N\rightarrow A_s}$ control signal from the inverter I1127 of the $GEN_1$ instruction decoding section (FIG. 31) enables the AND-gate G301 to translate the output of the last stage of the N-register to the first data stage of the A-register: namely, to translate $N_6'$ signals to the steering input terminals of the flip-flop $A_1$. A shift operation of the contents of the Q-register into the A-register is similarly accomplished through the AND-gate G302 inresponse to a $\overline{Q\rightarrow A_s}$ control signal from the inverter I1123 (FIG. 31). The A-register may also be ring-shifted by enabling the AND-gate G303 in response to an $\overline{A\rightarrow A_s}$ control signal from the inverter I1129 (FIG. 31). When the A-register is being ring-shifted, the $A_{19}'$ output signals from the last stage are coupled to the steering input terminals of the first stage $A_1$.

From the foregoing it may be understood that during shift operations into the A-register, the flip-flop $A_0$ is uncoupled from the remaining stages so that data is entered through the flip-flop $A_1$ and the sign bit in the flip-flop $A_0$ is not changed. However, during shift operations into other registers from the A-register, the AND-gate is enabled to couple the flip-flop $A_0$ to the remaining stages of the shift register so that as data is shifted out through the last stage $A_{19}$ into another register, the vacated positions $A_1$ to $A_{19}$ are filled with the sign bit. When the A-register is open-shifted, a signal is not present at an input terminal of the AND-gate G305 which will disable the AND-gate G304 so that the sign bit is duplicated in the vacated positions $A_1$ to $A_{19}$.

During word transfer operations, the A-register is loaded through the arithmetic section so that the bit configuration in stages $A_0$ to $A_{19}$ may be changed. However, if data is not being transferred into the A-register while the contents of the A-register are being transferred to the Q-register, the A-register is filled with 0-bits. A bit 0 in every order including the sign position is the bit configuration of a plus zero value. As noted hereinbefore, negative zeros are not permitted. Hence the sign position $A_0$ is not shifted when any one of the three shift control signals $N\rightarrow A_s$, $Q\rightarrow A_s$ or $A\rightarrow A_s$ disables the AND-gate G304. At all other times, that AND-gate is enabled so that for all word transfer operations, the sign position is transferred as an integral part of the word.

There are other operations which require shifting the A-register. Those operations involve shifting the contents of the A-register into the Q-register during multiplication and division. The shift is made from $A_{19}$ into $Q_1$ during multiplication one position at a time as the multiplier or the Q-register that controls the orders of the successive partial products to which the multiplicand is added is shifted out and the product is developed in the A and Q-registers. For division, the shift is made from $A_{19}$ into $Q_1$ for full word transfers while the dividend in the A and Q-registers is being converted to its absolute binary value if the dividend is a negative number expressed in the two's complement form. Multiplication and division operations are described hereinafter in detail.

The sign position flip-flop $A_0$ is set equal to the sign of the multiplicand in the $\alpha$-register at an appropriate time, as determined by the logic of an AND-gate G654 of the multiplication sequencing section in FIG. 26, through a separate steering input circuit. An inverter I301 couples the trigger input terminal of that steering circuit to the output terminal 654 of the AND-gate G654. The flip-flop $A_0$ is reset by a 0 volt signal at an input terminal 637 from an AND-gate G637 in the division sequencing section (FIG. 25) at an appropriate time to make the sign of the dividend positive as part of a sequence of operations required to convert a negative dividend into a positive dividend before the actual division process may start.

As the divisor is repeatedly subtracted from successively higher orders of the dividend, the dividend in the A and Q-registers is shifted to the left one position at a time under the control of the division sequencing section. Since the registers provided will not shift to the left, a left shift is actually accomplished by ring-shifting both registers independently one position short of a complete ring-shift. The sign positions are not involved in that operation. To complete a shift of the Q-register one place to the left into the last flip-flop $A_{19}$ of the A-register, the flip-flop $A_{19}$ is set equal to the flip-flop $Q_1$ in response to a 0 volt signal from an AND-gate G624 (FIG. 25) applied to a terminal 624 which is coupled to a trigger input terminal of the flip-flop $A_{19}$.

Q-REGISTER

The Q-register is a twenty bit shift register having data bit positions $Q_1$ to $Q_{19}$ and a sign bit position $Q_0$. It is employed as an extension of the A-register during multiplication and division operations and as a spare register during other operations or sequences of operations constituting sub-routines in a program.

Since the Q-register is essentially only an extension of the A-register, information may be transferred into it only through the A-register. Transfer operations are controlled by 0 volt signals applied to input terminals of an OR-gate G313 which in turn enables AND-gates G306 and G312 to allow a word from the A-register to be serially transferred into the Q-register through the flip-flop $Q_0$. The OR-gate also transmits a +6 volt signal to an output terminal 313 which is connected to the Q-register control section illustrated in FIG. 23 to enable it to generate $ShQ_0'$, $ShQ_1'$ and $ShQ_2$–$Q_{19}$ shift pulses.

The flip-flop $Q_0$ is uncoupled from the remaining flip-flops $Q_1$ to $Q_{19}$ at all times, except during the execution of a word transfer operation, by the normally disabled AND-gate G312. While the flip-flop $Q_0$ is uncoupled, the contents of the A-register may be shifted into the remaining flip-flops $Q_1$ to $Q_{19}$ through an AND-gate G310 which is enabled by a 0 volt shift control signal applied to an input terminal of an OR-gate G311. The output terminal 311 of the OR-gate G311 is connected to an AND-gate G418 in the Q-register control section to enable $ShQ_1'$ and $ShQ_2$–$Q_{19}$ shift pulses to be developed.

The data bit positions $Q_1$ to $Q_{19}$ may be ring-shifted through an AND-gate G606 in response to a +6 volt signal at an input terminal 606 from an inverter I606 in the division instruction sequencing section (FIG. 25). The Q-register is ring shifted one place short in order to effect a left shift required by the division algorithm employed.

The sign position $Q_0$ may be set equal to the sign position $A_0$ of the A-register at the end of a multiplication problem when a flip-flop F653 is set in order to assure that both parts of the product in the A and Q-registers have the same sign. That is accomplished through an OR-gate G307. The sign position $Q_0$ is similarly set equal to the sign position $A_0$ near the end of a division problem when a flip-flop F601 in the division sequencing section is set in order to assure that the quotient in one register has the same sign as the remainder in the other register. The sign of the Q-register is also made equal to the sign of the A-register in a similar manner for a programmed shift operation between them in response to either an $A \rightarrow Q_s$ or a $Q \rightarrow A_s$ operation signal from the $GEN_1$ instruction decoding section (FIG. 31).

The $A \rightarrow Q_s$ and $Q \rightarrow A_s$ operation signals enable the OR-gate G311 to couple the flip-flop $Q_1$ to the flip-flop $A_{19}$ as just described. A 0 volt signal at an input terminal 650 from an inverter I650 in the multiplication instruction sequencing section (FIG. 26) also enables the OR-gate G311 and the AND-gate G310 to couple the flip-flop $A_{19}$ to the flip-flop $Q_1$ throughout the multiplication problem for successive right-shifts as required and controlled by the multiplication sequencing section through the Q-register control section. The OR-gate G311 and the AND-gate G310 are similarly enabled by a 0 volt signal at an input terminal 605 of the OR-gate G311 from an AND-gate G605 in the division sequencing section (FIG. 25).

A word transfer operation is controlled by a 0 volt signal at an input terminal of the OR-gate G313 when a flip-flop F607 in the division sequencing section is set in order to exchange the contents of the A and Q-registers as the next to last operation of the division sequence, as described hereinafter. An STQ command signal from the basic command decoding section (FIG. 43) enables the OR-gate G313 for a word transfer to a memory location through the arithmetic section. Other word transfer operation signals from the $GEN_1$ instruction decoding section (FIG. 31) enable the OR-gate G313 if the Q-register is involved in the transfer operation. Those word transfer operations are SUB Q, ADD Q, $Q \rightarrow A$ and $A \rightarrow Q$.

During a division operation, the quotient is developed and stored in the Q-register, one bit at a time. A flip-flop F604 (FIG. 25) in the division sequencing section actually develops each bit as described in detail hereinafter and each bit is transferred into the Q-register from the flip-flop F604 in response to a negative-going (+6 to 0 volts) signal at an input terminal 625 coupled to the trigger input terminal of the flip-flop $Q_1$ when an AND-gate G625 (FIG. 27) is enabled.

In the implementation of the algorithm employed for multiplication, it is necessary for each bit of the multiplier in the Q-register to be tested as it is shifted to the right and to enter a bit 0 into the flip-flop $Q_{19}$ after each test. That is accomplished by a 0 volt signal at an input terminal 655 which is connected to an AND-gate G655 in the multiplication sequencing section (FIG. 26).

A AND Q-REGISTER CONTROL SECTION

An A and Q-register control section provides shift pulses for shift or transfer operations involving the A and Q-registers. The shift pulses for the A-register are $ShA_0'$, $ShA_1$–$A_{18}$ and $ShA_{19}'$ and the shift pulses for the Q-register are $ShQ_0'$, $ShQ_1'$, and $ShQ_2$–$Q_{19}$. They are developed for both registers in a similar manner but by separate sections of the A and Q-register control section because each register must be separately controlled for independent and concurrent operations.

Figure 42:
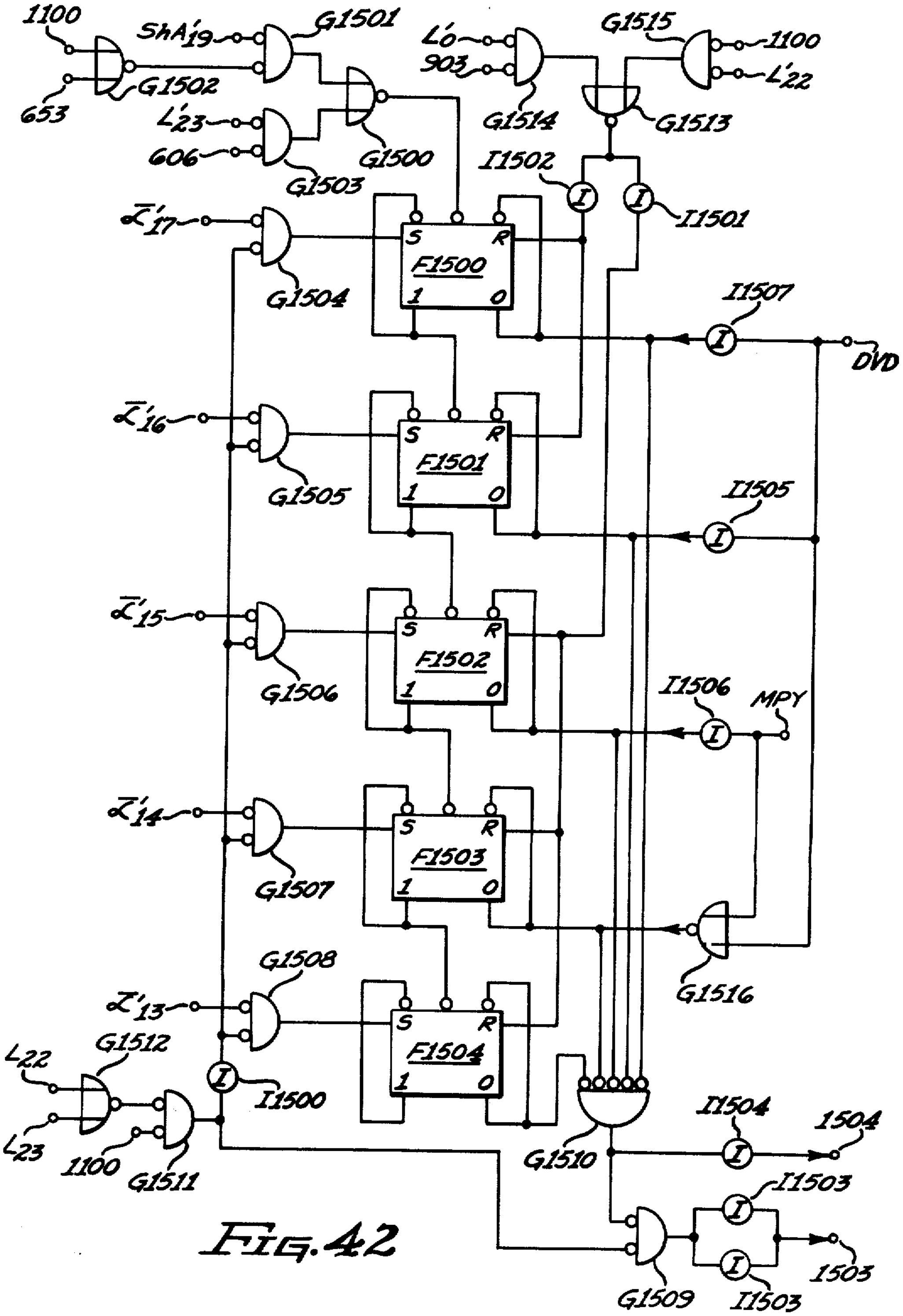
FIG. 42 illustrates a logic diagram of a shift counter employed to determined when the number of shifts required by a given shift command has been accomplished or to count the specified number of word-times required by a division instruction.

As described hereinbefore, the A and Q-registers are employed to perform multiplication and division instructions. To execute the steps required by those operations and to execute other instructions which require a shift of information through a specified number of positions in the A and Q-registers, a shift counter illustrated in FIG. 42 is provided so that the number of shift pulses applied to the A and Q-registers may be counted and the shift operation terminated after a shift through the required number of places has been completed. A signal from the shift counter is applied to an input terminal 1503 (FIG. 23) to terminate the generation of shift pulses for the A and Q-registers by the shift counter to accomplish that. As noted hereinbefore, in some instances it is necessary to shift through the flip-flop $A_0$ or $Q_0$, while in other cases it is not; consequently, separate shift pulses $ShA_0'$ and $ShQ_0'$ are generated for those flip-flops. Similarly, it is sometimes necessary to shift only the flip-flop $A_{19}$ or to shift only the flip-flop $Q_1$ so that separate $ShA_{19}'$ and $ShQ_1'$ pulses are generated.

The logic circuits of the A and Q-register control section include two flip-flops, F400 for the shift control of the A-register and F401 for the shift control of the Q-register. When it is desired to shift the entire contents of the A-register and the Q-register, the flip-flops F400 and F401 are set. The specified number of shift pulses to the required flip-flops $A_1$ to $A_{19}$ and $Q_1$ to $Q_{19}$ are generated under the control of the flip-flops. For instance, when the contents of the A-register are to be transferred or when a word is to be transferred into the A-register, such as during a programmed word transfer operation, an OR-gate G400 is enabled by an appropriate 0 volt signal at an input terminal. Signals at input terminals 614, 615, 628, 629 and 630 enable the OR-gate G400 under the control of the division instruction sequencing section (FIG. 25). A signal at an input terminal 656 enables the OR-gate G400 under the control of the multiplication instruction sequencing section (FIG. 26). Similarly, flip-flops F607 and F651 in the division and multiplication instruction sequencing sections, respectively, enable the OR-gate G400 at appropriate times while they are set. A flip-flop F1250 in the manual transfer control section (FIG. 37) also enables the OR-gate G400 when the A-register is to be loaded from the α or X-register or when the contents of the A-register are to be transferred to the α, β or X-register under manual control.

Since, as noted hereinbefore, all instructions which include a word transfer operation involve the A-register, every time a word transfer instruction is decoded through the AND-gate G1101 in the $GEN_1$ instruction sequencing section (FIG. 31), a 0 volt signal is transmitted to the input terminal 1101 of the OR-gate G400. Similarly, a 0 volt signal at an input terminal 1606 enables the OR-gate G400 every time the AND-gate G1605 in the basic instruction decoding section (FIG. 43) is enabled by any one of the following instructions: store the contents of the A-register in a memory location (STA); add the contents of the external I-register to the contents of a memory location (ADI); load the A-register from a memory location (LDA); and add the contents of a memory location to the contents of the A-register (ADD). The OR-gate G400 must be enabled for the execution of each of those instructions because each requires the transfer of a word into or out of the A-register through the arithmetic section. For the same reason a SUB command signal from the basic instruction decoding section enables the OR-gate G400.

When the OR-gate G1400 is enabled, an $L_0'$ pulse is translated through an enabled AND-gate G401 and an OR-gate G404 to set the A-register control flip-flop F400. When the flip-flop F400 is set, AND-gates G409, G410 and G411 are enabled. The AND-gates G409 and G410 are enabled through an OR-gate G406 connected to the true output terminal of the flip-flop F400. While those AND-gates are enabled, shift pulses are transmitted in response to $\phi_1'$ pulses to shift through all of the A-register flip-flops.

After one word-time has elapsed, an $L_{21}$ pulse is translated by an OR-gate G408 to reset the flip-flop F400. Accordingly, the first shift of the A-register takes place in response to a $\phi_1$ pulse which occurs during an $L_0$ bit-time, and the last shift takes place in response to a $\phi_1$ pulse which occurs during an $L_{20}$ bit-time with the result that twenty shift pulses are applied to the A-register so that a twenty bit word may be transferred into or out of the A-register.

If a command to store the contents of the A-register (STA) is being executed or to store the contents of the Q-register while the contents of the A and Q-registers are exchanged (STQ), OR-gates G403 and G427 are enabled in order to allow the flip-flop F400 to be set one bit-time earlier through an AND-gate G402 and reset one bit-time earlier through AND-gate G407 in order to allow for a bit-time delay in the memory section while recording as described hereinbefore with reference to FIGS. 16 and 17. During the execution of the STQ command, only the contents of the Q-register are stored in a memory location, but shift pulses must be concurrently applied to the A-register in order to perform the other operation which is an exchange of the contents in the A and Q-registers.

Since during the execution of a division operation it is necessary to effectively shift the A-register to the left while it is being loaded through the arithmetic section, a 0 volt signal is applied to an input terminal 609 of the OR-gate G427 to reset the flip-flop F400 one bit-time early after it has been set through the AND-gate G401, thereby generating only nineteen shift pulses for a twenty bit word, which leaves the last bit stored in the arithmetic section.

After the division operation has been completed, but before corrections are made, it is necessary to shift the A-register one position to the right. To accomplish that, a 0 volt signal from the division sequencing section is applied to an input terminal 631 of an OR-gate G406 during an $L_0$ bit-time to produce one $ShA_1$–$A_{18}$ and one $ShA_{19}'$ shift pulse.

There are two other situations under which the contents of the A-register are to be shifted without shifting the sign bit position $A_0$. For those two situations the flip-flop F1400 is not used and enabling signals are applied directly to the OR-gate G406. One of those situations is during the execution of a multiplication instruction when it is necessary to shift the product in the A-register under the control of the multiplication sequencing section which provides a 0 volt signal at an input terminal 653 of the OR-gate G406. The number of places to be shifted is determined by the multiplication sequencing section and will depend upon the number of successive 0 bits in the multiplier stored in the Q-register as described hereinafter with reference to FIG. 26. The other situation is when any shift operation is to be executed under a programmed instruction which specifies the number of places to be shifted. For that purpose an AND-gate G405 is enabled by a signal at an input terminal 1100 whenever a shift command is decoded by the AND-gate G1100 of the $GEN_1$ instruction decoding section in FIG. 31. The instruction sets the shift counter for the specified number of places to be shifted and when the specified number of shifts has been counted, a 0 volt signal from the shift counter at the input terminal 1503 disables the AND-gate G405.

When a complete twenty-bit word is to be transferred into or out of the Q-register, a +6 volt signal from the Q-register control OR-gate G313 (FIG. 22) is applied to an input terminal 313 (FIG. 23) and translated by an inverter I403 to enable an OR-gate G412 and an AND-gate G415. An $L_0'$ pulse translated through the enabled AND-gate G415 enables an OR-gate G417 to set the control flip-flop F401. While the flip-flop F401 is set, AND-gates G414, G421 and G426 are enabled to allow $ShQ_0'$, $ShQ_1'$ and $ShQ_2$–$Q_{19}$ shift pulses to be transmitted in response to $\phi_1'$ pulses. An $L_{20}$ pulse resets the flip-flop F401 through an OR-gate G425 to terminate the shifting of the Q-register. In that manner twenty shift pulses are transmitted to transfer a word into or out of the Q-register.

When an STQ command is to be executed, the flip-flop F401 is set through an AND-gate G416 to set the flip-flop F401 with an $L_{23}$ pulse and enable the transmission of shift pulses one bit-time earlier. The flip-flop F401 is then reset by an $L_{19}'$ pulse through an AND-gate G423 which is enabled by an STQ command signal translated through an OR-gate G422 to the AND-gate G423.

While a division instruction is being executed, the OR-gates G400 and G422 are enabled by a 0 volt signal at an input terminal 605 for two word-times to allow the contents of the A and Q-registers to be exchanged twice while both halves of the dividend are being complemented if the dividend is negative. The OR-gate G422 enables the OR-gate G412 through the OR-gate G413 so that it enables the AND-gate G415 to translate an $L_0'$ pulse to set the flip-flop F401. When it is set through the OR-gate G413, only $ShQ_1'$ and $ShQ_2$–$Q_{19}$ pulses are transmitted because the AND-gate G414 is disabled by a 0 volt signal from the OR-gate G413. The flip-flop F401 is then reset by an $L_{19}'$ pulse through the enabled AND-gate G423. While shift pulses are being transmitted to the Q-register under the control of the 0 volt signal at the input terminal 605, $ShA_0'$, $ShA_1$–$A_{18}$ and $ShA_{19}'$ shift pulses are transmitted to the A-register because the enabled OR-gate G400 enables the flip-flop F400 to be set and reset as described hereinbefore.

During the execution of a division instruction, it is necessary to shift the contents of the Q-register to the left, as noted hereinbefore, by ring-shifting it one position short. A 0 volt signal at an input terminal 627 from the division sequencing section causes the flip-flop F401 to be set by an $L_0'$ pulse and allows eighteen $ShQ_1'$ and $ShQ_2$–$Q_{19}$ pulses to be transmitted. The flip-flop F401 is reset by an $L_{18}'$ pulse translated by an AND-gate G424 which is enabled by a +6 volt signal from the division sequencing section. In that manner only eighteen shift pulses are produced to ring-shift the nineteen data bits of the Q-register one place short.

During the execution of a multiplication instruction, it is necessary to shift the flip-flops $Q_1$ to $Q_{19}$, the number of shifts depending upon the number of successive 0 bits in the multiplier stored in the Q-register just as described for the A-register hereinbefore. To accomplish that, the flip-flop F401 is not used. Instead, the AND-gates G421 and G426 are enabled directly through the OR-gate G419 by a 0 volt signal from the multiplication sequencing section (FIG. 26) at an input terminal 653.

For the programmed shift operations $A \rightarrow Q_s$ and $Q \rightarrow A_s$, the enabled OR-gate G311 in FIG. 22 transmits a +6 volt signal to an input terminal 311 of the AND-gate G418 to enable it to cause $ShQ_1'$ and $ShQ_2$–$Q_{19}$ shift pulses to be transmitted until the number of places to be shifted has been counted by the shift counter, at which time a 0 volt signal at an input terminal 1503 disables the AND-gate G418.

The AND-gate G418 is not employed to cause $ShQ_1'$ and $ShQ_2$–$Q_{19}$ pulses to be transmitted during the execution of a multiplication instruction. To assure that it is not enabled when the shift counter is preset to count the number of shift operations required to complete the multiplication as described hereinafter, an inhibiting 0 volt signal is applied to an input terminal 650 from an inverter I650 in the multiplication sequencing section (FIG. 26) until the multiplication instruction is complete.

SHIFT COUNTER

Figure 23:
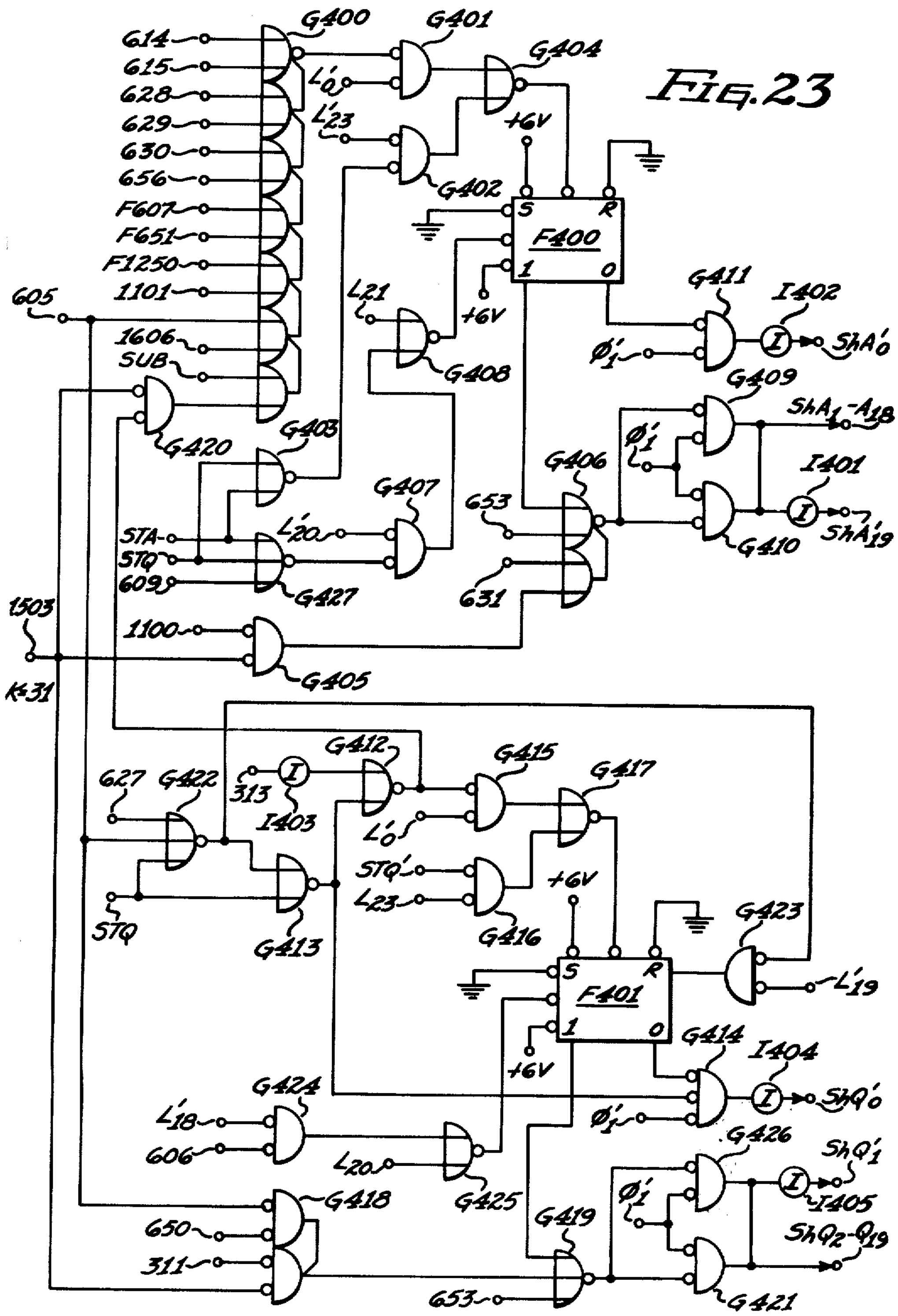
FIG. 23 illustrates a logic diagram of a circuit for selectively deriving shift pulses for the A and Q-registers.

The shift counter illustrated in FIG. 42 consists of five flip-flops F1500 to F1504 connected in cascade to form a five stage binary counter. As noted hereinbefore, it is employed to count operational steps during the execution of multiplication and division instructions and the number of places shifted during programmed shift operations. During the execution of an instruction which requires shifting certain registers a number of places specified by a binary number in bit positions 13 to 17 of an instruction written in Format III, the shift counter counts the number of $ShA_{19}'$ shift pulses applied until the specified number of places has been shifted and then transmits a +6 volt signal from an output terminal 1503 to stop further transmission of $ShA_{19}'$ pulses from the A and Q-register control section (FIG. 23). Only $ShA_{19}'$ pulses need be counted for all programmed shift operations since all such operations involve the A-register. During the execution of a multiplication instruction, the places that the multiplier is shifted to the right are counted to determine when all nineteen bits have been processed and during the execution of a division instruction, word-times are counted to determine when the execution of a division instruction is complete.

Since the shift counter has five stages, it may count thirty-one events without resetting since it may have thirty-one distinct stable conditions representing the binary values of one to thirty-one. For the binary value of thirty-one all of the flip-flops F1500 to F1504 are in a set state, and an AND-gate G1510 is enabled. If it is desired to shift the A-register six places, the counter is preset to the one's complement of the binary coded value of six (00110) in positions $\alpha_{13}$ to $\alpha_{17}$ of the instruction register which is to preset the shift counter to a value of thirty-one minus six, or twenty-five. As $ShA_{19}'$ pulses are applied through an enabled AND-gate G1501 and an OR-gate G1500 to the trigger input terminal of the flip-flop F1500, the counter is advanced from twenty-five to thirty-one at which time the AND-gate G1510 is enabled to produce an output signal which is employed to prevent further shift pulses from being transmitted.

To execute a multiplication instruction, nineteen shifts of one place to the right are required so that the shift counter is preset to a count of twelve in response to an MPY command signal. The shift counter then counts the $ShA_{19}$ shift pulses to determine when the multiplication operation has been completed.

The execution of a division instruction always requires twenty-seven word-times. Due to the algorithm employed, it is necessary to determine when the twenty-fourth word-time has been completed so that during the next succeeding three word-times required corrections may be made. To accomplish that, the shift counter is preset to the count of eleven since the first three word-times of the divide operation are not counted. During the period from the fourth to the twenty-third word-time inclusive, the contents of the A-register are transferred through the A-register twenty successive times. An $ShA_{19}'$ pulse advances the counter as each word-time passes so that when the count of thirty-one is reached, the twenty-third word-time of the division operation will have been completed. At that time output signals from the terminal 1503 and a terminal 1504 are employed to initiate the operations required during the last four word-times to correct the result and place it in the right form.

The flip-flops F1500 to F1504 are preset during the $L_{22}$ and $L_{23}$ bit-times immediately following an $L_{21}'$ pulse which sets the flip-flop F705 of the instruction sequencing section (FIG. 27) to enable the instruction to be decoded and executed. Considering first the instructions for shift operations, the $GEN_1$ instruction decoding section produces a signal at an output terminal 1100 which is connected to AND-gates G1511 and G1515 and to an OR-gate G1502. The AND-gate G1515 enables an $L_{22}'$ pulse to be translated by an OR-gate G1513 and a pair of inverters I1501 and I1502 to reset the shift counter. An OR-gate G1512 translates an $L_{22}$ pulse to the AND-gate G1509 to inhibit it while the shift counter is being reset. Immediately the OR-gate G1512 transmits an $L_{23}$ pulse through the AND-gate G1511 and an inverter I1500 to enable AND-gates G1504 to G1508 to preset the counter to the one's complement of the number specified by the instruction in positions $\alpha_{13}$ to $\alpha_{15}$ of the $\alpha$-register. Since the AND-gate G1501 is also enabled by the shift operation signal applied to the input terminal 1100 of the OR-gate G1502, the AND-gate G1501 transmits $ShA_{19}'$ shift pulses to the shift counter until the count of thirty-one is reached, at which time the AND-gate G1510 is enabled and an output signal is transmitted through the inverter I1504 to the output terminal 1504 and through the enabled AND-gate G1509 to the output terminal 1503 to stop the transmission of further shift pulses to the registers involved.

For the multiplication and division instructions, a signal from the OR-gate G903 in the $\alpha$-register control section (FIG. 29) produces a signal at an output terminal 903 in response to either a multiply or a divide command. That signal enables an AND-gate G1514 (FIG. 42) to transmit an $L_0'$ pulse through the OR-gate G1513 and the pair of inverters I1501 and I1502 to reset the shift counter. If a multiply command signal is present, the shift counter is preset to twelve through an inverter I1506 and an OR-gate G1516 by forcing the false output terminals of the flip-flops F1502 and F1503 to a +6 volt level.

A signal from the multiplication sequencing section is applied to an input terminal 653 of the OR-gate G1502 to enable the AND-gate G1501 to translate $ShA_{19}'$ pulses to the counter to count the shift operations during the multiplication process. When nineteen shifts have been counted, the AND-gate G1510 is enabled and an output signal is produced at the output terminals 1503 and 1504 to terminate the multiplication process.

If a division instruction is decoded by the basic instruction decoding section, a DVD command signal is applied to an input terminal of the OR-gate G1516 and to inverters I1505 and I1507 to preset the counter by setting the flip-flops F1500, F1501 and F1503 after the counter is reset through the OR-gate G1513. A signal from the division sequencing section is applied to an input terminal 606 of an AND-gate G1503 to enable $L_{23}'$ pulses to be transmitted through the OR-gate G1500. However, that signal does not appear at the input terminal 606 until after the first three word-times of the division operation. Thereafter twenty $L_{23}'$ pulses are counted to determine when the twenty word-times required for division have been completed. When the shift counter reaches the count of thirty-one, an output signal is produced at the output terminals 1503 and 1504 to terminate the sequence of successive subtractions in the algorithm employed and to initiate the operations required to correct the answer and place it in a specified form.

MULTIPLICATION SEQUENCING SECTION

A multiplication operation by the algorithm employed herein is essentially a series of additions of the multiplicand, each successive addition being made to a higher order of the partial product resulting from a previous addition. The function of the multiplication sequencing section is to control the necessary additions of the multiplicand stored in the α-register to the contents of the A-register in accordance with the bit configuration of the multiplier stored in the Q-register and to also control the necessary shifts to the right of the A and Q-registers in order that successive additions of the multiplicand may be made to successively higher orders of the partial product. As each bit of the multiplier is inspected in order of increasing significance to determine whether the multiplicand is to be added to successively higher orders of the partial product, the multiplier in the Q-register is open-shifted to the right while the partial product resulting from the previous addition in the A-register is shifted into the Q-register. Throughout the process, the sign bit of the multiplier stored in the flip-flop $Q_0$ is not altered until the conclusion of the multiplication process at which time the flip-flop $Q_0$ is set equal to the flip-flop $A_0$ so that both halves of the final product in the A and Q-registers will have the same sign. Consequently, during multiplication sequencing the Q-register may be considered as an extension of the A-register. The nineteen most significant bits of the final product are stored in the A-register and the nineteen least significant bits are stored in the Q-register.

Since negative numbers are represented in the two's complement form, it is necessary to make one type of correction if the multiplicand is a negative number and a second type of correction if the multiplier is a negative number, or both types of corrections if both are negative. These corrections will be described in detail first because they are complex as compared to the rest of the multiplication process which is implemented in a simple manner. Briefly, the rest of the multiplication process consists of inspecting the multiplier one bit at a time in ascending order of significance. If an order contains a bit 1, the multiplicand in the α-register is added to the A-register to form a new partial product. The bit inspected is then set to zero and both the A and Q-registers, except their sign positions, are shifted to the right as though the A and the Q-registers were one until a bit 1 is encountered at which time the multiplicand is again added to that portion of the partial product in the A-register. After the A and Q-registers have been shifted nineteen places to the right, the multiplication operation is complete. Each addition of the multiplicand requires one word-time but each sequence of 0-bits in the multiplier is shifted out in succession during one word-time. Consequently, the total number of word-times required to complete a multiplication operation depends upon the binary bit configuration of the multiplier. A maximum of twenty-one word-times is required when the multiplier contains a bit 1 in each of its nineteen bit positions. Of the two extra word-times, one is required to prepare the instruction sequencing section and the other to make a correction of one type if it is required.

Before describing the two types of corrections in detail, it is important to note that the sign positions of the A and Q-registers are not shifted so that they do not change during a right shift operation. However, the sign bit of the A-register does fill the vacated positions as the A and Q-registers are shifted to the right. For instance, if the partial product is positive, the sign of the A-register is positive and a bit 0 is shifted into the vacated positions of the A-register as the A and Q-registers are shifted. If the partial product is negative, a bit 1 in the sign position $A_0$ is shifted into the vacated positions of the A-register. The sign position $Q_0$ of the Q-register stores the sign of the multiplier and is not changed until the last step of the multiplication sequence when it is set equal to the sign of the A-register which at that time has the correct sign for the final product.

*Correction for a Negative Multiplicand*

The correction required if the multiplicand is negative is automatically made by allowing the sign bit of the partial product, the sign bit of the A-register, to fill the vacated positions of the A-register as it is shifted to the right. That correction does not pertain to the error in sign; it only pertains to the error caused by having expressed a negative multiplicand in the two's complement form. The sign of the most significant half of the final product will be correct for the multiplication of a negative multiplicand by a positive multiplier since the product is negative but the sign of the least significant half of the product will not be correct since the sign (bit 0) of the multiplier remains unchanged in the sign bit position $Q_0$. That error is taken care of by the last step of the multiplication sequence when the flip-flop $Q_0$ is set equal to the flip-flop $A_0$. The error which is more difficult to correct is the one automatically corrected in the manner which will now be described.

If the negative multiplicand $-Z$ in the α-register expressed in the two's complement form as $2^n-Z$ is multiplied by $+Y$ in the Q-register, the apparent product at the conclusion of the multiplication sequence without the automatic correction would be $(2^n-Z)Y$ but the true product expressed in the two's complement form should be $2^{2n}-ZY$. By comparing the true product with the apparent product, it is seen that the correction factor which should be added to the apparent product in order to obtain the true product is $(2^n-Y)2^n$, where $n$ is the number of orders in the Q-register, nineteen. That correction factor is automatically introduced by allowing the sum of the sign bits as each successive partial product is formed to be shifted into vacated positions of the A-register as part of the partial product so that it may be added in automatically to provide the true product. If that sum causes a change in the sign of the partial product, the sign position $A_0$ is set equal to the sign position $\alpha_0$ as the digital signal in the position $A_0$ is shifted into position $A_1$.

That the correction factor $(2^n-Y)2^n$ is automatically introduced in that manner may be verified by inspecting each step of a multiplication problem in the following example using registers having only four bit positions for convenience, three bit positions for data and one sign position. The example assumes the multiplier stored in the Q-register to be +5, the multiplicand stored in the α-register to be −3 and the A-register to be initially cleared. The contents of the registers are shown as they appear initially and both before and after each step of the multiplication sequence indicated. Since the sign bit of the Q-register is not shifted, the bit position of the Q-register is not shown except to illustrate the initial condition of the Q-register and in the final step to illustrate the necessity of making the sign bit of the Q-register equal to the sign bit of the A-register.

| $\alpha_0$ | $\alpha_1$ | $\alpha_2$ | $\alpha_3$ | $A_0$ | $A_1$ | $A_2$ | $A_3$ | $Q_0$ | $Q_1$ | $Q_2$ | $Q_3$ | Steps: |
|---|---|---|---|---|---|---|---|---|---|---|---|---|
| 1 | 1 | 0 | 1 | 0 | 0 | 0 | 0 | 0 | 1 | 0 | 1 | (1) Test $Q_3$ for bit 1. |
| | | | | 1 | 1 | 0 | 1 | | | | | |
| | | | | 1 | 1 | 0 | 1 | | 1 | 0 | 1 | (2) Add $\alpha$ to A. |
| | | | | 1 | 1 | 0 | 1 | | 1 | 0 | 0 | (3) Reset $Q_3$ and test for bit 1. |
| | | | | 1 | *1 | 1 | 0 | | 1 | 1 | 0 | (4) Shift A and Q and test $Q_3$. |
| | | | | 1 | **1 | *1 | 1 | | 0 | 1 | 1 | (5) Shift A and Q and test $Q_3$. |
| | | | | 1 | 1 | 0 | 1 | | | | | |
| | | | | 1 | **1 | *0 | 0 | | 0 | 1 | 1 | (6) Add $\alpha$ to A. |
| | | | | 1 | **1 | *0 | 0 | | 0 | 1 | 0 | (7) Reset $Q_3$ and test for bit 1. |
| | | | | 1 | 1 | **1 | *0 | | 0 | 0 | 1 | (8) Shift A and Q. |
| | | | | 1 | 1 | 1 | 0 | 1 | 0 | 0 | 1 | (9) Set $Q_0=A_0$. |

The first step is to test the least significant bit of the Q-register, and since it is a bit 1, the second step is to add the multiplicand stored in the $\alpha$-register to the A-register. The third step is to reset the least significant bit position $Q_3$ of the Q-register and test for a bit 1 in position $Q_3$. Since it is then a bit 0, both the A- and Q-registers are shifted one place to the right and position $Q_3$ is again tested for a bit 1 as the fourth step. Since that test reveals a bit 0 in position $Q_3$, the multiplicand in the $\alpha$-register is not added to the partial product in the A-register. Instead for the fifth step another shift one place to the right is performed placing a bit 1 in the least significant bit position $Q_3$ of the Q-register which is detected. The sixth step is to add the multiplicand in the $\alpha$-register to the partial product in the A-register. The seventh step is to reset the flip-flop $Q_3$ and test for a bit 1. Since a bit 0 has just been placed in position $Q_3$ both the A- and Q-registers are shifted one place to the right as the eighth step. Since there are only three bit positions in the multiplier, the third shift operation completes the multiplication sequence and the apparent product as shown is correct except for the sign of the Q-register. Consequently, the final step is to set the flip-flop $Q_0$ equal to the flip-flop $A_0$ to make the sign of both parts of the final product negative.

It should be noted that in response to the first shift operation, the sign bit 1 in the sign position $A_0$ is allowed to fill the vacated position $A_1$ which is the most significant data bit position of the A-register. That extraneous bit 1, which may be identified by a single asterisk is then shifted into the next less significant bit position $A_2$ of the A-register during the second shift operation while the sign bit 1 is again allowed to fill the vacated position $A_1$ to introduce a second extraneous bit 1. The second extraneous bit 1 may be identified by a double asterisk. Those two extraneous 1-bits introduced by allowing the sign bit to fill vacated positions of the A-register and become data bits are added into the partial product during the second add operation. The sum of the first extraneous bit 1 may be identified by a single asterisk and the sum of the second by a double asterisk. During the third shift operation, those sum bits are shifted into the two least significant bit positions $A_2$ and $A_3$ of the A-register as shown. The result is the same as if the two extraneous 1-bits were added in the two least significant bit positions of the A-register. Consequently, the binary value 011000 is automatically added as a correction factor to obtain the final product which is correct except for the sign bit of the Q-register. By making $Q_0$ equal to $A_0$ in the final step, the final product is correct even as to signs.

While adding the binary value 011000 by automatically adding 011 to the most significant half of the final product, the correction factor of $(2^n-Z)2^n$ is introduced where $n$ is equal to the number of orders in the Q-register and Z is equal to 5, which represents the two's complement of the binary value 101 expressed in binary form as 011. The remaining part of the correction factor $2^n$ is automatically introduced since the $(2^n-Z)$ part of the correction factor is added to the most significant half of the apparent product. The negative sign bit of the correction factor which is a bit 1 is not added as part of the correction factor but it may be ignored because the sign of the final product is already correct and it is only necessary to correct its value.

*Correction for a Negative Multiplier*

If only the multiplier is negative a correction factor must be added to the most significant half of the final product in order to obtain the correct product. Assuming the multiplier has a magnitude of $-Y$ expressed in the two's complement form as $2^n-Y$ and that the multiplicand has a magnitude of Z, the uncorrected product is $(2^n-Y)Z$. As before, the correct product should be $-YZ$ which in the two's complement form may be expressed as $2^{2n}-YZ$. By comparing the uncorrected product with the correct product, the correction factor which must be added to obtain the correct product is seen to be $2^n(2^n-Z)$.

The correction factor for the negative multiplier is added as one of the final steps after the normal multiplication process has been completed by adding the two's complement of Z or $(2^n-Z)$ to the most significant half of the uncorrected product. Since that half is nineteen places to the left of the least significant bit, the factor $2^n-Z$ is automatically multiplied by the factor of $2^n$ while it is being added to the uncorrected product so that the correction factor actually added is equal to $2^n(2^n-Z)$. The additional step of setting $Q_0$ equal to $A_0$ is not necessary for a negative multiplier because the product is negative and the sign bit already stored in $Q_0$ from the sign of the negative multiplier is already negative.

*Correction for Both Negative Multiplier and Negative Multiplicand*

If both the multiplier and the multiplicand are negative, both types of corrections described hereinbefore are required. To correct for the negative multiplier, the two's complement of the multiplicand is added to the most significant half of the product as described in the preceding paragraph. To correct for the negative multiplicand, it is only necessary to make the sign of $Q_0$ equal to the sign of $A_0$ at the termination of the multiplication operation because the correction factor is automatically added as described hereinbefore. For a more general discussion of the necessity for making corrections in multiplication involving negative factors expressed in the two's complement form see page 163 of Arithmetic Operations in Digital Computers by R. K. Richards.

*Multiplication Sequencing Operation*

Before a multiplication instruction may be read, the multiplier must be transferred into the Q-register and the A-register must be cleared. If the A-register is not cleared before the instruction is given, the binary value of the contents of the A-register will automatically be entered to the product because during the first addition the multiplicand is added to the contents of the A-register. After the A-register has been cleared, or preset to some value if a constant is to be intentionally added to the final product, and the multiplier has been transferred into the Q-register, the multiplication instruction is read from a memory location into the α-register under control of the instruction sequencing section (FIG. 27).

Since the multiplication instruction is written as a one-plus-one address instruction, the flip-flop F706 of the instruction sequencing section is set by bit 18 of the first instruction word to allow the flip-flop F703 to be set and the address of the next instruction to be loaded into the α-register during the next word-time. The instruction requires an operand (the multiplicand) so that the flip-flop F704 in the instruction sequencing section is set to initiate a search for the operand after the address of the next instruction has been loaded into the α-register.

When the address of the operand specified by that portion of the instruction stored in the α-register has been found, the flip-flop F705 is set by an $L_{21}'$ pulse to initiate execution by enabling the instruction decoding section of FIG. 43 to decode it and produce an MPY command signal from an AND-gate G1620. A flip-flop F1600 is set by the MPY command signal to store it for one word-time and disables the AND-gate G700 (FIG. 27) in order to inhibit the instruction sequencing section for one word-time while the multiplicand is transferred from the memory location to the α-register.

The MPY command signal is also applied to the input terminal of an OR-gate G903 of the α-register control section to cause the operand to be transferred into the α-register through the arithmetic section. The arithmetic section is enabled to transfer the contents of the memory location specified to the α-register by the MPY command signal at the input terminal 941 of the OR-gate G1400 (FIG. 40).

The executive flip-flop F705 in the instruction sequencing section (FIG. 27) is reset by an $L_{21}'$ pulse at the same time that the MPY command flip-flop F1600 in the instruction decoding section (FIG. 43) is reset so that the AND-gate G700 (FIG. 27) is not enabled and the instruction sequencing section does not initiate a search for the next instruction until a signal END MPY indicates that the multiplication is complete by enabling the OR-gate G701. In that manner instruction sequencing is suspended for an indefinite number of word-times until the multiplication sequencing section produces the END MPY signal.

In order to assure that the multiplicand read into the α-register while the flip-flop F705 (FIG. 27) is set is not decoded to produce another erroneous command signal, the MPY command signal from the true output terminal of the flip-flop F1600 is translated by an OR-gate G1600 and an inverter I1601 to disable key AND-gates, such as the AND-gate G1603, and thereby inhibit further instruction decoding.

The MPY command signal is also employed to preset the shift counter (FIG. 42) to a count of twelve as described hereinbefore so that the shift of the A and Q-registers nineteen places to the right may be determined by counting the $ShA_{19}'$ signals translated by the AND-gate G1501 in response to a control signal translated through the OR-gate G1502 from an output terminal 653 in the multiplication instruction sequencing section (FIG. 26). When the shift counter reaches thirty-one, a signal is transmitted to the instruction sequencing section from an output terminal 1503 to inhibit further multiplication. A complementary signal at an output terminal 1504 is also transmitted to the multiplication instruction sequencing section to initiate the operations necessary to correct the product.

At the conclusion of the word-time required to transfer the multiplicand into the α-register, when the execute flip-flop F705 and the MPY command flip-flop F1600 are reset by an $L_{21}$ pulse, a flip-flop F650 in the multiplication sequencing section is set. The flip-flop F650 is latched in the set state by a +6 volt signal from its false output terminal through the gates G650 and G651 until the shift counter reaches thirty-one at which time the AND-gate G650 is disabled and the next $L_{21}'$ pulse resets it.

The steering circuit of a flip-flop F651 is connected to the output terminals of the flip-flop F650 to enable it to be set by an $L_{23}'$ pulse immediately following the $L_{21}'$ pulse which sets the flip-flop F650. However, the flip-flop F651 will not be set if the flip-flop $Q_{19}$ of the Q-register is reset because the true output terminal of the flip-flop $Q_{19}$ holds the flip-flop F651 reset by applying to its true output terminal a +6 volt signal through an inverter I652 and an OR-gate G652.

If the least significant bit of the multiplier is a bit 0 so that the flip-flop F651 is not set, an AND-gate G653 is enabled to produce at its output terminal 653 a 0 volt signal that enables the pair of AND-gate G409 and G410 (FIG. 23) through the inverter I406 to generate $ShA_1$–$A_{18}$ and $ShA_{19}'$ shift pulses for the flip-flops $A_1$ to $A_{19}$ of the A-register and enables a pair of AND-gates G421 and G426 through an OR-gate G419 to generate $ShQ_1'$ and $ShQ_2$–$Q_{19}$ shift pulses for the flip-flops $Q_1$ to $Q_{19}$ of the Q-register. The 0 volt signal from the AND-gate G653 is also employed to enable an AND-gate G1501 through an OR-gate G1502 in the shift counter section (FIG. 42) to allow the shift pulse $ShA_{19}'$ to be counted.

Shift pulses are applied to the A and Q-registers to shift the least significant bit of the multiplier out of the Q-register and the least significant half of the partial product in the A-register into the Q-register. If the next least significant bit of the multiplier shifted into the least significant bit position $Q_{19}$ is a bit 1, the output terminal of the OR-gate G652 is driven to 0 volts to enable the multiplicand stored in the α-register to be added to the contents of the A-register upon the occurrence of the next $L_{23}'$ pulse which sets the flip-flop F651. Because of the manner in which the output terminal of the OR-gate G652 is directly connected to the true output terminal of the flip-flop F651, the output terminal of the OR-gate G652 cannot be driven to 0 volts until the flip-flop F651 is set. In other words, the flip-flop F651 clamps the output terminal of the OR-gate G652 at +6 volts until the flip-flop F651 is set by an $L_{23}'$ pulse. In that manner, the OR-gate G652 prevents the flip-flop F651 from being set by an $L_{23}'$ pulse until a bit 1 is shifted into the flip-flop $Q_{19}$ and the AND-gate G653 is disabled to discontinue shifting the A and Q-registers. Thereafter, upon the occurrence of the next $L_{23}'$ pulse, the flip-flop F651 is set and a 0 volt signal is transmitted: to the OR-gate G400 (FIG. 23) and the OR-gate G1410 (FIG. 40) to enable the contents of the A-register to be transferred through the arithmetic section; to the OR-gate G900 (FIG. 29) to enable the contents of the α-register to be ring-shifted; and to the OR-gate G1421 (FIG. 40) to enable the contents of the α-register to be added to the contents of the A-register being transferred through the arithmetic section. The result is automatically stored in the A-register. As the α-register is ring-shifted to restore its contents as its contents are added to the contents of the A-register, shift pulses are produced through AND-gates G410 and G411 of the A-register control section (FIG. 23) under the control of the flip-flop F400. The flip-flop F400 is set by an $L_0'$ pulse through the enabled AND-gate G401 and is reset by an $L_{21}$ pulse through the OR-gate G408 so that the flip-flop F401 remains set for one bit-time longer than the control flip-flop F933 of the $\alpha$-register control section. The extra shift pulse for the A-register is required in order to shift the last bit into the A-register since there is a bit-time of delay through the arithmetic section.

At the conclusion of the addition, an $L_{21}'$ pulse enables an AND-gate G655 to drive its output terminal 655 to a 0 volt level and thereby reset the flip-flop $Q_{19}$ of the Q-register. When the flip-flop $Q_{19}$ is reset, its true output terminal $Q_{19}$ is driven to a +6 volts to reset the flip-flop F651 through the inverter I652 and the OR-gate G652, and to enable the AND-gate G653. The enabled AND-gate G653 causes the contents of the A and Q-registers to be shifted to the right as before until a bit 1 is shifted into the flip-flop $Q_{19}$ again. The output terminal 650 of the inverter I650 is applied to the OR-gate G311 to enable the AND-gate G310 (FIG. 22) to couple the output terminal $A_{19}'$ of the A-register to the steering input terminals of the flip-flop $Q_1$. When the next bit 1 of the multiplier is shifted into $Q_{19}$, the AND-gate G653 is disabled and the flip-flop F651 is set as before to enable the contents of the $\alpha$-register to be added to the contents of the A-register.

During the addition of the contents of the $\alpha$-register to the contents of the A-register, any overflow is stored in the overflow flip-flop F1403 until the next $L_0'$ pulse resets it. In the meantime, the flip-flop $A_0$ is set equal to the sign of the multiplier in the flip-flop $\alpha_0$ by a $\phi_1'$ pulse during an $L_{21}'$ pulse period through an enabled AND-gate G654. In that manner the correct sign is always replaced in the sign bit position $A_0$ after the flip-flop $Q_{19}$ is reset as the A and Q-registers are shifted one place. That is important in order to assure the correct sign for the product and to cause the correction factor for a negative multiplier to be automatically added to the product as it is developed. It should be noted that when the overflow flip-flop F1403 is set, the overflow indicator flip-flop F1404 is set by the following $L_{23}'$ pulse. It is then automatically reset by an $L_1'$ pulse applied to the AND-gate G1443 (FIG. 41) which is enabled by the flip-flop F651 when it is reset.

The following example (−15X+13) illustrates the manner in which any overflow affecting the correctness of the sign of the partial product is corrected by setting the sign position $A_0$ equal to the sign position $\alpha_0$ as the A and Q-registers are shifted one place to the right just after the bit position $Q_{19}$ is reset to enable the shift control circuits to shift both registers until a bit 1 is sensed in position $Q_{19}$ again.

negative and there is not a carry into the sign position of the sum or when the signs of both numbers are positive and there is a carry into the sign position. A carry occurs during the addition of two or three binary digits in the same order which equals or exceeds the base two of the binary number system so that a carry is any bit 1 which is to be added to the next order. However, only the two aforementioned special conditions will affect the correctness of the sign of the product; consequently, only those two special conditions result in the transmission of an OVERFLOW' signal.

The first of those two special conditions is present for the two addition steps 6 and 9 of the foregoing example. The OVERFLOW' signal produced at those two times is employed to enable the AND-gate G654 to restore the correct negative sign (bit 1) in the sign position $A_0$ by setting that position equal to the sign position $\alpha_0$ of the multiplicand. That is accomplished while the bit 0 in the sign position $A_0$ is being shifted into the next lower order position $A_1$ in steps 8 and 11.

If the multiplicand is positive, the correct sign for successive partial products is positive (bit 0). Consequently, if a carry is added to bits in that order as a result of adding a positive multiplicand to a partial product, the OVERFLOW' signal produced by the arithmetic section enables the AND-gate G654 to correct the sign of the partial product by setting the sign position $A_0$ equal to the sign position $\alpha_0$ of the multiplicand while the bit 1 sum of the carry in the sign position $A_0$ is shifted into the next lower order position $A_1$.

The shift counter (FIG. 42) is advanced by one for each $ShA_{19}$ shift pulse applied while the A and Q-registers are being shifted to the right in response to a 0 volt signal at the output terminal 653 of the AND-gate G653 (FIG. 26). For example, if the bit configuration of the multiplier contains five successive 0 bits, the A and Q-registers are shifted five places to the right and the shift counter is advanced by the number five. When the shift counter reaches a count of thirty-one indicating that the multiplier has been completely shifted out of the Q-register, the flip-flop F651 will be held in the reset state by a 0 volt signal from the shift counter (FIG. 42) at the input terminal 1503 connected to the OR-gate G652 in order to prevent the contents of the $\alpha$-register from being added to the contents of the A-register again should a bit 1 be shifted into the flip-flop $Q_{19}$. The 0 volt signal at the input terminal 1503 also disables the AND-gate G653 to prevent further shift operations from being performed should a bit 0 be shifted into the flip-flop $Q_{19}$. The AND-

| | $\alpha_0$ | $\alpha_1$ | $\alpha_2$ | $\alpha_3$ | $\alpha_4$ | $A_0$ | $A_1$ | $A_2$ | $A_3$ | $A_4$ | $Q_0$ | $Q_1$ | $Q_2$ | $Q_3$ | $Q_4$ | Steps: |
|---|---|---|---|---|---|---|---|---|---|---|---|---|---|---|---|---|
| | 1 | 0 | 0 | 0 | 1 | 0 | 0 | 0 | 0 | 0 | 0 | 1 | 1 | 0 | 1 | (1) Test $Q_4$ for bit 1. |
| | | | | | | 1 | 0 | 0 | 0 | 1 | | | | | | |
| | | | | | | 1 | 0 | 0 | 0 | 1 | | 1 | 1 | 0 | 1 | (2) Add $\alpha$ to A. |
| | | | | | | 1 | 0 | 0 | 0 | 1 | | 1 | 1 | 0 | 0 | (3) Reset $Q_4$ and test for bit 1. |
| | | | | | | 1 | *1 | 0 | 0 | 0 | | 1 | 1 | 1 | 0 | (4) Shift A and Q; test for bit 1. |
| | | | | | | 1 | **1 | *1 | 0 | 0 | | 0 | 1 | 1 | 1 | (5) Shift A and Q; test for bit 1. |
| | | | | | | 1 | 0 | 0 | 0 | 1 | | | | | | |
| Overflow (1) | | | | | | 0 | **1 | *1 | 0 | 1 | | 0 | 1 | 1 | 1 | (6) Add $\alpha$ to A. |
| (1) | | | | | | 0 | **1 | *1 | 0 | 1 | | 0 | 1 | 1 | 0 | (7) Reset $Q_4$ and test for bit 1. |
| | | | | | | 1 | 0 | **1 | *1 | 0 | | 1 | 0 | 1 | 1 | (8) Shift A and Q; set $A_0=\alpha_0$. |
| | | | | | | 1 | 0 | 0 | 0 | 1 | | | | | | |
| Overflow (1) | | | | | | 0 | 0 | **1 | *1 | 1 | | 1 | 0 | 1 | 1 | (9) Add $\alpha$ to A. |
| (1) | | | | | | 0 | 0 | **1 | *1 | 1 | | 1 | 0 | 1 | 0 | (10) Reset $Q_4$ and test for bit 1. |
| | | | | | | 1 | 0 | 0 | **1 | *1 | | 1 | 1 | 0 | 1 | (11) Shift A and Q; set $A_0=\alpha_0$. |
| | | | | | | 1 | 0 | 0 | 1 | 1 | 1 | 1 | 1 | 0 | 1 | (12) Set $Q_0=A_0$. |

As noted hereinbefore with reference to FIG. 41, the arithmetic section produces an OVERFLOW' signal only when the signs of both binary numbers being added are gate G650 is similarly disabled when the shift counter reaches thirty-one in order to allow the flip-flop F650 to be reset in response to the next $L_{21}'$ pulse. At the same time that the flip-flop F650 is reset, the flip-flop F652, which is initially set by a 0 volt signal from an inverter I1504 (FIG. 42) when the shift counter is preset, is reset to enable an AND-gate G656 if the sign of the multiplier stored in the flip-flop $Q_0$ is negative. Upon the occurrence of the next $L_{21}'$ pulse, the flip-flop F652 is set again. During the intervening word-time, the two's complement of the contents of the α-register is added to the contents of the A-register in order to introduce the correction factor required for a negative multiplier as described hereinbefore. That is accomplished by a 0 volt signal at an output terminal 656 of the AND-gate G656 which, through an OR-gate G1437 (FIG. 40) in the arithmetic section, enables an AND-gate G1438 to allow the carry flip-flop F1401 to be set in response to the next $L_0'$ pulse and thereby add a bit 1 to the one's complement of the contents of the α-register shifted through the arithmetic section under the control of the AND-gate G1424 which is enabled by the 0 volt signal of the output terminal 656 through the OR-gate G1420. The contents of the A-register are synchronously shifted through the arithmetic section under the control of an AND-gate G1415 which is enabled through the OR-gate K1410 by the 0 volt signal at the output terminal 656.

If the sign of the multiplier is positive, the two's complement of the multiplicand is not added to the most significant half of the final product and one word-time is allowed to elapse. At the end of that word-time, the flip-flop F652 is set. At the same time a flip-flop F653 is also set in order to transmit a 0 volt signal from its true output terminal to the OR-gate G307 and thereby set the sign of the Q-register equal to the sign of the A-register as the final multiplication sequencing step.

At the same time that the flip-flops F652 and F653 are set, the instruction sequencing section (FIG. 27) is reactivated to initiate a search for the next instruction the address of which is specified by the contents of the β-register. That is accomplished by an $L_{21}'$ pulse transmitted through the AND-gate K702 which sets the flip-flop F701 the steering circuit of which is properly energized by a 0 volt END MPY signal from the false output terminal of the reset flip-flop F652 applied to the OR-gate K701. The AND-gate G709 is enabled by a +6 volt signal from the enabled OR-gate G701. A feedback from the true output terminal of the set flip-flop F701 holds the OR-gate G701 enabled so that when the address specified by the β-register is found, a 0 volt signal at an input terminal 842 is translated by the inverter I701 and the OR-gate G708 to disable the AND-gate G709 and enable the AND-gate G710. The next $L_{21}'$ pulse resets the flip-flop F701 and sets the flip-flop F702 to load the next instruction into the α-register which is normally the first of a sequence of instructions required to transfer the product into the memory section.

DIVISION SEQUENCING SECTION

Division is accomplished under the control of the division sequencing section illustrated in FIG. 2 by successive subtractions of a divisor stored in the α-register from appropriate orders of the most significant part of a dividend. Initially the most significant half of the dividend is stored in the A-register and the less significant half is stored in the Q-register. The divisor is conveniently subtracted from successively lower orders of the dividend by shifting the contents of the A-register one place to the left prior to each subtraction and subtracting the contents of the α-register from the contents of the A-register. As the contents of the A-register are shifted to the left, the less significant orders of the dividend stored in the Q-register are shifted into the A-register.

After each substraction, the difference or remainder is stored in the A-register. If that remainder is positive, the subtraction is final and a bit 1 is entered into the least significant bit position of the Q-register. But if it is negative, a bit 0 is entered and the trial subtraction must be nullified by restoring the preceding remainder and making the next trial subtraction from the next lower order. To restore a remainder, it would be possible to add the divisor back to the contents of the A-register before shifting the dividend one place to the left in order to make the next trial subtraction; however, that would require two word-times, one to add and one to subtract. Instead, the remainder is shifted one place to the left and the divisor is added to the contents of the A-register. In that manner the previous trial subtraction is nullified and another trial subtraction is made from the next lower order in one arithmetic operation which can be expressed as $A+\frac{1}{2}\alpha$, where A is the contents of the A-register and α is the contents of the α-register. That operation is equal to the operation of first adding α back into A and then subtracting α from the next lower order of A since shifting the divisor one order to the right relative to the dividend before the divisor is added is equivalent to dividing the divisor by two. The advantage of the operation $A+\frac{1}{2}\alpha$ over the operation $A+\alpha-\frac{1}{2}\alpha$ is that it requires only one arithmetic operation which is performed in one word-time instead of two arithmetic operations requiring two word-times. The algorithm for correcting a negative remainder in that manner, and for binary division in general, is described at pages 165 to 173 of Arithmetic Operations in Digital Computers by R. K. Richards.

This method of division by repeated trial subtractions requires that the absolute value of the divisor be subtracted from the absolute value of the dividend. Therefore, if a dividend is a negative binary number represented in the two's complement form, it is necessary to first store the sign bit, so that it will be available for determining the sign of the quotient after the division has been completed, and then obtain the absolute binary value of the dividend by taking the two's complement of that negative binary number. It is, of course, also necessary to store the sign of a negative divisor and obtain the two's complement of it but instead of taking a word-time to accomplish that, the negative divisor is left unaltered and its two's complement is added whenever a remainder is being restored by adding $\frac{1}{2}\alpha$ to A. For all trial substractions, the negative divisor already expressed in the two's complement form may be added directly.

Another condition imposed by the binary division algorithm employed is that the absolute value of the divisor must be greater than the absolute value of that portion of the dividend originally contained in the A-register in order that the quotient developed will not exceed the capacity of the Q-register when the division has been completed. The final remainder is found in the A-register after the last trial subtraction. To determine that the divisor is sufficiently large realtive to the dividend, it is subtracted from the original contents of the A-register, the most significant half of the dividend. If a negative remainder is produced by that test subtraction, it is known that the divisor is sufficiently large for the correct answer to be developed in the Q-register. If the subtraction produces a positive remainder, it is known in advance that a correct answer cannot be obtained and so it is unnecessary to proceed with the problem. In that event, provision is made to turn on the overflow indicator through the AND-gate G1445 (FIG. 41) and immediately search for the next instruction. The next instruction may be an instruction to branch on an overflow in order to introduce a sequence of instructions which will rescale the division problem so that it can be solved.

To perform the test subtraction, the two's complement of the divisor is serially added to the contents of the A-register if the divisor is a positive number and the sum is stored in the A-register. Only twenty shift pulses are applied in making the test subtraction. Since the divisor and the contents of the A-register are transferred through buffer flip-flops F1400 and F1401 in the arithmetic section, the sign bits are left in those flip-flops and the SUM of the sign bits is tested. If it it a negative sign, the overflow flip-flop F1404 is not set and sequencing for division proceeds. The reason for not completely registering the sum in the A-register is that if the test subtraction indicates a proper solution can be obtained, the next step would be to shift the A and Q-registers one place to the left. One word-time is required to ring-shift the Q-register one place short in order to effect a shift one place to the left. By having the A-register already effectively shifted one place to the left due to shifting it one place short during the test subtraction, one word-time is saved. The Q-register is actually ring-shifted while the next trial subtraction is being made from the contents of the A-register so that a separate word-time is not required to shift the Q-register one place to the left.

With the divisor effectively shifted one place to the left during the one word-time devoted to the test subtraction, the first trial subtraction may be made from the next to the highest order of the dividend by subtracting the divisor from the contents of the A-register. As just noted hereinbefore, the original dividend is restored automatically when the divisor is added instead of subtracted from the next lowest order of the dividend. Accordingly, the successive trial subtractions begin with an addition of the divisor to the contents of the A-register. While each trial subtraction is being made, the divisor is shifted one place to the left by ring-shifting the A-register one place short so that the next trial subtraction can be made from the next lower order of the dividend during the next word-time.

If the remainder of a given trial subtraction is negative, a bit 0 is entered into the least significant bit position $Q_{19}$ of the Q-register and the remainder is effectively restored automatically by adding the divisor into the next lower order than the order from which it was subtracted last. If the remainder of a given trial subtraction is positive, a bit 1 is entered into the bit position $Q_{19}$. As each successive trial subtraction is made the Q-register is shifted one place to the left so that the bits of the quotient entered into the bit position $Q_{19}$ may be shifted to the left to vacate that bit position $Q_{19}$ as the quotient is developed. Nineteen trial subtractions are made in order to develop a nineteen bit quotient in the Q-register and leave a nineteen bit remainder in the A-register.

If the last trial subtraction produces a negative remainder, the division process has been carried too far and the divisor must be added to restore the remainder. After that is done, both the final remainder and the quotient in the A and Q-registers, respectively, are positive binary numbers. The next step is to correct the signs of both. If the signs of both the divisor and the dividend are positive or negative, the positive signs of the numbers in the A and Q-registers are correct and it is only necessary to assure that the sign bit 0 is present in both of the sign positions $A_0$ and $Q_0$. But if the sign of the divisor is unlike the sign of the dividend, it is necessary to convert the numbers in the A and Q-registers to negative numbers in the two's complement form. As part of the final step of correcting the sign of the answer, the contents of the A and Q-registers are interchanged so that the quotient finally appears in the A-register and the final remainder appears in the Q-register.

A total of twenty-seven word-times is required to complete a division instruction. The first word-time begins when an $L_{21}'$ pulse sets the flip-flop F705 in the instruction sequencing section (FIG. 27) and is devoted to decoding the instruction by the instruction decoding section (FIG. 43) to set the divide flip-flop F1601 upon the termination of an $L_{23}$ pulse applied to an AND-gate G1621. A DVD command signal from the true output terminal of the flip-flop F1601 enables the OR-gate G903 in the α-register control section (FIG. 29). The output of OR-gate G903 enables the AND gate G1514 (FIG. 42) to allow an $L_0'$ pulse to clear the shift counter after which it is preset to a count of eleven by the DVD command signal as described hereinbefore. The shift counter is employed to determine when twenty $ShA_{19}'$ shift pulses have been applied to the A-register during the successive subtractions of the divisor, one for the test subtraction and one for each of nineteen trial subtractions.

The output of the OR-gate G903 is also coupled by an inverter I941 (FIG. 29) to an input terminal of an AND-gate G700 (FIG. 27) in the instruction sequencing section to suspend further instruction sequencing operations until an END DVD signal is received at an input terminal 604 of the OR-gate G701. The output of the inverter I941 also enables an OR-gate G904 (FIG. 29) to allow the divisor to be transferred from a location in the drum memory into the α-register through the arithmetic section as described hereinbefore with reference to FIG. 29.

As noted hereinbefore, a division instruction is a one-plus-one address instruction written in Format I containing a DVD command code 1111 and the address of the divisor in the first word and the address of the next instruction in the second word. When the division instruction has been loaded into the α-register, the instruction sequencing section proceeds to enable the address of the next instruction to be entered into the β-register and then proceeds to a search for the location of the divisor. It is not until the divisor has been located that the instruction sequencing section enables the decoding section to decode the DVD command code which immediately enables the divisor to be entered into the α-register. By storing the DVD command in the flip-flop F1601, the α-register is not required to store the division instruction and therefore may be used to store the divisor. At the beginning of the next $L_{22}$ bit-time period the flip-flop F1601 in the instruction decoding section is reset and an $L_{22}'$ pulse transmitted by an enabled AND-gate G602 (FIG. 25) simultaneously sets a flip-flop F600 the steering input circuit of which is energized by the DVD command signal to allow it to be set. It should be noted that before the decoding section flip-flop F1601 is reset, a flip-flop F608 in the division sequencing section is set through an AND-gate G633 if the sign bit of the A-register is a bit 0 representative of a plus sign. The DVD command signal is also employed to reset a flip-flop F605 and thereby clear it for receiving the sign bit of the divisor stored in the α-register.

The flip-flop F600 set by an $L_{22}'$ pulse at the end of the word-time required to enter the divisor into the α-register is the first stage of a three stage shift register employed as a ring counter to sequence the operations required for division. The first flip-flop F600 is set for one word-time to enable the divisor to be converted into a positive number which is the absolute value of the dividend if it is negative. That is accomplished in two steps only the first of which is accomplished during the word-time that the flip-flop F600 is set. That first step consists of transferring the most significant half of the dividend directly into the Q-register from the A-register while transferring the two's complement of the least significant half of the dividend in the Q-register to the A-register through the arithmetic section.

At the beginning of the word-time, the carry flip-flop F1402 is preset by the false output terminal of the flip-flop F600 through an AND-gate G603 of the division sequencing section (FIG. 25) and an OR-gate G1437 of the arithmetic control section (FIG. 40). Accordingly, as the one's complement of the contents of the Q-register is transferred through the adder into the A-register, a bit 1 is added to the least significant bit position to form the two's complement of the least significant half of the divisor. If a bit 1 is propagated from the most significant bit position during the process of forming the two's complement of the least significant part of the dividend, an AND-gate G607 (FIG. 27) is enabled so that an $L_{20}'$ pulse will set a flip-flop F603.

The next $L_{22}'$ pulse resets the flip-flop F600 and sets the flip-flop F601. Upon being set, the flip-flop F601 enables an AND-gate G608 to set a flip-flop F605 if the sign of the divisor is plus which is if the flip-flop $\alpha_0$ is reset and a +6 volt signal representative of a bit 0 is transmitted from its true output terminal. Consequently, the flip-flop F605 stores the sign of the divisor as a bit 1 if positive and a bit 0 if negative. The reason for reversing the bit representation of a plus and minus sign is to reverse the voltage level representation of the signs to reverse the enabling logic of the AND-gates G611 and G612 just as the bit representation of the A-register stored in the flip-flop F608 is reversed to enable an AND-gate G609 from the true output terminal of the flip-flop F608 when the sign is negative. In the employment of the flip-flop F608, any confusion which may arise due to the reversal of the sign bit representation may be eliminated by redesignating the input and output terminals of the flip-flop F608 so that the AND-gate G605 may be said to be enabled by a +6 volt signal from the false output terminal of the set flip-flop F608 when the sign of the dividend is negative instead of saying that the AND-gate G605 is enabled from the true output terminal of the reset flip-flop F608 as shown when the sign of the dividend is negative. However, in the employment of the flip-flop F605 to enable one or the other of the AND-gates G611 and G612 in cooperation with the flip-flop F604 the confusion cannot be eliminated without redesignating the input and output terminals of the flip-flop F604. Accordingly, the reversal of the logic levels of 0 volts and +6 volts at true output terminals of flip-flops for representing positive and negative signs stored in the division sequencing section is maintained in the following description.

The true output terminal of the flip-flop F601 is connected to an input terminal of an OR-gate G307 (FIG. 22) to enable it to set the flip-flop $Q_0$ equal to the flip-flop $A_0$. That operation has no significance at this point and may be disregarded since the original sign of the dividend is stored in the flip-flop F608 and the sign of the divisor is stored in the flip-flop F605 and it is only those signs which are of any significance in determining the correct sign of the quotient. However, that operation is repeated again near the end of the division sequencing when the flip-flop F601 is set for the second time in order to make the sign of the final remainder equal to the sign of the quotient as described hereinafter.

The set flip-flop F601 also enables the AND-gate G605 through the OR-gate G604 to allow the one's complement of the content of the Q-register (the most significant half of the dividend) to be transferred into the A-register through the arithmetic section while the content of the A-register (the two's complement of the least significant half of the dividend) is transferred into the Q-register if the sign of the dividend stored in the flip-flop F608 is negative. Again, as during the preceding word-time, the sign bit from position $A_0$ of the A-register is serially shifted out and discarded while the contents of bit position 1 to 19 of the A-register are serially shifted into $Q_1$ to $Q_{19}$.

If a bit 1 carry had been stored in the flip-flop F603 from the operation in the preceding word-time, the carry flip-flop F1402 would be preset to allow a bit 1 to be added to the first bit from the Q-register transferred through the adder to the A-register so that the two's complement of the most significant half of the dividend is formed and stored in the A-register. A $\phi_1'$ pulse during an $L_{19}'$ bit-time is transmitted through an enabled AND-gate G632 to reset the flip-flop F1400 and thereby clear the arithmetic section before the last bit is transferred into the sign bit position $A_0$ in order to assure that any carry propagated while forming the two's complement of the dividend is not entered into the sign bit position of the A-register which must be a bit 0 because as a result of forming the two's complement of the dividend, the binary number stored in the A and Q-registers must be a positive number.

The sign bit position $Q_0$ of the Q-register is of no significance; until the nineteen trial subtractions have been completed, as noted hereinbefore, and the Q-register may be considered as a nineteen bit shift register consisting of only flip-flops $Q_1$ to $Q_{19}$ which may be ring-shifted once during each trial subtraction. Only eighteen shift pulses are applied to the Q-register for that purpose in order that by ring-shifting only eighteen places to the right, the Q-register may be effectively shifted one place to the left. Since it is necessary to shift the entire dividend one place to the left after each subtraction, it is also necessary to shift the A-register one place to the left. That is accomplished by applying nineteen shift pulses to it, which is one less than the number of flip-flops in it. Thereafter, to complete the effective shift of the A and Q-registers as one register one position to the left, it is only necessary to transfer the bit from the flip-flop $Q_1$ into the flip-flop $A_{19}$ in response to an $L_{21}'$ pulse applied through an AND-gate G624, the output terminal of which is coupled to a trigger input terminal of the flip-flop $A_{19}$ by the inverter 1306 in FIG. 20.

An $L_{22}'$ pulse at the end of the third word-time of division sequencing resets the flip-flop F601 and sets a flip-flop F602 to initiate twenty successive subtractions, a test subtraction and nineteen trial subtractions. The shift counter counts twenty $L_{23}'$ pulses applied to an AND-gate G1503 (FIG. 42) which is enabled by a +6 volt signal at an output terminal 606 of an inverter I606 in the division sequencing section in order to determine when twenty successive subtractions have been made. The inverter I606 is driven by an AND-gate G627 which is enabled while the test subtraction is made, and for an additional nineteen word-times if the test subtraction produces a negative remainder in the A-register. Thereafter, when the shift counter reaches a count of thirty-one a +6 volt signal is produced at the output terminal 1504 in order to enable an AND-gate G600 and allow the flip-flop F600 to be set again through the OR-gate G601 upon the occurrence of the next $L_{22}'$ pulse. That pulse also resets the flip-flop F602.

The count of thirty-one is not reached until an $L_{23}'$ pulse occurs so that the AND-gate G600 is enabled for one word-time until the next $L_{22}'$ pulse occurs. Consequently, the flip-flop F602 remains set for one word-time after the twenty successive subtraction operations have been completed. That extra word-time period is employed to ring-shift the contents of the Q-register eighteen places for the last time and to shift the contents of the A-register one place to the right.

After the flip-flop F602 is reset, the set state is sequenced through the stages F600 to F602 one stage per word-time to provide three word-times required to correct the quotient and final remainder. The first correction word-time is devoted to adding the divisor to the contents of the A-register in order to restore the final remainder if the remainder after the last trial subtraction is negative. The second word-time is devoted to obtaining the two's complement of the final remainder if the dividend and the divisor have unlike signs. The final word-time is devoted to obtaining the two's complement of the quotient in the Q-register if the signs of the dividend and the divisor are unlike and for simultaneously exchanging the contents of the A and Q-registers in order to place the quotient in the A-register and the remainder in the Q-register.

Before proceeding with a more detailed description of a division operation, the steps involved will be illustrated in the following example wherein the step of shifting the dividend left one place before adding or subtracting the divisor as necesary for each trial subtraction has been listed separately although, as noted hereinbefore, the shift is effectively accomplished while a preceding trial subtraction is being made.

FIRST EXAMPLE: 25÷4=6 AND 1 REMAINDER

| | α-reg. | A-reg. | Q-reg. | |
|---|---|---|---|---|
| | +0100 | + 0001 | +1001 | =25 |
| Test Subtraction | | − 1100 | | =−4 |
| Negative Remainder | | − 1101 | 1001 | |
| Shift Left | | −(1) 1011 | 0010 | Insert extraneous bit 0. |
| Test for sign of remainder and Add Divisor | | + 0100 | | |
| Negative Remainder | | − 1111 | 0010 | |
| Shift Left | | −(1) 1110 | 0100 | Insert bit 0 as highest order of quotient. |
| Test for sign of remainder and Add Divisor | | + 0100 | | |
| Positive Remainder | | + 0010 | 0100 | |
| Shift Left | | +(0) 0100 | 1001 | Insert bit 1 as next order of quotient. |
| Test for sign of remainder and Sub. Divisor | | − 1100 | | |
| Positive Remainder | | + 0000 | 1001 | |
| Shift Left | | +(0) 0001 | 0011 | Insert bit 1 as next order of quotient. |
| Test for sign of remainder and Sub. Divisor | | | | |
| Negative Remainder | | − 1101 | 0011 | |
| Shift Left | | −(1) 1010 | 0110 | Insert bit 0 as next order of quotient. |
| Shift A-reg. Right | | − 1101 | 0110 | |
| and Add Divisor | | + 0100 | | |
| | | + 0001 | 0110 | Ans: Remainder and Quotient. |
| Exchange A and Q | | + 0110 | +0001 | Ans: Quotient and Remainder. |

Answer: Quotient in A-register 0110 =6
Final Remainder in Q-register 0001 =1

Note: The sign of the quotient is determined by the signs of the dividend and divisor and the sign of the final remainder is made equal to the sign of the quotient.

Note that in the foregoing example the dividend as contained in the A and Q-registers has eight bits and that the least significant half of the dividend is stored in the Q-register. The sign of each half must be the same so that only the sign of the A-register is indicated. For simplicity, the sign is represented in the example by a plus symbol. The divisor is also positive and is stored in the α-register throughout the division sequencing. To subtract the divisor for the first time in order to test whether or not a permissible division can be performed, the two's complement of the contents of the α-register is added to the contents of the A-register. The intermediate remainder after the test subtraction is negative indicating that the problem specified is permissible. Accordingly, the division sequencing control section allows $n$ trial subtractions of the divisor from the dividend (where $n$ is equal to the number of data bit positions in the Q-register) in order to obtain the quotient and final remainder.

Before the first trial subtraction of the divisor from the dividend can be made, the original dividend must be restored. As noted hereinbefore, the first trial subtraction is accomplished by shifting the dividend one order to the left and adding the divisor to the contents of the A-register thereby effectively restoring the original dividend and making the first trial subtraction in one arithmetic operation. In the example, the intermediate remainder after the first trial subtraction is again a negative value so that it is necessary to again restore the dividend before subtracting the divisor from the next lower order. Again the dividend is restored and the next trial subtraction is made by shifting the dividend one order to the left and adding the divisor to the contents of the A-register.

Each time that the divisor is added or subtracted to obtain a new intermediate remainder, a bit 0 or 1 is inserted in the least significant bit position of the Q-register as the dividend is shifted one place to the left. The bit 0 inserted after the test subtraction is an extraneous bit which will not appear in the quotient or the final remainder. That bit is underscored so that it may be identified throughout the example. The bit 0 inserted after the first trial subtraction is the most significant bit of the quotient. The intermediate remainder of the second trial subtraction is positive so that it is not necessary to restore it before the next trial subtraction is made but it is necessary to insert a bit 1 in the least significant bit position of the Q-register as the dividend is shifted one order to the left. Note that each time the dividend is shifted one place to the left, a bit (set off by parentheses) is discarded and the quotient being developed is shifted to a higher order position in the Q-register.

The third trial subtraction also produces a positive intermediate remainder so that the dividend is not restored and a bit 1 is inserted into the least significant bit position of the Q-register. The fourth and last trial subtraction of the divisor produces a negative intermediate remainder so that when the dividend is again shifted one order to the left, a bit 0 is inserted into the least significant bit position of the Q-register to develop the least significant bit of the quotient which is equal to six. The last intermediate remainder in the A-register is negative so that the next to last remainder must be restored by adding in the divisor. The correct final remainder is then contained in the A-register. As a final step the contents of the A and Q-registers are exchanged. Before the contents of the A and Q-registers are exchanged so that the quotient appears in the A-register and the remainder appears in the Q-register the sign of the remainder is made equal to the sign of the dividend and as the exchange is made, the sign of the quotient is made positive if the signs of the dividend and the divisor are alike, as they were in the example, and negative if the signs of the dividend and divisor are not alike.

In the foregoing example both the dividend and the divisor were selected as positive numbers for simplicity. If the dividend had been a negative number, the solution to the problem would have been obtained in the same manner except that the negative dividend would have first been complemented to place the absolute value of the dividend in the A and Q-registers and the original negative sign bit would have been stored in the flip-flop F608 so that at the conclusion of the problem the sign of both the quotient and the final remainder could have been made negative. In addition to making the signs negative, it would have been necessary to obtain the two's complement of the contents of the A-register and the Q-register so that the quotient and the final remainder would both be properly expressed as negative numbers in the two's complement form.

If only the divisor had been a negative number, it would have been necessary to add the two's complement of the negative divisor in order to add the divisor and to simply add the negative divisor in its two's complement form in order to subtract the divisor. Again the quotient would be negative so that it would be necessary to obtain the two's complement of the quotient but not of the remainder. But if both the divisor and the dividend had been negative, it would have been necessary to first obtain the absolute value of the dividend before proceeding as if only the divisor were negative. At the conclusion of the problem it would then have been necessary to convert to the two's complement form only the remainder as the sign of the quotient would have been positive.

To illustrate a division operation in more detail, some of the steps required to divide —7 by +3 are shown in the following second example.

bit-time period is required, the time at which the steps are begun. The initial time is an $L_{22}$ bit-time just prior to the word-time devoted to making a test subtraction. A second column indicates the key logic gate which directs the step described on the right.

The sign of the Q-register is not important until the final steps so that it is not repeated. The sign bit position of the A-register, however, is important and its content is indicated at each step. Since the A-register is effectively shifted one order to the left by applying one less than the total number of shift pulses required to shift the sum from the arithmetic section into the A-register as the contents of the $\alpha$-register are combined with the contents of the A-register, the most significant data bit is registered in the sign bit position of the A-register and the sign bit remains in the arithmetic section. Accordingly, at each step of shifting the A-register one order to the left, the sign bit which remains in the arithmetic section is indicated to the left of the A-register but enclosed in parenthesis. That step is indicated as always occurring at an $L_{19}$ bit-time, the time at which shifting of the A-register is terminated.

A flip-flop F604 is set to the complement of the sign bit left in the arithmetic section at the beginning of the SECOND EXAMPLE: $-7 \div +3$

| Time | Gate | F604 | A-reg. S 1234 | Q-reg. S 1234 | |
|---|---|---|---|---|---|
| $L_{22}$ | | | 0 0000 | 0 0111 | |
| $L_0$ | G614 | | 1 1101 | | TEST Subtraction. |
| $L_{19}$ | G609 | 0 | (1) 1 101 | | A-reg. shifted left one order. |
| $L_{21}$ | G624; G625 | 0 | (1) 1 1010 | 0111 | $A_4$ set=$Q_1$; $Q_1$ set=F604. |
| $L_0$ | G615 | | 0 0011 | | First Restoration and Subtraction. |
| $L_{18}$ | G627 | | | 1110 | Q-reg. ring-shifted three orders. |
| $L_{19}$ | G609 | 0 | (1) 1 101 | | A-reg. shifted left one order. |
| $L_{21}$ | G624; G625 | 0 | (1) 1 1011 | 0110 | $A_4$ set=$Q_1$; $Q_1$ set=F604. |
| $L_0$ | G615 | | 0 0011 | | Second Restoration and Subtraction. |
| $L_{18}$ | G627 | | | 1100 | Q-reg. ring.shifted three orders. |
| $L_{19}$ | G609 | 0 | (1) 1 110 | | A-reg. shifted left one order. |
| $L_{21}$ | G624; G625 | 0 | (1) 1 1101 | 0100 | $A_4$ set=$Q_1$; $Q_1$ set=F604. |
| $L_0$ | G615 | | 0 0011 | | Third Restoration and Subtraction. |
| $L_{18}$ | G627 | | | 1000 | Q-reg. ring-shifted three orders. |
| $L_{19}$ | G609 | 1 | (0) 0 000 | | A-reg. shifted left one order. |
| $L_{21}$ | G624; G625 | 1 | (0) 0 0001 | 1000 | $A_4$ set=$Q_1$; $Q_1$ set=F604. |
| $L_0$ | G614 | | 1 1101 | | Fourth Restoration and Subtraction. |
| $L_{18}$ | G627 | | | 0001 | Q-reg. ring-shifted three orders. |
| $L_{19}$ | G609 | 0 | (1) 1 110 | | A-reg. shifted left one order. |
| $L_{21}$ | G624; G625 | 0 | (1) 1 1100 | 0001 | $A_4$ set=$Q_1$; $Q_1$ set=F604. |
| $L_0$ | M631 | | 1 1110 | | A-reg. shifted right one order. |
| $L_{18}$ | G627 | | 1 1110 | 0010 | Final Q-reg. ring-shift of three orders. |
| $L_0$ | G628 | | 0 0011 | | Final Restoration of Remainder. |
| $L_{21}$ | G637 | | 0 0001 | | $A_0$ set=O. |
| $L_{22}$ | G307 | | | 0 0010 | $Q_0$ set=$A_0$. |
| $L_0$ | G630 | | 1 1111 | | Take two's complement of remainder. |
| $L_0$ | M623 | | 1 1110 | 1 1111 | Take two's complement of quotient and place it in A-reg; shift remainder to Q-reg. |

Again for simplicity the A and Q-registers are each considered to consist of only four data bit positions. However, a sign bit position is also included for each register in this example. The $\alpha$-register is not illustrated but it is assumed that a binary configuration 00011 representative of a positive decimal three is stored therein so that it is readily available for four successive subtractions from the dividend.

Before the instruction to divide is read into the $\alpha$-register in response to which the divisor is read into the $\alpha$-register, as described hereinbefore, the dividend is stored in the A and Q-registers in the two's complement form. After the one word-time required to enter the divisor into the $\alpha$-register, two word-times are required to complement both parts of the dividend since only one register may be complemented at a time. For this second example, it is assumed that the two word-times devoted to obtaining the two's complement of the dividend have just been completed at an $L_{22}$ bit-time.

A column on the left specifies the time during which the various steps are accomplished or, if more than one next bit-time $L_{20}$. That time and step are not separately indicated but the result is illustrated in a column headed F604 so that during the next bit-time period $L_{21}$, the bit position $Q_1$ is set equal to the content of F604 under the control of an AND-gate G625. It is in that manner that the quotient is developed in the Q-register. However, the first time $Q_1$ is set equal to F604, an extraneous bit is entered into the Q-register, as explained hereinbefore. That extraneous bit is again underscored so that it may be identified at each step until it is finally discarded from both the Q and A-registers.

During the test subtraction, the A-register is shifted to the left one order so that the dividend may be restored and the first trial subtraction made from the next to the highest order of the dividend. The first trial subtraction (restoration and subtraction) step during which the divisor is added to the dividend and the Q-register is ring-shifted begins at an $L_0$ bit-time. Ring-shifting of the Q-register is terminated at an $L_{18}$ bit-time so that it is effectively shifted one order to the left. Shifting of the sum from the adder into the A-register is terminated at an $L_{19}$ bit-time so that the A-register is also effectively shifted one order to the left. To complete the virtual shift of the dividend one order to the left, the least significant bit position of the A-register ($A_4$ in the example) is set equal to the position $Q_1$ at the same time that the extraneous bit is entered into the position $Q_1$. That bit entered into $Q_1$ is the most significant bit of the quotient being developed. For the moment it is out of place but as the second trial subtraction is made, the Q-register is ring-shifted three places thereby transferring that most significant bit into the least significant bit of the Q-register.

The second trial subtraction is the same as the first and the succeeding third and fourth trial subtractions are the same as the second but as the process proceeds through the second, third and fourth trial subtractions, it may be seen that the quotient being developed in the Q-register is shifted to the left so that when the last bit of the quotient is entered by setting the bit position $Q_1$ equal to the content of the flip-flop F604, the quotient will be completed in the Q-register but again the last bit which is the least significant bit of the quotient is out of place. It should also be noted that the last intermediate remainder has been automatically shifted one order to the left so that it is completely out of place by one order at the time that the least significant position of the A-register is set equal to $Q_1$.

To correct the last remainder, the A-register is shifted one place to the right under the control of an AND-gate G631. It is at that time that the extraneous bit originally entered into the Q-register, and carried throughout the process, is discarded. At the same time, ring-shifting of the Q-register for the last time is begun. At an $L_{18}$ bit-time, the ring-shifting of the Q-register is terminated to effectively shift the contents of the Q-register one order to the left and place the last bit of the quotient developed into the least significant bit position of the Q-register.

At this point the Q-register contains the correct absolute value of the quotient which needs to be corrected with respect to its sign and the A-register contains a negative remainder indicating that the divisor was subtracted from the dividend once too many times so that it is necessary to restore the correct absolute value of the final remainder by adding to it the divisor. The sign of the A-register should then be positive. To assure that, the sign position $A_0$ is reset at an $L_{21}$ bit-time under the control of an AND-gate G637. During the next $L_{22}$ bit-time, the sign of the Q-register is set equal to the bit position $A_0$, the sign of the A-register, under the control of an OR-gate G307 (FIG. 22) since the absolute value of the quotient in the Q-register must be positive. During the next word-time under the control of an AND-gate G630, the two's complement of the final remainder is obtained and placed in the A-register because the sign of the dividend is negative. Had the sign of the dividend been positive, it would not have been necessary to take the two's complement of the remainder since the A-register would already contain the correct positive final remainder but one word-time is devoted to obtaining the two's complement of the remainder whether it is necessary or not.

During the final word-time, the contents of the A and Q-registers are interchanged. In the process, the two's complement of the quotient is obtained and placed in the A-register if the signs of the dividend and the divisor are unlike. If the signs had not been unlike, an AND-gate G622 would have controlled the interchange of the contents between the A and Q-registers instead of the AND-gate G623 as in the example.

It should be noted that throughout the example, a word-time has been indicated as being twenty-four bit-times even though a word length of only five bits is employed for the example. However, it will become apparent as the description of the division sequencing section proceeds that the word length is immaterial and that if a word length shorter than twenty bits were to be actually employed, sufficient bit-times would be deleted between bit-time $L_0$ and bit-time $L_{18}$ in the timing of the computer system. Deletion of those bit-times would have effect only on other portions of the computer. In order to understand the division sequencing section, deletion of those bit-times is possible and the example is valid as to the details indicated.

From the foregoing it may be seen that a total of twenty-seven word-times is required to complete division by successive subtractions. The first word-time is devoted to decoding the divide instruction and loading the divisor into the $\alpha$-register. The flip-flop F1601 is set during that word-time. The second and third word-times are devoted to complementing the dividend if it is necessary. The flip-flops F600 and F601 of the three bit shift register in the instruction sequencing section are successively set during the second and third word-times. The fourth word-time is devoted to testing the relative magnitude of the divisor. The third flip-flop F602 of the three bit shift register is set during that testing word-time and it remains set for the next nineteen successive word-times during which repeated trial subtractions of the divisor are made from the contents of the A-register. The shift counter in FIG. 42 counts the twenty word-times during which the flip-flop F602 is set. When it reaches the count of thirty-one, the process of repeated additions and subtractions is terminated and the Q-register is ring-shifted for the last time in order to effectively shift its contents one order to the left and the A-register is shifted one order to the right as described hereinbefore. One word-time, the twenty-fourth word-time of division sequencing, is required for that purpose. After the Q-register has been shifted for the last time, at which time the shift counter reaches a count of thirty-one, the three-bit shift register of the division sequencing section is recycled so that the flip-flop F602 is reset and the flip-flop F600 is set again. The flip-flop F600 remains set for one word-time during which the last remainder in the A-register is corrected if it is negative as a result of the last trial subtraction. After the correct final remainder is obtained, the flip-flop F601 is set and the flip-flop F600 is reset. The flip-flop F601 remains set for one word-time during which the final remainder in the A-register is made negative if the dividend is negative by obtaining the two's complement of the contents of the A-register. During the twenty-seventh and final word-time period, the flip-flop F602 is set to allow the contents of the A and Q-registers to be interchanged. If the divisor and the dividend have like signs the quotient remains unchanged as it is transferred into the A-register but if the divisor and the dividend have unlike signs, the quotient is made negative by obtaining the two's complement of the contents of the Q-register and placing the result in the A-register as the contents of the A and Q-registers are exchanged.

In addition to the flip-flops F600 to F602, the division sequencing section includes the following flip-flops: a flip-flop F603 provided to store a carry from the process of obtaining the two's complement of the least significant half of the dividend during the second word-time so that it may be added to the complement of the most significant half of the dividend during the third word-time; the flip-flop F604 provided to store the complement of the last bit from the arithmetic section following each trial subtraction of the divisor since, as noted hereinbefore, shifting of the sum into the A-register is always stopped one bit-time before the sum is completely registered; the flip-flop F605 provided to store the complement of the sign of the divisor; a flip-flop F606 provided to determine whether the division sequencing should be terminated after the test subtraction; a flip-flop F607 to sequence the interchange of the A and Q-registers at the end of the division sequencing; and the flip-flop F608 to store the complement of the sign of the dividend.

The flip-flops F604 and F605 control a pair of AND-gates G614 and G615 through gates G611 to G613 in order to cause the absolute value of the divisor to be added to the contents of the A-register if the last remainder is negative and to be subtracted if the last remainder is positive. If the absolute value of the divisor is to be added and the sign of the divisor is negative, only the AND-gate G614 is enabled to cause the two's complement of the divisor to be added to the contents of the A-register. If the divisor is positive and it is to be added to the contents of the A-register, only the AND-gate G615 is enabled. If the sign of the last remainder is positive, the divisor is to be subtracted. Accordingly, if the divisor is negative, only the AND-gate G615 is enabled so that the divisor is directly added to the contents of the A-register but if the divisor is positive, the AND-gate G614 is enabled to cause the two's complement of the divisor to be added to the contents of the A-register.

After nineteen trial substractions have been made and the shift counter has reached a count of thirty-one, an AND-gate G609 is disabled to prevent either AND-gate G614 or G615 from being enabled and thereby prevent further trial subtractions from being made. An $L_{22}'$ pulse resets the flip-flop F602 through an AND-gate G602 and sets the flip-flop F600 to enable one of two AND-gates G628 and G629 in order to restore the final remainder by adding the divisor to the contents of the A-register if necessary. The AND-gates G628 and G629 are prevented from being enabled until a count of thirty-one has been reached by the shift counter since each AND-gate has an input terminal connected to the output terminal 1504 of the shift counter. If the sign of the last remainder is negative the flip-flop F604 is reset and its true output terminal is driven to a +6 volt level to permit a selected one of the AND-gates G628 and G629 to be enabled. If the divisor is negative, the flip-flop F605 is also reset and only the AND-gate G629 is enabled to cause the two's complement of the divisor to be added to the contents of the A-register. If on the other hand the divisor is positive, the flip-flop F605 is set and only the AND-gate G628 is enabled to cause the divisor to be added directly to the contents of the A-register.

The flip-flop F606 is provided to determine whether the division sequencing should be terminated after the test subtraction is made. It is set through the AND-gate G603 during the second word-time when the flip-flop F600 is set. Thereafter, while the flip-flop F602 is set during the fourth word-time, the test subtraction is made and an AND-gate G617 is enabled so that a +6 volt signal is transmitted from the output terminal of an OR-gate G618 to an input terminal of an AND-gate G634 and a 0 volt signal is transmitted from an inverter I604 to an input terminal of an OR-gate G701 in the instruction sequencing section. A $\phi_1'$ pulse during an $L_{20}'$ bit-time period resets the flip-flop F604 if the sign of the difference of the test subtraction is negative. When the flip-flop F604 is reset, a 0 volt signal is transmitted from its false output terminal to the reset input terminal of the flip-flop F606 so that the flip-flop F606 is also reset thereby disabling an AND-gate G617.

Division sequencing proceeds only if the flip-flop F606 is reset. If the sign of the remainder in the A-register after the test subtraction is positive, the divisor is too small relative to that portion of the dividend contained in the A-register so that the resulting quotient will exceed the capacity of the A-register when the divide operation is completed if the division sequencing is allowed to proceed. Since it is known in advance that the answer will not be correct, the remaining twenty-three word-times required for a division may be avoided by branching out of division sequencing. That is accomplished by a 0 volt signal at the output terminal 604 of the inverter I604 if the flip-flops F604 and F606 have not been reset by an $L_{21}'$ pulse following the trial subtraction since the 0 volt signal at the output terminal 604 enables the OR-gate G701 in the instruction sequencing section (FIG. 27) to allow the flip-flop F701 to be set by enabling the AND-gate G709.

At the same time, an $L_{21}'$ pulse is applied to the AND-gate G634 to reset the flip-flop F608 and to the AND-gate G1445 (FIG. 41) to set the overflow flip-flop F1404. The AND-gate G1445 is enabled by a +6 volt signal transmitted from an inverter I608 only if the flip-flop F606 remains set, thereby indicating a prohibited division problem and allowing the overflow flip-flop F1404 to be set so that a following branch on overflow instruction may be employed to introduce a sequence of instructions which will rescale the division problem or to take some other appropriate action as desired.

If the test subtraction indicates that a permissible division has been instructed, an AND-gate G626 is enabled when the AND-gate G617 is disabled. The enabled AND-gate G626 enables an AND-gate G627 through an inverter I605 until the end of the twenty-fourth word-time. A 0 volt signal at an output terminal 627 connected to the enabled AND-gate G627 disables an AND-gate G702 in the instruction sequencing section (FIG. 27) to prevent pulses from being applied to the trigger input terminal of the flip-flop F701 until a flip-flop F607 in the division sequencing section (FIG. 25) is set. That assures suspension of instruction sequencing if the flip-flop F606 is reset during an $L_{20}$ bit-time period of the test subtraction word-time.

Although the flip-flop F602 is set for twenty-one word-times, the AND-gate G627 is enabled for only twenty word-times since the flip-flop F606 is set for the first of the twenty-one word-times. The signal output from the AND-gate G627 enables an AND-gate G1503 (FIG. 42) through an inverter I606 to allow the shift counter to count the remaining twenty of the twenty-one word-times during which the contents of bit positions $Q_1$ to $Q_{19}$ of the Q-register are ring-shifted one place short once during each word-time. An AND-gate G424 connected to the output terminal 606 enables an $L_{18}'$ pulse to reset the flip-flop F401 in the Q-register control section (FIG. 23) to stop the ring-shifting of the Q-register after eighteen shift pulses have been applied. A DVD-OP signal at the output terminal 627 (FIG. 25) enables an OR-gate G422 (FIG. 23) to set the flip-flop F401 at the beginning of an $L_0$ bit-time period. An AND-gate G309 (FIG. 22) is enabled by the +6 volt signal at the output terminal 606 (FIG. 25) to continually connect the output of bit position $Q_{19}$ to the steering input circuit of bit position $Q_1$.

Following each ring-shift of the Q-register, the bit position $A_{19}$ is set equal to the bit position $Q_1$ by an $L_{21}'$ pulse applied to an enabled AND-gate G624 and bit position $Q_1$ is set equal to the flip-flop F604 by an $L_{21}'$ pulse applied to an enabled AND-gate G625. As just noted hereinbefore, the flip-flop F604 is set at that time to the complement of the sign bit of a trial subtraction remainder so that if the remainder of a trial subtraction is negative, the bit position $Q_1$ is set equal to zero. It is in that manner that binary digits of the quotient are introduced into the Q-register.

An $L_{23}'$ pulse applied to the enabled AND-gate G1503 (FIG. 42) advances the shift counter to the count of thirty-one just before the Q-register is ring-shifted for the last time to properly arrange the quotient in the Q-register at which time the contents of the A-register are shifted one place to the right. When the shift counter reaches the count of thirty-one, AND-gates G603 and G609 are disabled. Disabling the AND-gate G609 enables the OR-gate G610 through an inverter I602. The enabled OR-gate G610 enables the AND-gate G602 so that the next $L_{22}'$ pulse which occurs immediately after the Q-register is ring-shifted for the last time resets the flip-flop F602 and, because the AND-gate G600 is then enabled, sets the flip-flop F600. When the flip-flop F600 is set for the second time, the divisor is added to the contents of the A-register if the remainder following the last trial subtraction is negative. That is accomplished under the control of the AND-gates G628 and G629 as just described hereinbefore. An $L_{21}'$ pulse applied to an enabled AND-gate G637 resets the flip-flop $A_0$ after the final remainder has been restored to assure that the final remainder is positive.

After the final remainder has been restored the flip-flop F600 is reset and the flip-flop F601 is set. During the word-time that the flip-flop F601 is set for the second time, the final remainder is converted to the two's complement form if the dividend is negative. That is accomplished under the control of an AND-gate G630 which has one input terminal connected to the true side of the flip-flop F608 which is reset if the dividend is negative to enable the AND-gate G630 to preset the carry flip-flop F1402 via the OR-gate G1437 so that a one is added to the complement of the contents of the A-register serially shifted through the adder under the control of the AND-gate G630 via the OR-gate G1412. The 0 volt signal from the output terminal of the AND-gate G630 is also applied to the OR-gate G400 of the A-register control section (FIG. 23) to enable the flip-flop F400 to be set in response to an $L_0'$ pulse. The flip-flop F400 is automatically reset by an $L_{21}$ pulse applied to an OR-gate G408 so that the two's complement from the arithmetic section is fully shifted into the A-register.

At the end of the twenty-fifth word-time, the sign bit of the final remainder is a zero and it is necessary to make the sign bit of the quotient also zero before the final remainder is converted to its two's complement form if the dividend is negative. That is accomplished by a negative-going (+6 to 0 volts) signal derived from the true output terminal of the flip-flop F601 as it is being set and inverted by the OR-gate G307 (FIG. 22) to trigger the flip-flop $Q_0$.

The false output terminal of the flip-flop F601 enables an AND-gate G630 through an inverter I603. If the dividend is negative, the flip-flop F608 is reset so that the AND-gate G630 is enabled to preset the carry flip-flop F1402 (FIG. 40) through the OR-gate G1437 and allow the two's complement of the contents of the A-register to be transferred through the arithmetic section into the A-register. To transfer the contents of the A-register through the arithmetic section, the flip-flop F400 in the A-register control section (FIG. 23) is set by an $L_0'$ pulse applied to an AND-gate G401 enabled by the AND-gate G630 (FIG. 25) via the OR-gate G400. The flip-flop F400 is automatically reset by an $L_{21}$ pulse applied to an OR-gate G408. After the two's complement of the final remainder in the A-register has been obtained, if necessary, the final remainder is correct in both sign and magnitude but the quotient in the Q-register is correct only in magnitude if the divisor and the dividend have unlike signs because then the quotient should be negative.

An $L_{22}'$ pulse resets the flip-flop F601 and sets the flip-flop F602 at the end of the twenty-sixth word-time. At the same time that the flip-flop F607 is set to enable the OR-gate G618 and to produce a signal END DVD through an inverter I604 which indicates that the end of the division sequencing has ben reached, one of a pair of AND-gates G622 and G623 is enabled. The AND-gate G622 is enabled if the positive sign of the quotient is already correct and the two's complement of it is not to be obtained and the AND-gate G623 is enabled if the positive sign of the quotient is not correct and the two's complement of the quotient is to be obtained. The output of the AND-gate G623 presets the carry flip-flop F1402 (FIG. 40) through the OR-gate G1437 and allows the two's complement of the contents of the Q-register to be transferred to the A-register while the remainder is transferred directly into the Q-register.

AND-gates G619 and G620 provide the logic to determine whether the two's complement of the quotient should be obtained. Those gates compare the sign of the dividend stored in the flip-flop F608 and the sign of the divisor stored in the flip-flop F605 to determine whether both are positive or both are negative. If they are either both positive or both negative, the OR-gate G621 is enabled and the AND-gate G622 is enabled during the twenty-seventh word-time. If they are neither both positive nor both negative, the AND-gate G623 is enabled during the twenty-seventh word-time.

While the two's complement of the quotient is being obtained, if necessary, and the quotient is transferred to the A-register, the final remainder in the A-register is transferred directly into the Q-register as noted hereinbefore. The true output terminal of the set flip-flop F607 enables the OR-gate G313 (FIG. 22) to couple the bit position $A_{19}$ to the steering input terminals of the flip-flop $Q_0$ through the AND-gate G306 and enables the AND-gate G401 (FIG. 23) through the OR-gate G400 to allow the flip-flop F400 to be set by an $L_0'$ pulse. The flip-flop F400 is then automatically reset by an $L_{21}$ pulse. While the flip-flop F400 is set, twenty-one $ShA_0'$, $ShA_1$–$A_{18}$ and $ShA_{19}'$ shift pulses are generated. The output terminal 313 of the enabled OR-gate G313 is coupled to an OR-gate G412 by an inverter I403 to enable it and allow an $L_0'$ pulse to set the flip-flop F401. The flip-flop F401 is automatically reset by an $L_{20}$ pulse applied to the OR-gate G425. In that manner twenty $ShQ_0'$, $ShQ_1'$ and $ShQ_2$–$Q_{19}$ shift pulses are generated. Only twenty shift pulses need be applied to the Q-register since data is being transferred directly from the A-register into the Q-register but twenty-one shift pulses are required for the A-register since data is being transferred from the Q-register to the A-register through the arithmetic section which introduces a one bit-time delay.

While the flip-flop F607 (FIG. 23) is set, the enabled OR-gate G618 allows an $L_{21}'$ pulse to be transmitted through an AND-gate G634 to reset the flip-flop F608. The output terminal 618 of the OR-gate G618 is also coupled by an inverter I604 to the OR-gate G701 in the instruction sequencing section (FIG. 27) to energize the steering circuit of the flip-flop F701 through the OR-gate G701 and the AND-gate G709 as to allow it to be set by the next $L_{21}'$ pulse applied to the AND-gate G702. When the flip-flop F701 is set, a search for the next instruction specified by the contents of the $\beta$-register is initiated.

N-REGISTER

The N-register illustrated in FIG. 19 is a six-bit register which functions as a buffer or transfer register between the computer and input-output equipment, such as a typewriter 221 and a punched paper tape reader 225, only one of which may be employed at one time. The selection of the typewriter is made by closing a switch 215 and the selection of the paper tape reader is made by opening a switch 216. Output data to be typed from the computer is accumulated in the A-register and transferred into the N-register for typing, one six-bit coded character at a time. Input data also passes through the N-register as six-bit binary coded words, each binary word representing a letter, number or symbol. Data read in must be interpreted by the computer after it is received from the N-register and data to be read out must be prepared in the proper six-bit binary coded form before it is transferred into the N-register. If necessary, a subroutine of instructions may be provided in the computer program to convert data read in from a paper tape in one code to binary coded data which may be processed by the computer and another subroutine may be provided to convert binary coded data to be read out into data consisting of six-bit words in a code which may be decoded to operate the typewriter.

Data to be read out is serially transferred from the A-register into the N-register six bits at a time and transmitted in parallel to a relay decoding matrix 220 from the false output terminals $N_1'$ to $N_6'$ of the N-register to operate the typewriter. Either one of the instructions to open-shift the A-register to the N-register K places (OAN) and to open-shift the A-register to the N-register while shifting the N-register into the Q-register K places (ANQ) will shift the contents of the A-register into the N-register six bits at a time to type data out.

Input data to the computer from the paper tape reader 225 is transmitted to the N-register in parallel through a group of switches 200 which includes an indexing switch S and data switches *a* to *f* each of which is operated by a relay energized by the paper tape reader 225. The manner in which they are operated by the paper tape reader is not a part of the present invention and will not be described; various different systems known in the art are commercially available. It is sufficient to understand that when a relay K211 is energized, a −48 volt signal is applied through a relay contact 211 to the paper tape reader to engage its clutch and enable its relays to be energized. The energized relays actuate the switches 200. Either one of the instructions to open-shift the N-register and the A-register six places (ONA) and to open-shift the N-register into the A-register and the A-register into the Q-register (NAQ) shifts the six-bit coded word from the N-register into the A-register during a read-in process.

Actuation of the input-output control switches 215 and 216 may be implemented to be by means of programmed external-effect instructions, such as by providing a flip-flop which may be set and reset by external-effect command signals, but for simplicity the switches are illustrated as manually operated switches. It should be noted, however, that selecting either the typewriter for a read-out operation or the paper tape reader for the read-in operation through the control of those switches will only enable data to be read out or read in; specific programmed instructions are required to effect each word transfer between the computer and input-output equipment through the N-register.

The time required to type a character is approximately 100 milliseconds and the time required to read a character from the paper tape is approximately fifty milliseconds. During the time that an instruction to read or type a character is being executed, other instructions which do not require the use of the N-register may be executed. Thus, when a command to type a character (TYP) or a command to read a character (RPT) is being executed, a 0 volt signal is translated to an output terminal 210 until the electro-mechanical action of the typewriter or reader is complete, at which time a +6 volt signal is translated to the output terminal 210 to signal that the selected input or ouput device is ready to type or read another character. That signal is applied to input terminals of AND-gates G1305 and G1310 in the branch decoding and decision making section to enable the instruction sequencing section to effect a branch in response to a command to branch when the typewriter is ready (BTR) or in response to a command to branch when the paper tape reader is ready (BRR) whichever is applicable. Since only one input-output device may be employed at a time and the action of either produces a 0 volt signal at the output terminal 210, only one AND-gate, such as the AND-gate G1310, need be provided for a branch instruction decoding and decision making function. The same BRR command would then be used to branch when the last electromechanical action initiated has been completed. Such a common command could be identified by the mnemonic code EMA.

The N-register receives data serially from the A-register through an AND-gate G200 whenever an instruction is decoded which includes a shift-control signal transmitted from the $GEN_1$ instruction decoding section of FIG. 31. Those shift-control signals are $A \rightarrow N_s$ and $N \rightarrow A_s$ from the respective AND-gates G1125 and G1127. Instructions for shift operations are written in Format III so that the bit positions 13 to 17 of the instruction specify the number of places to be shifted, as described hereinbefore. The shift-control signal $A \rightarrow N_s$ enables an AND-gate G202 through an OR-gate G201 to allow $ShA_{19}'$ signals to serially shift $A_{19}'$ signals applied to an AND-gate G200 into the N-register. As the N-register is loaded from the A-register in that manner, data previously stored in the N-register is serially shifted out. When the contents of the N-register are to be shifted into the A-register a shift-control signal $N \rightarrow A_s$ enables the AND-gate G202 to allow $ShA_{19}'$ signals to serially shift the contents of the N-register into the A-register. As the data is shifted from the N-register to the A-register, 0-bits are shifted into the vacated bit positions of the N-register.

When the N-register is loaded in parallel from the paper tape reader 225 via the switches 200, a group 201 of six AND-gates *aa* to *ff* are enabled by the indexing switch to transmit 1-bits to set input terminals of appropriate bit positions of the N-register. A read paper tape instruction (RPT) is decoded by the $GEN_1$ instruction decoding section to provide an IN-OUT signal and a $D_0'$ signal. The IN-OUT signal is inverted by an inverter I204 to provide an IN-OUT′ signal which, in combination with the $D_0'$ signal, enables a pair of AND-gates G207 and G208 to reset the N-register and to enable an OR-gate G209 over a line 208. The +6 volt signal from the enabled OR-gate G209 is applied to the false output terminal of a flip-flop F209 to set it. An AND-gate G210 is disabled when the flip-flop F209 is set so that a 0 volt signal is translated to the output terminal 210 until the electromechanical action of the paper tape reader is completed and the flip-flop F209 is reset.

Before the read paper tape instruction may be given and successfully executed, the switch 216 must be opened, as described hereinbefore, thereby selecting the paper tape reader for operation. With the switch 216 open, an inhibiting 0 volt signal applied to an AND-gate G213 is removed so that the +6 volt signal from the enabled OR-gate G209 which sets the flip-flop F209 is translated by the AND-gate G213 to a transistor switch 213 and thereby energizes a relay K211 to close the relay contact 211 and provide a −48 volt signal to the paper tape reader. A clutch in the paper tape reader is engaged by the −48 volt signal and the next row of data is moved into place, read and transmitted in parallel to the group 201 of AND-gates by the group of switches 200 which is actuated by the paper tape reader. The data switches *a* to *f* of the group 200 are closed before the indexing switch S of that group so that the data switches will have time to settle before the group 201 of AND-gates is enabled.

A means is provided to de-energize a normally energized relay K207 when the relay K211 is energized and the electromechanical action of the paper tape reader is initiated in order that a relay contact 207 may be closed after the OR-gate G209 drives the flip-flop F209 to a set state. That means is illustrated as a relay K226 which is energized in response to the mechanical action of the paper tape reader to open a relay contact 226 thereby removing a −48 volt potential which maintains the relay K207 energized. When the relay K207 is de-energized and the contact 207 is closed, a 0 volt signal is applied to the reset input terminal of the flip-flop F209 to reset it. It should be noted that the AND-gate G210 remains disabled when the flip-flop is reset because of a 0 volt signal applied to one of its input terminals from the closed contact 207 which sets the flip-flop F209. After the paper tape reader has completed a reading cycle, the relay K226 is de-energized and its contact 226 is closed to energize the relay K207 again and open its contact 207 thereby enabling the AND-gate G210 to provide an electromechanical-action-complete signal to the branch instruction decoding and decision making section (FIG. 39).

When an instruction to type a character is received after the switch 215 is opened and the switch 216 is closed, it is decoded by the $GEN_1$ instruction decoding section to provide an IN-OUT signal and a $D_1'$ signal which are combined at an AND-gate G206 to provide a TYP command signal which is translated by the OR-gate G209 to enable an AND-gate G212 and set the flip-flop F209. Before the instruction to type is received, a six bit coded word representing the character to be typed is transferred into the N-register from the A-register as described hereinbefore. While the switch 215 is closed, a relay K213 is energized thereby removing an inhibiting ground potential from the AND-gate G212 and from a relay decoding matrix 220. With the inhibiting 0 volt signal removed from the AND-gate G212, the TYP command signal is translated to the base electrode of a transistor switch 212 to render it conductive. Current conduction through the transistor switch 212 energizes a relay K209 to close a contact 209 and energize a relay K210 in order to provide a −48 volt signal to the relay decoding matrix.

Binary coded signals at input terminals $N_1'$ to $N_6'$ derived from the false output terminals of the N-register are applied to input terminals of the relay decoding matrix 220 which transmits a signal over a line in a cable 219 to initiate the electromechanical action required in the typewriter to type the character decoded. The electromechanical action closes a cam actuated switch in the typewriter to energize a relay K222 and thereby open the relay switch 222. With the switch 222 open, the relay K207 is de-energized and the switch 207 closes to reset the flip-flop F209 and hold the AND-gate G210 disabled until the electromechanical action of the typewriter is complete.

The cam actuated switch within the typewriter which energizes the relay K222 is so adjusted that, when the typewriter mechanism is within about five milliseconds of completing the type operation, the relay K222 is de-energized and the relay K207 is re-energized by the time the typewriter has completed its type operation. In that manner, the AND-gate G210 is enabled after the type operation has been completed. Thereafter, upon the occurrence of a branch-on-typewriter-ready instruction (BTR) a +6 volt signal at the output terminal 210 is transmitted to the AND-gate G1310 (FIG. 39) to permit a branch decision to be made.

I-REGISTER

The I-register illustrated in FIG. 55 is a four bit register consisting of flip-flops $I_0$ to $I_3$. It is employed to transfer four bit binary numbers from an external digital data accumulator 2475 to the arithmetic section of the computer in order that they may be added to binary numbers stored in memory locations. The digital data accumulator 2475 includes a large number of binary counters, but for convenience only two binary counters 2476 and 2477 are illustrated.

The accumulation of data by the binary counters is controlled by an accumulator control 2478 which directs pulses to be counted from input terminals 2480 and 2481 to respective binary counters 2476 and 2477 while it is enabled by a 0 volt signal over a line 2482. The manner in which the accumulator control 2478 may be implemented will depend upon the application of the digital data accumulator but it may be assumed to include a logic circuit which couples the input terminals 2480 and 2481 to the respective binary counters 2476 and 2477 while the enabling 0 volt signal is present on the line 2482.

The contents of the binary counters 2476 and 2477 may be transferred in parallel through respective banks 2414 and 2415 of AND-gates via a bank 2413 of OR-gates and a group of AND-gates G2400 to G2403 enabled by an $L_{23}'$ pulse through an AND-gate G2404 and an inverter I2400 during the presence of an ADI′ command signal. The ADI command signal also enables an AND-gate G2405 in order that the contents of the I-register may be serially transferred to the arithmetic section in response to $ShA_1$–$A_{18}$ shift pulses while a binary number from a memory location is being transferred to the A-register. In that manner the contents of a binary counter in the I-register are serially transferred to the arithmetic section where it is added to a binary number read from a memory location. The sum in the A-register is then stored in the memory location by a separate instruction which, upon being decoded, produces an STA command signal as described hereinbefore with reference to FIG. 43.

An IS-register is provided as a means for sequencing the transfer of accumulated data from the binary counters 2476 and 2477 to the I-register under programmed control. The following sequence of instructions is executed when it is desired to add accumulated data to numbers stored in memory locations. An SIC instruction to set the input control circuitry is read and decoded in the $GEN_1$ instruction decoding sections of FIGS. 31 and 33 to provide $D_1'$ and $\overline{\text{EX-EFF}}$ signals which enable an AND-gate G2408 to set a flip-flop F2448 and reset the IS-register in response to an $L_{12}'$ pulse.

When the $IS_3$ flip-flop is reset, a +6 volt signal from its true output terminal enables an AND-gate G2470 and disables the accumulator control 2478. At the same time, the set flip-flop F2448 enables an AND-gate G2471 to set the flip-flop $IS_0$ in response to an $L_{16}'$ pulse. Thereafter, an instruction is decoded to load the I-register from a binary counter specified by the IS-register and to transfer the contents loaded into the I-register to the arithmetic section so that it may be added to the contents of a memory location. The resulting sum is stored in the A-register; therefore, it is necessary to execute an LDA instruction for storing the contents of the A-register in a memory location before another instruction to load the I-register from another binary counter may be executed.

When an ADI instruction is executed, an ADI′ command signal is transmitted from the instruction decoding section (FIG. 43) to an AND-gate G2404 to cause the contents of the binary counter 2477 to be transferred into the I-register through the AND-gates G2400 to G2403 in response to an $L_{23}'$ pulse. The ADI′ command signal enables the contents of the I-register to be added to the contents of the specified memory location as described hereinbefore with reference to FIG. 40. During the addition operation, a 0 volt signal from an output terminal 1606 in the instruction decoding section enables the OR-gate G400 of the A-register control section in FIG. 23 to cause $ShA_1$–$A_{18}$ shift pulses to be applied to the I-register so that the contents of the I-register may be transferred through the enabled AND-gate G2405 to the arithmetic section.

The ADI′ command signal also enables an AND-gate G2407 to translate an $L_4'$ pulse through an inverter I2414 and the enabled AND-gate G2470 to a trigger input terminal of the IS-register so that the flip-flop $IS_0$ is reset and the flip-flop $IS_2$ is set. The output of the enabled AND-gate G2407 also resets the flip-flop F2448 at that time. When the flip-flop $IS_2$ is set, the bank 2414 of AND-gates is enabled and the bank 2415 of AND-gates is disabled to transfer the contents of the binary counter 2476 to the I-register next.

Before the next ADI command may be executed, it is necessary to store the contents of the A-register in response to an STA command signal derived from an instruction decoded by the basic instruction decoding section (FIG. 43). After the STA command has been executed in a manner described hereinbefore, a second ADI command may be executed in a manner similar to the first except that the transfer of data to the I-register is made through the bank 2414 of AND-gates in response to an $L_{23}'$ pulse. A following $L_4'$ pulse is translated by the inverter I2414 and the AND-gate G2470 to the trigger input terminal of the Input Selector Register to reset the flip-flop $IS_2$ and set the flip-flop $IS_3$.

When the flip-flop $IS_3$ is set, a positive-going (0 to +6 volts) signal is transmitted to the trigger input terminal of a steered flip-flop F2465 to set it. The set flip-flop F2465 enables a pair of AND-gates G2472 and G2473 to translate an $L_8'$ pulse to reset the binary counters 2476 and 2477. Thereafter, an $L_{12}'$ pulse resets the flip-flop F2465.

After the flip-flop $IS_3$ has been set, the accumulator control 2478 is enabled over the line 2482. By the time the binary counters in the digital data accumulator have been reset, the accumulator control is ready to resume translating signals applied to the input terminals 2480 and 2481 to the binary counters. It is assumed that the nature of the signal sources connected to the input terminals 2480 and 2481 is such that signals which are to be counted are not generated during the period that the $IS_3$ flip-flop is reset and data is being transferred to the I-register, a period of about four word-times in the illustrated embodiment, or that the nature of the data being accumulated is such that signals which may be applied to the input terminals 2480 and 2481 during the period that the accumulator control is disabled may be ignored. The $IS_3$ flip-flop remains set to continually enable the accumulator control until an instruction to set the IS-register is again executed in order to introduce another sequence of instructions which will cause data to be transferred from the binary counters in the digital data accumulator to the I-register as described.

STALL AND PROGRAMMED ALARM CIRCUIT

Figure 38:
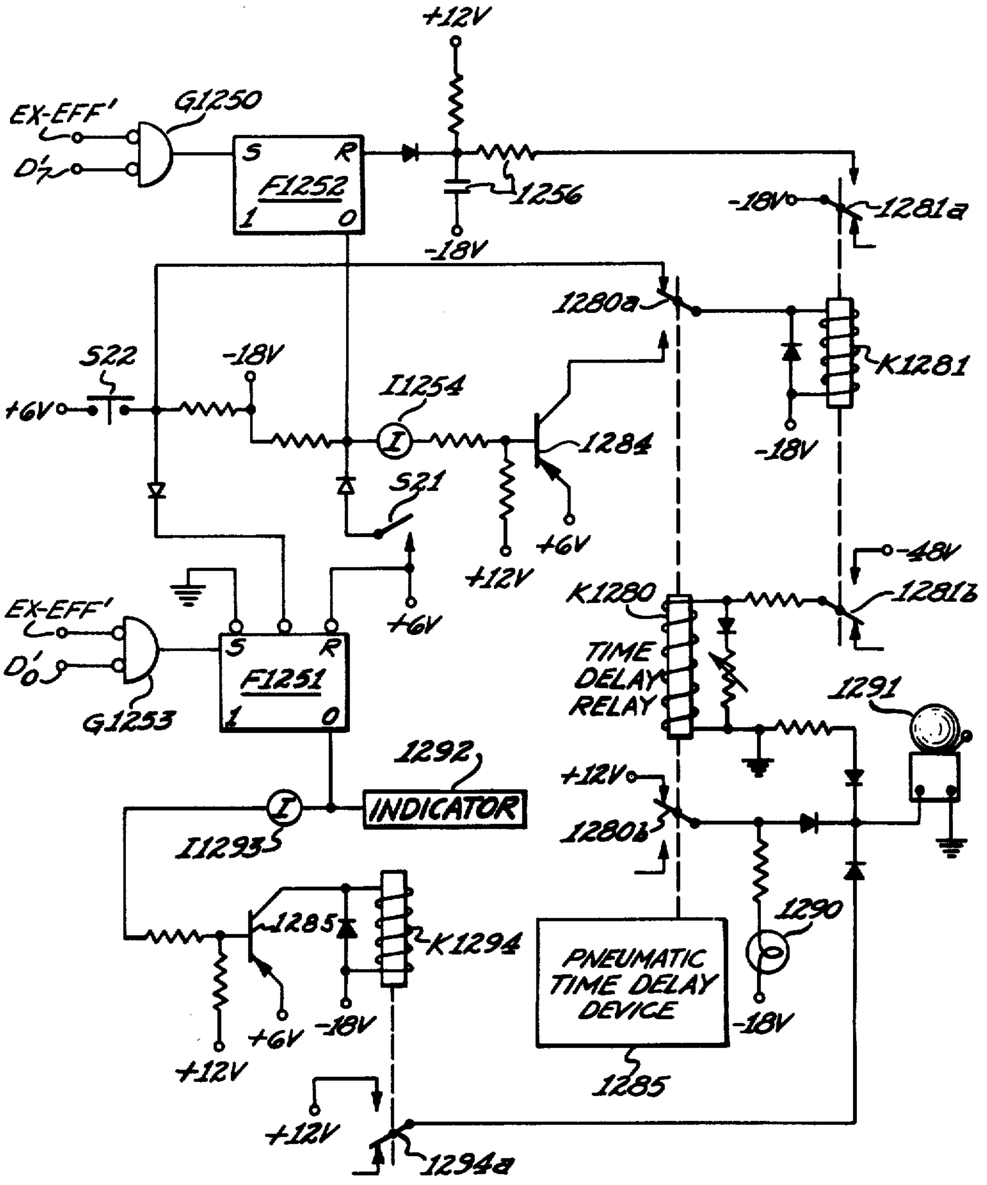
FIG. 38 illustrates a logic diagram of a circuit for providing a program-stall alarm and a programmed alarm.

The stall-alarm circuit illustrated in FIG. 38 provides an alarm to indicate that the operation program has by reason of some system or program malfunction stopped or taken an unusual length of time to complete a given sequence of instructions. The circuit primarily consists of a flip-flop F1252, two relays K1280 and K1281, a visual indicator 1290 and an audio alarm 1291. One of the two relays, relay K1280, is a time delay relay having a fast pickup time and a delayed drop-out which may be adjusted. An adjustable pneumatic time delay device 1285 associated with the time delay relay K1280 is employed to adjust the relay drop-out time to provide a delay of from one to sixty seconds.

The stall-alarm circuit is designed such that during normal automatic operation, the flip-flop F1252 must be cyclically set within the drop-out time delay of the relay K1280 in order to prevent the alarm devices 1290 and 1291 from being energized. Consequently, the program is written to control the operation of the computer with recurring instructions to set the stall-alarm flip-flop F1252 within the drop-out time of the relay K1280. Each instruction is decoded by the $GEN_1$ decoding section (FIG. 31) to provide an $\overline{\text{EX-EFF}}$ and a $D_7'$ signal at input terminals of an AND-gate G1250 to cause the flip-flop F1252 to be set and prevent the stall-alarm devices 1290 and 1291 from being energized.

If there has been some malfunction in the execution of the stored program, the flip-flop F1252 will not be set before the time delay relay K1280 drops out and one of its contacts 1280*b* closes as shown to cause a +12 volt signal to be connected to the visual indicator 1290 and the audio alarm 1291.

To place the stall-alarm circuit in an initial condition or to reset it after an alarm condition, a reset-alarm push button S22 on the console is depressed to transmit a +6 volt signal through the contact 1280*a* to energize the relay K1281. When the relay K1281 is energized, a set of its contacts 1281*a* and 1281*b* will be closed thereby providing a −48 volt signal to energize the time delay relay K1280 and a −18 volt signal to an R–C circuit 1256 to reset the flip-flop F1252.

Energization of the relay K1280 will transfer the contact 1280*a* to the collector of a transistor switch 1284 which is operated by the flip-flop F1252 through an inverter I1254. If the flip-flop F1252 is not set within the time delay of the relay K1280, the relay K1281 will not be energized and the time delay relay K1280 will drop out. Consequently, if the flip-flop F1252 is not continually set by program instructions (SSA), the time delay relay K1280 will permit its contacts 1280*a* and 1280*b* to transfer to their de-energized position as shown and sound an alarm. Each time the relay K1281 is re-energized, the contact 1281*a* supplies a −18 volt signal to the reset input terminal of the flip-flop F1252 through the R–C circuit 1256. When the flip-flop F1252 is reset, the transistor switch 1284 is cut off and the relay K1281 is de-energized.

To prevent the program stall-alarm circuit from producing an alarm when the instruction sequencing of the stored program is being operated manually, a switch S21 is closed to provide a +6 volt signal to the inverter I1254 and thereby hold the relay K1281 continuously energized through the transistor switch 1284. With the relay K1281 continuously energized, the relay K1280 is also continuously energized.

The audio alarm 1291 may also be energized by an ALM command which, upon being decoded by the $GEN_1$ instruction decoding section of FIG. 31 and an AND-gate G1253 (FIG. 38), sets a flip-flop F1251. When the flip-flop F1251 is set, an indicator 1292 is energized directly and a relay K1294 is energized through an inverter I1293 and a transistor switch 1285. A contact 1294*a* is thereby closed to supply a +12 volt signal to energize the alarm 1291. The flip-flop F1251 may be reset to de-energize the programmed alarm by momentarily depressing the push button S22.

What is claimed is:

1. In a serial, stored-program, digital computer having an instruction sequencing section for controlling the execution of single-address and one-plus-one address instructions, said one-plus-one address instruction consisting of two groups of digital signals, a first group of a given one-plus-one address instruction specifying an operation to compare the absolute value of a given number with the absolute value of a specified constant and to branch to an alternative sequence of instructions beginning with an instruction at an address specified by a second group of digital signals if a specified relation is present between the value of said given number and the value of said specified constant, said specified constant being represented by a portion of said first group of digital signals which group includes two distinctive digital signals, the combination comprising:
- a memory section having a plurality of sequentially accessible memory locations;
- a first and second register;
- a third register for storing a group of digital signals representing said given number;
- first means for transferring said first group of digital signals to said first register including a serial binary adder through which said first group of digital signals is serially transferred to said first register;
- sensing means for determining the presence of said two distinctive digital signals of said first group of digital signals;
- a second means coupled to said sensing means and responsive to the presence of a particular one of said distinctive digital signals for causing said group of digital signals in said third register to be transferred in synchronism with said first group of digital signals to effect a binary addition of like binary orders of said specified constant and said given number, the sum being transferred to said first register for storage;
- means for decoding said first group of digital signals in said first register and for simultaneously determining the presence of said specified relation by testing for the presence of a carry propagated into a predetermined order of said first group of digital signals transferred to said first register;

a third means coupled to said sensing means and responsive to the presence of the other one of said distinctive digital signals for causing said second group of digital signals of said given one-plus-one address instruction to be transferred to said second register;

and a fourth means coupled to said decoding means for inhibiting said third means from transferring said second group of digital signals to said second register if it is determined that said specified relation is not present.

2. In a serial, stored-program, digital computer, the combination as defined in claim 1 wherein said specified constant is a negative number represented by the two's complement of its true binary value whereby binary addition effects a subtraction of said specified constant from said given number in order to compare their absolute values.

3. In a stored-program digital computer having an addressable memory section with sequentially accessible locations including locations *n*, $n+1$, $n+2$ . . . $n+q$ . . . $n+s$, where *n*, *q* and *s* are arbitrary integers, for storing words consisting of groups of digital signals representative of instructions, instruction addresses and operands, the combination comprising:

a first register for storing a group of digital signals representing an instruction to be executed;

a second register for storing a group of digital signals representing a location address of an instruction which is the first of a sequence of instructions to be transferred to said first register from alternate memory locations;

a third register for storing a group of digital signals representing a number;

an arithmetic section for performing arithmetic operations on two groups of digital signals representing two numbers in response to control signals received over control signal lines;

a first means for transferring a given instruction group of digital signals from a memory location *n* directly to said arithmetic section, said given instruction group of digital signals specifying an operation to branch to an alternative sequence of instructions beginning with an instruction in a location $n+q$, the address of which is specified by a group of digital signals in a location $n+1$, if the absolute value of a number in said third register bears a specified relation to the absolute value of a constant specified by said group of digital signals being transferred from said memory location *n*, said instruction group of digital signals including a first and a second distinctive signal;

a second means responsive to said first distinctive signal of said instruction group of digital signals for transferring said group of digital signals representing a number from said third register to said arithmetic section and for transmitting control signals to said arithmetic section as said given instruction group of digital signals is being transferred whereby said given instruction group of digital signals is modified in accordance with the relation the absolute value of said binary number bears to the absolute value of said specified constant;

a third means for transferring a resultant group of digital signals representing the result of said arithmetic operation from said arithmetic section to said first register;

a fourth means responsive to said second distinctive signal of said instruction group of digital signals for transferring from the next immediately accessible memory location $n+1$ an address group of digital signals representative of the location $n+q$ to said second register;

a fifth means for decoding said instruction group of digital signals transferred to said first register and for determining whether said specified relation is present;

a sixth means responsive to said fifth means for inhibiting said fourth means from transferring an address group of digital signals from said location $n+1$ to said second register when said fifth means determines said specified relation is not present and for enabling said first means to transfer an instruction group of digital signals from a memory location $n+2$ to said first register;

and a seventh means for enabling said first means to transfer a group of digital signals from said memory location $n+q$ to said first register when the presence of said specified relation is determined and a group of digital signals representing the memory location $n+q$ is transferred to said second register, said seventh means including a means for comparing the addresses of the sequentially accessible memory locations with the address $n+q$ specified by the group of digital signals in said second register.

References Cited by the Examiner

UNITED STATES PATENTS

| | | | |
|---|---|---|---|
| 2,974,867 | 3/61 | Steele | 235—167 |
| 3,058,658 | 10/62 | Schmierer et al. | 340—172.5 |

MALCOLM A. MORRISON, *Primary Examiner.*

WALTER W. BURNS, Jr., *Examiner.*